United States Patent
Kobayashi et al.

[11] Patent Number: 5,978,415
[45] Date of Patent: Nov. 2, 1999

[54] AUTOMATIC AMPLITUDE EQUALIZER

[75] Inventors: Kenzō Kobayashi; Toshio Kawasaki; Toshio Tamura, all of Kawasaki; Hiroyuki Kiyanagi, Sendai; Takanori Iwamatsu, Kawasaki, all of Japan

[73] Assignee: Fujitsu Limited, Kanagawa, Japan

[21] Appl. No.: 08/533,119

[22] Filed: Sep. 25, 1995

[30] Foreign Application Priority Data

| | | | |
|---|---|---|---|
| Sep. 27, 1994 | [JP] | Japan | 6-231824 |
| Oct. 3, 1994 | [JP] | Japan | 6-238977 |
| Jun. 28, 1995 | [JP] | Japan | 7-162720 |

[51] Int. Cl.$^6$ ..................... H03H 7/30
[52] U.S. Cl. .................. 375/230; 375/232; 375/233; 375/235
[58] Field of Search .............. 327/100; 333/18, 333/165; 375/229, 230, 232, 233, 235, 261, 345; 455/273, 276.1, 311

[56] References Cited

U.S. PATENT DOCUMENTS

| | | | |
|---|---|---|---|
| 3,727,136 | 4/1973 | Schroeder et al. | 375/235 |
| 3,906,347 | 9/1975 | Motley et al. | 375/235 |
| 4,097,807 | 6/1978 | Fujimura | 375/232 |
| 4,237,554 | 12/1980 | Gitlin et al. | 375/232 |
| 4,258,340 | 3/1981 | Ryu . | |
| 4,466,134 | 8/1984 | McNicol . | |
| 4,483,009 | 11/1984 | Honda et al. | 375/232 |
| 5,394,110 | 2/1995 | Mizoguchi | 329/304 |

FOREIGN PATENT DOCUMENTS

| | | |
|---|---|---|
| 0030037 | 6/1981 | European Pat. Off. . |
| 0092907 | 11/1983 | European Pat. Off. . |
| 0 106 136 | 4/1984 | European Pat. Off. . |
| 0 122 637 | 10/1984 | European Pat. Off. . |
| 0 257 526 | 3/1988 | European Pat. Off. . |

*Primary Examiner*—Stephen Chin
*Assistant Examiner*—Joseph Roundtree
*Attorney, Agent, or Firm*—Helfgott & Karas, P C.

[57] ABSTRACT

The invention provides an automatic amplitude equalizer for compensating an amplitude characteristic of an input signal, wherein a control signal for equalizing an inclination amplitude distortion of an input signal is detected making use of a pair of digital demodulated signals to compensate for the amplitude characteristic of the input signal with a high degree of accuracy and which can be constructed with a reduced circuit scale and at a reduce cost. The automatic amplitude equalizer includes a first-order inclination amplitude equalization section for compensating for an amplitude characteristic of an input signal in accordance with a first-order inclination amplitude characteristic, and a control section for discriminating a direction of variation of a value of a first one of a pair of digital demodulated signals originating from the input signal, detecting error information from the other, second one of the digital demodulated signals which is orthogonal to the first signal, and outputting a control signal for the first-order inclination amplitude equalization section based on a correlation between the error information and the direction of variation of the value of the first signal.

45 Claims, 66 Drawing Sheets

FIG. 12

| DIRECTION OF ROTATION OF COMPOSITE VECTOR | MOVEMENT OF SIGNAL I | ERROR VOLTAGE E OF SIGNAL Q | FIRST-ORDER INCLINATION DISTORTION ($\gamma$) |
|---|---|---|---|
| COUNTERCLOCKWISE | ↓ | −E | POSITIVE INCLINATION ($\gamma > 1$) |
|  | ↑ | +E |  |
| CLOCKWISE | ↓ | +E | NEGATIVE INCLINATION ($\gamma < 1$) |
|  | ↑ | −E |  |
| NO ROTATION | × | 0 | ZERO INCLINATION ($\gamma = 1$) |

FIG. 16

| C1 | C2 | C3 | |
|----|----|----|---|
| 0  | 0  | 0  | |
| 0  | 1  | ×  | (MAINTAINS STATE PRIOR BY ONE BIT) |
| 1  | 0  | ×  | |
| 1  | 1  | 1  | |

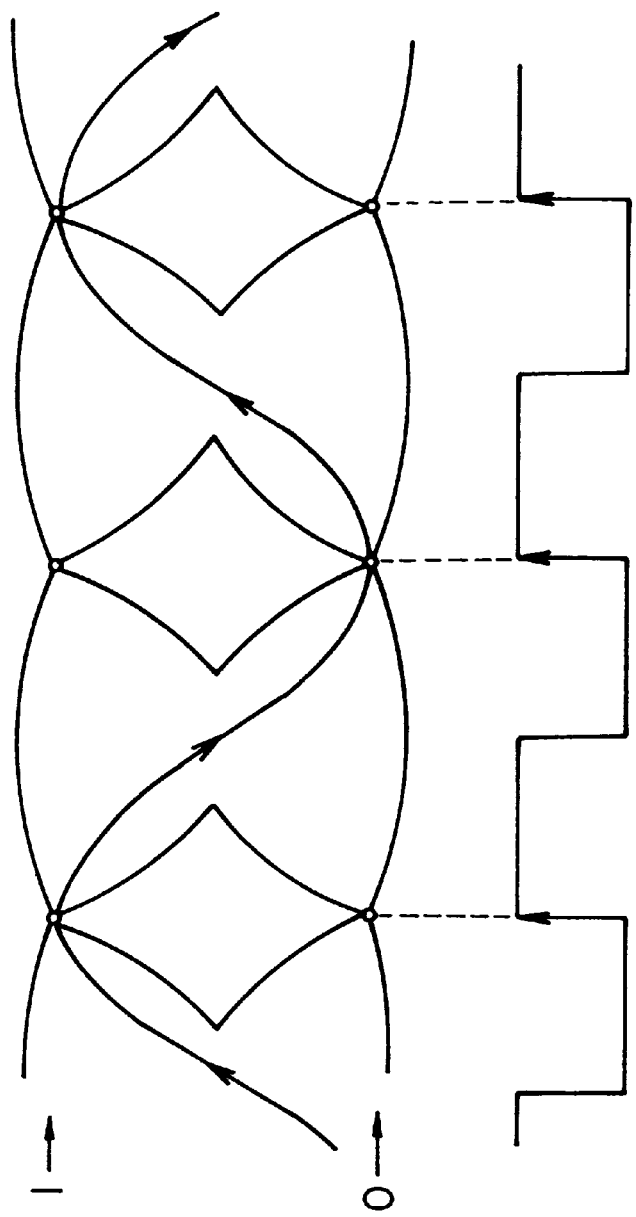

$D \oplus \epsilon = \text{"1"}$ $D \oplus \epsilon = \text{"0"}$

AUTOMATIC AMPLITUDE EQUALIZER

BACKGROUND OF THE INVENTION

1. Field of the Invention

This invention relates to an automatic amplitude equalizer which compensates for an amplitude characteristic of an input signal.

2. Description of the Related Art

In recent years, in digital multiplex radio apparatus, in order to improve the signal quality of a channel against deterioration arising from a transmission line distortion such as a fading distortion which occurs in the space, transversal equalizers which can equalize the transmission line distortion in the time-domain are practically used widely.

It is known, however, that the equalization characteristic (also called signature characteristic) of a transversal equalizer, for example, of the orthogonal two-dimensional type is called "M curve" and is inferior in primary first-order inclination characteristic in an IF (intermediate frequency) band.

Therefore, it is demanded to use, in addition to a transversal equalizer which equalizes a transmission line distortion (first-order inclination distortion) of a first-order inclination characteristic of an IF signal (input signal) in the time-domain, an equalizer which equalizes the transmission line distortion in the frequency-domain or the time-domain to compensate for the transmission line distortion more effectively.

Also it is demanded for an equalizer to effectively detect a secondary or second-order inclination distortion of an IF signal and compensate for not only a first-order inclination distortion of the IF signal but also a second-order inclination distortion of the IF signal effectively to assure a higher performance of an equalizer.

FIG. 65 is a block diagram showing a construction of an ordinary automatic amplitude equalizer. Referring to FIG. 65, the automatic amplitude equalizer shown includes a first-order inclination compensation section 100, an automatic gain control section (AGC) 200, a three-wave detector 300 and a comparison circuit 400.

The first-order inclination compensation section 100 has a first-order inclination amplitude characteristic, which is controlled in accordance with a control signal from the comparison circuit 400 which will be hereinafter described so that the first-order inclination compensation section 100 compensates for a first-order inclination distortion of a received signal transmitted thereto in the space in accordance with the first-order inclination characteristic thereof. The automatic gain control section 200 controls the gain of the output of the first-order inclination compensation section 100 fixed so that a circuit at a following stage to the first-order inclination compensation section 100 such as a demodulator may operate regularly.

The three-wave detector 300 performs three-wave detection for the output of the automatic gain control section 200 to detect three different frequency components $f_0$, $f_1^-$ and $f_2^+$ of the output. The comparison circuit 400 compares the three frequency components $f_0$, $f_1^-$ and $f_2^+$ obtained from the three-wave detector 300 with each other to detect a first-order inclination distortion of the input signal (received signal) of the equalizer and outputs a control signal for the first-order inclination compensation section 100 for compensating for the first-order inclination distortion.

In the automatic amplitude equalizer having the construction described above, an input signal to the equalizer is controlled fixed in gain by the automatic gain control section 200 and three-wave detected by the three-wave detector 300. The three frequency components $f_0$, $f_1^-$ and $f_2^+$ thus obtained from the three-wave detector 300 are compared with each other by the comparison circuit 400 to detect a first-order inclination distortion of the input signal.

Then, from the comparison circuit 400, a control signal for controlling the first-order inclination amplitude characteristic of the first-order inclination compensation section 100 is outputted in order to compensate for the first-order inclination distortion. In accordance with the control signal, the first-order inclination compensation section 100 compensates for the first-order inclination characteristic of the input signal.

FIG. 66 is a block diagram showing a construction of another ordinary automatic amplitude equalizer. Referring to FIG. 66, the automatic amplitude equalizer shown includes a reception section 10, a first-order inclination compensation section 20', a variable gain amplification section 30, a demodulation section 40 including a transversal equalizer (TRE) 41, an identification section 50, an amplitude detection section 60, and a control section 90'. It is to be noted that reference numeral 101 denotes an antenna.

The reception section 10 down converts a RF (radio frequency) signal received by the antenna 101 into an IF (intermediate frequency) signal. The first-order inclination compensation section 20' has a first-order inclination amplitude characteristic and compensates for a first-order inclination distortion of an IF signal in accordance with the first-order inclination amplitude characteristic. The first-order inclination compensation section 20' include a distributor (hybrid type) 211, a positive inclination first-order amplitude equalization section 212 which makes use of a positive inclination first-order characteristic of a notch filter or a like element, a negative inclination first-order amplitude equalization section 213 which similarly makes use of a negative inclination first-order characteristic of a notch filter, a pair of variable attenuators 214 and 215 for which a PIN diode or a like element is employed, and a mixer (hybrid type) 216.

The variable gain amplification section 30 controls the amplification degree of the output of the first-order inclination compensation section 20' in accordance with an AGC (Automatic Gain Control) signal from the amplitude detection section 60, which will be hereinafter described, so that the gain of the output thereof to the demodulation section 40 may be fixed. The demodulation section 40 demodulates the output of the variable gain amplification section 30 using a suitable demodulation method such as orthogonal detection to obtain a demodulated base band signal (BBS). The demodulation section 40 is constructed including the transversal equalizer 41, for example, of the 7-tap type.

The identification section 50 identifies a demodulated base band signal obtained from the demodulation section 40 with a required identification level. The amplitude detection section 60 compares the BBS signal from the demodulation section 40 with a predetermined reference value (symbol level) in synchronism with a symbol timing clock signal (SCK) to produce an AGC signal for automatically controlling the gain of the variable gain amplification section 30.

The control section 90' detects a first-order inclination distortion of an IF signal and produces based on the thus detected first-order inclination distortion and outputs to the first-order inclination compensation section 20' a control signal for controlling the mixing ratio between the outputs of the positive inclination first-order amplitude equalization section 212 and the negative inclination first-order amplitude equalization section 213 in the first-order inclination compensation section 20'. The control section 90' includes the spectrum distortion detection section 70' for detecting a first-order inclination distortion in a spectrum of an IF signal, and the mixing ratio control section 80' for producing a control signal in response to a result of detection by the spectrum distortion detection section 70'.

In the automatic amplitude equalizer having the construction described above, a RF (radio frequency) signal received by the antenna 101 is amplified and down converted into an IF (intermediate frequency) signal having a center frequency at $f_0$, which will be hereinafter described with reference to FIG. 67(a), by the reception section 10. Then, the IF signal is compensated for, in first-order inclination distortion thereof, by the first-order inclination compensation section 20', and an $IF_{EQ}$ signal after compensation is outputted from the first-order inclination compensation section 20'.

The $IF_{EQ}$ signal is amplified by the variable gain amplification section 30 and then inputted to the demodulation section 40, in which the input signal ($IF_{EQ}$ signal) is demodulated using a predetermined demodulation method such as orthogonal detection to obtain a demodulated base band signal (BBS).

Then, the demodulated base band signal BBS is identified with a required identification level by and outputted as a received data from the identification section 50. Meanwhile, the amplitude detection section 60 compares the base band signal (BBS) outputted from the demodulation section 40 with a predetermined reference value (symbol level) in synchronism with a symbol timing clock signal SCK to perform automatic gain control (AGC) so that the input signal level to the demodulation section 40 may always be fixed.

The demodulation section 40 described above includes the transversal equalizer 41 so that a fading distortion of an IF signal may basically be corrected in the time-domain. For the transversal equalizer 41, a transversal equalizer of the 7-tap type having, for example, such a signature characteristic (M curve) as represented by a characteristic $T_7$ in FIG. 67(a) is employed normally. It is to be noted that, in FIG. 67(a), the axis of abscissa represents the fading frequency (MHz), and the axis of ordinate represents the depth of fading (dB).

However, if it is tried to realize a uniform error rate of approximately $10^{-3}$ over the entire IF band using a transversal equalizer of the 7-tap type, when a distortion (deterioration in amplitude) by fading occurs in the proximity of the frequency $f_0$, the distortion can be compensated for (equalized) to the depth of up to approximately 17 dB, but when a distortion by fading occurs at any of the opposite shoulder portions (first-order inclination), the distortion can be compensated for only to the depth of up to approximately 15 dB. The difference between the depths is approximately 2 dB, and the inclination of the characteristic $T_7$ is comparatively moderate.

Thus, it has been devised and put into practical use to compensate for an amount of deterioration in amplitude at any of the opposite shoulder portions of such a characteristic $T_7$ as illustrated in FIG. 67(a) separately by means of a first-order inclination compensation section which has such a first-order inclination amplitude equalization characteristic as the first-order inclination compensation section 20' described above.

In particular, in this instance, an IF signal is branched by the distributor 211 into two waves, which are individually inputted to the positive inclination first-order amplitude equalization section 212 and the negative inclination first-order amplitude equalization section 213 which have first-order inclination amplitude equalization characteristics of a positive inclination and a negative inclination, respectively. The positive inclination first-order amplitude equalization section 212 performs first-order amplitude equalization of the positive inclination for the input signal thereto in the frequency-domain while the negative inclination first-order amplitude equalization section 213 performs first-order amplitude equalization of the negative inclination for the input signal thereto in the frequency-domain.

The outputs of the two equalization sections 212 and 213 are attenuated by the variable attenuators 214 and 215, respectively, so that they have such a mixing ratio with which the inclination amplitude distortion of the received signal may be cancelled, and are then mixed (composed) by the mixer 216. An example of operation in this instance will be described in detail below.

First, the spectrum distortion detection section 70' detects an amount of a first-order inclination distortion in a spectrum by two-point detection of frequencies ($f_0-\Delta f$, $f_0+\Delta f$) at the opposite shoulder portions of the IF band. Further, if the the spectrum distortion detection section 70' detects a distortion of a positive inclination from the $IF_{EQ}$ signal, then it outputs a negative detection signal SPD, but if it detects a distortion of a negative inclination, then it outputs a positive detection signal SPD. Then, the mixing ratio control section 80' integrates, in the inside thereof, the positive or negative detection signal SPD to produce a distortion detection signal.

In this instance, the distortion detection signal is driven to the "0" side when the spectrum of the $IF_{EQ}$ signal is flat or has a distortion in the proximity of the frequency $f_0$, but is driven to the "−" side when the spectrum of the $IF_{EQ}$ signal has a distortion of a positive inclination, whereas it is driven to the "+" side when the spectrum of the $IF_{EQ}$ signal has a distortion of a negative inclination. In response to the distortion detection signal, the control signals to be applied to the variable attenuators 214 and 215 are varied symmetrically in such manners as seen from curves "a" and "b" in FIG. 67(b).

It is to be noted that, in this instance, the variable attenuators 214 and 215 have such a characteristic that, when the control voltage "a" or "b" is low, the attenuation amount approaches "∞", but on the contrary when the control voltage "a" or "b" is high, the attenuation amount approaches "0".

FIG. 68(a) is a diagram illustrating an example of equalization operation of the first-order inclination compensation section 20'. Referring to FIG. 68(a), the characteristic p indicates a positive inclination first-order amplitude equalization characteristic of the positive inclination first-order amplitude equalization section 212, and the characteristic n indicates a native inclination first-order amplitude equalization characteristic of the negative inclination first-order amplitude equalization section 213. A composite characteristic of the characteristics p and n is indicated by the characteristic m. It is to be noted that, in this instance, a mixing ratio between the characteristics p and n is taken into consideration, and in the example shown, the mixing ratio is p:n=1:2.

The composite characteristic m is, as seen in FIG. 68(a), opposite to the positive inclination distortion of the input IF signal, and consequently, if the IF signal is equalized in amplitude with the composite characteristic m, then a flat IF$_{EQ}$ signal is obtained at the output of the first-order inclination compensation section 20'. The first-order inclination compensation section 20' is constructed such that this relationship stands for any first-order inclination distortion of the IF signal. Accordingly, in the system in which the first-order inclination compensation section 20' is employed in addition to the transversal equalizer 41 of the 7-tap type described above, also the fading distortion at any of the opposite shoulder portions of the IF band is compensated for to the depth of 17 dB similarly to that at a central portion of the IF band, and consequently, the M curve exhibits a flat configuration (not shown).

A further automatic amplitude equalizer which compensates a first-order inclination distortion of an input signal is disclosed in Japanese Patent Laid-Open Application No. show a 58-198928 wherein a first-order inclination distortion of a received signal is detected from two different analog signals (I, Q) obtained by demodulation of the input signal and orthogonal to each other to compensate for the first-order inclination distortion of the received signal to equalize the amplitude of the received signal.

While several automatic amplitude equalizers are described above, the automatic amplitude equalizer shown in FIG. 65 has a subject to be solved in that a large circuit scale and a high cost are required because, upon detection of a first-order inclination distortion, the frequency components $f_0$, $f_1^-$ and $f_2^+$ which are to be used for comparison by the comparison circuit 400 are detected using the three-wave detector 300 which has a large circuit scale and is expensive.

Meanwhile, an automatic amplitude equalizer of the type shown in FIG. 66 nowadays employs, for example, in place of the transversal equalizer 41, a transversal equalizer of the 9-tap type having such an M curve as indicated by a characteristic $T_9$ in FIG. 67(*a*), and consequently is improved very much in equalization characteristic.

If it is tried to realize a uniform error rate of approximately $10^{-3}$ over the entire IF band using a transversal equalizer of the 9-tap type just mentioned, then when fading occurs in the proximity of the frequency $f_0$, a first-order inclination distortion of an input signal can be compensated for to the depth of up to approximately 20 dB, but when fading occurs at any of the opposite shoulder portions (first-order inclination) of the IF band, the first-order inclination distortion of the input signal can be compensated for to the depth of up to approximately 16 dB. In short, the difference between the depths is approximately 4 dB, and the inclination of the characteristic $T_9$ is steeper than that of the characteristic $T_7$.

However, if it is tried to compensate for such a steep characteristic $T_9$ by means of the first-order inclination compensation section 20', then a steep equalization characteristic is required for each of the positive inclination first-order amplitude equalization section 212 and the negative inclination first-order amplitude equalization section 213 accordingly. However, an amplitude characteristic which satisfies such a steep equalization characteristic is rather near to a second- or third-order characteristic, and if a first-order characteristic is used as approximate characteristic to the amplitude characteristic, then the following problem is invited.

In particular, referring to FIG. 68(*b*), the characteristic p represents a positive inclination second-order equalization characteristic of the positive inclination first-order amplitude equalization section 212, and the characteristic n represents a negative inclination second-order equalization characteristic of the negative inclination first-order amplitude equalization section 213. It is to be noted that, in FIG. 68(*b*), each of the second-order characteristics is represented approximately as a polygonal line. Then, the composite characteristic of the characteristics p and n is indicated by m. If an IF signal having a positive inclination distortion similar to that illustrated in FIG. 68(*a*) is inputted to the first-order inclination compensation section 20', then the amplitude of the IF$_{EQ}$ signal at the output of the first-order inclination compensation section 20' exhibits deterioration in the proximity of the frequency $f_0$ as seen in FIG. 68(*b*). This phenomenon always occurs if the inclinations of the characteristics p and n are steep.

Therefore, in such a system as employs the first-order inclination compensation section 20' in addition to a transversal equalizer of the 9-tap type, the overall equalization characteristic EQT$_9$ of the M curve does not exhibit such a flat configuration as seen in FIG. 67(*a*), but rather exhibits deterioration of approximately 3 dB in the proximity of the frequency $f_0$.

On the other hand, the apparatus disclosed in Japanese Patent Laid-Open Application No. show a 58-198928 still has a subject to be solved in that the circuit scale or the cost of an apparatus cannot be reduced because also a detection system for detecting a first-order inclination distortion of an input signal from analog signals (I, Q) obtained by demodulation of the input signal is formed from an analog circuit.

Further, although it is a common practice to detect a first-order inclination distortion of an input signal and compensate for the first-order inclination distortion of the input signal based on the thus detected first-order inclination distortion to equalize the input signal, it is not a common practice to detect a second-order inclination distortion (second-order inclination amplitude characteristic) of an input signal to compensate for the second-order inclination distortion.

SUMMARY OF THE INVENTION

It is an object to provide an automatic amplitude equalizer wherein a control signal for compensating for an inclination amplitude distortion of a received signal is detected making use of a correlation between a direction of variation of a value of one of a pair of digital demodulated signals and error information of the other signal using a detection system formed from a digital circuit and which can be constructed with a reduced circuit scale and at a reduce cost.

It is another object of the present invention to provide an automatic amplitude equalizer which can compensate for an amplitude characteristic (particularly a first-order inclination distortion) of an input signal readily with a simple construction.

It is a further object of the present invention to provide an automatic amplitude equalizer wherein not only a first-order inclination distortion of an input signal but also a second-order inclination distortion of the input signal are detected and also the second-order inclination distortion of the input signal can be compensated for with a high degree of accuracy.

In order to attain the objects described above, according to an aspect of the present invention, there is provided an automatic amplitude equalizer for compensating for an amplitude characteristic of an input signal, which comprises a first-order inclination amplitude equalization section for compensating for the amplitude characteristic of the input signal in accordance with a first-order inclination amplitude characteristic, and a control section for discriminating a direction of variation of a value of a first one of a pair of digital demodulated signals originating from the input signal, detecting error information from the other, second one of the digital demodulated signals which is orthogonal to the first signal, and outputting a control signal for the first-order inclination amplitude equalization section based on a correlation between the error information and the direction of variation of the value of the first signal.

Accordingly, with the automatic amplitude equalizer, the control section can be formed from a digital circuit, and the control signal for the first-order inclination amplitude equalization section can be produced from the digital demodulated signals. Consequently, the automatic amplitude equalizer is advantageous in that it can be produced in a remarkably reduced scale and at a remarkably reduced cost and it can be improved in accuracy in compensation very much.

According to another aspect of the present invention, there is provided an automatic amplitude equalizer for compensating for an amplitude characteristic of an input signal, which comprises a first-order inclination amplitude equalization section for compensating for the amplitude characteristic of the input signal in accordance with a first-order inclination amplitude characteristic, and a control section for discriminating a direction of variation of a value of a first one of a pair of digital demodulated signals originating from the input signal, detecting error information from the other, second one of the digital demodulated signals which is orthogonal to the first signal, producing a first correlation signal based on a correlation between the error information and the direction of variation of the value of the first signal, discriminating a direction of variation of a value of the second signal, detecting error information from the first signal of the digital demodulated signals which is orthogonal to the second signal, producing a second correlation signal based on a correlation between the error information and the direction of variation of the value of the second signal, and producing and outputting a control signal for the first-order inclination amplitude equalization section from the first correlation signal and the second correlation signal.

Accordingly, the automatic amplitude equalizer is advantageous similarly to the automatic amplitude equalizer described hereinabove. The automatic amplitude equalizer is further advantageous in that the detection sensitivity and the accuracy of a control signal for the first-order inclination amplitude equalization section can be improved very much, and consequently, the accuracy can be improved further remarkably.

According to a further aspect of the present invention, there is provided an automatic amplitude equalizer for compensating for an amplitude characteristic of an input signal in the frequency-domain, which comprises a first-order inclination amplitude equalization section including a positive inclination amplitude equalization section having a positive inclination amplitude equalization characteristic in the frequency-domain, a negative inclination amplitude equalization section having a negative inclination amplitude equalization characteristic in the frequency-domain, and a zero inclination amplitude equalization section having a zero inclination amplitude equalization characteristic in the frequency-domain, the first-order inclination amplitude equalization section mixing outputs of the positive inclination amplitude equalization section, the negative inclination amplitude equalization section and the zero inclination amplitude equalization section at variable mixing rates, and a control section for producing a mixing ratio control signal for controlling the mixing rates at the first-order inclination amplitude equalization section based on a pair of digital demodulated signals originating from the input signal and outputting the mixing ratio control signal to the first-order inclination amplitude equalization section.

With the automatic amplitude equalizer, since the outputs of the positive inclination amplitude equalization section, the zero inclination amplitude equalization section and the negative inclination amplitude equalization section (signals having positive, zero and negative inclination amplitude equalization characteristics, respectively) of the first-order inclination amplitude equalization section are mixed at variable mixing rates in response to the mixing ratio control signal produced by the control section to compensate for the amplitude characteristic of the input signal, the automatic amplitude equalizer is advantageous in that the amplitude characteristic of the input signal can be compensated for with a higher degree of accuracy with a very simple construction and consequently it has a remarkably improved compensation capacity for the input signal.

According to a still further aspect of the present invention, there is provided an automatic amplitude equalizer for compensating for an amplitude characteristic of an input signal in the frequency-domain, which comprises a first-order inclination amplitude equalization section including a positive inclination amplitude equalization section having a positive inclination amplitude equalization characteristic in the frequency-domain, a negative inclination amplitude equalization section having a negative inclination amplitude equalization characteristic in the frequency-domain, and a convex inclination amplitude equalization section having a convex inclination amplitude equalization characteristic in the frequency-domain, the first-order inclination amplitude equalization section mixing outputs of the positive inclination amplitude equalization section and the negative inclination amplitude equalization section at variable mixing rates while the first-order inclination amplitude equalization section mixes an output of the convex inclination amplitude equalization section at a fixed mixing rate, and a control section for producing a mixing ratio control signal for controlling the mixing rates at the first-order inclination amplitude equalization section based on digital demodulated signals originating from the input signal and outputting the mixing ratio control signal to the first-order inclination amplitude equalization section.

With the automatic amplitude equalizer, even an amplitude characteristic of an input signal which cannot be compensated for by the positive inclination amplitude equalization section and the negative inclination amplitude equalization section can be compensated for very effectively.

According to a yet further aspect of the present invention, there is provided an automatic amplitude equalizer for compensating for an amplitude characteristic of an input signal, which comprises a second-order inclination amplitude equalization section for compensating for a second-order inclination amplitude characteristic of the input signal in accordance with a first-order inclination amplitude characteristic or a second-order inclination amplitude characteristic, and a control section for detecting the second-order inclination amplitude characteristic of the input signal from a pair of digital demodulated signals originating from the input signal and outputting a control signal for the second-order inclination amplitude equalization section based on a result of the detection.

With the automatic amplitude equalizer, the second-order inclination amplitude characteristic of the input signal can be compensated for with certainty.

According to a yet further aspect of the present invention, there is provided an automatic amplitude equalizer for compensating for an amplitude characteristic of an input signal, which comprises a first-order inclination amplitude equalization section for compensating for a first-order inclination amplitude characteristic of the input signal in accordance with a first-order inclination amplitude characteristic, a second-order inclination amplitude equalization section for compensating for a second-order inclination amplitude characteristic of the input signal in accordance with a first-order inclination amplitude characteristic or a second-order inclination amplitude characteristic, a first control section for detecting the first-order inclination amplitude characteristic of the input signal from one of a pair of digital demodulated signals originating from the input signal and outputting a control signal for the first-order inclination amplitude equalization section based on a result of the detection, and a second control section for detecting a second-order inclination amplitude characteristic of the input signal from the one digital demodulated signal originating from the input signal and outputting a control signal for the second-order inclination amplitude equalization section based on a result of the detection.

With the automatic amplitude equalizer, both of the first-order inclination amplitude characteristic and the second-order inclination amplitude characteristic of the input signal can be compensated for by the first-order inclination amplitude equalization section and the second-order inclination amplitude equalization section, respectively. Consequently, the automatic amplitude equalizer has a remarkably improved compensation capacity.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 8, 9, 10(a) and 10(b), and 11 are diagrammatic views illustrating the principle of operation of the automatic amplitude equalizer shown in FIG. 7;

FIG. 12 is a table illustrating the principle of operation of the automatic amplitude equalizer shown in FIG. 7;

FIG. 16 is a truth table used in the rise/drop identification section of FIG. 15;

FIGS. 50(a) to 50(c), 51(a) and 51(b), and 52(a) and 52(b) are waveform diagrams illustrating operation of the automatic amplitude equalizer of FIG. 44;

DESCRIPTION OF THE PREFERRED EMBODIMENTS a. Aspects of the Invention

Several aspects of the present invention will first be described with reference to the drawings.

Figure 1:
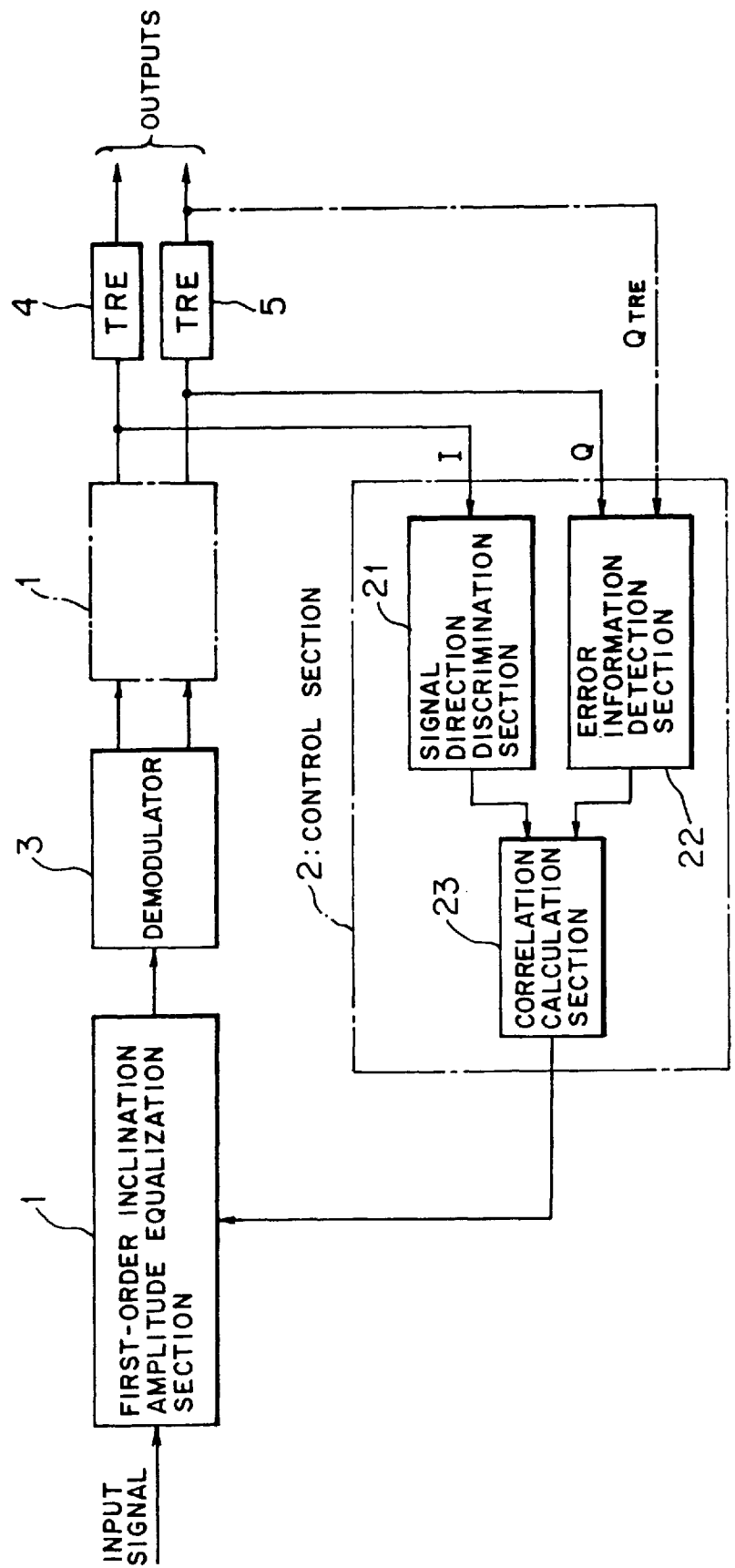
FIGS. 1 to 6 are block diagrams illustrating different aspects of the present invention.

FIG. 1 shows in block diagram an automatic amplitude equalizer according to an aspect of the present invention. Referring to FIG. 1, the automatic amplitude equalizer shown includes a first-order inclination amplitude equalization section 1, a control section 2, a demodulator 3, and a pair of transversal equalizers (TRE) 4 and 5.

The first-order inclination amplitude equalization section 1 compensates for an amplitude characteristic of an input signal in accordance with a predetermined first-order inclination amplitude characteristic. The control section 2 discriminates a direction of variation of a value of one I (or Q) of a pair of digital demodulated signals I and Q originating from the input signal, detects error information from the other one Q (or I) of the digital demodulated signals I and Q which is orthogonal to the signal I, and outputs a control signal for the first-order inclination amplitude equalization section 1 based on the correlation between the error information and the direction of variation of the value of the signal I (or Q).

In the automatic amplitude equalizer of the construction described above, upon compensation of an amplitude characteristic of an input signal, the control section 2 discriminates a direction of variation of a value of one I (or Q) of a pair of digital demodulated signals I and Q originating from the input signal and detects error information from the other signal Q (or I) of the digital demodulated signals I and Q which is orthogonal to the signal I. Then, the control section 2 outputs a control signal for the first-order inclination amplitude equalization section 1 based on the correlation between the error information and the direction of variation of the value of the signal I (or Q) to the first-order inclination amplitude equalization section 1. Consequently, the amplitude characteristic of the input signal is compensated for in accordance with the predetermined first-order inclination amplitude characteristic by the first-order inclination amplitude equalization section 1.

Accordingly, with the automatic amplitude equalizer shown in FIG. 1, the control section 2 can be formed from a digital circuit, and the control signal for the first-order inclination amplitude equalization section 1 can be produced from the digital demodulated signals I and Q. Consequently, the automatic amplitude equalizer is advantageous in that it can be produced in a remarkably reduced scale and at a remarkably reduced cost and it can be improved in accuracy in compensation very much.

By the way, the first-order inclination amplitude equalization section 1 may be constructed such that it has the first-order inclination amplitude characteristic in the frequency-domain and compensates for the amplitude characteristic of the input signal in accordance with the first-order inclination amplitude characteristic or such that it includes an equalizer which operates in the time-domain and compensates for the amplitude characteristic of the input signal in accordance with the first-order inclination amplitude characteristic.

Where the first-order inclination amplitude equalization section 1 has the first-order inclination amplitude characteristic in the frequency-domain, the amplitude characteristic of the input signal is compensated for in accordance with the first-order inclination amplitude characteristic in the frequency-domain, but where the first-order inclination amplitude equalization section 1 includes an equalizer which operates in the time-domain, the amplitude characteristic of the input signal is compensated for in accordance with the first-order inclination amplitude characteristic in the time-domain.

Accordingly, the automatic amplitude equalizer of the construction just described is advantageous in that it has a much widened range of application.

The control section 2 includes a signal direction discrimination section 21, an error information detection section 22, and a correlation calculation section 23. The signal direction discrimination section 21 discriminates the direction of variation of the value of the signal I (or Q) of the digital demodulated signals I and Q. The error information detection section 22 detects error information from the signal Q (or I) of the digital demodulated signals I and Q which is orthogonal to the signal I (or Q). The correlation calculation section 23 outputs a control signal for the first-order inclination amplitude equalization section 1 based on the correlation between the error information obtained by the error information detection section 22 and the direction of variation of the value of the signal I (or Q) obtained by the signal direction discrimination section 21.

Consequently, in the control section 2, the direction of variation of the value of the signal I (or Q) of the digital demodulated signals I and Q is discriminated by the signal direction discrimination section 21, and error information is detected by the error information detection section 22 from the other signal Q (or I) of the digital demodulated signals I and Q which is orthogonal to the signal I (or Q). Then, a control signal for the first-order inclination amplitude equalization section 1 is produced by the correlation calculation section 23 based on the correlation between the error information obtained by the error information detection section 22 and the direction of variation of the value of the signal I (or Q) obtained by the signal direction discrimination section 21 and is outputted to the inclination amplitude equalization section 1.

Accordingly, with the automatic amplitude equalizer of the construction described above, the control section 2 can be realized very readily from a digital circuit. Consequently, the automatic amplitude equalizer is advantageous in that it can be produced in a remarkably reduced scale and at a remarkably reduced cost and it can be improved in accuracy in compensation very much.

Particularly, the signal direction discrimination section 21 is constructed such that it samples the signal I (or Q) in a data clock period or in a period equal to 1/N (N is an integral number equal to or greater than 2) the data clock period to discriminate the direction of variation of the value of the signal I (or Q).

Consequently, in the signal direction discrimination section 21, the signal I (or Q) is sampled in the data clock period or in the period equal to 1/N (N is an integral number equal to or greater than 2) the data clock period to discriminate the direction of variation of the value of the signal I (or Q).

With the automatic amplitude equalizer of the construction just described, the signal direction discrimination section 21 can be formed very readily from a digital circuit. Consequently, the automatic amplitude equalizer is advantageous in that it can be produced in a remarkably reduced scale and at a remarkably reduced cost and it can be improved in accuracy in compensation very much. Further, by whichever demodulation method the digital demodulated signals I and Q have been demodulated, the direction of variation of the value of any of the signals I and Q can be discriminated. Consequently, the automatic amplitude equalizer is also advantageous in that it has much improved universal applications.

Further, the error information detection section 22 may be constructed such that it detects error information from an error bit of the signal Q (or I) or may be constructed as a difference calculation section which calculates a difference between the signal Q (or I) of the digital demodulated signals I and Q originating from the input signal and an equalized signal $Q_{TRE}$ (or $I_{TRE}$) obtained by processing of the signal Q (or I) further by means of the transversal equalizer 5 (or 4).

In this instance, upon detection of error information, the error information detection section 22 can detect error information from an error bit of the signal Q (or I). Or, the difference between the signal Q (or I) of the digital demodulated signals I and Q originating from the input signal and the equalized signal $Q_{TRE}$ (or $I_{TRE}$) obtained by processing of the signal Q (or I) further by means of the transversal equalizer 5 (or 4) is calculated by the error information detection section 22 to detect error information.

With the automatic amplitude equalizer of the construction just described, it can be produced in a remarkably reduced scale and at a remarkably reduced cost. Further, since error information with a higher degree of accuracy can be obtained from the signal Q, the automatic amplitude equalizer is improved very much in accuracy and performance.

By the way, the demodulator 3 produces the digital demodulated signals I and Q from the input signal, and the first-order inclination amplitude equalization section 1 is provided at a preceding stage to the demodulator 3. However, the first-order inclination amplitude equalization section 1 may alternatively be provided at a following stage to the demodulator 3 as indicated by an alternate long and short dash line in FIG. 1.

Where the first-order inclination amplitude equalization section 1 is provided at the preceding stage to the demodulator 3, the amplitude characteristic of the input signal is compensated for at the preceding stage to the demodulator 3. However, where the first-order inclination amplitude equalization section 1 is provided conversely at the following stage to the demodulator 3 as indicated by an alternate long and short dash line in FIG. 1, the amplitude characteristic of the input signal is compensated for at the following stage to the demodulator 3.

Accordingly, the automatic amplitude equalizer of the construction described above is advantageous in that it has a high degree of flexibility in designing a circuit.

Figure 2:
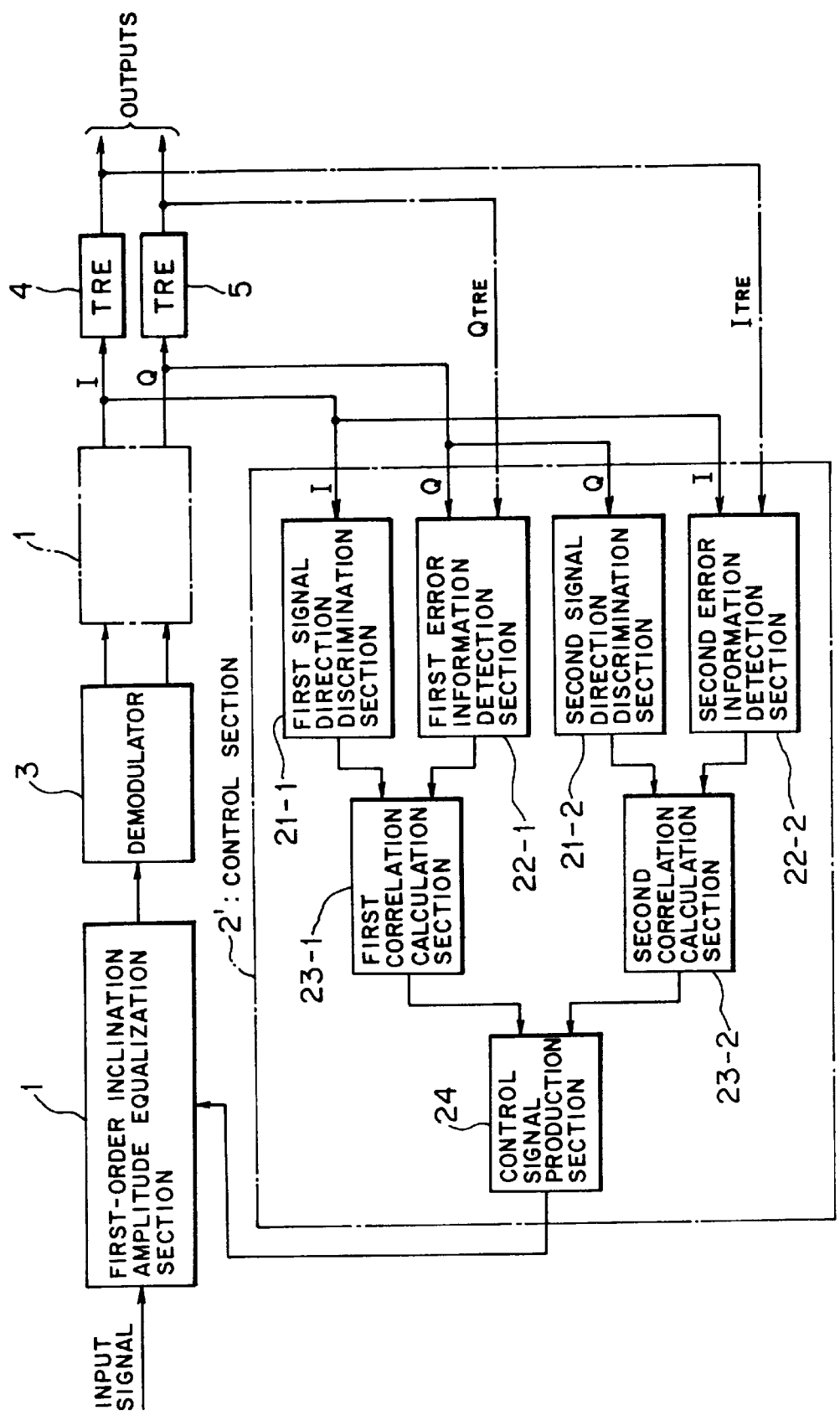

Referring now to FIG. 2, there is shown in block diagram an automatic amplitude equalizer according to another aspect of the present invention. The automatic amplitude equalizer shown includes a first-order inclination amplitude equalization section 1, a control section 2', a demodulator 3, and a pair of transversal equalizers (TRE) 4 and 5.

The first-order inclination amplitude equalization section 1 is similar to that described hereinabove with reference to FIG. 1. The control section 2' discriminates a direction of variation of a value of one I of a pair of digital demodulated signals I and Q originating from an input signal, detects error information from the other one Q of the digital demodulated signals I and Q which is orthogonal to the signal I, and produces a first correlation signal based on the correlation between the error information and the direction of variation of the value of the signal I. Further, the control section 2' discriminates a direction of variation of a value of the second Q, detects error information from the signal I of the digital demodulated signals I and Q which is orthogonal to the signal Q, and produces a second correlation signal based on the correlation between the error information and the direction of variation of the value of the signal Q. Then, the control section 2' produces and outputs a control signal for the first-order inclination amplitude equalization section 1 from the first correlation signal and the second correlation signal.

Consequently, in the automatic amplitude equalizer of the construction described above, the direction of variation of the value of the signal I of the digital demodulated signals I and Q originating from the input signal is discriminated by the control section 2', and error information is detected from the signal Q of the digital demodulated signals I and Q which is orthogonal to the signal I by the control section 2'. Then, a first correlation signal is produced based on the correlation between the error information and the direction of movement of the signal I.

Further, the direction of movement of the other signal Q is discriminated, and error information is detected from the signal I of the digital demodulated signals I and Q which is orthogonal to the signal Q. Then, a second correlation signal is produced based on the correlation between the error information and the direction of variation of the value of the signal Q.

Then, a control signal for the first-order inclination amplitude equalization section 1 is produced from the first correlation signal and the second correlation signal and is outputted to the first-order inclination amplitude equalization section 1. Consequently, the first-order inclination amplitude equalization section 1 compensates for the amplitude characteristic of the input signal in accordance with the predetermined first-order inclination amplitude characteristic.

Accordingly, the automatic amplitude equalizer of the construction described above is advantageous similarly to the automatic amplitude equalizer described hereinabove with reference to FIG. 1. The present automatic amplitude equalizer is further advantageous in that the detection sensitivity and the accuracy of a control signal for the first-order inclination amplitude equalization section 1 can be improved very much, and consequently, the accuracy can be improved further remarkably.

It is to be noted that, also in this instance, the first-order inclination amplitude equalization section 1 may be constructed such that it has the first-order inclination amplitude characteristic in the frequency-domain and compensates for the amplitude characteristic of the input signal in accordance with the first-order inclination amplitude characteristic or that it includes an equalizer which operates in the time-domain and compensates for the amplitude characteristic of the input signal in accordance with the first-order inclination amplitude characteristic.

Where the first-order inclination amplitude equalization section 1 has the first-order inclination amplitude characteristic in the frequency-domain, the amplitude characteristic of the input signal is compensated for in accordance with the first-order inclination amplitude characteristic in the frequency-domain, but where the first-order inclination amplitude equalization section 1 includes an equalizer which operates in the time-domain, the amplitude characteristic of the input signal is compensated for in accordance with the first-order inclination amplitude characteristic in the time-domain.

With the automatic amplitude equalizer of the construction just described, it is advantageous in that it has a much widened range of application even comparing with the automatic amplitude equalizer described hereinabove with reference to FIG. 1.

The control section 2' described above includes, as seen in FIG. 2, a first signal direction discrimination section 21-1, a first error information detection section 22-1, a first correlation calculation section 23-1, a second signal direction discrimination section 21-2, a second error information detection section 22-2, a second correlation calculation section 23-2, and a control signal production section 24.

The first signal direction discrimination section 21-1 discriminates the direction of variation of the value of the signal I of the digital demodulated signals, and the first error information detection section 22-1 detects the error information from the signal Q of the digital demodulated signals which is orthogonal to the signal I. The first correlation calculation section 23-1 outputs a first correlation signal based on the correlation between the error information obtained by the first error information detection section 22-1 and the direction of variation of the value of the signal I obtained by the first signal direction discrimination section 21-1.

The second signal direction discrimination section 21-2 discriminates the direction of variation of the value of the signal Q, and the second error information detection section 22-2 detects the error information from the signal I. Further, the second correlation calculation section 23-2 outputs the second correlation signal based on the correlation between the error information obtained by the second error information detection section 22-2 and the direction of variation of the value of the signal Q obtained by the second signal direction discrimination section 21-2.

Then, the control signal production section 24 produces a control signal for the first-order inclination amplitude equalization section 1 from the first correlation signal from the first correlation calculation section 23-1 and the second correlation signal from the second correlation calculation section 23-2.

Consequently, in the control section 2', the direction of variation of the value of the signal I of the digital demodulated signals I and Q is discriminated by the first signal direction discrimination section 21-1, and error information is detected by the first error information detection section 22-1 from the other signal Q of the digital demodulated signals I and Q which is orthogonal to the signal I. Then, a first correlation signal is produced by and outputted from the first correlation calculation section 23-1 based on the correlation between the error information obtained by the first error information detection section 22-1 and the direction of variation of the value of the signal I obtained by the first signal direction discrimination section 21-1.

Meanwhile, the direction of variation of the value of the other signal Q is discriminated by the second signal direction discrimination section 21-2, and error information is detected by the second error information detection section 22-2 from the signal I which is orthogonal to the signal Q. Then, a second correlation signal is produced by and outputted from the second correlation calculation section 23-2 based on the correlation between the error information obtained by the second error information detection section 22-2 and the direction of variation of the value of the signal Q obtained by the second signal direction discrimination section 21-2.

Then, a control signal for the first-order inclination amplitude equalization section 1 is produced from the first correlation signal and the second correlation signal by the control signal production section 24. The control signal thus produced is outputted to the first-order inclination amplitude equalization section 1. Consequently, the amplitude characteristic of the input signal is compensated for in accordance with the predetermined first-order inclination amplitude characteristic by the first-order inclination amplitude equalization section 1.

Accordingly, with the automatic amplitude equalizer of the construction described above, the equalizer shown in FIG. 2 can be realized very readily from a digital circuit. Consequently, the automatic amplitude equalizer is advantageous in that it can be produced in a remarkably reduced scale and at a remarkably reduced cost and it is also improved very much in accuracy in compensation.

The first signal direction discrimination section 21-1 is constructed such that it samples the signal I in a data clock period or in a period equal to 1/N (N is an integral number equal to or greater than 2) the data clock period to discriminate the direction of variation of the value of the signal I, and the second signal direction discrimination section 21-2 is constructed such that it samples the other signal Q in the data clock period or in the period equal to 1/N (N is an integral number equal to or greater than 2) the data clock period to discriminate the direction of variation of the value of the signal Q.

Consequently, in the first signal direction discrimination section 21-1, the signal I is sampled in the data clock period or in the period equal to 1/N (N is an integral number equal to or greater than 2) the data clock period to discriminate the direction of variation of the value of the signal I. Meanwhile, in the second signal direction discrimination section 21-2, the signal Q is sampled in the data clock period or in the period equal to 1/N (N is an integral number equal to or greater than 2) the data clock period to discriminate the direction of variation of the value of the signal Q.

With the automatic amplitude equalizer of the construction just described, each of the signal direction discrimination sections 21-1 and 21-2 can be formed very readily from a digital circuit. Consequently, the automatic amplitude equalizer is advantageous in that it can be produced in a remarkably reduced scale and at a remarkably reduced cost and it can be improved in accuracy in compensation very much. Further, by whichever demodulation method the digital demodulated signals I and Q have been demodulated, the directions of variation of the values of the first and second ones I and Q of the digital demodulated signals I and Q can be discriminated. Consequently, the automatic amplitude equalizer is also advantageous in that it has much improved universal applications.

The automatic amplitude equalizer may be constructed such that the first error information detection section 22-1 detects error information from an error bit of the signal I, and the second error information detection section 22-2 detects error information from an error bit of the other signal Q.

In this instance, the first error information detection section 22-1 can detect error information from an error bit of the signal I, and the second error information detection section 22-2 can detect error information from an error bit of the other signal Q.

Accordingly, with the automatic amplitude equalizer of the construction just described, it is advantageous in that the circuit scale and the cost of the automatic amplitude equalizer shown in FIG. 2 can be reduced remarkably.

The automatic amplitude equalizer may be constructed such that the first error information detection section 22-1 is constructed as a first difference calculation section which calculates a difference between the signal Q of the digital demodulated signals I and Q originating from the input signal and an equalized signal $Q_{TRE}$ obtained by processing of the signal Q further by means of the transversal equalizer 5, and the second error information detection section 22-2 is constructed as a second difference calculation section which calculates a difference between the signal I and an equalized signal $I_{TRE}$ obtained by processing of the signal I further by means of the other transversal equalizer 4.

Where the first error information detection section 22-1 is constructed as the first difference calculation section and the second error information detection section 22-2 is constructed as the second difference calculation section, the first error information detection section 22-1 calculates a difference between the signal Q of the digital demodulated signals I and Q originating from the input signal and the equalized signal $Q_{TRE}$ obtained by processing of the signal Q further by means of the transversal equalizer 5. Meanwhile, the second error information detection section 22-2 calculates a difference between the signal I and an equalized signal $I_{TRE}$ obtained by processing of the signal I further by means of the transversal equalizer 4.

As a result, error information of the digital demodulated signals I and Q is detected using the equalized signals $I_{TRE}$ and $Q_{TRE}$ after equalized by the transversal equalizers 4 and 5, respectively.

Accordingly, with the automatic amplitude equalizer of the construction described above, the error information obtained from the first and second ones I and Q of the digital demodulated signals I and Q is further improved in accuracy. Consequently, the automatic amplitude equalizer is advantageous in that it is improved in accuracy and performance very much.

By the way, also in this instance, while the first-order inclination amplitude equalization section 1 is provided at a preceding stage to the demodulator 3 similarly as in the automatic amplitude equalizer shown in FIG. 1, it may otherwise be provided at a following stage to the demodulator 3 as indicated by an alternate long and short dash line in FIG. 2.

Where the first-order inclination amplitude equalization section 1 is provided at the preceding stage to the demodulator 3 as shown in FIG. 2, the amplitude characteristic of the input signal is compensated for in accordance with the predetermined first-order inclination amplitude characteristic at the preceding stage to the demodulator 3. However, where the first-order inclination amplitude equalization section 1 is provided conversely at the following stage to the demodulator 3 as indicated by an alternate long and short dash line in FIG. 2, the amplitude characteristic of the input signal is compensated for at the following stage to the demodulator 3.

Accordingly, the automatic amplitude equalizer of the construction just described is advantageous in that, since the first-order inclination amplitude equalization section 1 can be provided at any of the preceding and following stages to the demodulator 3, it has a high degree of flexibility in designing a circuit.

Figure 3:
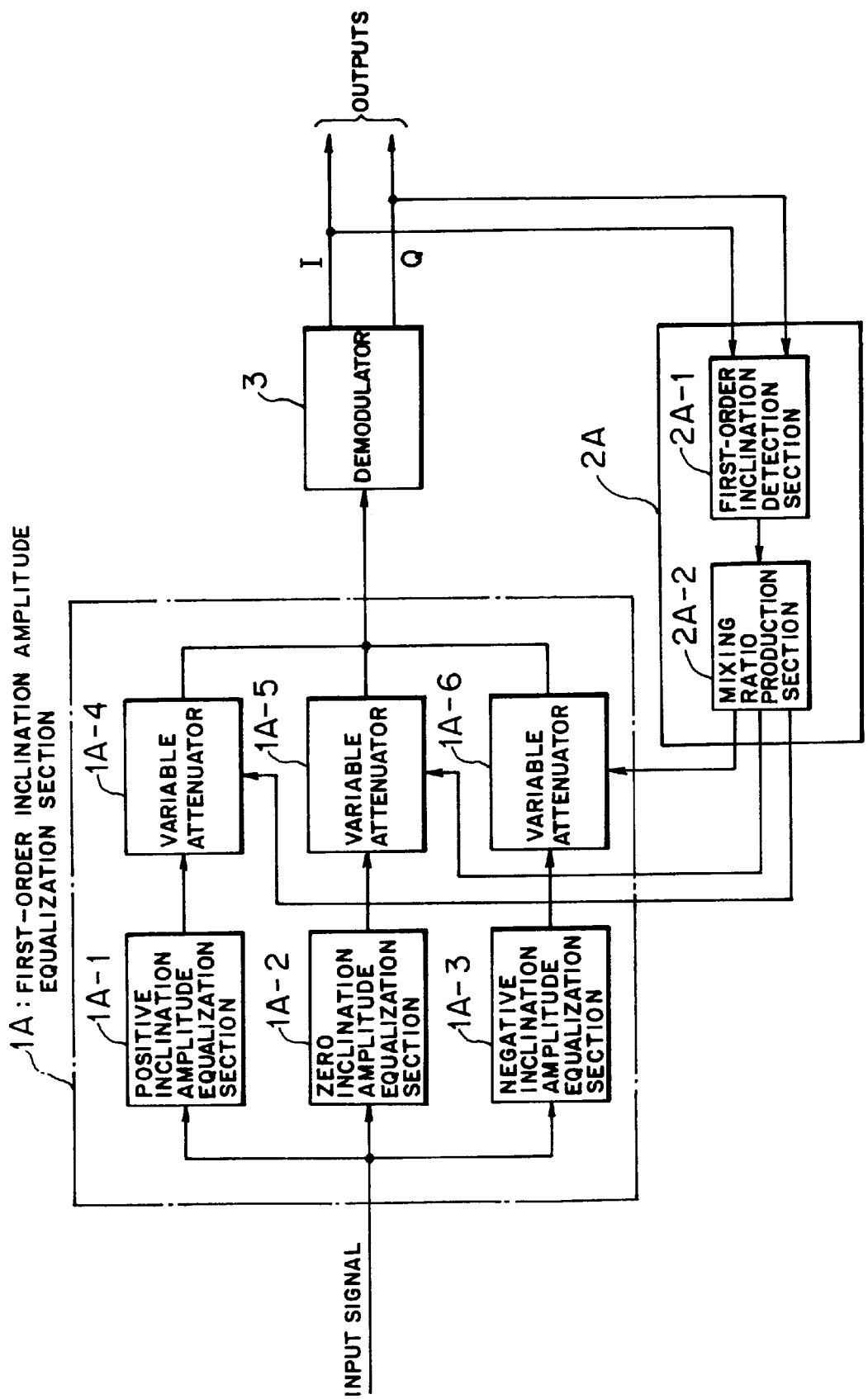

Referring now FIG. 3, there is shown in block diagram an automatic amplitude equalizer according to a further aspect of the present invention. The automatic amplitude equalizer shown includes a first-order inclination amplitude equalization section 1A, a control section 2A, and a demodulator 3.

The first-order inclination amplitude equalization section 1A includes a positive inclination amplitude equalization section 1A-1, a negative inclination amplitude equalization section 1A-2, and a zero inclination amplitude equalization section 1A-3, and further includes variable attenuators 1A-4 to 1A-6.

The positive inclination amplitude equalization section 1A-1, the negative inclination amplitude equalization section 1A-2 and the zero inclination amplitude equalization section 1A-3 have a positive inclination amplitude equalization characteristic, a negative inclination amplitude equalization characteristic and a zero inclination amplitude equalization characteristic in the frequency-domain, respectively. In this instance, the outputs of the positive inclination amplitude equalization section 1A-1, the negative inclination amplitude equalization section 1A-2 and the zero inclination amplitude equalization section 1A-3 are mixed at a variable mixing ratio, that is, at variable mixing rates.

The control section 2A produces a mixing ratio control signal for controlling the mixing rates at the first-order inclination amplitude equalization section 1A based on a pair of digital demodulated signals I and Q originating from an input signal and outputs the mixing ratio control signal to the first-order inclination amplitude equalization section 1A.

In the automatic amplitude equalizer of the construction described above, the mixing ratio control signal for controlling the mixing rates at the first-order inclination amplitude equalization section 1A is produced based on the pair of digital demodulated signals I and Q originating from the input signal by the control section 2A, and the mixing ratio control signal thus produced is outputted to the first-order inclination amplitude equalization section 1A.

Then, in the first-order inclination amplitude equalization section 1A, the outputs of the positive inclination amplitude equalization section 1A-1, the negative inclination amplitude equalization section 1A-3 and the zero inclination amplitude equalization section 1A-2 (signals having positive, zero and negative inclination amplitude equalization characteristics in the frequency-domain, respectively) are mixed at variable mixing rates in accordance with the mixing ratio control signal from the control section 2A. Consequently, the amplitude characteristic of the input signal is compensated for.

Accordingly, the automatic amplitude equalizer is advantageous in that the amplitude characteristic of the input signal can be compensated for with a higher degree of accuracy with a very simple construction and consequently it has a remarkably improved compensation capacity for the input signal.

Further, in this instance, the variable attenuators 1A-4 to 1A-6 are provided corresponding to the positive inclination amplitude equalization section 1A-1, the negative inclination amplitude equalization section 1A-3 and the zero inclination amplitude equalization section 1A-2, respectively, and attenuation degrees of the variable attenuators 1A-4 to 1A-6 are individually controlled in accordance with the mixing ratio control signal outputted from the control section 2A so that the outputs of the positive inclination amplitude equalization section 1A-1, the negative inclination amplitude equalization section 1A-3 and the zero inclination amplitude equalization section 1A-2 are mixed at the variable mixing rates.

Consequently, in the first-order inclination amplitude equalization section 1A, since the attenuation degrees of the variable attenuators 1A-4 to 1A-6 are individually controlled in accordance with the mixing ratio control signal from the control section 2A, the outputs of the positive inclination amplitude equalization section 1A-1, the negative inclination amplitude equalization section 1A-3 and the zero inclination amplitude equalization section 1A-2 are mixed at the variable mixing rates.

Accordingly, the amplitude characteristic of the input signal can be compensated with certainty by controlling the mixing rates.

The zero inclination amplitude equalization section 1A-2 is formed from a delay line having a same delay characteristic as those of the positive inclination amplitude equalization section 1A-1 and the negative inclination amplitude equalization section 1A-3. Consequently, the phases when the output of the zero inclination amplitude equalization section 1A-2 and the outputs of the positive inclination amplitude equalization section 1A-1 and the negative inclination amplitude equalization section 1A-3 are mixed are adjusted to each other.

Consequently, since the outputs of the positive inclination amplitude equalization section 1A-1, the zero inclination amplitude equalization section 1A-2 and the negative inclination amplitude equalization section 1A-3 are mixed without any displacement in phase with each other, the outputs can be mixed accurately at a desired mixing ratio to compensate for the amplitude characteristic of the input signal.

Meanwhile, the control section 2A includes a first-order inclination detection section 2A-1 and a mixing ratio production section 2A-2 as seen in FIG. 3. The first-order inclination detection section 2A-1 detects a first-order inclination amplitude characteristic of the input signal based on the digital demodulated signals I and Q originating from the input signal. The mixing ratio production section 2A-2 produces a mixing ratio control signal in accordance with a result of detection by the first-order inclination detection section 2A-1.

Consequently, in the control section 2A, the first-order inclination amplitude characteristic of the input signal is detected based on the digital demodulated signals I and Q originating from the input signal by the first-order inclination detection section 2A-1. Then, a mixing ratio control signal is produced by the mixing ratio production section 2A-2 in accordance with a result of detection by the first-order inclination detection section 2A-1.

With the automatic amplitude equalizer of the construction just described, a mixing ratio control signal for the first-order inclination amplitude equalization section 1A can be produced with a high degree of accuracy by the control section 2A of a very simple construction wherein the first-order inclination detection section 2A-1 and the mixing ratio production section 2A-2 are formed from a digital circuit.

Further, the first-order inclination detection section 2A-1 includes a signal direction discrimination section for discriminating the direction of variation of the value of one I (or Q) of the digital demodulated signals I and Q originating from the input signal, an error information detection section for detecting error information from the other one Q (or I) of the digital demodulated signals I and Q which is orthogonal to the signal I (or Q), and a correlation calculation section for detecting, by calculation, the first-order inclination amplitude characteristic of the input signal based on the correlation between the error information obtained by the error information detection section and the direction of variation of the value of the signal I (or Q) obtained by the signal discrimination section.

Consequently, in the first-order inclination detection section 2A-1, the direction of variation of the value of the signal I (or Q) of the digital demodulated signals I and Q originating from the input signal is discriminated by the signal direction discrimination section, and error information is detected by the error information detection section from the other signal Q (or I) of the digital demodulated signals I and Q which is orthogonal to the signal I (or Q). Then, the first-order inclination amplitude characteristic of the input signal is detected by calculation by the correlation calculation section based on the correlation between the error information obtained by the error information detection section and the direction of variation of the value of the signal I (or Q) obtained by the signal discrimination section.

Accordingly, in the first-order inclination detection section, the first-order inclination amplitude characteristic of the input signal can be detected with certainty.

Meanwhile, the mixing ratio production section 2A-2 includes an integrator for integrating the first-order inclination amplitude characteristic detected by the first-order inclination detection section 2A-1 and produces, as the mixing ratio control signal, a signal by which, when a result of integration of the first-order inclination amplitude characteristic by the integrator exhibits a zero inclination amplitude characteristic, the mixing rate of the output of the negative inclination amplitude equalization section 1A-2 is set to a maximum value while the mixing rates of the outputs of the positive inclination amplitude equalization section 1A-1 and the zero inclination amplitude equalization section 1A-3 are set to minimum values, and when the result of integration exhibits a negative inclination amplitude characteristic, the mixing rate of the output of the positive inclination amplitude equalization section 1A-1 is increased so as to cancel the negative inclination amplitude characteristic, but when the result of integration exhibits a positive inclination amplitude characteristic, the mixing rate of the output of the zero inclination amplitude equalization section 1A-3 is increased so as to cancel the positive inclination amplitude characteristic.

Consequently, in the mixing ratio production section 2A-2, the first-order inclination amplitude characteristic detected by the first-order inclination detection section 2A-1 is integrated by the integrator, and as the mixing ratio control signal, a signal is produced by which, when a result of the integration exhibits a zero inclination amplitude characteristic, the mixing rate of the output of the zero inclination amplitude equalization section 1A-2 is set to a maximum value while the mixing rates of the outputs of the positive inclination amplitude equalization section 1A-1 and the negative inclination amplitude equalization section 1A-3 are set to minimum values, and when the result of integration exhibits a negative inclination amplitude characteristic, the mixing rate of the output of the positive inclination amplitude equalization section 1A-1 is increased so as to cancel the negative inclination amplitude characteristic, but when the result of integration exhibits a positive inclination amplitude characteristic, the mixing rate of the output of the negative inclination amplitude equalization section 1A-3 is increased so as to cancel the positive inclination amplitude characteristic.

Accordingly, where the mixing ratio production section described above is constructed in such a manner as described above, the mixing rates for the first-order inclination amplitude equalization section 1A can be controlled very readily.

Or, the mixing ratio production section 2A-2 may include an integrator for integrating the first-order inclination amplitude characteristic detected by the first-order inclination detection section 2A-1, and a conversion memory for converting a result of integration of the first-order inclination amplitude characteristic by the integrator into the mixing ratio control signal.

In this instance, in the mixing ratio production section 2A-1, a result of integration of the first-order inclination amplitude characteristic by the integrator can be converted into a mixing ratio control signal by means of the conversion memory.

Accordingly, the mixing ratio control signal can be obtained by the mixing ratio production section of a simple construction, and consequently, the circuit scale of the mixing ratio production section 2A-2 can be reduced remarkably.

The automatic amplitude equalizer described above may be constructed such that it further comprises a signal level error detection section for detecting error information of a signal level from one of the digital demodulated signals I and Q originating from the input signal, and the mixing ratio production section 2A-2 varies an output level of the mixing ratio control signal in response to the error information detected by the signal level error detection section.

In the automatic amplitude equalizer of the construction just described, the output level of the mixing ratio control signal can be varied in response to error information of the signal level detected by the signal level error detection section, and consequently, the output level of the first-order inclination amplitude equalization section 1A can be adjusted.

Accordingly, the output level of the first-order inclination amplitude equalization section 1A can be kept fixed with a very simple construction without the necessity of provision of a separate circuit for keeping the output level of the first-order inclination amplitude equalization section 1A fixed.

Figure 4:
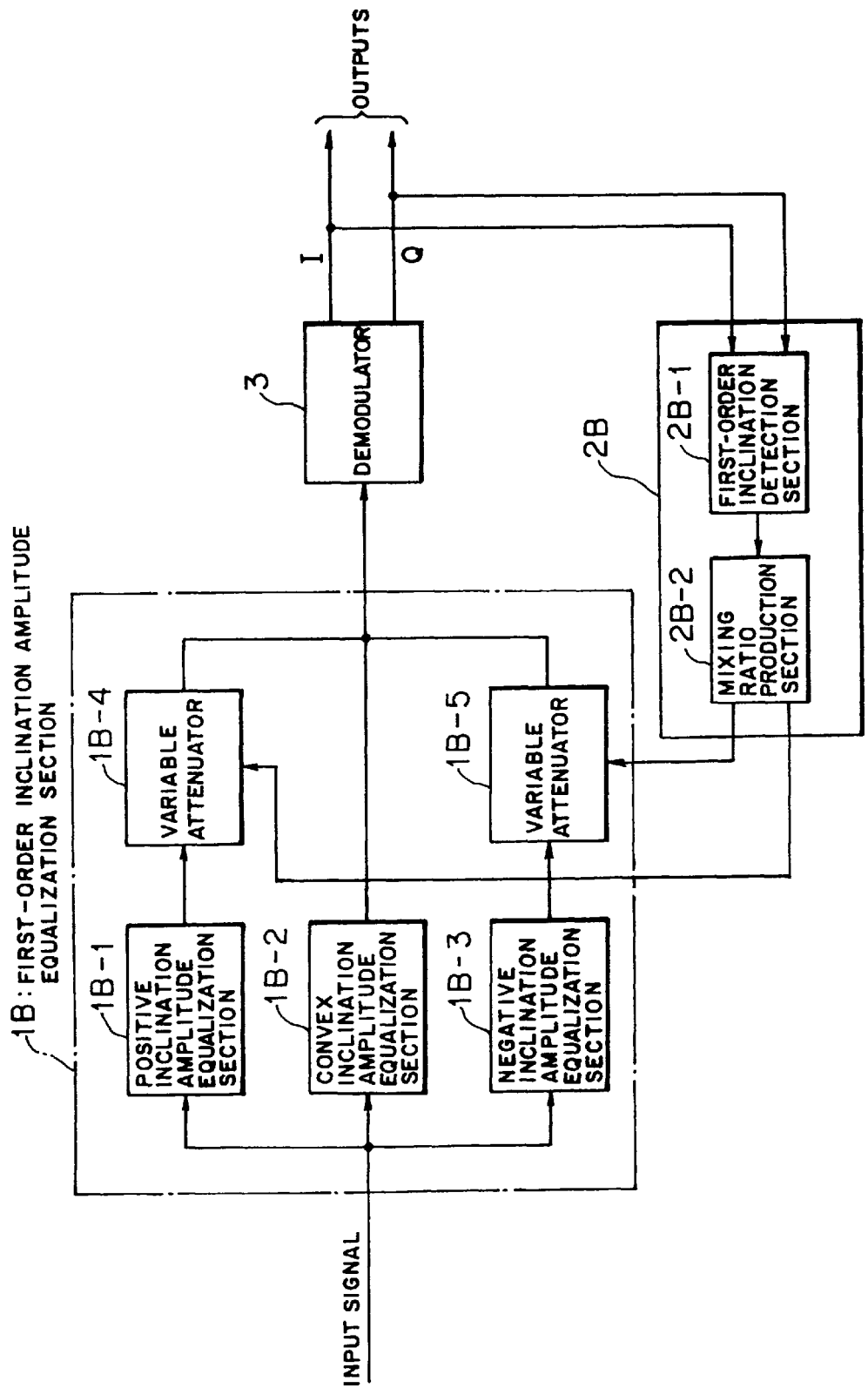

Referring now to FIG. 4, there is shown in block diagram an automatic amplitude equalizer according to a still further aspect of the present invention. The automatic amplitude equalizer shown includes a first-order inclination amplitude equalization section 1B, a control section 2B, and a demodulator 3. The first-order inclination amplitude equalization section 1B includes a positive inclination amplitude equalization section 1B-1, a convex inclination amplitude equalization section 1B-2, and a negative inclination amplitude equalization section 1B-3.

The positive inclination amplitude equalization section 1B-1, the convex inclination amplitude equalization section 1B-2 and the negative inclination amplitude equalization section 1B-3 have positive, convex and negative inclination amplitude equalization characteristics in the frequency-domain, respectively, and the outputs of the positive inclination amplitude equalization section 1B-1 and the negative inclination amplitude equalization section 1B-3 are mixed at variable mixing rates while the output of the convex inclination amplitude equalization section 1B-2 is mixed at the fixed mixing rate.

The control section 2B produces a mixing ratio control signal for controlling the mixing rates at the first-order inclination amplitude equalization section 1B based on digital demodulated signals I and Q originating from the input signal and outputs the mixing ratio control signal to the first-order inclination amplitude equalization section 1B.

With the automatic amplitude equalizer of the construction described above, upon compensation for an amplitude characteristic of an input signal in the frequency-domain, a mixing ratio control signal for the first-order inclination amplitude equalization section 1B is produced by the control section 2B based on the digital demodulated signals I and Q originating from the input signal and and is outputted to the first-order inclination amplitude equalization section 1B.

Then, in the first-order inclination amplitude equalization section 1B, the outputs of the positive inclination amplitude equalization section 1B-1 and the negative inclination amplitude equalization section 1B-3 (signals having positive and negative inclination amplitude equalization characteristics in the frequency-domain) are mixed at variable mixing rates in accordance with the mixing ratio control signal, and the output of the convex inclination amplitude equalization section 1B-2 (signal having a convex inclination amplitude equalization characteristic in the frequency-domain) is mixed at the fixed mixing rate.

Accordingly, with the automatic amplitude equalizer of the construction described above, even an amplitude characteristic of an input signal which cannot be compensated for by the positive inclination amplitude equalization section 1B-1 and the negative inclination amplitude equalization section 1B-3 can be compensated for very effectively.

Further, as seen in FIG. 4, the first-order inclination amplitude equalization section 1B further includes a pair of variable attenuators 1B-4 and 1B-5 corresponding to the positive inclination amplitude equalization section 1B-1 and the negative inclination amplitude equalization section 1B-3, respectively, and attenuation degrees of the variable attenuators 1B-4 and 1B-5 are individually controlled in accordance with the mixing ratio control signal so that the outputs of the positive inclination amplitude equalization section 1B-1 and the negative inclination amplitude equalization section 1B-3 are mixed at the individually variable rates while the output of the convex inclination amplitude equalization section 1B-2 is mixed at the fixed mixing rate.

Thus, in the first-order inclination amplitude equalization section 1B, the attenuation degrees of the variable attenuators 1B-4 and 1B-5 corresponding to the positive inclination amplitude equalization section 1B-1 and the negative inclination amplitude equalization section 1B-3 are individually controlled in accordance with the mixing ratio control signal produced by the control section 2B. Consequently, the outputs of the positive inclination amplitude equalization section 1B-1 and the negative inclination amplitude equalization section 1B-3 are mixed at the individually variable rates while the output of the convex inclination amplitude equalization section 1B-2 is mixed at the fixed mixing rate.

Accordingly, the outputs of the equalization sections described above can be mixed at a desired mixing ratio very readily to compensate for the amplitude characteristic of the input signal with certainty.

Particularly, the convex inclination amplitude equalization section 1B-2 is formed as a resonance circuit having a center frequency at the center of a frequency band of the input signal. Consequently, as a signal having a desired convex inclination amplitude equalization characteristic, a signal having a center frequency at the center of the frequency band of the input signal can be obtained.

Accordingly, a desired convex inclination amplitude equalization characteristic can be obtained readily.

Meanwhile, as shown in FIG. 4, the control section 2B includes a first-order inclination detection section 2B-1 and a mixing ratio production section 2B-2. The first-order inclination detection section 2B-1 detects a first-order inclination amplitude characteristic of the input signal based on the digital demodulated signals I and Q originating from the input signal, and the mixing ratio production section 2B-2 produces the mixing ratio control signal in response to a result of detection by the first-order inclination detection section 2B-1.

Consequently, in the control section 2B, the first-order inclination amplitude characteristic of the input signal is detected by the first-order inclination detection section 2B-1 based on the digital demodulated signals I and Q originating from the input signal, and a mixing ratio control signal for the first-order inclination amplitude equalization section 1B is produced by the mixing ratio production section 2B-2 in response to a result of detection by the first-order inclination detection section 2B-1.

Accordingly, the first-order inclination amplitude characteristic of the input signal can be detected and a control signal for the first-order inclination amplitude equalization section 1B for compensating for the first-order inclination amplitude characteristic of the input signal can be obtained with a very simple construction.

Further particularly, the first-order inclination detection section 2B-1 includes a signal direction discrimination section for discriminating the direction of variation of the value of the signal I (or Q) of the digital demodulated signals I and Q originating from the input signal, an error information detection section for detecting error information from the other signal Q (or I) of the digital demodulated signals I and Q which is orthogonal to the signal I (or Q), and a correlation calculation section for detecting, by calculation, the first-order inclination amplitude characteristic of the input signal based on the correlation between the error information obtained by the error information detection section and the direction of variation of the value of the signal I (or Q) by the signal discrimination section.

Consequently, in the first-order inclination detection section 2B-1, the direction of variation of the value of the signal I (or Q) of the digital demodulated signals I and Q originating from the input signal is discriminated by the signal direction discrimination section, and error information is detected by the error information detection section from the other signal Q (or I) of the digital demodulated signals I and Q which is orthogonal to the signal I (or Q). Then, the first-order inclination amplitude characteristic of the input signal is detected by calculation by the correlation calculation section based on the correlation between the error information and the direction of variation of the value of the signal I (or Q).

Accordingly, the first-order inclination amplitude characteristic of the input signal can be detected with certainty.

Meanwhile, the mixing ratio production section 2B-2 is constructed such that it includes an integrator for integrating the first-order inclination amplitude characteristic detected by the first-order inclination detection section 2B-1 and produces, as the mixing ratio control signal, a signal by which, when a result of integration of the first-order inclination amplitude characteristic by the integrator exhibits a zero inclination amplitude characteristic, the mixing rates of the outputs of the positive inclination amplitude equalization section 1B-1 and the negative inclination amplitude equalization section 1B-3 are set to maximum values, and when the result of integration exhibits a negative inclination amplitude characteristic, the mixing rate of the output of the positive inclination amplitude equalization section 1B-1 is increased so as to cancel the negative inclination amplitude characteristic, but when the result of integration exhibits a positive inclination amplitude characteristic, the mixing rate of the output of the negative inclination amplitude equalization section 1B-3 is increased so as to cancel the positive inclination amplitude characteristic.

Consequently, in the mixing ratio production section 2B-2, the first-order inclination amplitude characteristic detected by the first-order inclination detection section 2B-1 is integrated by the integrator, and, as the mixing ratio control signal, a signal is produced by which, when a result of integration of the first-order inclination amplitude characteristic exhibits a zero inclination amplitude characteristic, the mixing rates of the outputs of the positive inclination amplitude equalization section 1B-1 and the negative inclination amplitude equalization section 1B-3 are set to maximum values, and when the result of integration exhibits a negative inclination amplitude characteristic, the mixing rate of the output of the positive inclination amplitude equalization section 1B-1 is increased so as to cancel the negative inclination amplitude characteristic, but when the result of integration exhibits a positive inclination amplitude characteristic, the mixing rate of the output of the negative inclination amplitude equalization section 1B-3 is increased so as to cancel the positive inclination amplitude characteristic.

Accordingly, the mixing rates at the first-order inclination amplitude equalization section can be controlled very readily.

Alternatively, the mixing ratio production section 2B-2 may include an integrator for integrating the first-order inclination amplitude characteristic detected by the first-order inclination detection section 2B-1, and a conversion memory for converting a result of integration of the first-order inclination amplitude characteristic by the integrator into the mixing ratio control signal. In this instance, a result of integration of the first-order inclination amplitude characteristic by the integrator can be converted into a mixing ratio control signal by the conversion memory.

Accordingly, also in this instance, the mixing ratio control signal can be obtained with a simpler construction, and consequently, the circuit scale of the mixing ratio production section 2B-2 can be reduced remarkably.

Further, also in this instance, the automatic amplitude equalizer may be constructed such that it further comprises a signal level error detection section for detecting error information of a signal level from the digital demodulated signals I and Q originating from the input signal, and the mixing ratio production section 2B-2 varies an output level of the mixing ratio control signal in response to the error information detected by the signal level error detection section.

Also in this instance, since the output level of the mixing ratio control signal can be varied in response to error information of the signal level detected by the signal level error detection section, the output level of the first-order inclination amplitude equalization section 1A can be adjusted.

Accordingly, the output level of the first-order inclination amplitude equalization section 1B can be kept fixed with a very simple construction without the necessity of provision of a separate circuit for keeping the output level of the first-order inclination amplitude equalization section 1B fixed.

Figure 5:
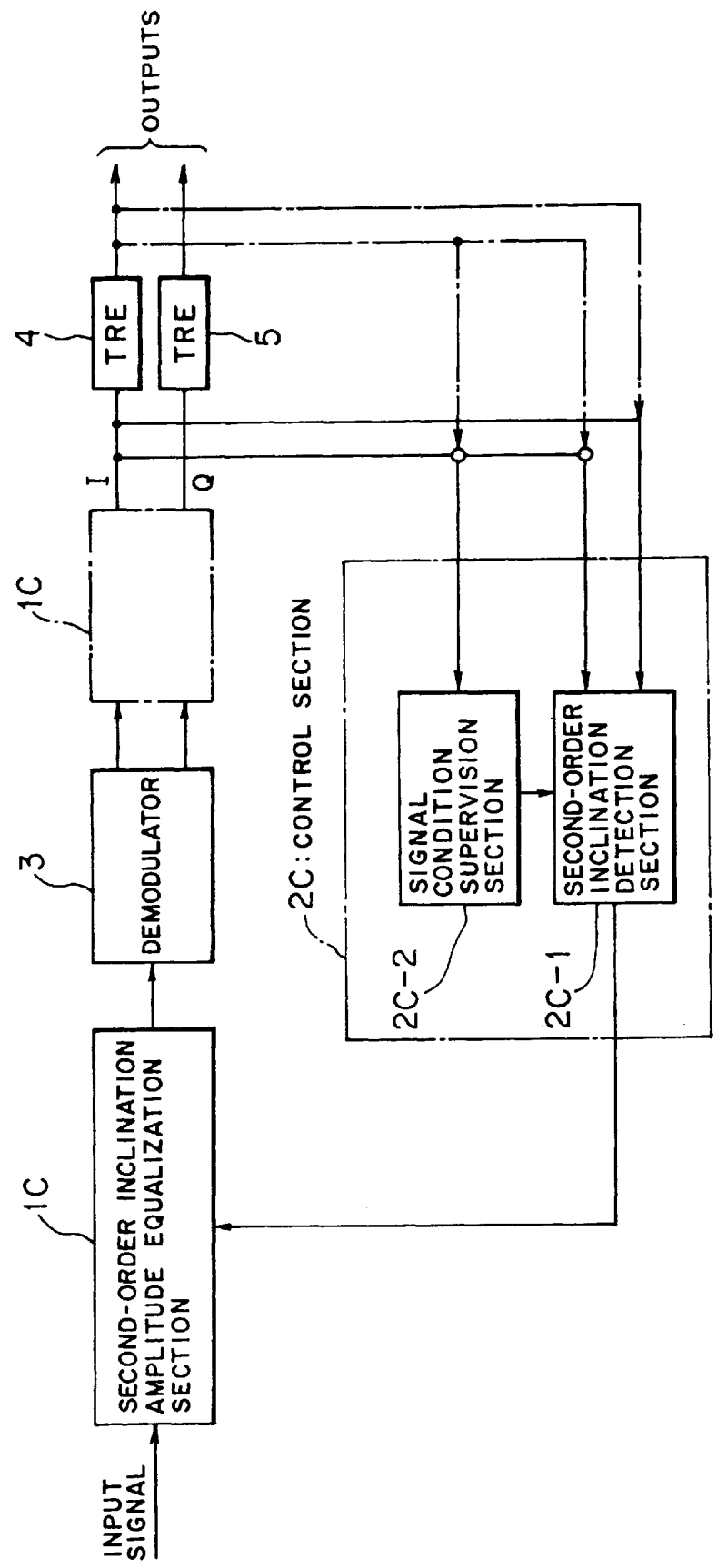

Referring now to FIG. 5, there is shown in block diagram an automatic amplitude equalizer according to a yet further aspect of the present invention. The automatic amplitude equalizer includes a second-order inclination amplitude equalization section 1C, a control section 2C, a demodulator 3, and a pair of transversal equalizers (TRE) 4 and 5.

The second-order inclination amplitude equalization section 1C compensates for a second-order inclination amplitude characteristic of an input signal in accordance with a predetermined first-order inclination amplitude characteristic or a predetermined second-order inclination amplitude characteristic. The control section 2C detects the second-order inclination amplitude characteristic of the input signal from a pair of digital demodulated signals I and Q originating from the input signal and outputs a control signal for the second-order inclination amplitude equalization section 1C based on a result of the detection.

In the automatic amplitude equalizer described above, upon compensation for an amplitude characteristic of an input signal, a second-order inclination amplitude characteristic of the input signal is detected by the control section 2C from a pair of digital demodulated signals I and Q originating from the input signal. Then, based on a result of such detection, a control signal for the second-order inclination amplitude equalization section 1C is outputted to the second-order inclination amplitude equalization section 1C. Consequently, the amplitude characteristic of the input signal is compensated for in accordance with the predetermined first-order inclination amplitude characteristic by the second-order inclination amplitude equalization section 1C.

Accordingly, with the automatic amplitude equalizer of the construction described above, the second-order inclination amplitude characteristic of the input signal can be compensated for with certainty.

The second-order inclination amplitude equalization section 1C has the first-order inclination amplitude characteristic or the second-order inclination amplitude characteristic in the frequency-domain and compensates for the second-order inclination amplitude characteristic of the input signal in accordance with the first-order inclination amplitude characteristic or the second-order inclination amplitude characteristic. Alternatively, the second-order inclination amplitude equalization section 1C may include an equalizer which operates in the time-domain and compensate for the second-order inclination amplitude characteristic of the input signal in accordance with the first-order inclination amplitude characteristic or the second-order inclination amplitude characteristic.

Where the second-order inclination amplitude equalization section 1C has the second-order inclination amplitude characteristic in the frequency-domain, the amplitude characteristic of the input signal is compensated for in the frequency-domain, but where the second-order inclination amplitude equalization section 1C includes an equalizer which operates in the time-domain, the amplitude characteristic of the input signal is compensated for in the time-domain.

Accordingly, the second-order inclination amplitude characteristic of the input signal can be compensated for very readily in accordance with the first-order inclination amplitude characteristic or the second-order inclination amplitude characteristic in the frequency-domain.

On the other hand, where the second-order inclination amplitude equalization section 1C includes an equalizer which operates in the time-domain and compensates for the second-order inclination amplitude characteristic in accordance with the first-order inclination amplitude characteristic or the second-order inclination amplitude characteristic, even when the input undergoes a large amount of delay in time, the second-order inclination amplitude characteristic of the input signal can be compensated for in accordance with the first-order inclination amplitude characteristic or the second-order inclination amplitude characteristic with a higher degree of certainty.

Meanwhile, the control section 2C includes, as shown in FIG. 5, a second-order inclination detection section 2C-1 and a signal condition supervision section 2C-2.

The second-order inclination detection section 2C-1 detects the second-order inclination amplitude characteristic of the input signal based on the correlation between the value of the signal I (or Q) of the digital demodulated signals I and Q and error information of the digital demodulated signal I (or Q). The signal condition supervision section 2C-2 supervises the variation condition of the value of the digital demodulated signal I (or Q), and outputs, when it is discriminated by the signal condition supervision section 2C-2 that the variation condition of the value of the digital demodulated signal I (or Q) is a particular condition, a control signal for the second-order inclination amplitude equalization section 1C in accordance with the second-order inclination amplitude characteristic detected by the second-order inclination detection section 2C-1.

Consequently, in the control section 2C, the second-order inclination amplitude characteristic of the input signal is detected by the second-order inclination detection section 2C-1 based on the correlation between the value of the digital demodulated signal I (or Q) and error information of the digital demodulated signal I. Meanwhile, the variation condition of the value of the digital demodulated signal I (or Q) is supervised by the signal condition supervision section 2C-2.

Then, when it is discriminated by the signal condition supervision section 2C-2 that the variation condition of the value of the digital demodulated signal I (or Q) is the particular condition, a control signal for the second-order inclination amplitude equalization section 1C is outputted in accordance with the second-order inclination amplitude characteristic detected by the second-order inclination detection section 2C-1.

Accordingly, the second-order inclination amplitude characteristic of the input signal can be detected and compensated for with certainty with a very simple construction.

The second-order inclination detection section 2C-1 may detect the second-order inclination amplitude characteristic based on the correlation between the value of an equalized signal $I_{TRE}$ (or $Q_{TRE}$) obtained by processing of the digital demodulated signal I (or Q) further by means of the transversal equalizer 4 (or 5) and error information of the equalized signal $I_{TRE}$ (or $Q_{TRE}$).

With the second-order inclination detection section 2C-1 of the construction just described, the second-order inclination amplitude characteristic can be detected based on the correlation between the value of the equalized signal $I_{TRE}$ (or $Q_{TRE}$) obtained by processing of the digital demodulated signal I (or Q) further by means of the transversal equalizer 4 (or 5) and the error information of the equalized signal $I_{TRE}$ (or $Q_{TRE}$).

Accordingly, the second-order inclination amplitude characteristic of the input signal can be detected with a higher degree of accuracy.

More particularly, the second-order inclination detection section 2C-1 includes an exclusive OR element for logically exclusively ORing the digital demodulated signal I (or Q) and the error information of the digital demodulated signal I (or Q). Meanwhile, the signal condition supervision section 2C-2 includes a delay section for delaying the digital demodulated signal I (or Q) by a predetermined time, and a particular signal condition discrimination section for discriminating whether or not a value of the delayed digital demodulated signal I (or Q) from the delay section is in a particular variation condition.

Consequently, in the second-order inclination detection section 2C-1, logical exclusive ORing is performed by the exclusive OR element between the digital demodulated signal I (or Q) and the error information of the digital demodulated signal I (or Q).

Meanwhile, in the signal condition supervision section 2C-2, the digital demodulated signal I (or Q) is delayed by the predetermined time by the delay section, and it is discriminated by the particular signal condition discrimination section whether or not the value of the delayed digital demodulated signal I (or Q) from the delay section is in the particular variation condition.

Accordingly, the second-order inclination amplitude characteristic of the input signal can be detected very readily, and it can be discriminated with certainty whether or not the value of the digital demodulated signal is in the particular variation condition.

Further, the delay section includes a plurality of delay elements, and the particular signal condition discrimination section is constructed as means for discriminating whether or not values of the digital demodulated signal I or Q from the delay elements exhibit a condition wherein two different values alternately appear repetitively.

Consequently, in the signal condition supervision section 2C-2, the digital demodulated signal I (or Q) is delayed by the predetermined time by each of the delay elements, and then, it is discriminated by the particular signal condition discrimination section whether or not the values of the digital demodulated signal I (or Q) from the delay elements exhibit the condition wherein two different values alternately appear repetitively.

Accordingly, the signal condition discrimination section can be realized very readily.

Alternatively, the automatic amplitude equalizer may be constructed such that the delay section includes a plurality of delay elements and an inversion/non-inversion section for performing, when the values of one of the digital demodulated signals from the delay elements exhibit a condition wherein two different values alternately appear repetitively, inversion and non-inversion processing for the values of the digital demodulated signal from the delay elements to convert the values into a fixed value and outputting the fixed value, the particular signal condition discrimination section being constructed as means for receiving outputs of the inversion/non-inversion section and discriminating whether or not the values of the digital demodulated signal received from the inversion/non-inversion section are in a condition wherein the values have all equal to the fixed value.

Thus, in the delay section, when the values of one of the digital demodulated signals from the delay elements exhibit the condition wherein two different values alternately appear repetitively, inversion and non-inversion processing is performed for the values of the digital demodulated signal from the delay elements to convert the values into a fixed value to be outputted from the inversion/non-inversion section. Then, based on the outputs of the inversion/non-inversion section, it can be discriminated by the particular signal condition discrimination section whether or not the values of the digital demodulated signal thus received are in the condition wherein the values have all equal to the fixed value.

Accordingly, the particular signal condition discrimination section can be constructed in a simpler construction, and also discrimination processing therein can be performed very readily.

By the way, the demodulator 3 produces the digital demodulated signals I and Q from an input signal, and while the second-order inclination amplitude equalization section 1C is provided, in the arrangement shown in FIG. 5, at a preceding stage to the demodulator 3, it may alternatively be provided at a following stage to the demodulator 3.

Where the second-order inclination amplitude equalization section 1C is provided at the preceding stage to the demodulator 3, the amplitude characteristic of the input signal is compensated for in accordance with the predetermined second-order inclination amplitude characteristic at the preceding stage to the demodulator 3. However, where the second-order inclination amplitude equalization section 1C is conversely provided at the following stage to the demodulator 3 as indicated by an alternate long and short dash line in FIG. 5, the amplitude characteristic of the input signal is compensated for similarly at the following stage to the demodulator 3.

Accordingly, in either case, the amplitude characteristic of the input signal can be compensated for with certainty.

Where the second-order inclination amplitude equalization section 1C is provided at the following stage to the demodulator 3, it is provided by a plural number corresponding to the number of the digital demodulated signals I and Q obtained by the demodulator 3, and the control section 2C is provided by a plural number corresponding to the second-order inclination amplitude equalization sections.

In this instance, by the control sections 2C provided corresponding to the second-order inclination amplitude equalization sections 1C, the second-order inclination amplitude equalization sections are controlled to perform compensation processing for the digital demodulated signals I and Q, and consequently, the amplitude characteristic of the input signal is compensated for in accordance with the predetermined second-order inclination amplitude characteristic.

Accordingly, the amplitude characteristic of the input signal can be compensated for with a higher degree of accuracy in accordance with the second-order inclination amplitude characteristic.

Figure 6:
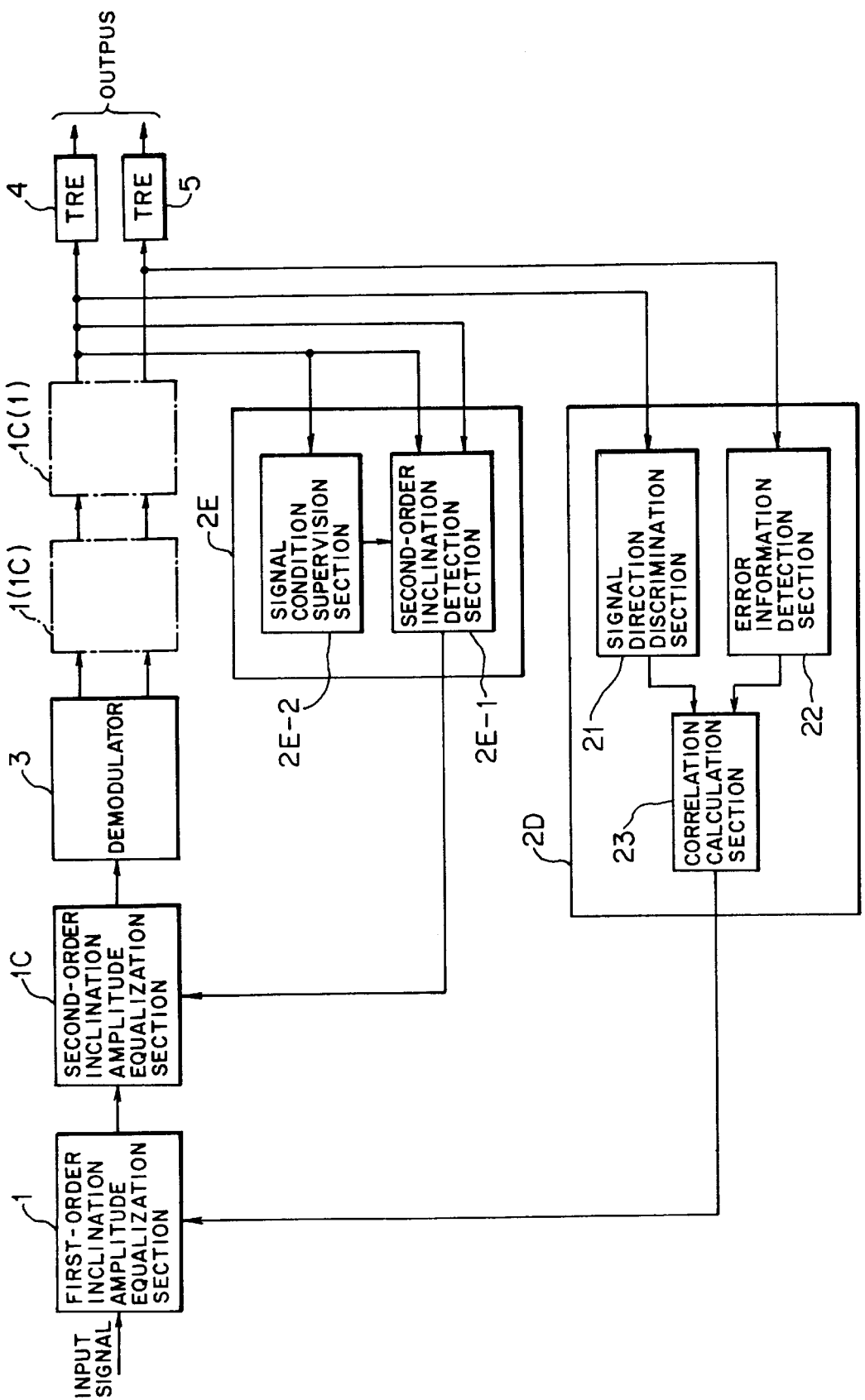

Referring now to FIG. 6, there is shown in block diagram an automatic amplitude equalizer according to a yet further aspect of the present invention. The automatic amplitude equalizer includes a first-order inclination amplitude equalization section 1, a second-order inclination amplitude equalization section 1C, a first control section 2D, a second control section 2E, a demodulator 3, and a pair of transversal equalizers (TRE) 4 and 5.

The first-order inclination amplitude equalization section 1 is similar to that shown in FIG. 1 and compensates for a first-order inclination amplitude characteristic of an input signal in accordance with a predetermined first-order inclination amplitude characteristic. The second-order inclination amplitude equalization section 1C is similar to that shown in FIG. 5 and compensates for a second-order inclination amplitude characteristic of the input signal in accordance with a predetermined first-order inclination amplitude characteristic or a predetermined second-order inclination amplitude characteristic.

The first control section 2D detects the first-order inclination amplitude characteristic of the input signal from one I of a pair of digital demodulated signals I and Q originating from the input signal and outputs a control signal for the first-order inclination amplitude equalization section 1 based on a result of the detection. The second control section 2E detects a second-order inclination amplitude characteristic of the input signal from the digital demodulated signal I (or Q) originating from the input signal and outputs a control signal for the second-order inclination amplitude equalization section 1C based on a result of the detection.

Consequently, in the automatic amplitude equalizer of the construction described above, upon compensation for the amplitude characteristic of the input signal, the first-order inclination amplitude characteristic of the input signal is detected by the first control section 2D from the digital demodulated signal I (or Q) originating from the input signal, and the second-order inclination amplitude characteristic of the input signal is detected similarly by the second control section 2E from the digital demodulated signal I (or Q) originating from the input signal.

Then, in the first control section 2D and the second control section 2E, control signals for the first-order inclination amplitude equalization section 1 and the second-order inclination amplitude equalization section 1C are produced based on results of the detection of the first-order inclination amplitude characteristic and the second-order inclination amplitude characteristic, and are outputted to the first-order inclination amplitude equalization section 1 and the second-order inclination amplitude equalization section 1C, respectively.

As a result, the amplitude characteristic of the input signal is compensated for in accordance with the predetermined first-order inclination amplitude characteristic by the first-order inclination amplitude equalization section 1 and then compensated for in accordance with the predetermined first-order inclination amplitude characteristic by the second-order inclination amplitude equalization section 1C.

Accordingly, with the automatic amplitude equalizer described above, both of the first-order inclination amplitude characteristic and the second-order inclination amplitude characteristic of the input signal can be compensated for by the first-order inclination amplitude equalization section 1 and the second-order inclination amplitude equalization section 1C, respectively. Consequently, the automatic amplitude equalizer has a remarkably improved compensation capacity.

Also in this instance, the first-order inclination amplitude equalization section 1 is constructed such that it has the first-order inclination amplitude characteristic in the frequency-domain and compensates for the first-order inclination amplitude characteristic of the input signal in accordance with the first-order inclination amplitude characteristic thereof. However, the first-order inclination amplitude equalization section 1 may alternatively be constructed such that it includes an equalizer which operates in the time-domain and compensates for the first-order inclination amplitude characteristic of the input signal in accordance with the first-order inclination amplitude characteristic thereof.

Where the first-order inclination amplitude equalization section 1 has the first-order inclination amplitude characteristic in the frequency-domain, the first-order inclination amplitude characteristic of the input signal is compensated for in accordance with the first-order inclination amplitude characteristic. However, where the first-order inclination amplitude equalization section 1 includes an equalizer which operates in the time-domain, the first-order inclination amplitude characteristic of the input signal is compensated for in accordance with the first-order inclination amplitude characteristic.

Accordingly, also in this instance, the first-order inclination amplitude characteristic of the input signal can be compensated for very readily in accordance with the first-order inclination amplitude characteristic in the frequency-domain. Further, even when the input signal undergoes a long delay in time, the amplitude characteristic of the input signal can be compensated for with a high degree of certainty in accordance with the first-order inclination amplitude characteristic.

Meanwhile, the second-order inclination amplitude equalization section 1C is constructed such that it has the first-order inclination amplitude characteristic or the second-order inclination amplitude characteristic in the frequency-domain and compensates for the second inclination amplitude characteristic of the input signal in accordance with the first-order inclination amplitude characteristic or the second-order inclination amplitude characteristic thereof. However, the second-order inclination amplitude equalization section 1C may alternatively be constructed such that it includes an equalizer which operates in the time-domain and compensates for the second-order inclination amplitude characteristic of the input signal in accordance with the first-order inclination amplitude characteristic or the second-order inclination amplitude characteristic thereof.

Where the second-order inclination amplitude equalization section 1C has the second-order inclination amplitude characteristic in the frequency-domain, the amplitude characteristic of the input signal is compensated for in accordance with the second-order inclination amplitude characteristic in the frequency-domain. However, where the second-order inclination amplitude equalization section 1C includes an equalizer which operates in the time-domain, the amplitude characteristic of the input signal is compensated for in accordance with the second-order inclination amplitude characteristic in the time-domain.

Accordingly, the second-order inclination amplitude characteristic of the input signal can be compensated for very readily in accordance with the first-order inclination amplitude characteristic or the second inclination amplitude characteristic. Further, even when the input signal undergoes a long delay in time, the second-order inclination amplitude characteristic of the input signal can be compensated for with a high degree of certainty in accordance with the first-order inclination amplitude characteristic or the second inclination amplitude characteristic.

Meanwhile, the first control section 2D includes a signal direction discrimination section 21, an error information detection section 22, and a correlation calculation section 23, which are all similar to those described hereinabove with reference to FIG. 1. Also in this instance, the signal direction discrimination section 21 discriminates the direction of variation of the value of the signal I (or Q) of the digital demodulated signals I and Q. The error information detection section 22 detects error information from the other signal Q (or I) of the digital demodulated signals I and Q which is orthogonal to the signal I (or Q). The correlation calculation section 23 outputs a control signal for the first-order inclination amplitude equalization section 1 based on the correlation between the error information obtained by the error information detection section 22 and the direction of variation of the value of the signal I (or Q) obtained by the signal direction discrimination section 21.

Thus, in the first control section 2D, the direction of variation of the value of the signal I (or Q) of the digital demodulated signals I and Q is discriminated by the signal direction discrimination section 21. Meanwhile, error information is detected by the error information detection section 22 from the other signal Q (or I) of the digital demodulated signals I and Q which is orthogonal to the signal I (or Q).

Then, a control signal for the first-order inclination amplitude equalization section 1 is outputted from the correlation calculation section 23 based on the correlation between the error information and the direction of variation of the value of the signal I (or Q).

Accordingly, the first control section 2D can be realized with a very simple construction. Consequently, the automatic amplitude equalizer can be constructed in a remarkably reduced circuit scale at a remarkably reduced cost and is improved very much in accuracy in compensation.

Alternatively, the first control section 2D may include, similarly to the control section 2' shown in FIG. 2, a first signal direction discrimination section 21-1, a first error information detection section 22-1, a first correlation calculation section 23-1, a second signal direction discrimination section 21-2, a second error information detection section 22-2, a second correlation calculation section 23-2, and a control signal production section 24.

In this instance, similarly to the control section 2' shown in FIG. 2, the first control section 2D can produce a control signal for the first-order inclination amplitude equalization section 1 by means of the first signal direction discrimination section 21-1, first error information detection section 22-1, first correlation calculation section 23-1, second signal direction discrimination section 21-2, second error information detection section 22-2, second correlation calculation section 23-2 and control signal production section 24 thereof.

Accordingly, in this instance, the first-order inclination amplitude characteristic of the input signal can be detected based on both of the digital demodulated signals I and Q, and consequently, the detection sensitivity and the accuracy of the control signal for the first-order inclination amplitude equalization section 1 can be improved remarkably. Consequently, the automatic amplitude characteristic has further remarkably improved accuracy.

Figure 15:
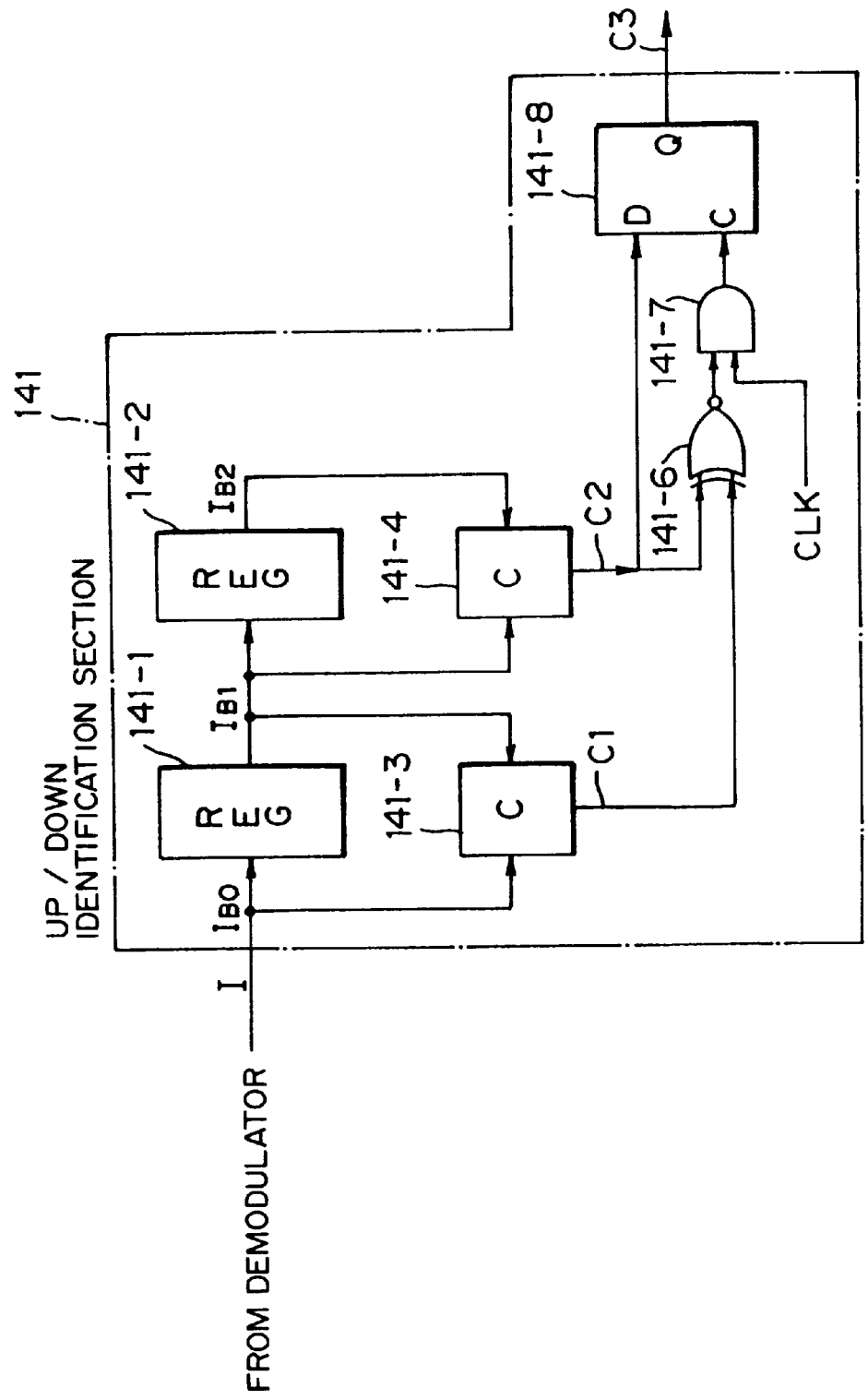
FIG. 15 is a block diagram showing a construction of a rise/drop identification section of the automatic amplitude equalization of FIG. 7.

Meanwhile, the second control section 2E includes a second-order inclination detection section 2E-1 and a signal condition supervision section 2E-2, which are similar to the second-order inclination detection section 2C-1 and the signal condition supervision section 2C-2 shown in FIG. 15, respectively.

Also in this instance, the second-order inclination detection section 2E-1 detects the second-order inclination amplitude characteristic of the input signal based on the correlation between the value and error information of the digital demodulated signal I (or Q). The signal condition supervision section 2E-2 supervises the variation condition of the value of the digital demodulated signal I (or Q). When the signal condition supervision section 2E-2 discriminates that the variation condition of the value of the digital demodulated signal I (or Q) is in a particular condition, it outputs a control signal for the second-order inclination amplitude equalization section 1C in accordance with the second-order inclination amplitude characteristic detected by the second-order inclination detection section 2E-1.

Consequently, in the second control section 2E, the second-order inclination amplitude characteristic of the input signal is detected based on the correlation between the value and error information of the digital demodulated signal I (or Q) by the second-order inclination detection section 2E-1. Then, the variation condition of the value of the digital demodulated signal I (or Q) is supervised by the signal condition supervision section 2E-2.

Then, if it is discriminated by the signal condition supervision section 2E-2 that the variation condition of the value of the digital demodulated signal I (or Q) is in the particular condition, a control signal for the second-order inclination amplitude equalization section 1C is outputted in accordance with the second-order inclination amplitude characteristic detected by the second-order inclination detection section 2E-1.

Accordingly, the second-order inclination amplitude characteristic of the input signal can be detected and compensated for with certainty with a very simple construction.

By the way, the automatic amplitude equalizer shown in FIG. 6 further includes the demodulator 3 for producing the digital demodulated signals I and Q from the input signal, and the first-order inclination amplitude equalization section 1 and the second-order inclination amplitude equalization section 1C are provided at preceding stages to the demodulator 3. However, the first-order inclination amplitude equalization section 1 and the second-order inclination amplitude equalization section 1C may alternatively be provided at following stages to the demodulator 3.

Also in this instance, where the first-order inclination amplitude equalization section 1 and the second-order inclination amplitude equalization section 1C are provided at preceding stages to the demodulator 3 as seen in FIG. 6, the amplitude characteristic of the input signal is compensated for in accordance with the predetermined first- and second-order inclination amplitude characteristics at the preceding stages to the demodulator 3. On the other hand, where the first-order inclination amplitude equalization section 1 and the second-order inclination amplitude equalization section 1C are provided at the following stages to the demodulator 3, the amplitude characteristic of the input signal is compensated for similarly at the following stages to the demodulator 3.

Accordingly, with the automatic amplitude equalizer of the construction described above, the amplitude characteristic (both of the first-order inclination amplitude characteristic and the second-order inclination amplitude characteristic) of the input signal can be compensated for, with the simple construction that the first-order inclination amplitude equalization section 1 and the second-order inclination amplitude equalization section 1C are provided at the preceding stages to the demodulator 3, with certainty in accordance with the predetermined first- and second-order inclination amplitude characteristics at the preceding stages to the demodulator 3.

Also where the first-order inclination amplitude equalization section 1 and the second-order inclination amplitude equalization section 1C are provided at the following stages to the demodulator 3, the amplitude characteristic of the input signal can be compensated for similarly with certainty.

The automatic amplitude equalizer may be constructed otherwise such that the first-order inclination amplitude equalization section 1 is provided at a preceding stage to the demodulator 3 while the second-order inclination amplitude equalization section 1C is provided at a following stage to the demodulator 3 or conversely such that the second-order inclination amplitude equalization section 1C is provided at a preceding stage to the demodulator 3 while the first-order inclination amplitude equalization section 1 is provided at a following stage to the demodulator 3.

Where the first-order inclination amplitude equalization section 1 is provided at the preceding stage to the demodulator 3 while the second-order inclination amplitude equalization section 1C is provided at the following stage to the demodulator 3, the amplitude characteristic of the input signal is first compensated for in accordance with the predetermined first-order inclination amplitude characteristic at the preceding stage to the demodulator 3, and then compensated for in accordance with the predetermined second-order inclination amplitude characteristic at the following stage to the demodulator 3.

However, conversely where the second-order inclination amplitude equalization section 1C is provided at the preceding stage to the demodulator 3 while the first-order inclination amplitude equalization section 1 is provided at the following stage to the demodulator 3, the amplitude characteristic of the input signal is first compensated for in accordance with the predetermined second-order inclination amplitude characteristic at the preceding stage to the demodulator 3, and then compensated for in accordance with the predetermined first-order inclination amplitude characteristic at the following stage to the demodulator 3.

Accordingly, the amplitude characteristic of the input signal can be either first compensated for in accordance with the predetermined first-order inclination amplitude characteristic at the preceding stage to the demodulator 3 and then compensated for in accordance with the predetermined second inclination amplitude characteristic at the following stage to the demodulator 3 or first compensated for in accordance with the predetermined second-order inclination amplitude characteristic at the preceding stage to the demodulator 3 and then compensated for in accordance with the predetermined first-order inclination amplitude characteristic at the following stage to the demodulator 3.

Further, the second-order inclination amplitude equalization section 1C may be provided, at a following stage to the demodulator 3, by a plural number corresponding to the number of the digital demodulated signals I and Q obtained by the demodulator 3, and in this instance, the second control section 2D is provided by a plural number corresponding to the second-order inclination amplitude equalization sections.

In this instance, the second-order inclination amplitude equalization sections are controlled by corresponding ones of the second control sections 2E, which are provided corresponding to the second-order inclination amplitude equalization sections 1C, to perform compensation processing for the individual digital demodulated signals I and Q. Consequently, the amplitude characteristic of the input signal is compensated for in accordance with the predetermined second-order inclination amplitude characteristic.

Accordingly, also in this instance, since compensation processing is performed individually for the digital demodulated signals I and Q, the amplitude characteristic of the input signal can be compensated for with a higher degree of accuracy in accordance with the predetermined second-order inclination amplitude characteristic.

b. First Embodiment

Figure 7:
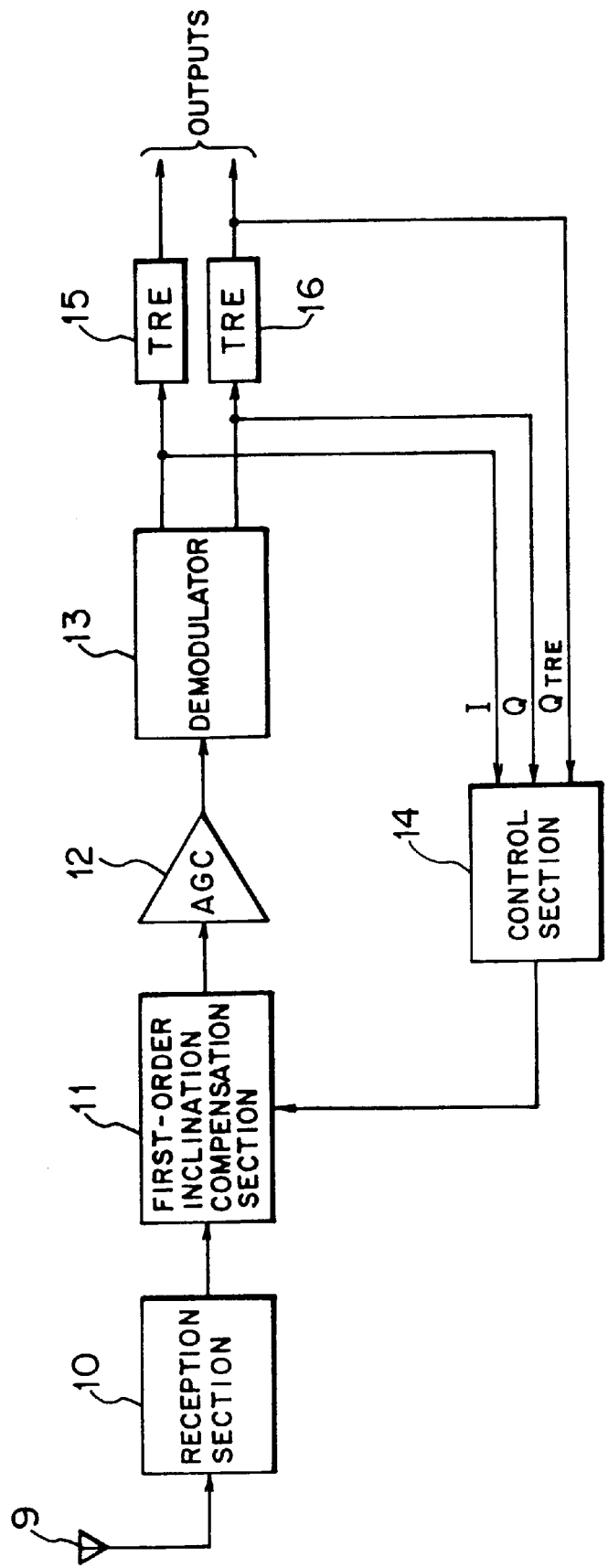
FIG. 7 is a block diagram of an automatic amplitude equalizer showing a first preferred embodiment of the present invention.

Referring now to FIG. 7, there is shown in block diagram a construction of an automatic amplitude equalizer according to a first preferred embodiment of the present invention. The automatic amplitude equalizer shown includes an antenna 9, a reception section 10, a first-order inclination compensation section 11, an automatic gain control section (AGC) 12, a demodulator 13, a control section 14, and a pair of transversal equalizers (TRE) 15 and 16.

The reception section 10 frequency converts (down converts) a RF (radio frequency) signal received by the antenna 9 into an IF (intermediate frequency) signal and outputs the IF signal to the first-order inclination compensation section 11. The first-order inclination compensation section (first-order inclination compensation section) 11 has a first-order inclination amplitude characteristic in the frequency-domain and compensates for the amplitude characteristic of the IF signal (input signal) from the reception section 10 in accordance with the first-order inclination amplitude characteristic.

The automatic gain control section 12 controls the gain of the output signal of the first-order inclination compensation section 11 fixed and outputs a resulted signal to the demodulator 13. The demodulator 13 demodulates the signal from the first-order inclination compensation section 11 outputted by way of the automatic gain control section 12 into two orthogonal base band signals and converts the orthogonal base band signals from analog to digital signals to obtain digital demodulated signals I and Q. The transversal equalizers 15 and 16 equalize the digital demodulated signals I and Q in the time-domain, respectively.

The control section 14 detects a first-order inclination distortion (first-order inclination amplitude characteristic) of the IF signal obtained from the demodulator 13 from the digital demodulated signals I and Q of the IF signal, and outputs thus detected information as a control signal for controlling the first-order inclination amplitude characteristic of the first-order inclination compensation section 11. It is to be noted that, in the present embodiment, the first-order inclination compensation section 11 is provided at a preceding stage to the demodulator 13, that is, at a position at which the IF signal is inputted to and outputted from the first-order inclination compensation section 11.

In the automatic amplitude equalizer shown in FIG. 7 and having the construction described above, an RF signal received by the antenna 9 is down converted into an IF signal by the reception section 10 and is orthogonally detected by the demodulator 13 so that a pair of digital demodulated signals I and Q of a base band are obtained.

Then, the control section 14 detects a first-order inclination distortion of the IF signal using the digital demodulated signals I and Q and an equalized signal Q$_{TRE}$ obtained by equalization processing of the digital demodulated signal Q by means of the transversal equalizer 16. The control section 14 outputs a control signal for the first-order inclination compensation section 11 based on a result of such detection to the first-order inclination compensation section 11. The first-order inclination compensation section 11 compensates for the first-order inclination distortion of the IF signal by controlling the first-order inclination amplitude characteristic of itself in accordance with the control signal from the control section 4.

Here, the principle of detecting a first-order inclination distortion of an IF signal as described above will be described in detail with reference to FIGS. 8 to 12.

Figure 8:
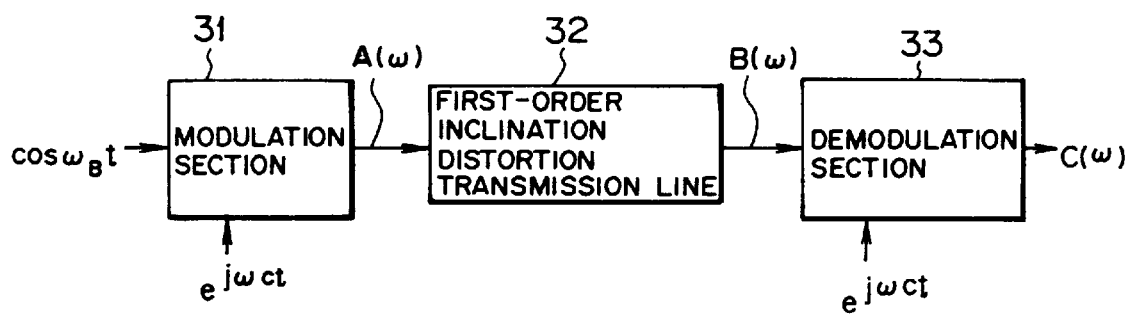
FIG. 8 is a block diagram illustrating a principle of operation of the automatic amplitude equalizer of FIG. 7.

Referring first to FIG. 8, there is illustrated a perception of an ordinary signal transmission system. The signal transmission system includes a modulation section 31, a first-order inclination distortion transmission line 32 and a demodulation section 33. In FIG. 8, reference character ω$_B$ denotes a signal (base band) frequency, ω$_C$ a carrier frequency, A(ω) a modulated signal, B(ω) a modulated signal having undergone a first-order inclination distortion by the first-order inclination distortion transmission line 32, and C(ω) a demodulated signal.

Now, if, for example, a transmission signal represented as cosω$_S$ is modulated by the modulation section 31, then the modulated signal A(ω) from the modulation section 31 is given as $$A(\omega) = \cos\omega_B t \times \exp(j\omega_C t) \tag{1}$$

Here, since, from the Euler's formula, $$\cos\theta = [\exp(j\theta) + \exp(-j\theta)]/2$$

the modulated signal A(ω) is given as $$A(\omega) = [\exp(j\omega_B t) + \exp(-j\omega_B t)] \times \exp[j\omega_C (\omega_C + \omega_B)t] + \exp[j(\omega_C - \omega_B)t]]/2 \tag{2}$$

The expression (2) indicates that two frequency components (ω$_C$+ω$_B$) and (ω$_C$−ω$_B$) are present in the modulated signal A(ω).

Further, if the amplitudes of the two frequency components mentioned above are represented as P(ω$_C$+ω$_B$) and P(ω$_C$−ω$_B$) and the amplitude ratio between them is represented by γ, then the amplitude ratio γ is represented as $$\gamma = P(\omega_C + \omega_B)/P(\omega_C - \omega_B) \tag{3}$$

Figures 10A, 10B:
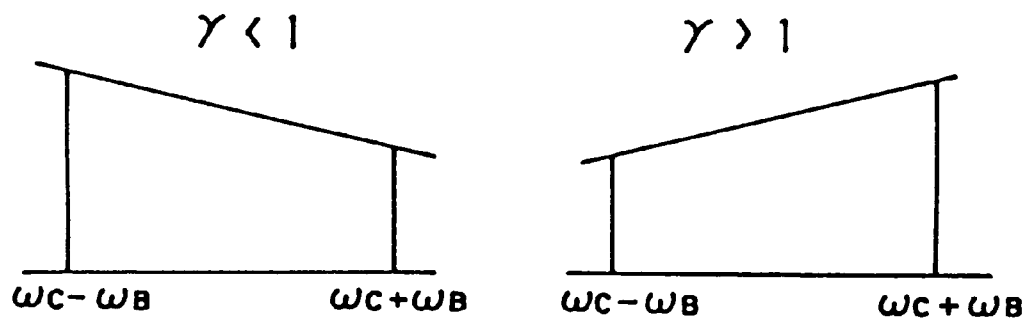

Here, the amplitude ratio γ signifies, when γ<1, a negative inclination distortion (rightwardly downwardly inclined slope) as seen in FIG. 10(*a*), but signifies, when γ>1, a positive inclination distortion (rightwardly upwardly inclined slope) as seen in FIG. 10(*b*). It is to be noted that γ=1 (not shown) signifies a zero inclination distortion (no distortion).

Using the amplitude ratio γ, the modulated signal B(ω) which has undergone a first-order inclination distortion is represented in the following manner.

$$B(\omega) = [\exp[j(\omega_C + \omega_B)t] + \gamma\exp[j(\omega_C - \omega_B)t]]/2 \tag{4}$$
$$= [\exp(j\omega_C t) \times ((\exp(j\omega_B t) + \gamma\exp(-j\omega_B t))]/2$$

Further, if the modulated signal B(ω) is demodulated by the demodulation section 33, then the demodulated signal C(ω) from the demodulation section 33 is given as $$C(\omega) = [\exp(j\omega_B t) + \gamma\exp(-j\omega_B t)]/2 \tag{5}$$
$$= (\cos\omega_B t + j\sin\omega_B t - \gamma\cos\omega_B t - j\gamma\sin\omega_B t)/2$$
$$= [(1 + \gamma)\cos\omega_B t + j(1 - \gamma)\sin\omega_B t]/2$$

In this instance, since actually the modulated signal B(ω) has been orthogonally detected by the demodulation section 33, the following orthogonal demodulated outputs (demodulated signals) I and Q are obtained:

$$I = [(1+\gamma)\cos\omega_B t]/2 \tag{6}$$

$$Q = [(1-\gamma)\cos\omega_B t]/2 \tag{7}$$

Here, if γ=1, that is, if no first-order inclination distortion is present, then I=cosω$_B$t and Q=0, and the transmission signal (cosω$_B$t) itself is demodulated. However, if γ>1 or γ<1, then since the demodulated signal Q is not equal to "0", an amplitude component of the demodulated signal Q will appear centered at "0" in accordance with an increase or a decrease in amplitude of the demodulated signal I. In short, it can be seen that, when γ>1 or γ<1, an orthogonal interference component is provided by the demodulated signal Q.

Figure 9:
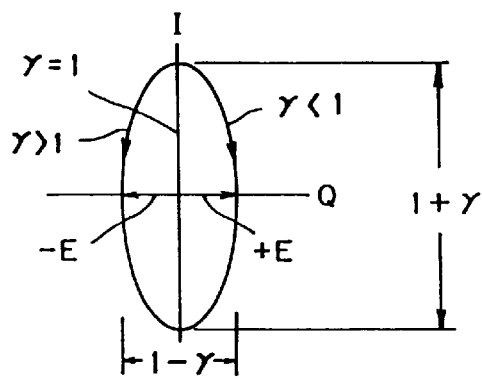

FIG. 9 illustrates the demodulated signals I and Q (which may each be hereinafter referred to merely as signal I or Q) given by the expressions (6) and (7) above in the form of vectors on a rectangular coordinate system I-Q. As seen from FIG. 9, the vector of the signal I moves in accordance with cosωBt with the amplitude of (1+γ)/2 on the I axis while the vector of the signal Q moves in accordance with sinωBt with the amplitude of (1−γ)/2 on the Q axis. Consequently, the composite vector of the signals I and Q will draw an ellipse with the major axis on the I axis since (1+γ)>(1−γ) always stands.

Here, when γ>1, that is, when the first-order inclination distortion has a positive inclination, the demodulated signals I and Q have the forms of I=cosωBt and Q=−sinωBt, respectively, and consequently, the composite vector of the signals I and Q rotates in the counterclockwise direction in FIG. 9. As a result, an error voltage (error information) E=−E of the signal Q appears on the Q axis.

On the contrary, when γ<1, that is, when the first-order inclination distortion has a negative inclination, the signals I and Q have the forms of I=cosωBt and Q=sinωBt, respectively, and consequently, the composite vector of the signals I and Q now rotates in the clockwise direction in FIG. 9, and an error voltage E=+E appears on the Q axis. It is to be noted that, when γ=1, that is, when no first-order inclination distortion is present, since Q=0 in the expression (7), the composite vector of the signals I and Q is present on the I axis.

FIG. 12 illustrates a corresponding relationship (correlation) among the direction of rotation of the composite vector of the signals I and Q, the movement of the signal I (direction of variation of the value of the signal I), the error voltage E of the signal Q and the first-order inclination distortion (γ) described above.

As seen from FIG. 12, when the composite vector of the signals I and Q rotates in the counterclockwise direction in FIG. 9, the first-order inclination distortion has a positive inclination. Accordingly, if the time when the signal I changes to the downward direction ↓(+→−) in FIG. 9 and the error voltage of the signal Q exhibits the value −E or the time when the signal I changes to the upward direction ↑(−→+) in FIG. 9 and the error voltage of the signal Q exhibits the value +E is detected, then it can be detected readily that the first-order inclination distortion of the input signal has a positive inclination.

On the other hand, when the composite vector of the signals I and Q rotates in the clockwise direction in FIG. 9, the first-order inclination distortion has a negative inclination. Accordingly, if the time when the signal I changes to the downward direction ↓(+→−) in FIG. 9 and the error voltage of the signal Q exhibits the value +E or the time when the signal I changes to the upward direction ↑(−→+) in FIG. 9 and the error voltage of the signal Q exhibits the value −E is detected, then it can be detected readily that the first-order inclination distortion of the input signal has a negative inclination.

It is to be noted that the face that the first-order inclination distortion of the input signal has a zero inclination (γ=1) can be detected effectively from the fact that the error voltage E of the demodulated signal Q is "0", that is, no error voltage E is detected. In this instance, however, the movement of the signal I is not required for such detection.

From the foregoing description, it can be recognized that a first-order inclination distortion of any of a positive inclination, a negative inclination and a zero inclination can be detected effectively from digital demodulated signals I and Q obtained by orthogonal detection of an input signal cosωBt by the demodulation section 33.

Figure 11:
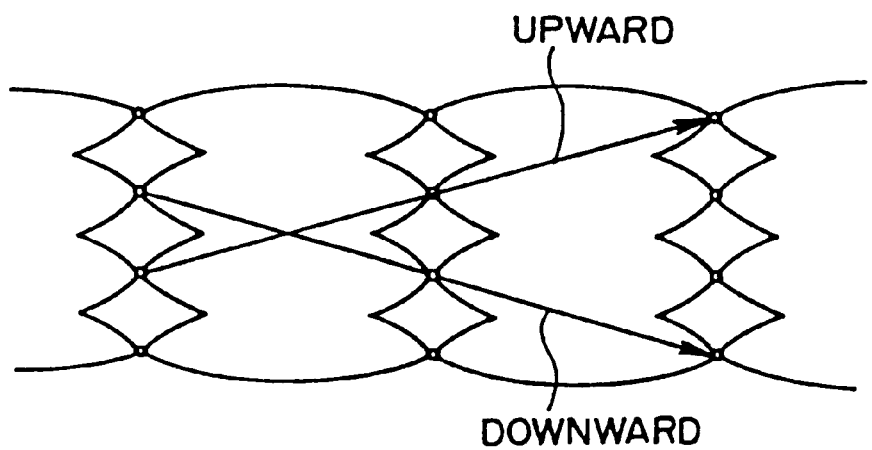

It is to be noted that FIG. 11 is a diagram showing a received eye pattern of the I axis when the demodulated signal A(ω) described above is not A(ω)=cosωBt but a signal which has undergone such modulation as PSK (Phase Shift Keying) or QAM (Quadrature Amplitude Modulation), and also in this instance, if a first-order inclination distortion (or a higher order inclination distortion) is included in the received demodulated signal B(ω), then when the demodulated signal I moves in the upward or downward direction, the error voltage E=±E of an orthogonal interference component appears in the demodulated signal Q. Consequently, if a movement of the signal I is detected and the error voltage E by the signal Q is detected, then the characteristic of a positive inclination, a negative inclination or a zero inclination of the first-order inclination distortion can be detected effectively as described above.

In this manner, by discriminating the direction in which the signal I of the demodulated signals I and Q moves and detecting the error voltage E from the signal Q orthogonal to the signal I, a positive inclination, a negative inclination or a zero inclination of the first-order inclination distortion of the input signal can be detected based on a correlation between them.

Figure 13:
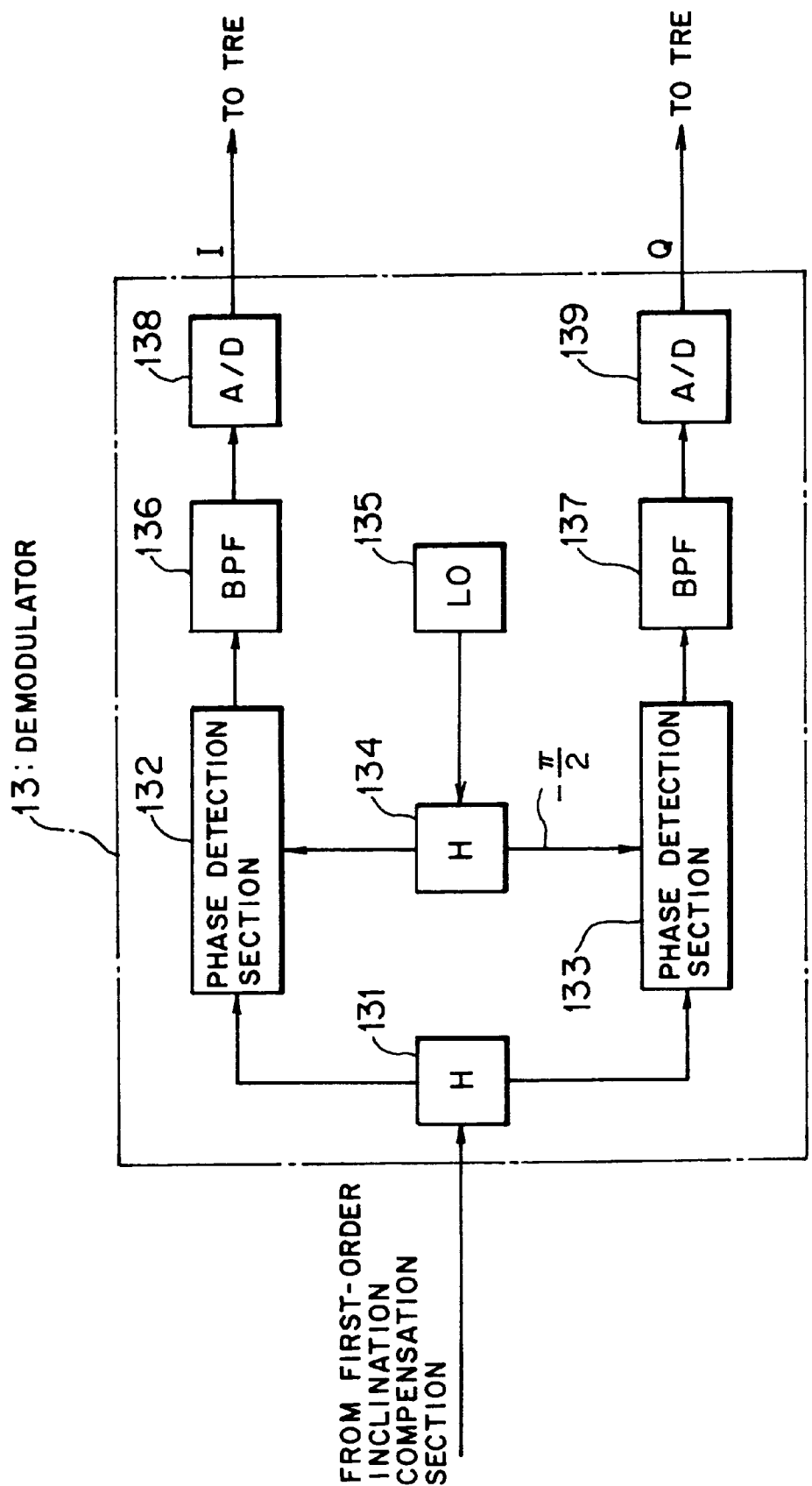
FIG. 13 is a block diagram showing a construction of a demodulator of the automatic amplitude equalization of FIG. 7.

Thus, in order to obtain such digital demodulated signals I and Q, the demodulator 13 includes, as shown in FIG. 13, a pair of hybrid circuits (H) 131 and 134, a pair of phase detection sections 132 and 133, a local oscillator (LO) 135, a pair of band pass filters (BPF) 136 and 137, and a pair of analog to digital converters (A/D) 138 and 139.

Each of the hybrid circuits 131 and 134 branches an input signal thereto into two waves. The phase detection sections 132 and 133 perform orthogonal detection of an IF signal from the hybrid circuit 131 in response to a carrier reproduction signal from the local oscillator 135 all described below to obtain demodulated base band signals I and Q orthogonal to each other, respectively. The local oscillator 135 produces a carrier reproduction signal synchronized in phase with a carrier.

The band pass filters 136 and 137 filter the demodulated base band signals I and Q obtained from the phase detection sections 132 and 133 to remove noise components from the demodulated base band signals I and Q, respectively, while allowing only signal components of a required frequency band to pass therethrough. The analog to digital converters 138 and 139 perform analog to digital conversion of the demodulated base band signals I and Q from the band pass filters 136 and 137 to obtain digital demodulated signals I and Q, respectively.

Consequently, in the demodulator 13 of the construction described above, an IF signal from the automatic gain control section 12 (refer to FIG. 7) is branched into two waves by the hybrid circuit 131, and the two output signals of the hybrid circuit 131 are outputted to the phase detection sections 132 and 133. Meanwhile, a carrier reproduction signal synchronized in phase with the carrier is produced from the local oscillator 135 and is branched into two waves having phases different by π/2 from each other by the hybrid circuit 134. The two waves from the hybrid circuit 134 are outputted to the phase detection sections 132 and 133.

As a result, the demodulated base band signals I and Q orthogonal to each other are obtained from the phase detection sections 132 and 133, respectively. The demodulated base band signals I and Q are inputted through the band pass filters 136 and 137 to the analog to digital converters 138 and 139, by which they are converted from analog into digital signals to obtain digital demodulated signals I and Q having phases different by $\pi/2$ from each other, respectively.

Figure 14:
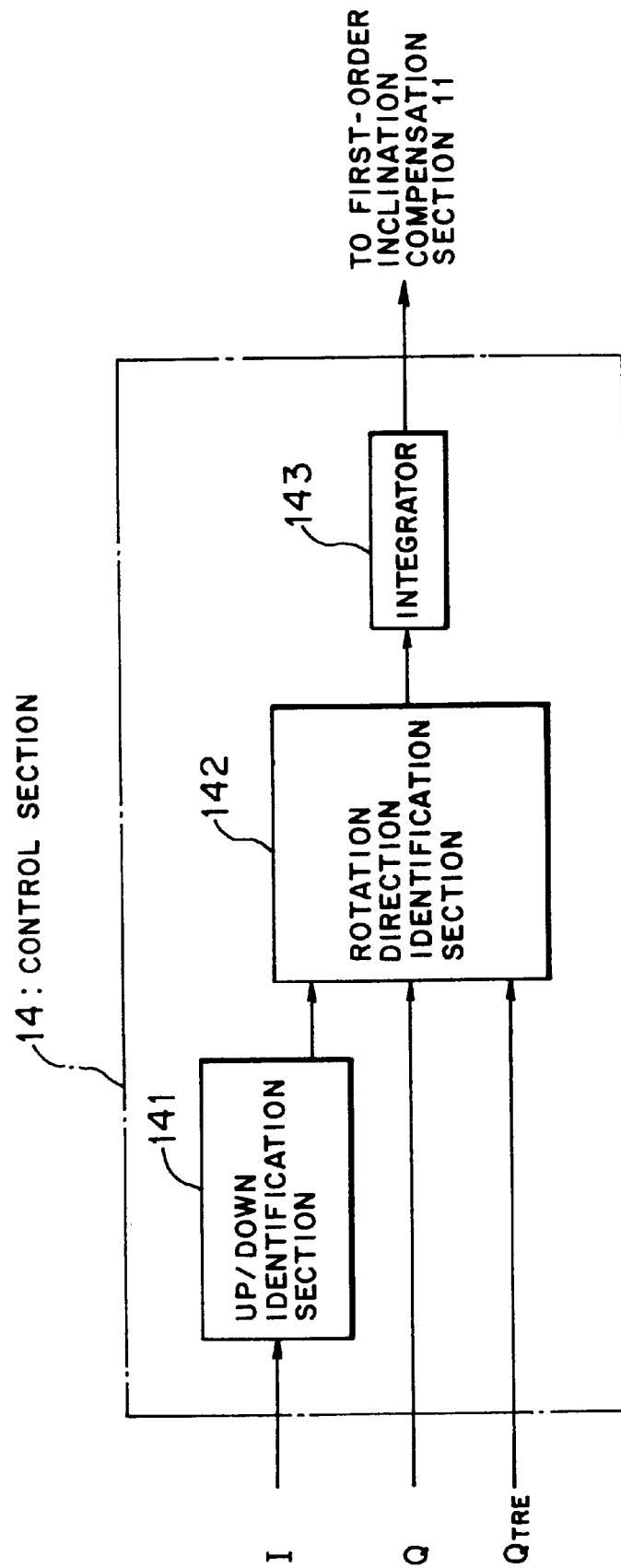
FIG. 14 is a block diagram showing a construction of a control section of the automatic amplitude equalization of FIG. 7.

FIG. 14 shows in block diagram a construction of the control section 14 which detects the first-order inclination distortion of the IF signal from the digital demodulated signals I and Q obtained from the demodulator 13 in such a manner as described above. Referring to FIG. 14, the control section 14 shown includes an up/down identification section 141, a rotation direction identification section 142 and an integrator 143.

The up/down identification section (signal direction discrimination section) 141 discriminates the direction in which one of a pair of digital demodulated signals I and Q obtained from the demodulator 13, that is, the signal I (which may be hereinafter referred to as digital I channel signal I), moves, that is, in which direction, for example, between the upward direction ($\uparrow$) and the downward direction ($\downarrow$) on the rectangular coordinate system I-Q described hereinabove with reference to FIG. 9 the value of the digital demodulated signal I varies.

The rotation direction identification section (error information detection section, correlation calculation section) 142 detects an error voltage (error information) $E=\pm E$, which makes an orthogonal interference component with the digital signal I, from the digital demodulated signal Q (which may be hereinafter referred to as digital Q channel signal Q) obtained similarly from the demodulator 13 and an equalized signal $Q_{TRE}$ obtained by equalization of the digital demodulated signal Q by means of the transversal equalizer 16 (refer to FIG. 7). The rotation direction identification section 142 then detects a positive inclination, a negative inclination or a zero inclination of the first-order inclination distortion of the received signal based on the correlation (refer to FIG. 12) between the error voltage $E=\pm E$ and the direction of movement of the signal I obtained by the up/down identification section 141.

The integrator 143 integrates the detection signal of a positive inclination, a negative inclination or a zero inclination of the first-order inclination distortion obtained by the rotation direction identification section 142 to remove noise components included in the detection signal and outputs a resulted signal as a control signal for the first-order inclination compensation section 11 (refer to FIG. 7).

Consequently, in the control section 14, the direction in which the digital demodulated signal I moves (direction of a variation of the value of the signal) is discriminated by the up/down identification section 141, and the error voltage E of the digital demodulated signal Q is detected by the rotation direction identification section 142. Further, a positive inclination, a negative inclination or a zero inclination of the IF signal is detected from the direction of movement of the digital demodulated signal I and the error voltage E of the digital demodulated signal Q.

The up/down identification section 141 and the rotation direction identification section 142 described above will be described in more detail below with reference to FIGS. 15 to 17.

Referring first to FIG. 15, an internal construction of the up/down identification section 141 is shown. The up/down identification section 141 includes a pair of registers (REG) 141-1 and 141-2, a pair of comparators (C) 141-3 and 141-4, an EX-NOR gate (Exclusive NOR element) 141-6, an AND gate 141-7, and a flip-flop circuit 141-8.

The register 141-1 delays the digital demodulated signal I from the demodulator 13 by a required time, and the register 141-2 further delays the digital demodulated signal I after delayed by the register 141-1 by a time equal to the delay time by the register 141-1. Consequently, data $I_{B0}$, $I_{B1}$ and $I_{B2}$ of the digital demodulated signal I are sampled out in time series by the registers 141-1 and 142-2.

The comparator 141-3 compares the data $I_{B0}$ and the data $I_{B1}$ of the digital demodulated signal I before and after delayed by the register 141-1 while the comparator 141-4 compares the data $I_{B1}$ and the data $I_{B2}$ of the digital demodulated signal I before and after delayed by the register 141-2.

The EX-NOR gate 141-6 exclusive NORs results of comparison by the comparators 141-3 and 141-4. The AND gate (logical AND element) 141-7 logically ANDs a result of calculation from the EX-NOR gate 141-6 and a timing clock pulse which exhibits a high level for each data clock period T. The flip-flop circuit 141-8 outputs a signal corresponding to the direction of the variation of the digital demodulated signal I inputted thereto based on a result of comparison by the comparator 141-4 and another result of comparison by the AND gate 141-7.

In the up/down identification section 141 having the construction described above, data $I_{B0}$, $I_{B1}$ and $I_{B2}$ of the digital demodulated signal I are first sampled out in time series in a data clock period T by the registers 141-1 and 141-2, and then the data $I_{B0}$ and the data $I_{B1}$ are compared with each other by the comparator 141-3. A result of the comparison is outputted as a detection signal C1 from the comparator 141-3. The detection signal C1 represents one of three cases of $I_{BB}>I_{B1}$, $I_{B0}=I_{B1}$, and $I_{B0}<I_{B1}$.

Further, the data $I_{B1}$ from the register 141-1 and the further delayed data $I_{B2}$ from the register 141-2 are compared with each other by the comparator 141-4, and a result of the comparison is outputted as a detection signal C2 from the comparator 141-4. The detection signal C2 represents one of three cases of $I_{B1}>I_{B2}$, $B_1=I_{B2}$, and $I_{B1}<I_{B2}$.

Then, for example, when the detection signal C1 is $C1=I_{B0}>I_{B1}$ and the detection signal C2 is $C2=I_{B1}>I_{B2}$, that is, when the digital demodulated signal I exhibits data which increases in signal level as time passes, it is discriminated that the direction in which the digital demodulated signal I moves is the upward direction. On the contrary when the detection signal C1 is $C1=I_{B0}<I_{B2}$ and the detection signal C2 is $C2=I_{B1}<I_{B2}$, it is discriminated that the direction in which the digital demodulated signal I moves is the downward direction.

Now, if it is defined that C1=1 when the result of comparison by the comparator 141-3 is $I_{B0}>I_{B1}$ and C2=1 when the result of comparison by the comparator 141-4 is $I_{B1}>I_{B2}$, then the truth table of the values C1 to C3 is such as shown in FIG. 16.

In particular, in this instance, from the up/down identification section 141, the value "1" is outputted when the direction in which the digital demodulated signal I moves is the upward direction, but the value "0" is outputted when the direction is the downward direction. It is to be noted that, as seen from FIG. 16, in any other case than when both of the detection signals C1 and C2 are equal to "0" or equal to "1", the direction in which the signal I moves cannot be discriminated at the point of time, and consequently, a result of discrimination in the last cycle (a value prior by 1 bit) is maintained.

While the up/down identification section 141 samples the digital demodulated signal I in the data clock period T, the digital demodulated signal I may otherwise be sampled in a period T/N (N is an integral number equal to or greater than 2) of the data clock signal to discriminate the direction in which the digital demodulated signal I moves. In the alternative just described, the direction in which the digital demodulated signal I moves can be discriminated in a similar manner also where the signal is obtained by demodulation of a signal which has been modulated by such a modulation method as, for example, four-phase PSK (Phase Shift Keying) or multi-value QAM (Quadrature Amplitude Modulation).

Consequently, by whichever modulation method a signal from which the digital demodulated signal I is originated has been modulated, the discrimination described above regarding the digital demodulated signal I can be performed readily.

Figure 17:
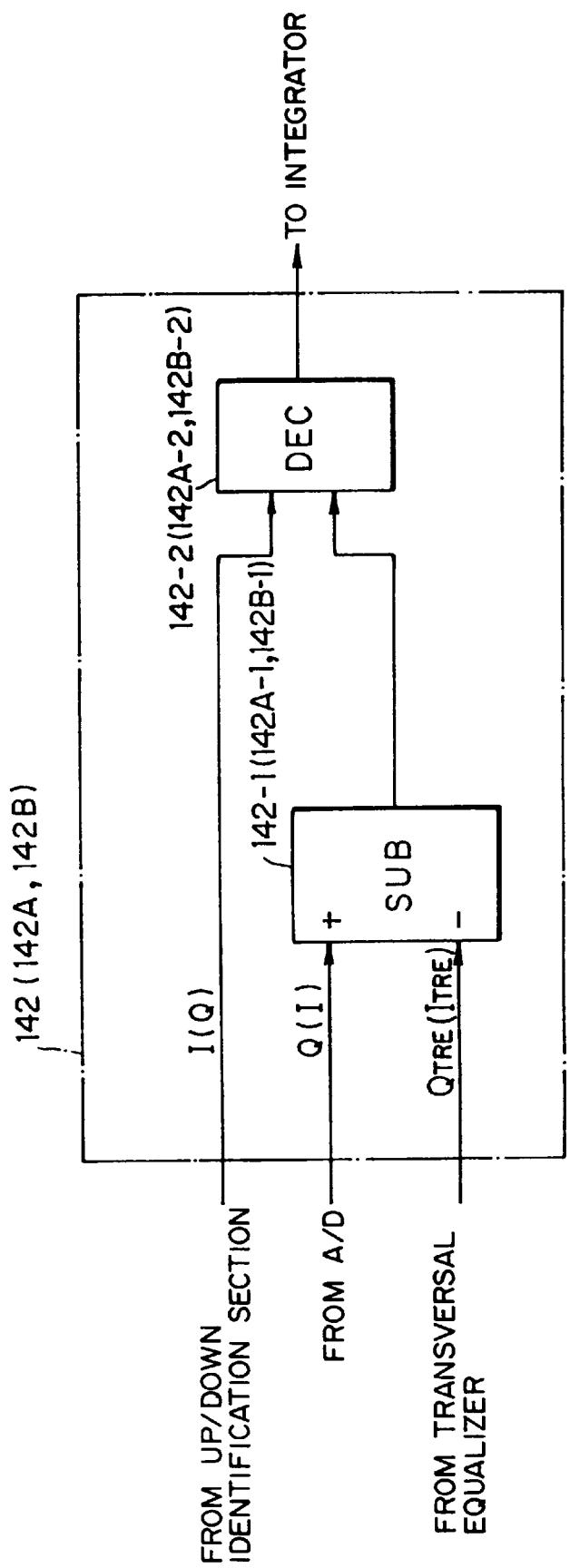
FIG. 17 is a block diagram showing a construction of a rotation direction identification section of the automatic amplitude equalization shown in FIG. 7.

Referring now to FIG. 17, there is shown an internal construction of the rotation direction identification section 142. The rotation direction identification section 142 shown includes a subtractor (SUB) 142-1 and a decoder (DEC) 142-2.

The subtractor (error information detection section) 142-1 detects, from the signal Q of the digital demodulated signals I and Q which is orthogonal to the other signal I, an error voltage E which makes an orthogonal interference component with the signal I. In this instance, the subtractor 142-1 is constructed as a difference calculation section which calculates a difference between the digital demodulated signal Q before equalization by the transversal equalizer 16 (refer to FIG. 13) and the equalized signal QTRE after equalization to detect an error voltage E.

Meanwhile, the decoder (correlation calculation section) 142-2 detects a positive inclination, a negative inclination or a zero inclination of the first-order inclination distortion based on the correlation (refer to FIG. 12) between the error voltage E obtained by the subtractor 142-1 and the direction of movement of the signal I obtained by the up/down identification section 141 described hereinabove with reference to FIGS. 14 and 15. The decoder 142-2 thus outputs a resulted signal as a control signal for the first-order inclination compensation section 11.

Consequently, in the rotation direction identification section 142, the difference between the signal Q and the signal QTRE before and after equalized by the transversal equalizer 16 is calculated by the subtractor 142-1 to detect an error voltage E of the signal Q, and a positive inclination, a negative inclination or a zero inclination of the first-order inclination distortion of the IF signal is detected based on the correlation between the error voltage E of the signal Q and the direction of movement of the signal I identified by the up/down identification section 141 and a signal corresponding to the thus detected inclination is outputted as a control signal for the first-order inclination compensation section 11 from the decoder 142-2.

The control signal is integrated by the integrator 143 (refer to FIG. 14) and outputted to the first-order inclination compensation section 11.

It is to be noted that, while the error voltage E described above can otherwise be detected only from part (an error bit) of data of the digital demodulated signal Q before equalized by the transversal equalizer 16 as will be hereinabove described in connection with the third preferred embodiment of the present invention, in this instance, if an error such as a bit error is produced in the digital demodulated signal Q before equalization, no accurate data of the error voltage E may possibly be obtained.

Therefore, in the present embodiment, data of the digital signal QTRE after equalization by the transversal equalizer 16 is subtracted from data of the digital signal Q before equalization as described above so that data of the error voltage E can be detected with a higher degree of accuracy.

Figure 19:
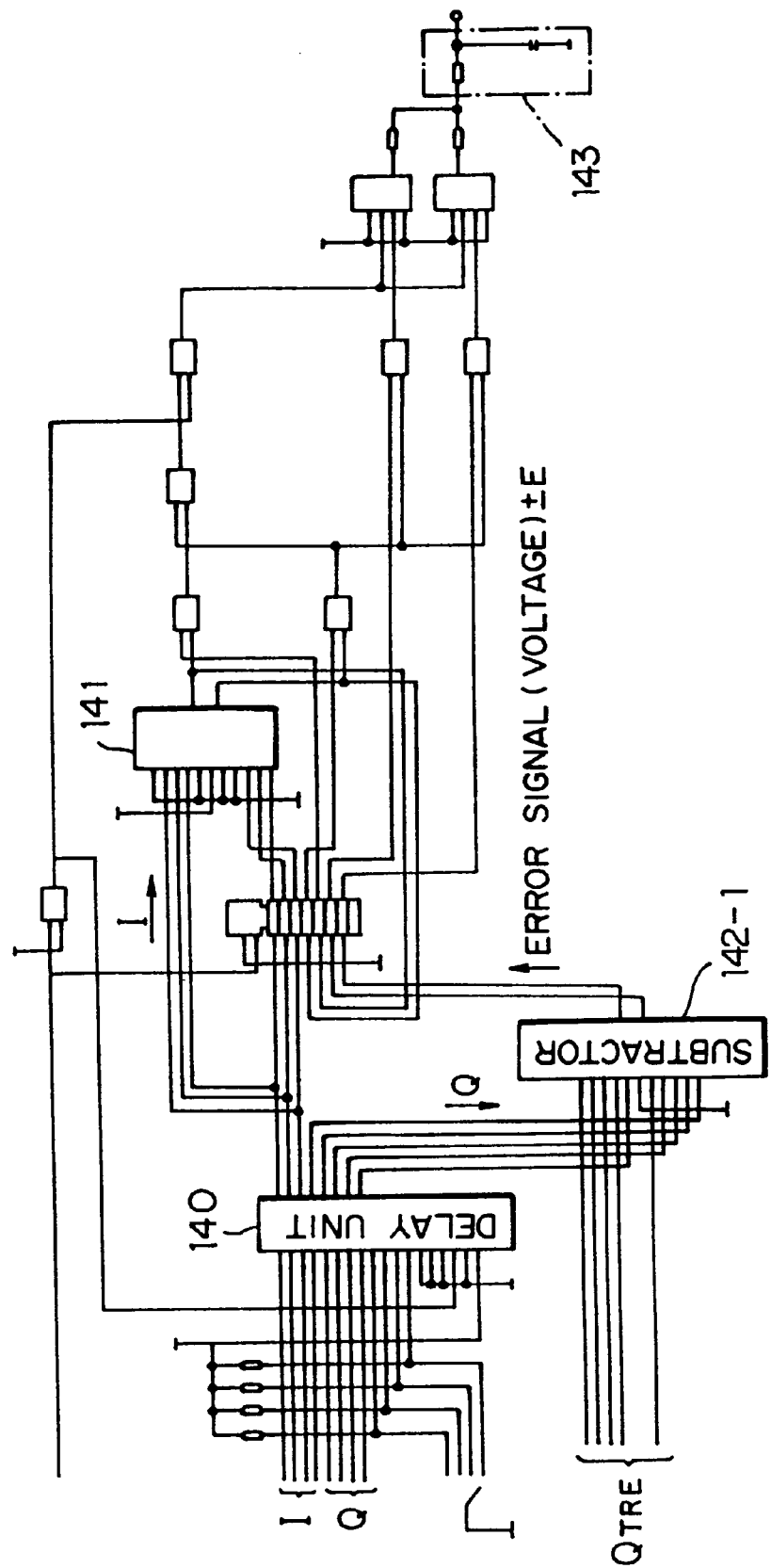
FIG. 19 is a block diagram showing a construction of the control section of the automatic amplitude equalization of FIG. 7 where it is formed from practically used circuits.

FIG. 19 shows an example of the control section 14 described above where it is constructed from practically used circuits, and an outline of operation of the circuit shown will be described below. Referring to FIG. 19, the digital I channel signal I is first outputted by way of a delay unit 140 to the up/down identification section 141, by which the direction in which the digital I channel signal I moves is discriminated. Meanwhile, the digital Q channel signal Q is delayed by the delay unit 140 so that the input timing thereof to the subtractor 142-1 may be the same as that of the equalized signal QTRE after equalized by the transversal equalizer 16.

Thereafter, the difference between the data of the signal Q and the equalized signal QTRE is calculated by the rotation direction identification section 142 to detect an error voltage E of the signal Q. Then, a correlation between the error voltage E of the signal Q and the direction of movement of the digital signal I obtained by the up/down identification section 141 is detected, and a resulted signal, that is, a control signal for the first-order inclination compensation section 11, is outputted to the first-order inclination compensation section 11 by way of the integrator 143.

Figure 18:
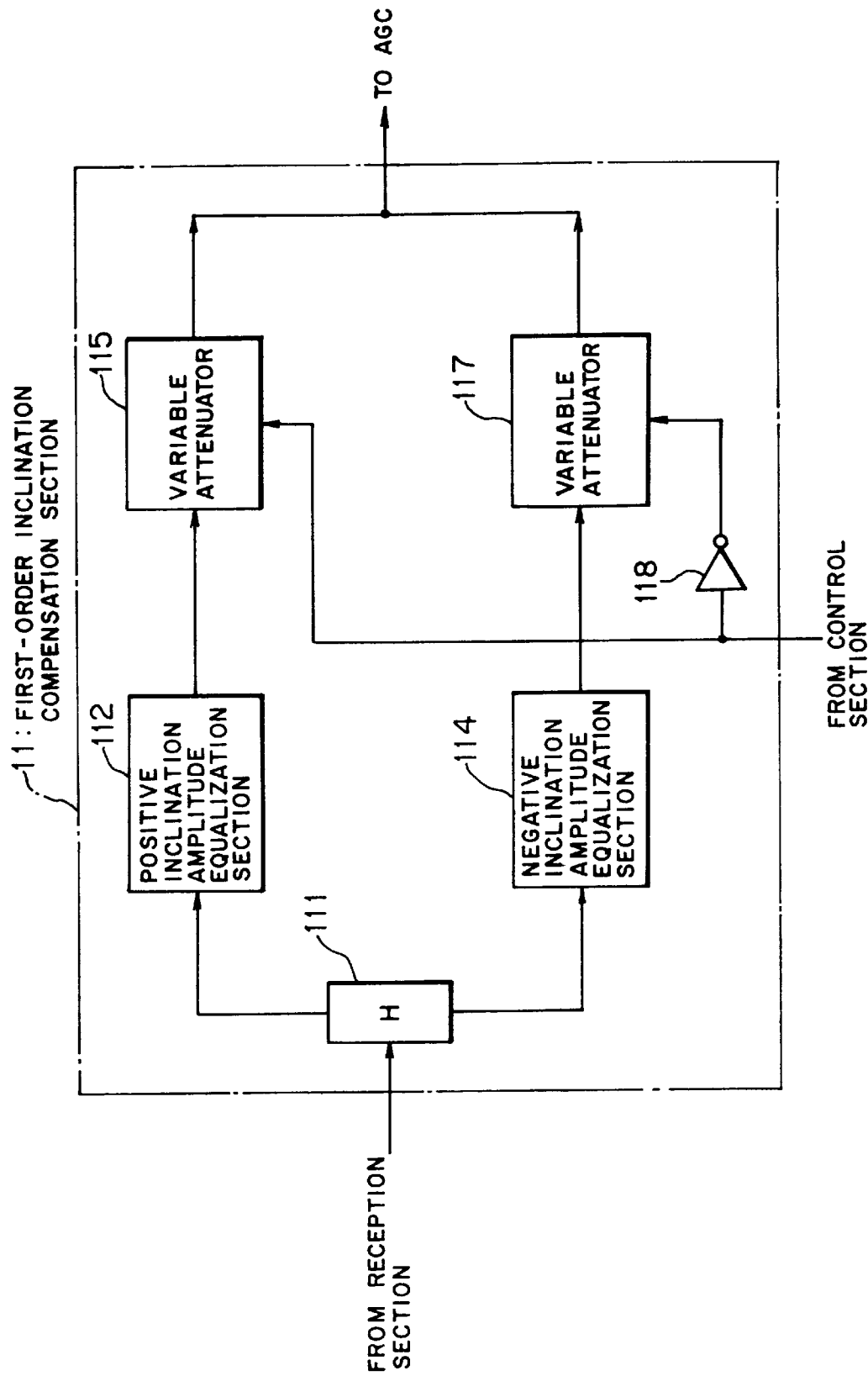
FIG. 18 is a block diagram showing a construction of a first-order inclination compensation section of the automatic amplitude equalization shown in FIG. 7.

FIG. 18 shows in block diagram a construction of the first-order inclination compensation section 11. Referring to FIG. 18, the first-order inclination compensation section 11 shown includes a hybrid circuit (H) 111, a positive inclination amplitude equalization section 112, a negative inclination amplitude equalization section 114, a pair of variable attenuators 115 and 117, and an inversion gate 118.

The hybrid circuit 111 branches the IF signal from the reception section 10 (FIG. 7) into two waves. The positive inclination amplitude equalization section 112 has a first-order inclination amplitude characteristic of a positive inclination and amplitude equalizes (compensates for) the amplitude characteristic of the signal inputted thereto in accordance with the positive inclination amplitude characteristic while the negative inclination amplitude equalization section 114 has a first-order inclination amplitude characteristic of a negative inclination and amplitude equalizes the amplitude characteristic of the signal inputted thereto in accordance with the negative phase amplitude characteristic.

The variable attenuators 115 and 117 adjust the attenuation amounts of the output signals of the positive inclination amplitude equalization section 112 and the negative inclination amplitude equalization section 114, respectively. The inversion gate 118 inverts the polarity of the control signal from the negative inclination amplitude equalization section 114 obtained based on the correlation between the direction in which the digital modulated signal I moves and the error voltage E of the digital demodulated signal Q as described above.

More particularly, the positive inclination amplitude equalization section 112 and the negative inclination amplitude equalization section 114 can be constructed making use of portions of positive and negative inclination secondary characteristics of, for example, a notch filter, respectively. Meanwhile, the variable attenuators 115 and 117 can each be constructed, for example, using a variable resistor.

In the first-order inclination compensation section 11 having the construction described above, the control signal outputted from the control section 14 in accordance with the characteristic (a positive inclination, a negative inclination or a zero inclination) of the first-order inclination distortion of the IF signal is inputted to the variable attenuators 115 and 117, by which the output levels of the signal having undergone amplitude equalization of a positive inclination by the positive inclination amplitude equalization section 112 and another signal having undergone amplitude equalization of the negative inclination by the negative inclination amplitude equalization section 114 are adjusted, whereafter they are combined into a single wave.

As a result, the positive inclination and the negative inclination of the first-order inclination distortion of the input signal are cancelled by each other to compensate for the first-order inclination distortion. It is to be noted that the inversion gate 118 inverts the polarity of the control signal from the control section 14 and outputs the control signal of the inverted polarity to the variable attenuator 117.

The first-order inclination compensation section 11 may alternatively be constructed such that, as hereinafter described in connection with the thirteenth embodiment of the present invention, a zero inclination amplitude equalization section (which can be constructed using, for example, a coaxial cable or a delay line which has a flat passing characteristic such as a microstrip line) is provided in parallel to the positive inclination amplitude equalization section 112 and the negative inclination amplitude equalization section 114 and a variable attenuator is provided on the output side of the zero inclination amplitude equalization section.

In the automatic amplitude equalizer of the first embodiment of the present invention described above, the up/down identification section 141 in the control section 14 discriminates the direction in which the digital I channel signal I moves, and the subtractor 142-1 of the rotation direction identification section 142 in the control section 14 detects the error voltage E of the digital Q channel signal Q. Then, the characteristic (a positive inclination, a negative inclination or a zero inclination) of the first-order inclination distortion of the input signal is detected based on the correlation between the direction of movement of the signal I and the error voltage E of the signal Q, and a detection signal of the characteristic is outputted as a control signal for the first-order inclination compensation section 11. Consequently, the circuitry of the detection system (control section 14) for detecting a first-order inclination distortion of an input signal can be constructed as digital circuitry. Consequently, the automatic amplitude equalizer is advantageous in that it can be constructed with a remarkably reduced circuit scale and at a remarkably reduced cost and also the compensation capacity thereof is improved very much.

Further, as described hereinabove with reference to FIG. 15, in the up/down identification section 141, the signal I is sampled in the data clock period T by the registers 141-1 and 141-2, and the data $I_{B0}$, $I_{B1}$ and $I_{B2}$ obtained by the sampling are compared with each other by the comparators 141-3 and 141-4 to discriminate the direction in which the signal I moves. Consequently, the circuitry of the up/down identification section 141 can be formed readily as digital circuitry. Accordingly, the circuit scale and the cost can be reduced remarkably, and the direction in which the digital demodulated signal I moves can be discriminated with a higher degree of accuracy.

Further, since the up/down identification section 141 can discriminate the direction of movement of the signal I also by sampling the digital demodulated signal I in a period T/N which is equal to 1/N the data clock period T, by whichever modulation method (for example, QPSK) a signal from which the digital demodulated signal I is originated is modulated, the direction in which the digital demodulated signal I moves can be discriminated. Consequently, the automatic amplitude equalizer is improved very much in universal applicability.

Further, with the automatic amplitude equalizer of the present embodiment, since the first-order inclination distortion of the IF signal can be compensated for at the stage preceding to the demodulator 13 by the simple construction wherein the first-order inclination compensation section 11 is provided at the preceding stage to the demodulator 13, the first-order inclination distortion of the input signal can be compensated for with certainty while restricting the circuit scale of the automatic amplitude equalizer to its minimum necessary level.

It is to be noted that, while, in the present embodiment, the direction of movement of a signal is discriminated from the digital demodulated signal I and an error voltage (error information) E is detected from the digital demodulated signal Q, even if the direction of movement of a signal is discriminated from the digital demodulated signal Q and an error voltage E is detected from the digital demodulated signal I conversely to that described above, the first-order inclination distortion of the input signal can be detected similarly.

c. Second Embodiment

Figure 20:
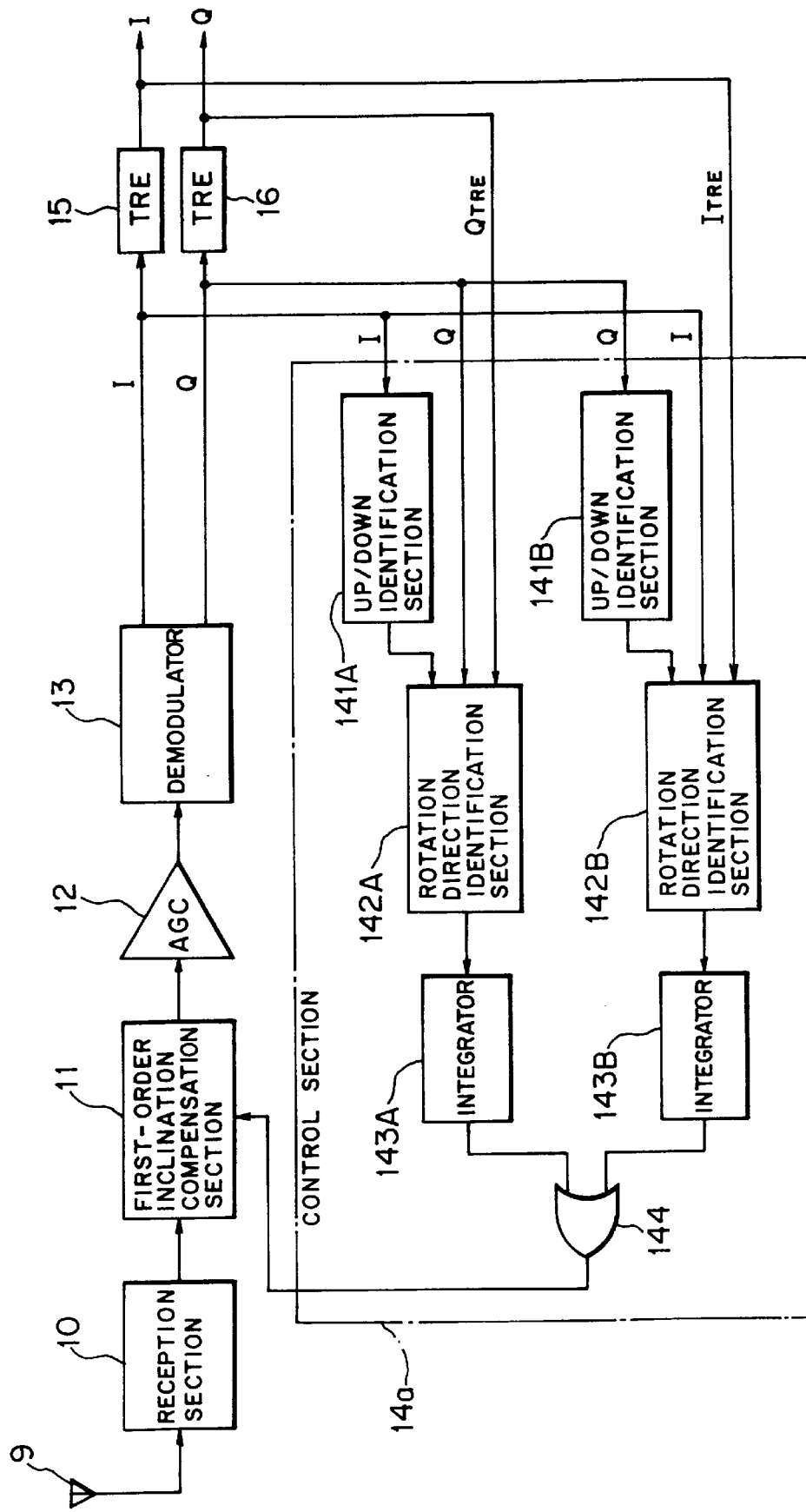
FIG. 20 is a block diagram of another automatic amplitude equalizer showing a second preferred embodiment of the present invention.

FIG. 20 shows in block diagram a construction of an automatic amplitude equalizer according to a second preferred embodiment of the present invention. Referring to FIG. 20, the automatic amplitude equalizer shown includes an antenna 9, a reception section 10, an automatic gain control section (AGC) 12, a demodulator 13, and a pair of transversal equalizers 15 and 16 all similar to those described hereinabove with reference to FIG. 7. The automatic amplitude equalizer further includes a control section 14a. Also in the present automatic amplitude equalizer, the first-order inclination compensation section 11 is provided at the preceding stage to the demodulator 13 similarly as in the first embodiment described above.

Similarly to the control section 14 described hereinabove in connection with the first embodiment, the control section 14a detects a characteristic (a positive inclination, a negative inclination or a zero inclination) of a first-order inclination distortion of an IF signal (input signal) obtained from the demodulator 13 from digital demodulated signals I and Q of the IF signal and equalized signals $I_{TRE}$ and $Q_{TRE}$ obtained by processing the digital demodulated signals I and Q by means of the transversal equalizers 15 and 16, respectively, and outputs a control signal for the first-order inclination compensation section 11. In this instance, the control section 14a detects the direction of movement of the signal and the error voltage (error information) E from each of the digital demodulated signals I and Q.

In particular, the control section 14a discriminates the direction in which one of the digital demodulated signals I and Q, that is, the signal I, moves (the direction of variation of the value of the signal I), detects error information E from the other digital demodulated signal Q orthogonal to the signal I, and obtains a detection signal (first correlation signal) corresponding to a positive inclination, a negative inclination or a zero inclination of the first-order inclination distortion of the input signal based on the correlation between the error information E and the direction of movement of the signal I. Further, the control section 14a discriminates the direction in which the other signal Q moves, detects error information E from the signal I orthogonal to the signal Q, and obtains a detection signal (second correlation signal) corresponding to a positive inclination, a negative inclination or a zero inclination of the first-order inclination distortion similarly. Then, the control section 14a produces and outputs a control signal for the first-order inclination compensation section 11 from the two detection signals.

To this end, the control section 14a includes, as shown in FIG. 20, a pair of up/down identification sections 141A and 141B, a pair of rotation direction identification sections 142A and 142B and a pair of integrators 143A and 143B which are similar to the up/down identification section 141, the rotation direction identification section 142 and the integrator 143 shown in FIG. 14, respectively, and further includes an OR gate (logical OR element) 144.

The up/down identification section (first signal direction discrimination section) 141A discriminates the direction in which one of the digital demodulated signals I and Q obtained by the demodulator 13, that is, the signal I, moves. The rotation direction identification section 142A detects, from the other signal Q of the digital modulated signals I and Q which is orthogonal to the signal I, error information E which makes an orthogonal interference component with the signal I, and outputs a first correlation signal based on the error information E of the signal Q and the direction of movement of the signal I obtained by the up/down identification section 141A. The integrator 143A integrates the first correlation signal obtained by the rotation direction identification section 142A.

In contrast, the up/down identification section (second signal direction discrimination section) 141B discriminates the direction in which the other one of the digital demodulated signals I and Q obtained by the demodulator 13, that is, the signal Q, moves. The rotation direction identification section 142B detects, from the signal I of the digital modulated signals I and Q which is orthogonal to the signal Q, error information E which makes an orthogonal interference component with the signal Q, and outputs a second correlation signal based on the error information E of the signal I and the direction of movement of the signal Q obtained by the up/down identification section 141B. The integrator 143B integrates the second correlation signal obtained by the rotation direction identification section 142B.

The OR gate (control signal production section). 144 logically ANDs the outputs of the integrators 143A and 143B to produce and output a control signal for the first-order inclination compensation section 11.

It is to be noted that the rotation direction identification sections 142A and 142B are individually similar to the rotation direction identification section 142 shown in FIG. 14 and are each constructed, as shown in FIG. 17, including a pair of subtractors (SUB) 142A-1 and 142B-1 and a pair of decoders (DEC) 142A-2 and 142B-2.

Also with the automatic amplitude equalizer shown in FIG. 20 having the construction described above, the first-order inclination characteristic of the first-order inclination compensation section 11 is controlled in accordance with a control signal from the control section 14a to compensate for the first-order inclination distortion of the IF signal. This operation will be described in detail below.

First, in the control section 14a, similarly as in the control section 14 shown in FIG. 14, the direction in which the signal I between the digital demodulated signals I and Q moves is discriminated by the up/down identification section 141A by sampling the signal I in a data clock period T, and error information E which makes an orthogonal interference component with the signal I is detected by the rotation direction identification section 142A from the other signal Q of the digital demodulated signals I and Q which is orthogonal to the signal I.

In particular, in the rotation direction identification section 142A, the difference between the digital demodulated signal Q and the equalized signal $Q_{TRE}$ obtained by equalization of the digital demodulated signal Q by means of the transversal equalizer 16 is calculated by the subtractor 142A-1 to detect error information E of the digital demodulated signal Q.

Then, based on the correlation between the error information E of the signal Q and the direction of movement of the signal I, a positive inclination, a negative inclination or a zero inclination of the first-order inclination distortion of the input signal is detected, and a first correlation signal is outputted from the decoder 142A-2 based on the thus detected positive inclination, negative inclination or zero inclination of the first-order inclination distortion.

Meanwhile, in this instance, in the up/down identification section 141B, the other digital demodulated signal Q of the digital demodulated signals I and Q is sampled in the data clock period T to discriminate the direction in which the signal Q moves, and error information E which makes an orthogonal interference component with the signal Q is detected by the rotation direction identification section 142B from the digital demodulated signal I orthogonal to the digital demodulated signal Q.

In particular, in the rotation direction identification section 142B, the difference between the digital demodulated signal I and the equalized signal $Q_{TRE}$ obtained by equalization of the digital demodulated signal I by means of the transversal equalizer 15 is calculated by the subtractor 142B-1 to detect error information E of the digital demodulated signal I.

Then, based on the correlation between the error information E of the signal I and the direction of movement of the signal Q, a positive inclination, a negative inclination or a zero inclination of the first-order inclination distortion of the input signal is detected, and a second correlation signal is outputted from the decoder 142B-2 based on the thus detected positive inclination, negative inclination or zero inclination of the first-order inclination distortion.

Thereafter, the correlation signals obtained in such a manner as described above are integrated by the integrators 143A and 143B, respectively, and then logically ORed by the OR gate 144 to obtain a control signal for the first-order inclination compensation section 11 which corresponds to the positive inclination, negative inclination or zero inclination of the first-order inclination distortion of the input signal. The control signal for the first-order inclination compensation section 11 thus obtained is outputted to the first-order inclination compensation section 11.

Consequently, by the first-order inclination compensation section 11, the first-order inclination distortion of the IF signal is compensated for in accordance with the control signal at the preceding stage to the demodulator 13 in a similar manner as in the first embodiment.

In this manner, in the automatic amplitude equalizer according to the second preferred embodiment of the present invention, since the characteristic (a positive inclination, a negative inclination or a zero inclination) of the first-order inclination distortion of the IF signal is detected not only based on the correlation between the direction in which the signal I moves and the error information E of the signal Q but also based on the correlation between the direction in which the signal Q moves and the error information E of the signal I, the sensitivity and the accuracy in detection of a control signal for the first-order inclination compensation section 11 can be improved very much. Consequently, similar effects or advantages to those of the automatic amplitude equalizer of the first embodiment are achieved. Besides, also the performance of the automatic amplitude equalizer exhibits a great degree of improvement.

It is to be noted that, also in the automatic amplitude equalizer of the present embodiment, similarly as in the automatic amplitude equalizer of the first embodiment, the digital demodulated signal I may alternatively be sampled by the up/down identification section 141A in a period TIN (which is an integral number equal to or greater than 2) which is equal to 1/N the data clock period T while the digital demodulated signal Q is sampled by the up/down identification section 141B in the period TIN which is equal to 1/N the data clock period T to discriminate the directions of movement of the digital demodulates signals I and Q, respectively.

d. Third Embodiment

Figure 21:
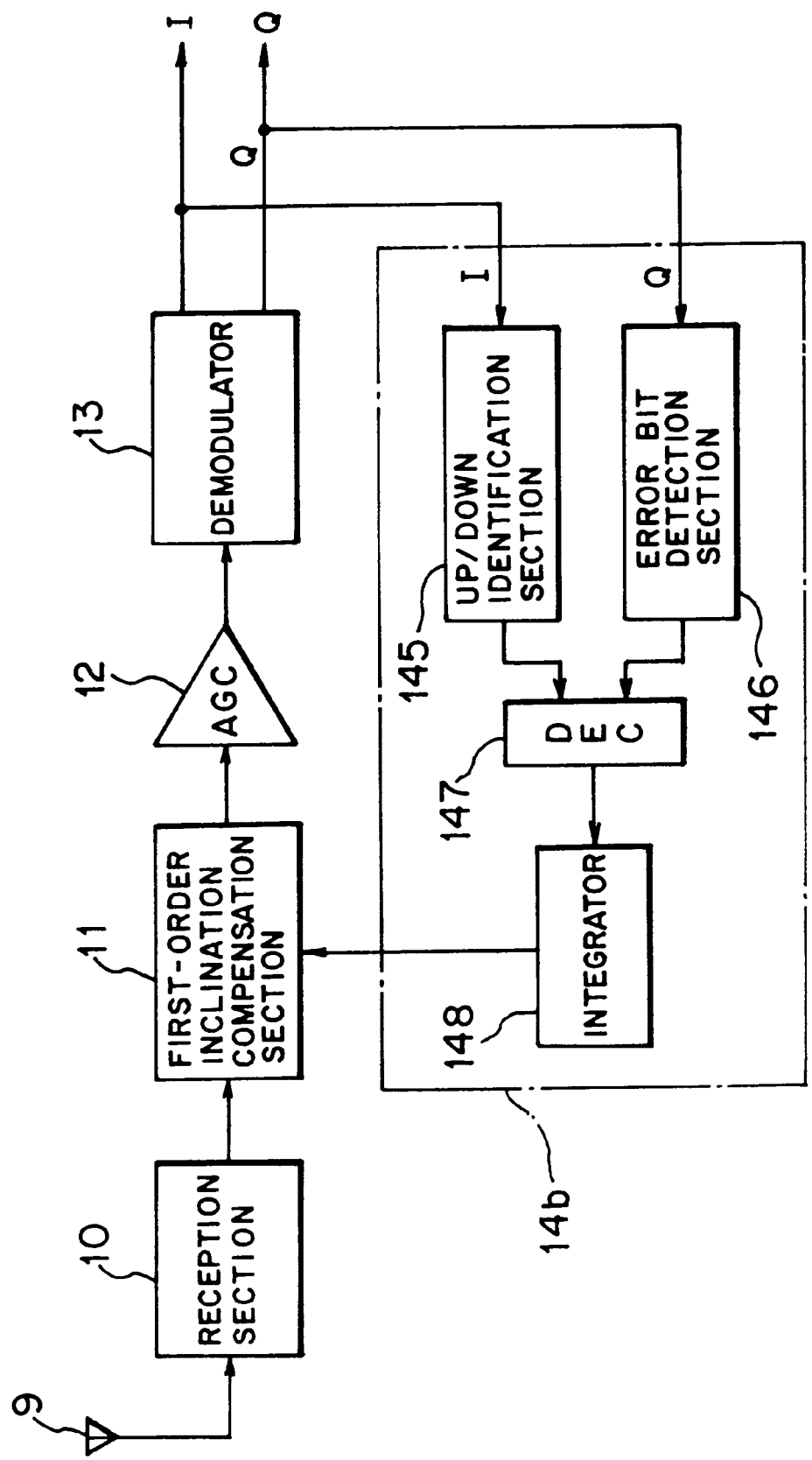
FIG. 21 is a block diagram of a further automatic amplitude equalizer showing a third preferred embodiment of the present invention.

FIG. 21 shows in block diagram a construction of an automatic amplitude equalizer according to a third preferred embodiment of the present invention. Referring to FIG. 21, also the automatic amplitude equalizer shown includes an antenna 9, a reception section 10, a first-order inclination compensation section 11, an automatic gain control section (AGC) 12 and a demodulator 13 which are all similar to those of the automatic amplitude equalizer described hereinabove with reference to FIG. 7. The automatic amplitude equalizer further includes a control section 14b.

Here, the control section 14b detects a first-order inclination distortion of an input signal only from digital demodulation signals I and Q obtained from the demodulator 13 (in the first and second embodiments, a first-order inclination distortion of an input signal is detected from digital modulated signals I and Q and an equalized signal $Q_{TRE}$ ($I_{TRE}$)) to produce and output a control signal for the first-order inclination compensation section 11. The control section 14b includes, as shown in FIG. 21, an up/down identification section 145, an error bit detection section 146, a decoder (DEC) 147 and an integrator 148.

The up/down identification section 145 is similar to the up/down identification section 141 (refer to FIGS. 14 and 15) of the automatic amplitude equalizer of the first embodiment, and samples one of the digital signals I and Q obtained by the demodulator 13, that is, the signal I, in a data clock period T and compares such sample data of the digital signal I with each other to discriminate the direction in which the signal I moves. The error bit detection section (error information detection section) 146 detects an error voltage (error information) $E=\pm E$ of the signal Q, which is an orthogonal interference component of the signal I, only from part (an error bit) of data of the digital demodulated signal Q.

The decoder 147 produces a control signal for controlling the first-order inclination amplitude characteristic of a positive inclination or a negative inclination of the first-order inclination compensation section 11 based on the correlation between a result of discrimination obtained by the up/down identification section 145 and error information E obtained by the error bit detection section 146. The integrator 148 integrates the control signal obtained by the decoder 147 to average the control signal to remove noise components included in the control signal and outputs a resulted signal to the first-order inclination compensation section 11.

Also in this instance, the up/down identification section 145 may otherwise sample, similarly as in the first embodiment, the digital demodulated signal I in a period T/N (N is an integral number equal to or greater than 2) equal to 1/N the data clock period to discriminate the direction in which the digital demodulated signal I moves.

In the control section 14b constructed in such a manner as described above, the direction in which the digital demodulated signal I moves is discriminated by the up/down identification section 145, and error information E is detected only from part (an error bit) of data of the digital demodulated signal Q by the error bit detection section 146. Then, from the correlation between the direction in which the signal I moves and the error information E of the signal Q, a characteristic (a positive inclination, a negative inclination or a zero inclination) of the first-order inclination distortion of the input signal is detected.

In short, in the automatic amplitude equalizer of the present embodiment, the error information E of the digital demodulated signal Q is detected not by calculating a difference between the digital signal Q obtained by the demodulator 13 and the equalized signal $Q_{TRE}$ obtained by equalization of the digital signal Q by means of the transversal equalizer 16 as described hereinabove in connection with the first embodiment, but only from part (an error bit) of data of the digital demodulated signal Q obtained by the demodulator 13.

Then, the detection signal is converted into a signal corresponding to the characteristic (a positive inclination, a negative inclination or a zero inclination) of the first-order inclination distortion by the decoder 147 to produce a control signal for the first-order inclination compensation section 11, and the control signal is outputted to the first-order inclination compensation section 11 by way of the integrator 148.

Consequently, in the first-order inclination compensation section 11, the attenuation amounts of the variable attenuators 115 and 117 are controlled in accordance with the control signal from the control section 14b, and the outputs of the positive inclination amplitude equalization section 112 and the negative inclination amplitude equalization section 114 are mixed at a required ratio with each other to compensate for the first-order inclination distortion of the IF signal (at the preceding stage to the demodulator 13) as described hereinabove with reference to FIG. 18.

As described above, the automatic amplitude equalizer of the third embodiment of the present invention is advantageous in that, since the error information E of the digital signal Q can be detected only from part (an error bit) of data of the digital demodulated signal Q by the error bit detection section 146, the circuit scale and the cost can be further reduced comparing with those of the automatic amplitude equalizer described hereinabove in connection with the first embodiment.

It is to be noted that, also in this instance, while, in the present embodiment, the direction in which a signal moves is discriminated from the digital demodulated signal I while the error information E is detected from the digital demodulated signal Q, alternatively the direction in which a signal moves may be discriminated from the digital demodulated signal Q while the error information E is detected from the digital demodulated signal I conversely to that described above.

e. Fourth Embodiment

Figure 22:
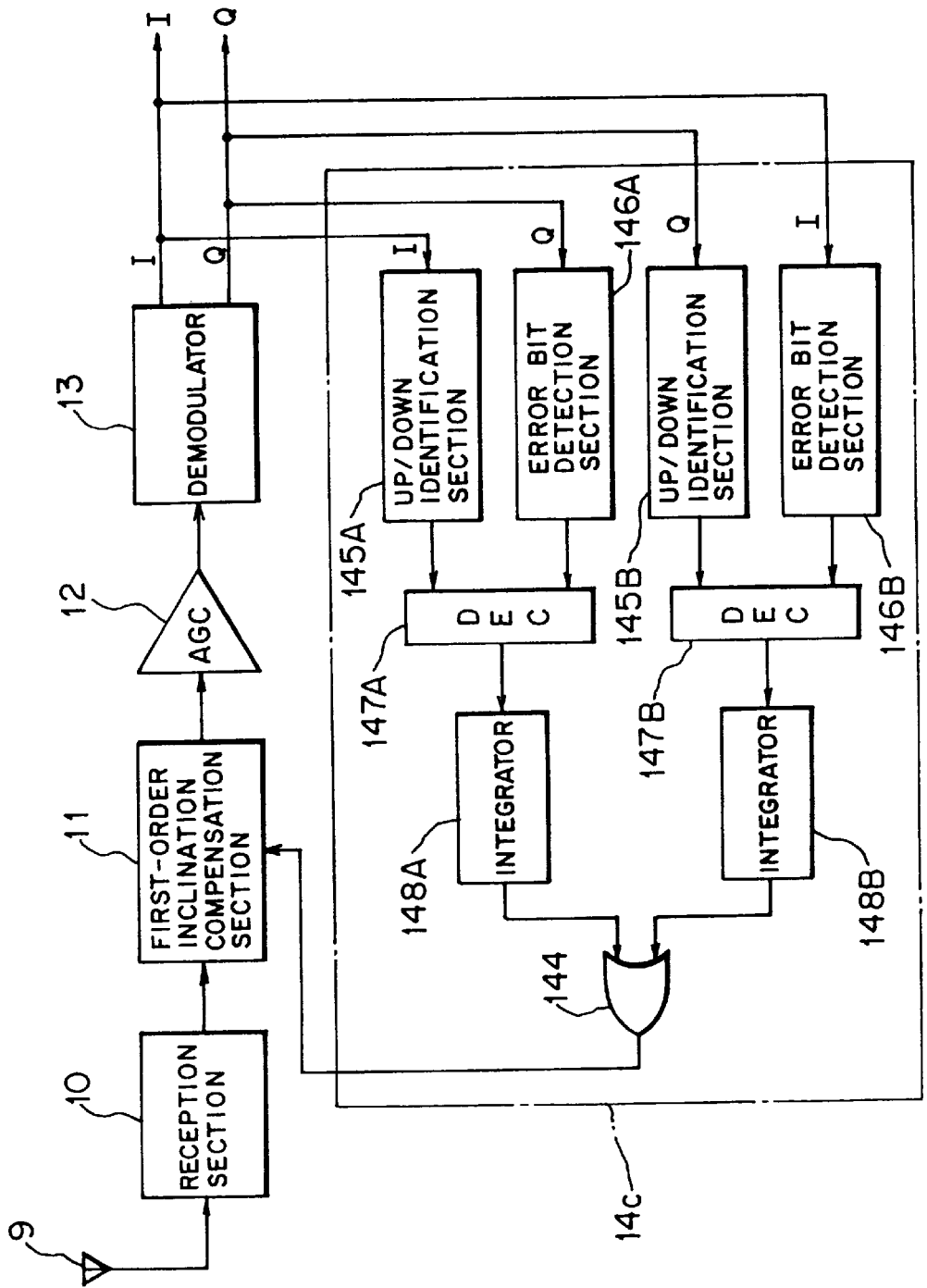
FIG. 22 is a block diagram of a still further automatic amplitude equalizer showing a fourth preferred embodiment of the present invention.

FIG. 22 shows in block diagram a construction of an automatic amplitude equalizer according to a fourth preferred embodiment of the present invention. Referring to FIG. 22, also the automatic amplitude equalizer shown includes an antenna 9, a reception section 10, a first-order inclination compensation section 11, an automatic gain control section (AGC) 12 and a demodulator 13 which are all similar to those of the automatic amplitude equalizer described hereinabove with reference to FIG. 7. The automatic amplitude equalizer further includes a control section 14c.

The control section 14c includes an OR gate 144, a pair of up/down identification sections 145A and 145B, a pair of error bit identification sections 146A and 146B, a pair of decoders (DEC) 147A and 147B, and a pair of integrators 148A and 148B.

Roughly speaking, the control section 14c is a modification to the control section 14a of the automatic amplitude equalizer of the second embodiment described above in that the rotation direction identification section 142A of the control section 14a is formed from the error bit identification section (first error information detection section) 146A and the decoder 147A (first correlation calculation section), and the rotation direction identification section 142B is formed from the error bit identification section (second error information detection section) 146B and the decoder (second correlation calculation section) 147B.

Accordingly, also in this instance, a digital demodulated signal I obtained by the demodulator 13 is sampled in a data clock period T by the up/down identification section 145A and sample data obtained by such sampling are compared with each other by the up/down identification section 145A to discriminate the direction in which the signal I moves, and error information E of a digital demodulated signal Q is detected from only part (an error bit) of data of the digital demodulated signal Q by the decoder 147A.

Then, based on the correlation between the direction of movement of the signal I and the error information E of the signal Q obtained in this manner, a signal corresponding to a characteristic (a positive inclination, a negative inclination or a zero inclination) of the first-order inclination distortion of the input signal is outputted as a first correlation signal from the decoder 147A.

Further, in this instance, the digital demodulated signal Q obtained by the demodulator 13 is sampled in the data clock period T and sample data obtained by such sampling are compared with each other by the up/down identification section 145B to discriminate the direction in which the signal Q moves. Meanwhile, error information E of the digital demodulated signal I is detected from only part (an error bit) of data of the signal I by the error bit identification section 146B.

Then, based on the correlation between the direction of movement of the digital signal Q and the error information E of the digital signal I obtained in this manner, a signal corresponding to a characteristic (a positive inclination, a negative inclination or a zero inclination) of the first-order inclination distortion of the input signal is outputted as a second correlation signal from the decoder 147B.

Thereafter, the correlation signals outputted from the decoders 147A and 147B are integrated by the integrators 148A and 148B, respectively, and are logically ORed by the OR gate 144. Consequently, if a first-order inclination distortion is detected from at least one of the digital demodulated signals I and Q, a control signal for the first-order inclination compensation section 11 is outputted to the first-order inclination compensation section 11.

Thereafter, the first-order inclination distortion of the input signal is compensated for by the first-order inclination compensation section 11 at the preceding stage to the demodulator 13 similarly as in the first embodiment.

As described above, with the automatic amplitude equalizer of the fourth preferred embodiment of the present invention, since the error information E of the digital signal Q (or I) can be detected only from part (an error bit) of data of the digital signal Q (or I), similar effects or advantages to those of the automatic amplitude equalizer described hereinabove in connection with the second embodiment can be achieved. The automatic amplitude equalizer of the present embodiment is advantageous also in that the circuit scale and the cost can be further reduced.

It is to be noted that, also in this instance, the up/down identification section 141A may otherwise sample, similarly as in the second embodiment, the digital demodulated signal I in a period TIN (N is an integral number equal to or greater than 2) equal to 1/N the data clock period while the up/down identification section 141B samples the digital demodulated signal Q in the period T/N equal to 1/N the data clock period.

f. Fifth Embodiment

Figure 23:
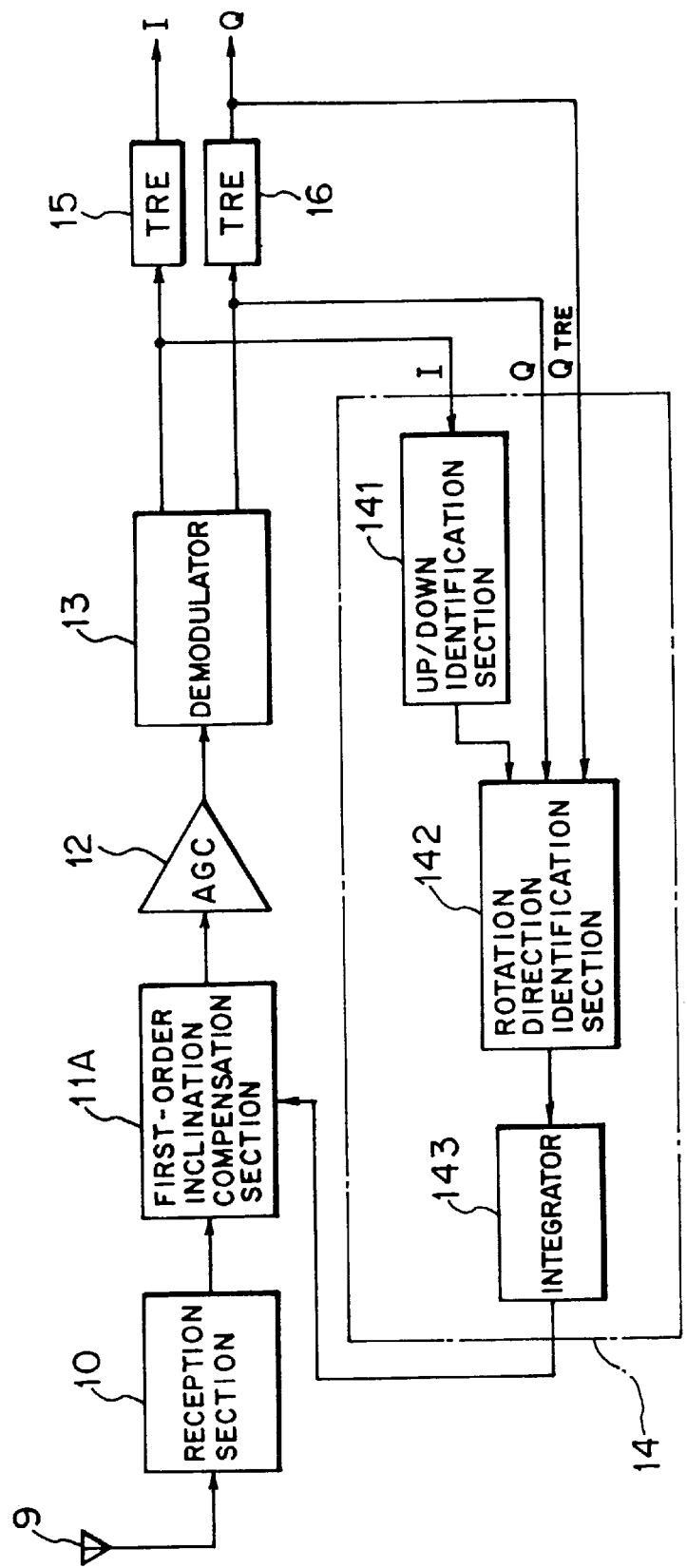
FIG. 23 is a block diagram of a yet further automatic amplitude equalizer showing a fifth preferred embodiment of the present invention.

FIG. 23 shows in block diagram a construction of an automatic amplitude equalizer according to a fifth preferred embodiment of the present invention. Referring to FIG. 23, also the automatic amplitude equalizer shown includes an antenna 9, a reception section 10, an automatic gain control section (AGC) 12, a demodulator 13, a control section 14, and a pair of transversal equalizers 15 and 16. The automatic amplitude equalizer further includes a first-order inclination compensation section 11A.

Figure 24:
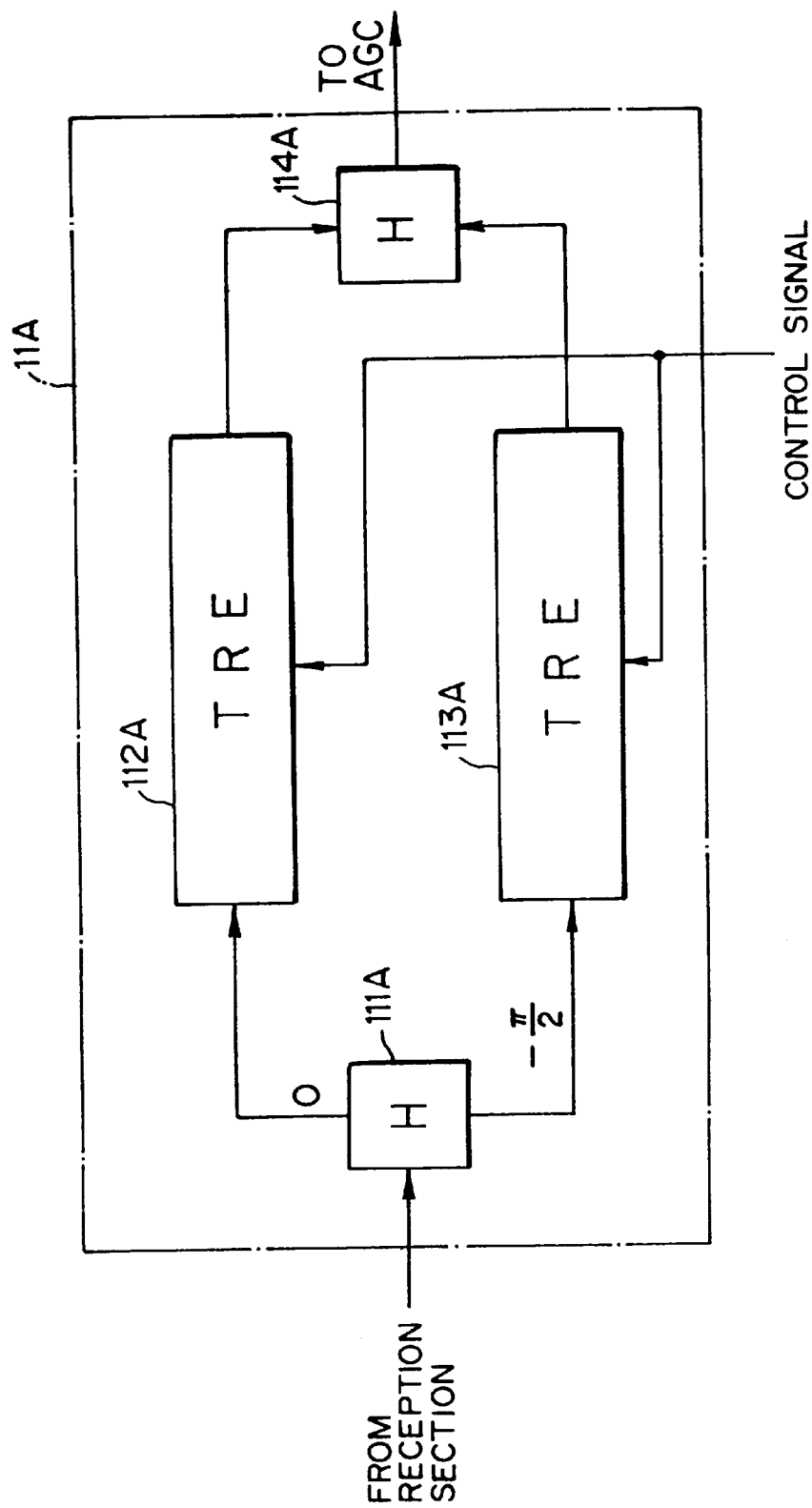
FIG. 24 is a block diagram showing an internal construction of a first-order inclination compensation section of the automatic amplitude equalizer of FIG. 23.

Referring to FIG. 24, the first-order inclination compensation section 11A includes a pair of hybrid circuits (H) 111A and 114A, and a pair of IF transversal equalizers (TRE: hereinafter referred to simply as transversal equalizers) 112A and 113A.

The hybrid circuit 111A is of the orthogonal two-dimensional type and branches an input signal thereto from the reception section 10 into two signals having phases different by π/2 from each other. The transversal equalizers 112A and 113A equalize, in response to a control signal from the control section 14, first-order inclination distortions of the signals obtained by branching the input signal by means of the hybrid circuit 111A individually in the time-domain to compensate for the first-order inclination distortion. The hybrid circuit 114A adjusts the phases of equalized signals from the transversal equalizers 112A and 113A to a same phase and outputs the equalized signals of the same phase.

In short, while the first-order inclination compensation section 11 described hereinabove in connection with the first embodiment compensates for the first-order inclination distortion of the input signal of the IF band in the frequency-domain, the first-order inclination compensation section 11A in the present embodiment compensates for the first-order inclination distortion of the input signal of the IF band in the time-domain.

Figure 25:
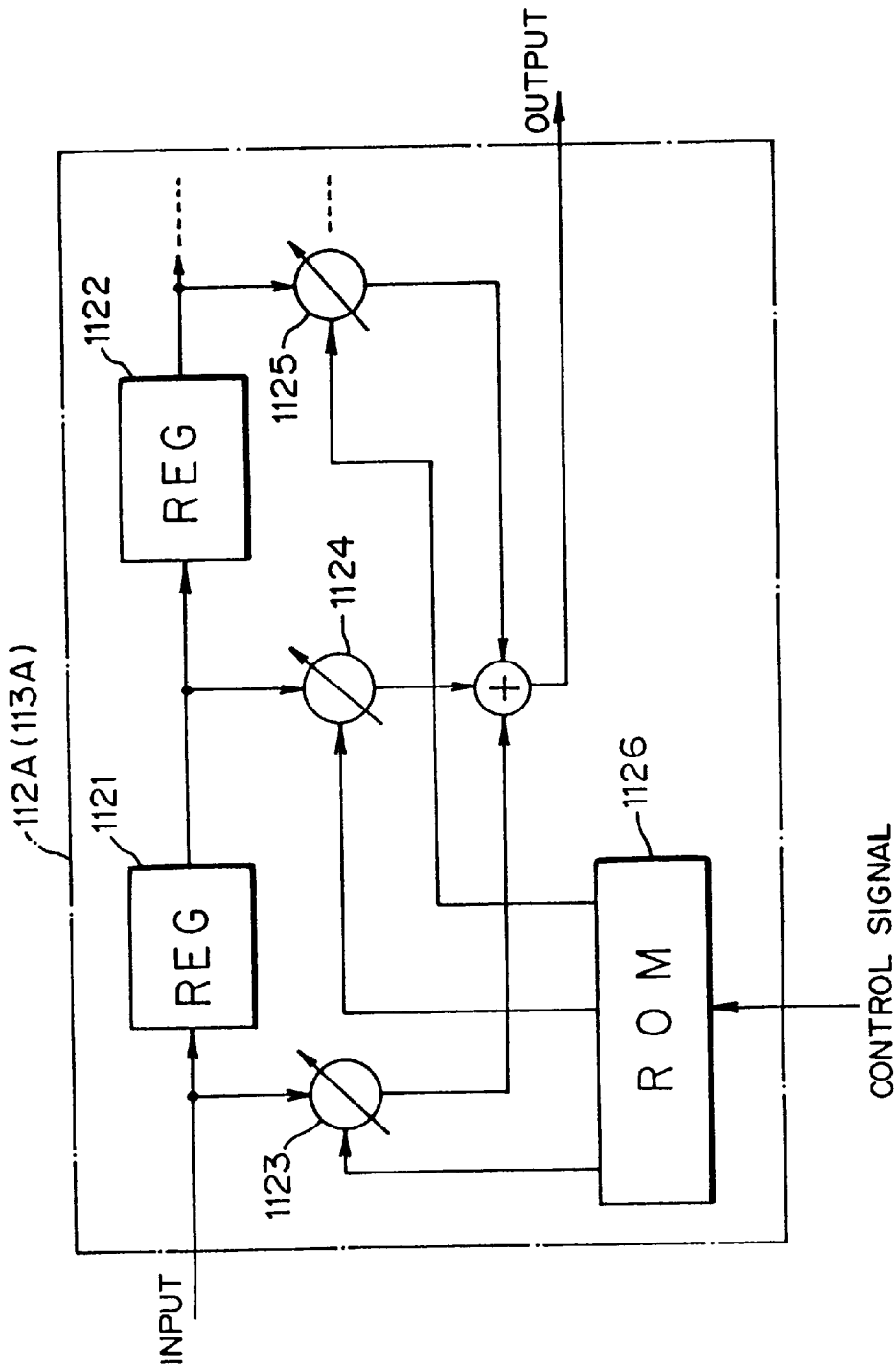
FIG. 25 is a block diagram showing an internal construction of a transversal equalizer of the automatic amplitude equalizer of FIG. 23.

FIG. 25 shows an internal construction of the transversal equalizer 112A (113A) described above. Referring to FIG. 25, the transversal equalizer 112A (113A) shown includes a plurality of registers (REG) 1121, 1122, . . . , a plurality of taps (multipliers) 1123, 1124, 1125, . . . , and a memory (ROM) 1126.

The registers 1121, 1122, . . . store an input signal (one of signals branched by the hybrid circuit 111A) in time series to individually delay output signals to the taps 1124, 1125, . . . by required times. The taps 1123, 1124, 1125, . . . equalize the first-order inclination distortion of the input signal delayed by the registers 1121, 1122, . . . by adjusting individual weighting coefficients (tap coefficients) thereof independently of each other.

The memory 1126 stores weighting data for adjusting the tap coefficients mentioned above. The memory 1126 outputs the weighting data individually to the taps 1123, 1124, 1125, . . . in response to a control signal from the control section 14 so that the tap coefficients of the taps 1123, 1124, 1125, . . . may be adjusted independently of each other.

It is to be noted that also the antenna 9, the reception section 10, the automatic gain control section (AGC) 12, the demodulator 13, the control section 14 and the transversal equalizers 15 and 16 shown in FIG. 23 are all similar to those of the automatic amplitude equalizer described hereinabove with reference to FIG. 7. Also in this instance, the first-order inclination compensation section 11A is provided at the preceding stage to the demodulator 13.

Also in the automatic amplitude equalizer of the present invention having the construction described above, similarly as in the automatic amplitude equalizer of the first embodiment, a positive inclination, a negative inclination or a zero inclination of the first-order inclination distortion of the input signal is detected from the digital demodulated signals I and Q obtained by the demodulator 13 by the control section 14, and a control signal for the first-order inclination compensation section 11A produced in accordance with a result of the detection is outputted to the first-order inclination compensation section 11A.

In particular, also in this instance, the digital demodulated signal I is sampled in a data clock period T by the up/down identification section 141 and sample data obtained by such sampling are compared with each other to discriminate the direction in which the signal I moves, and a difference between the digital demodulated signal Q and the equalized signal QTRE obtained by equalization of the digital demodulated signal by means of the transversal equalizer 16 is calculated by the rotation direction identification section 142 to detect error information E of the digital demodulated signal Q.

Further, based on the correlation between the error information E of the signal Q and the direction of movement of the signal I obtained by the up/down identification section 141, a characteristic (a positive inclination, a negative inclination or a zero inclination) of the first-order inclination distortion of the input signal is detected.

It is to be noted that, also in this instance, if the digital demodulated signal I is sampled in a period T/N (N is an integral number equal to or greater than 2) equal to 1/N the data clock period, even where the digital demodulated signal I is demodulated, for example, by QPSK, the direction in which the digital demodulated signal I moves can be discriminated in a similar manner.

Further, the detection signal obtained by the rotation direction identification section 142 in such a manner as described above is integrated by the integrator 143 and outputted as a control signal for the first-order inclination compensation section 11 to the first-order inclination compensation section 11.

Consequently, in the first-order inclination compensation section 11A, the weighting coefficients are individually outputted from the memory 1126 to the taps 1123, 1124, 1125, . . . in response to the control signal to adjust the tap coefficients of the transversal equalizers 112A and 112B so that the first-order inclination distortion of the input signal (IF signal) is compensated for in the time-domain at the preceding stage to the demodulator 13.

As described above, with the automatic amplitude equalizer of the fifth preferred embodiment of the present invention, since a first-order inclination distortion of an input signal can be compensated for readily also in the time-domain by means of the first-order inclination compensation section 11A constructed using the transversal equalizers 112A and 113A which perform equalization processing in the time-domain, similar effects or advantages to those described hereinabove in connection with the first embodiment can be obtained. In addition, the first-order inclination distortion of the input signal can be compensated for with a higher degree of accuracy.

It is to be noted that, also in the present embodiment, similarly as in the first embodiment, the direction of movement of a signal may be discriminated from the digital demodulated signal Q while the error information E is detected from the digital demodulated signal I.

g. Sixth Embodiment

Figure 26:
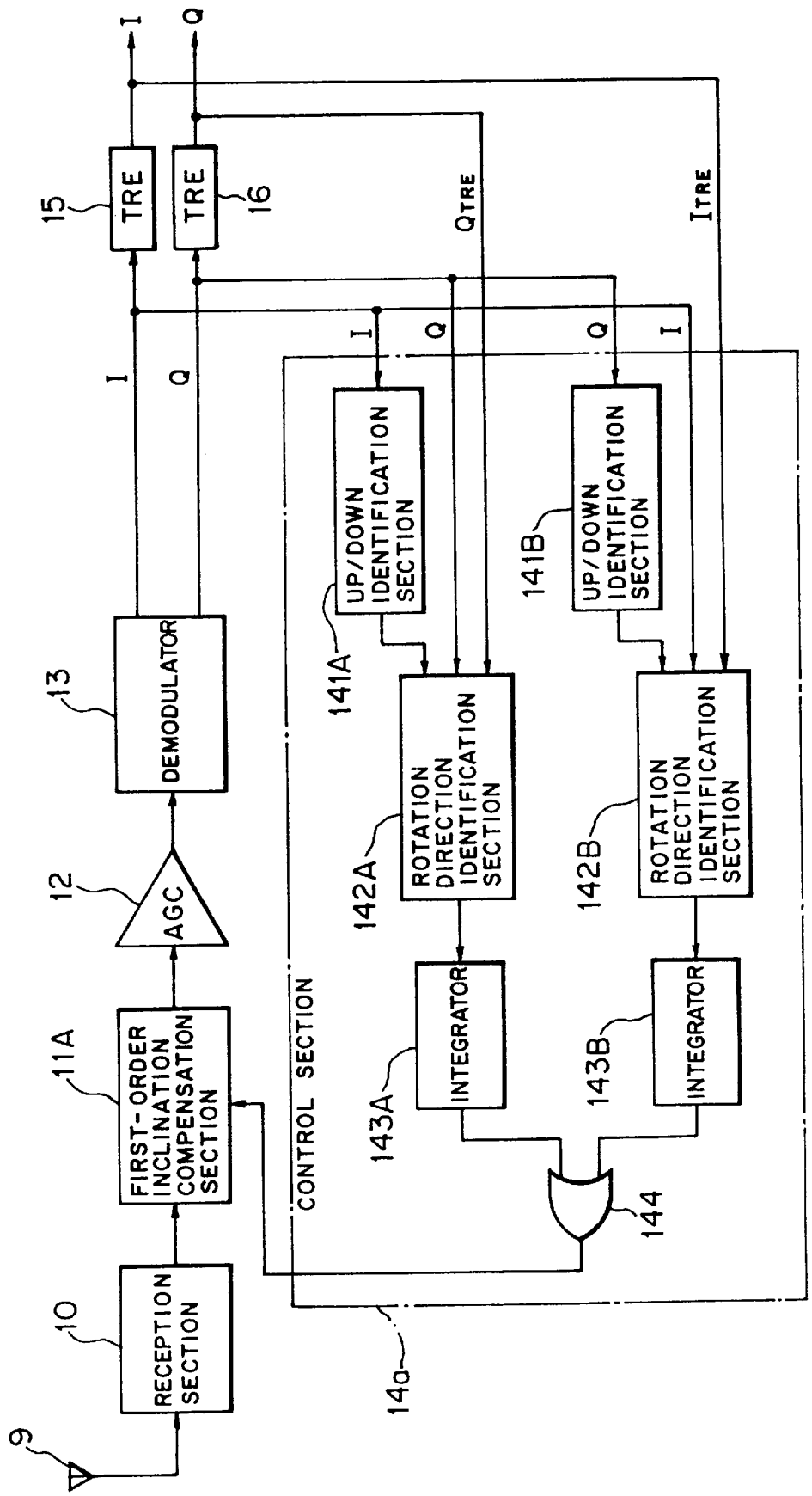
FIG. 26 is a block diagram of a yet further automatic amplitude equalizer showing a sixth preferred embodiment of the present invention.

FIG. 26 shows in block diagram a construction of an automatic amplitude equalizer according to a sixth preferred embodiment of the present invention. Referring to FIG. 26, the automatic amplitude equalizer of the present embodiment is a modification to and includes same components as those of the automatic amplitude equalizer of the second embodiment except a first-order inclination compensation section 11A, which, however, is similar to the first-order inclination compensation section 11A described hereinabove in connection with the fifth embodiment.

In particular, the automatic amplitude equalizer shown in FIG. 26 employs, for the first-order inclination compensation section 11 of the automatic amplitude equalizer described hereinabove in connection with the second embodiment, the first-order inclination compensation section 11A employed in the automatic amplitude equalizer described hereinabove in connection with the fifth embodiment so that a first-order inclination distortion of an input signal can be compensated for also in the time-domain.

Accordingly, also in this instance, in the control section 14a, the digital demodulated signal I obtained by the demodulator 13 is sampled in a data clock period T and sample data thus obtained are compared with each other by the up/down identification section 141A to discriminate the direction in which the signal I moves, and the digital demodulated signal Q is sampled in the data clock period T and sample data thus obtained are compared with each other similarly by the up/down identification section 141B to discriminate the direction in which the signal Q moves.

It is to be noted that, also in this instance, if the digital demodulated signals I and Q are sampled in a period T/N (N is an integral number equal to or greater than 2) equal to 1/N the data clock period, even where the digital demodulated signals I and Q are demodulated, for example, by QPSK, the directions in which the digital demodulated signals I and Q move can be discriminated in a similar manner.

Then, in the rotation direction identification section 142A, a difference between the digital demodulated signal Q and the equalized signal QTRE obtained by equalization of the digital demodulated signal Q by means of the transversal equalizer 16 is calculated to detect error information E of the signal Q. Meanwhile, in the rotation direction identification section 142B, a difference between the digital demodulated signal I and the equalized signal ITRE obtained by equalization of the digital demodulated signal I by means of the transversal equalizer 15 is calculated to detect error information E of the signal I.

Further, in the rotation direction identification section 142A, a characteristic of the first-order inclination distortion of the input signal is detected based on the correlation between the direction of movement of the digital demodulated signal I and the error information E of the digital demodulated signal Q, but in the rotation direction identification section 142B, the first-order inclination distortion of the input signal is detected based on the correlation between the direction of movement of the digital demodulated signal Q and the error information E of the digital demodulated signal I.

Further, the detection signals obtained in such a manner as described above are individually integrated by the integrators 143A and 143B and then logically ORed by the OR gate 144 to obtain a control signal for the first-order inclination compensation section 11A. The control signal for the first-order inclination compensation section 11A is outputted to the transversal equalizers 112A and 113A (refer to FIG. 24).

Then, in each of the transversal equalizers 112A and 113A (refer to FIG. 21), the tap coefficients of the taps 1123, 1124, 1125, . . . are adjusted in response to the control signal from the control section 14a so that the first-order inclination distortion of the input signal is equalized and compensated for as described hereinabove in connection with the fifth embodiment.

As described above, with the automatic amplitude equalizer of the sixth preferred embodiment of the present invention, since the first-order inclination compensation section 11 employed in the automatic amplitude equalizer of the second embodiment is constructed as the first-order inclination compensation section 11A which includes the transversal equalizers 112A and 113A, a first-order inclination distortion of an input signal can be compensated for readily also in the time-domain. Consequently, similar effects or advantages to those of the automatic amplitude equalizer described hereinabove in connection with the second embodiment are achieved. Besides, the first-order inclination distortion of the input signal can be compensated for with a higher degree of accuracy.

h. Seventh Embodiment

Figure 27:
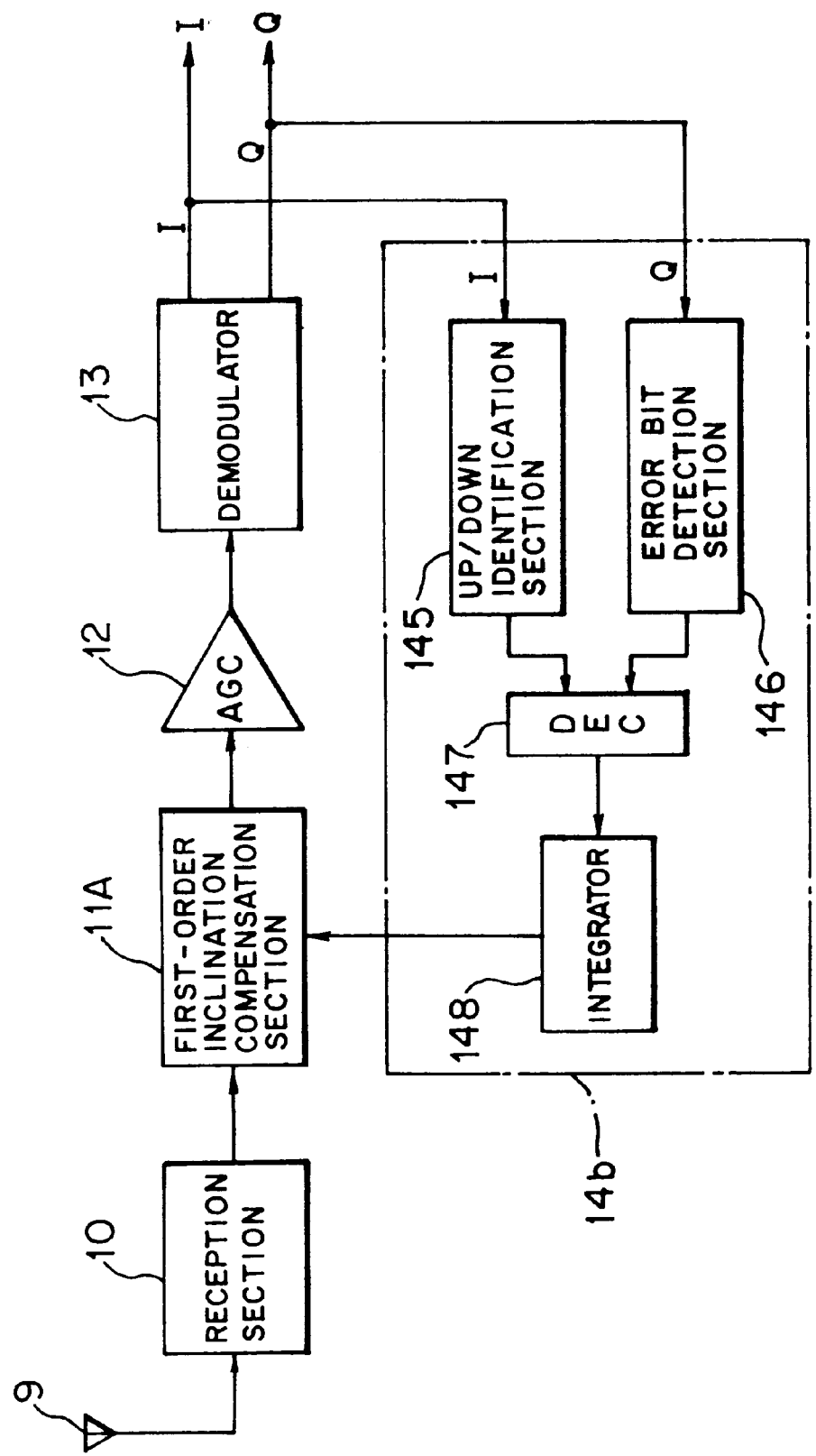
FIG. 27 is a block diagram of a yet further automatic amplitude equalizer showing a seventh preferred embodiment of the present invention.

FIG. 27 shows in block diagram a construction of an automatic amplitude equalizer according to a seventh preferred embodiment of the present invention. Referring to FIG. 27, the automatic amplitude equalizer of the present embodiment is a modification to and includes same components as those of the automatic amplitude equalizer of the third embodiment shown in FIG. 21 except a first-order inclination compensation section 11A, which, however, is similar to the first-order inclination compensation section 11A described hereinabove in connection with the fifth embodiment.

In particular, the automatic amplitude equalizer shown in FIG. 27 employs, in place of the first-order inclination compensation section 11 of the automatic amplitude equalizer described hereinabove in connection with the third embodiment, the first-order inclination compensation section 11A employed in the automatic amplitude equalizer described hereinabove in connection with the fifth embodiment for equalizing a first-order inclination distortion in the time-domain so that a first-order inclination distortion of an input signal (IF signal) can be compensated for also in the time-domain.

Also in the automatic amplitude equalizer of the present embodiment having the construction described above, in the control section 14b, the digital demodulated signal I obtained by the demodulator 13 is sampled in a data clock period T and sample data thus obtained are compared with each other by the up/down identification section 145 to discriminate the direction in which the signal I moves, and error information E of the digital demodulated signal Q is detected only from part (an error bit) of data of the digital demodulated signal Q by the error bit detection section 146.

Then, based on the correlation between the direction of movement of the signal I and the error information E of the signal Q, a characteristic (a positive inclination, a negative inclination or a zero inclination) of the first-order inclination distortion of the input signal is detected. Then, in response to a result of the detection, a control signal for the first-order inclination compensation section 11A is outputted from the decoder (DEC) 14. Further, the control signal is integrated by the integrator 148 and then outputted to the first-order inclination compensation section 11A.

Also in this instance, in the first-order inclination compensation section 11A, the weighting coefficients of the taps 1123, 1124, 1125, . . . of the transversal equalizers 112A and 113A (refer to FIG. 24) are adjusted in response to the control signal from the control section 14b as described hereinabove in connection with the fifth embodiment so that the first-order inclination distortion of the input signal is compensated for in the time-domain.

As described above, with the automatic amplitude equalizer of the seventh preferred embodiment of the present invention, since the first-order inclination compensation section 11 described hereinabove in connection with the third embodiment is constructed as the first-order inclination compensation section 11A which includes the transversal equalizers 112A and 113A, the first-order inclination distortion of the input signal can be compensated for simply also in the time-domain.

It is to be noted that, also in the present embodiment, if the digital demodulated signal I is sampled in a period T/N (N is an integral number equal to or greater than 2) equal to 1/N the data clock period by means of the up/down identification section 145A, then even where the digital demodulated signal I is demodulated, for example, by QPSK, the direction in which the digital demodulated signal I moves can be discriminated in a similar manner.

i. Eighth Embodiment

Figure 28:
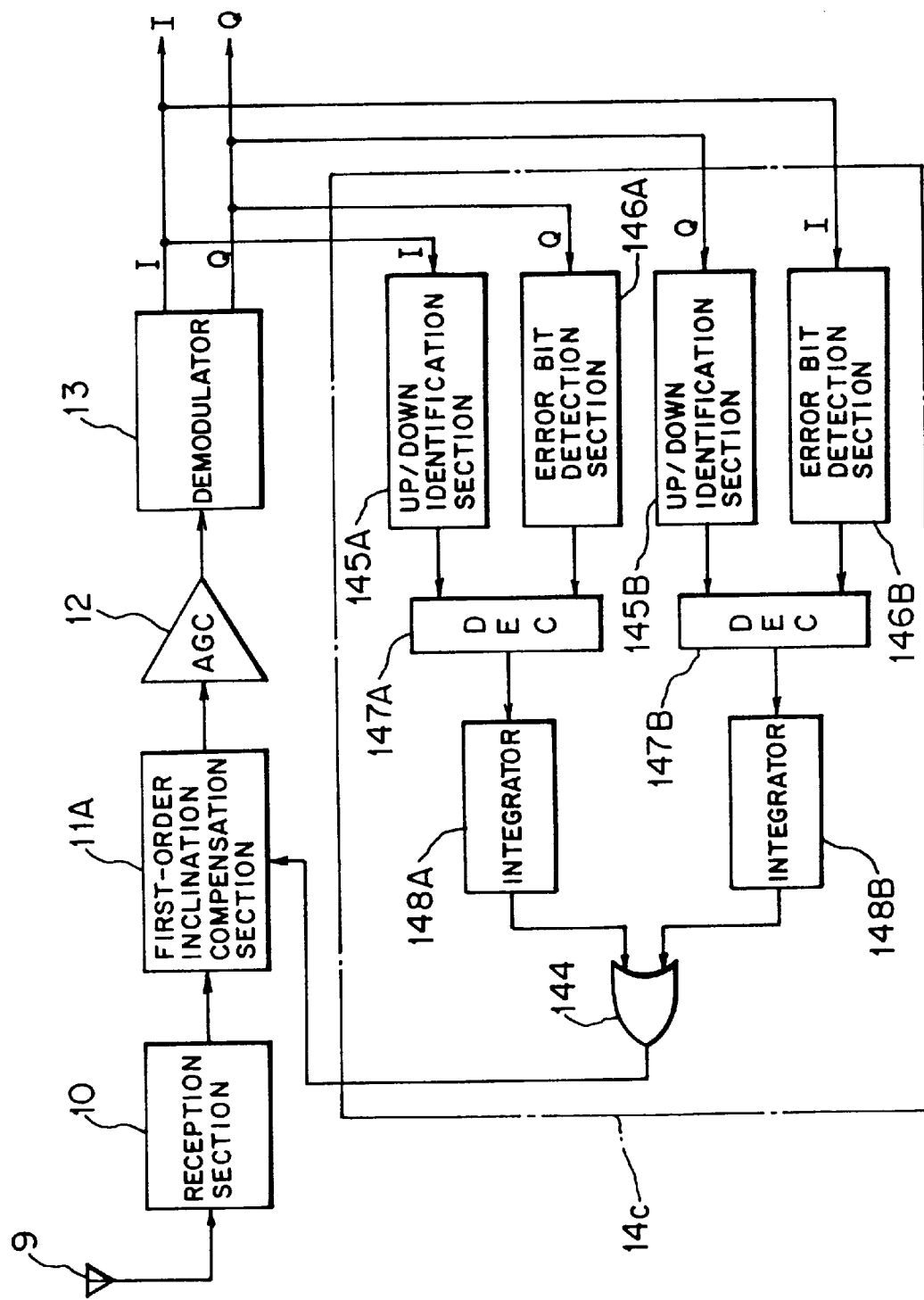
FIG. 28 is a block diagram of a yet further automatic amplitude equalizer showing an eighth preferred embodiment of the present invention.

FIG. 28 shows in block diagram a construction of an automatic amplitude equalizer according to an eighth preferred embodiment of the present invention. Referring to FIG. 28, the automatic amplitude equalizer of the present embodiment is a modification to and includes same components as those of the automatic amplitude equalizer of the fourth embodiment shown in FIG. 22 except a first-order inclination compensation section 11A, which, however, is similar to the first-order inclination compensation section 11A described hereinabove in connection with the fifth embodiment.

In particular, the automatic amplitude equalizer shown in FIG. 28 employs, in place of the first-order inclination compensation section 11 of the automatic amplitude equalizer described hereinabove in connection with the fourth embodiment, the first-order inclination compensation section 11A employed in the automatic amplitude equalizer described hereinabove in connection with the fifth embodiment so that a first-order inclination distortion of an input signal of an IF band can be compensated for also in the time-domain.

Also in the automatic amplitude equalizer of the present embodiment having the construction described above, in the control section 14c, the digital demodulated signal I obtained by the demodulator 13 is sampled in a data clock period T and sample data thus obtained are compared with each other by the up/down identification section 145A to discriminate the direction in which the signal I moves, and error information E of the digital demodulated signal Q is detected only from part (an error bit) of data of the digital demodulated signal Q by the error bit detection section 146A.

Further, in this instance, the digital demodulated signal Q is simultaneously sampled in the data clock period T and sample data obtained by such sampling are compared with each other by the up/down identification section 145B to discriminate the direction in which the signal Q moves. Meanwhile, error information E of the digital demodulated signal I is detected from only part (an error bit) of data of the signal I by the error bit identification section 146B.

It is to be noted that, also in this instance, if the digital demodulated signals I and Q are sampled in a period T/N (N is an integral number equal to or greater than 2) equal to 1/N the data clock period, then even where the digital demodulated signals I and Q are demodulated, for example, by QPSK, the directions in which the digital demodulated signals I and Q move can be discriminated in a similar manner.

Then, based on the correlation between the direction of movement of the digital modulated signal I obtained by the up/down identification section 145A and the error information E of the digital signal Q obtained by the error bit detection section 146A, a characteristic (a positive inclination, a negative inclination or a zero inclination) of the first-order inclination distortion of the input signal is detected, and a signal corresponding to the characteristic is outputted as a first correlation signal from the decoder (DEC) 147A.

Simultaneously, based on the correlation between the direction of movement of the digital demodulated signal Q obtained by the up/down identification section 145B and the error information E of the digital signal I obtained by the error bit detection section 146B, the first-order inclination distortion of the input signal is detected, and a signal corresponding to the characteristic is outputted as a second correlation signal from the decoder (DEC) 147B.

Then, the correlation signals obtained in such a manner as described above are integrated by the integrators 148A and 148B, respectively, and then are logically ORed by the OR gate 144. Consequently, if at least one of the first correlation signal and the second correlation signal described above is outputted, then since a first-order inclination distortion is included in the input signal, a control signal for the first-order inclination compensation section 11A corresponding to the detected correlation signal is outputted to the first-order inclination compensation section 11A.

Consequently, in the first-order inclination compensation section 11A, also in this instance, the tap coefficients of the transversal equalizers 112A and 113A are adjusted in response to the control signal from the control section 14c, and the first-order inclination distortion of the input signal is compensated for in the time-domain.

As described above, with the automatic amplitude equalizer of the eighth preferred embodiment of the present invention, since the first-order inclination compensation section 11A which includes the transversal equalizers 112A and 113A employed in the automatic amplitude equalizer of the fifth embodiment is employed in place of the first-order inclination compensation section 11 having the first-order inclination amplitude characteristic in the frequency-domain employed in the automatic amplitude equalizer of the fourth embodiment, the first-order inclination distortion of the input signal can be compensated for readily also in the time-domain.

j. Ninth Embodiment

Figure 29:
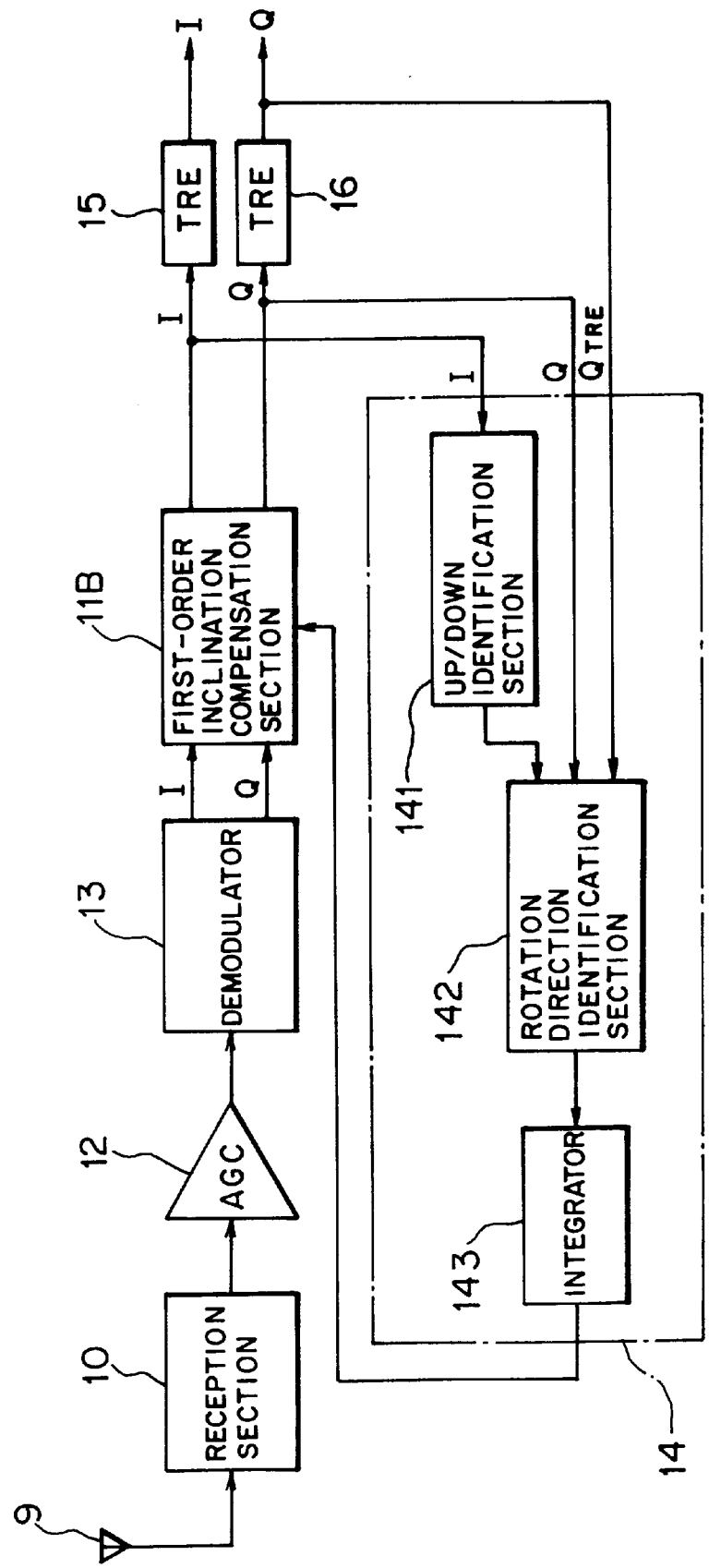
FIG. 29 is a block diagram of a yet further automatic amplitude equalizer showing a ninth preferred embodiment of the present invention.

FIG. 29 shows in block diagram a construction of an automatic amplitude equalizer according to a ninth preferred embodiment of the present invention. Referring to FIG. 29, the automatic amplitude equalizer of the present embodiment is a modification to and includes same components as those of the automatic amplitude equalizer of the fifth embodiment shown in FIG. 23 except a first-order inclination compensation section 11B. The first-order inclination compensation section 11B is provided at a stage following the demodulator 13 as seen in FIG. 29.

In particular, the first-order inclination compensation section 11B in the present embodiment does not compensate for a first-order inclination distortion of an input signal of the IF band before digitized by the demodulator 13 as in the first-order inclination compensation sections 11 and 11A described hereinabove with reference to the preceding embodiments, but compensates for first-order inclination distortions of digital demodulated signals I and Q of a base band obtained from the demodulator 13.

Figure 30:
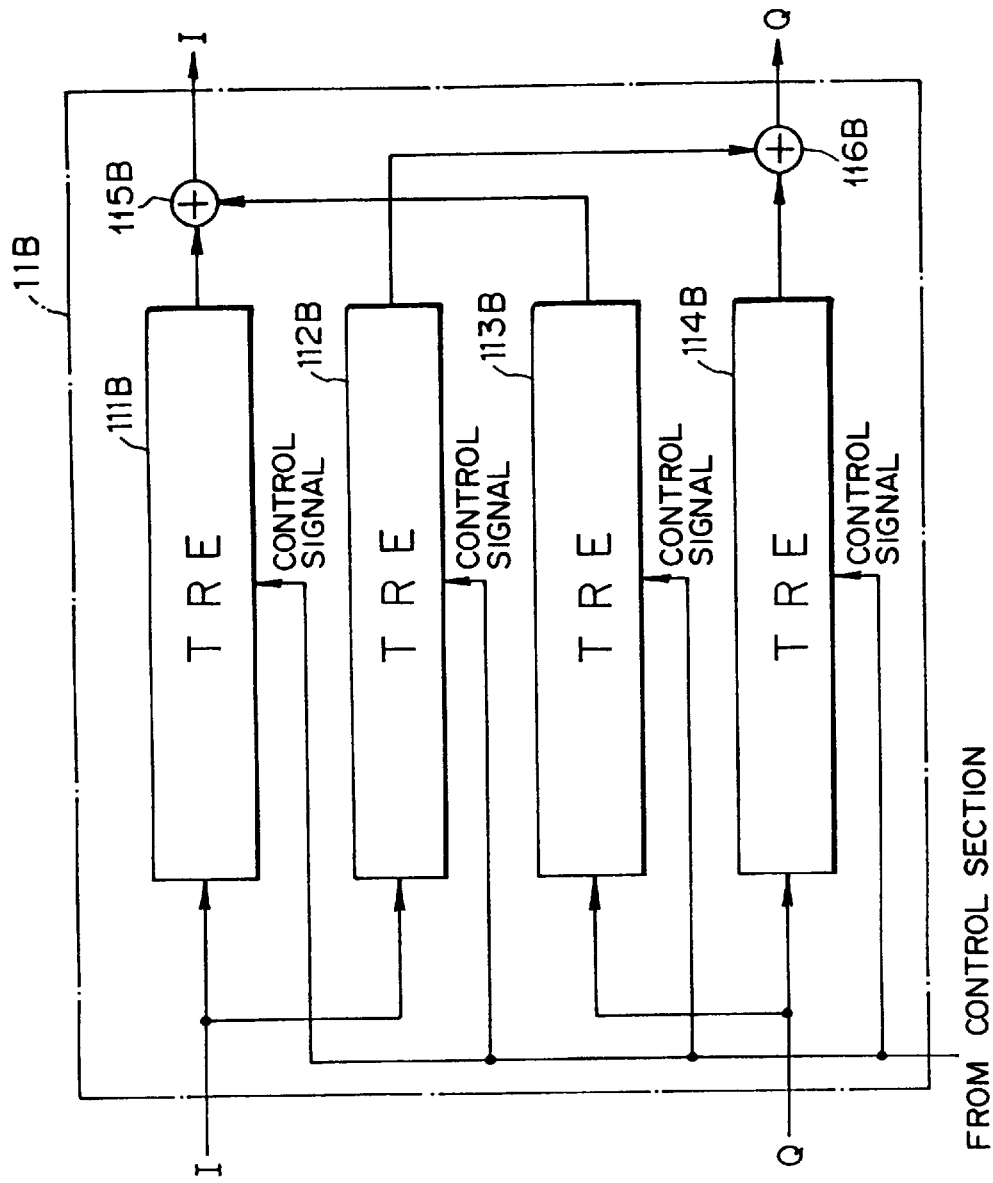
FIG. 30 is a block diagram showing an internal construction of a first-order inclination compensation section of the automatic amplitude equalizer of FIG. 29.

To this end, the first-order inclination compensation section 11B includes, as shown in FIG. 30, four base band transversal equalizers (TRE: which are hereinafter referred to each merely as transversal equalizer) 111B to 114B, and a pair of addition sections 115B and 116B.

Each of the transversal equalizers 111B to 114B is similar to the transversal equalizer 112A (113A) described hereinabove in connection with the fifth embodiment shown in FIG. 24 and has a similar internal construction to that of the transversal equalizer shown in FIG. 25. The addition section 115B adds signals equalized by the transversal equalizers 111B and 113B to each other, and the addition section 116B adds signals equalized by the transversal equalizers 112B and 114B to each other.

In the first-order inclination compensation section 11B constructed in such a manner as described above, the first-order inclination distortion of the digital demodulated signal I is compensated for in the time-domain and also the first-order inclination distortion of the digital demodulated signal Q is compensated for in the time-domain in response to a control signal from the control section 14 (refer to FIG. 29) by the transversal equalizers 111B and 112B, respectively. It is to be noted that detailed operation of each of the transversal equalizers 111B to 114B is similar to that of the transversal equalizer described hereinabove in connection with the fifth embodiment shown in FIG. 25.

Then, the digital demodulated signals I and Q after equalized by the transversal equalizers 111B and 113B are added to each other by the addition section 115B, from which an equalized digital demodulated signal I is outputted. Meanwhile, the digital demodulated signals I and Q after equalized by the transversal equalizers 112B and 114B are added to each other by the addition section 116B, from which an equalized digital demodulated signal Q is outputted.

In the control section 14, also in this instance, the first-order inclination distortion of the input signal is detected from the digital demodulated signals I and Q to obtain a control signal for the first-order inclination compensation section 11B.

In particular, the digital demodulated signal I is sampled in a data clock period T and sample data obtained by such sampling are compared with each other by the up/down identification section 141 to discriminate the direction in which the signal I moves. Meanwhile, error information E of the digital demodulated signal Q is detected by the rotation direction identification section 142.

Then, based on the correlation between the direction in which the digital demodulated signal I moves and data of the error information E of the digital demodulated signal Q, a characteristic (a positive inclination, a negative inclination or a zero inclination) of the first-order inclination distortion of the input signal is detected, and in response to the characteristic thus detected, a control signal for the first-order inclination compensation section 11B is outputted to the first-order inclination compensation section 11B.

As a result, in the first-order inclination compensation section 11B, the tap coefficients of the transversal equalizers 111B to 114B are adjusted in response to the control signal and equalization processing is performed for the digital demodulated signals I and Q of the base band to equalize and compensate for the first-order inclination distortion of the input signal at the following stage to the demodulator 13.

As described above, with the automatic amplitude equalizer according to the ninth embodiment of the present invention, since the first-order inclination compensation section 11B which operates on a signal of a base band is provided at the following stage to the demodulator 13 is provided in place of the first-order inclination compensation section 11A which operates on a signal of the IF band described hereinabove in connection with the fifth embodiment, the first-order inclination distortions of the digital demodulated signals I and Q of the base band which are outputs of the demodulator 13 can be compensated for in the time-domain. Consequently, the universal applicability of the automatic amplitude equalizer of the fifth embodiment is improved very much.

It is to be noted that, also in the present embodiment, if the up/down identification section 141 is constructed such that the digital demodulated signal I is sampled in a period T/N (N is an integral number equal to or greater than 2) equal to 1/N the data clock period to discriminate the direction in which the digital demodulated signal I moves, by whichever modulation method (for example, QPSK or multi-value QAM) a signal from which the digital demodulated signal I is originated is demodulated, the direction in which the digital demodulated signal I moves can be discriminated readily.

Further, while, in the present embodiment, the direction in which the digital demodulated signal I moves is discriminated from the digital demodulated signal I and error information E of the digital demodulated signal Q is detected from the digital demodulated signal Q, alternatively the direction in which the digital demodulated signal Q moves may be discriminated from the digital demodulated signal Q while error information E of the digital demodulated signal I is detected from the digital demodulated signal I.

k. Tenth Embodiment

Figure 31:
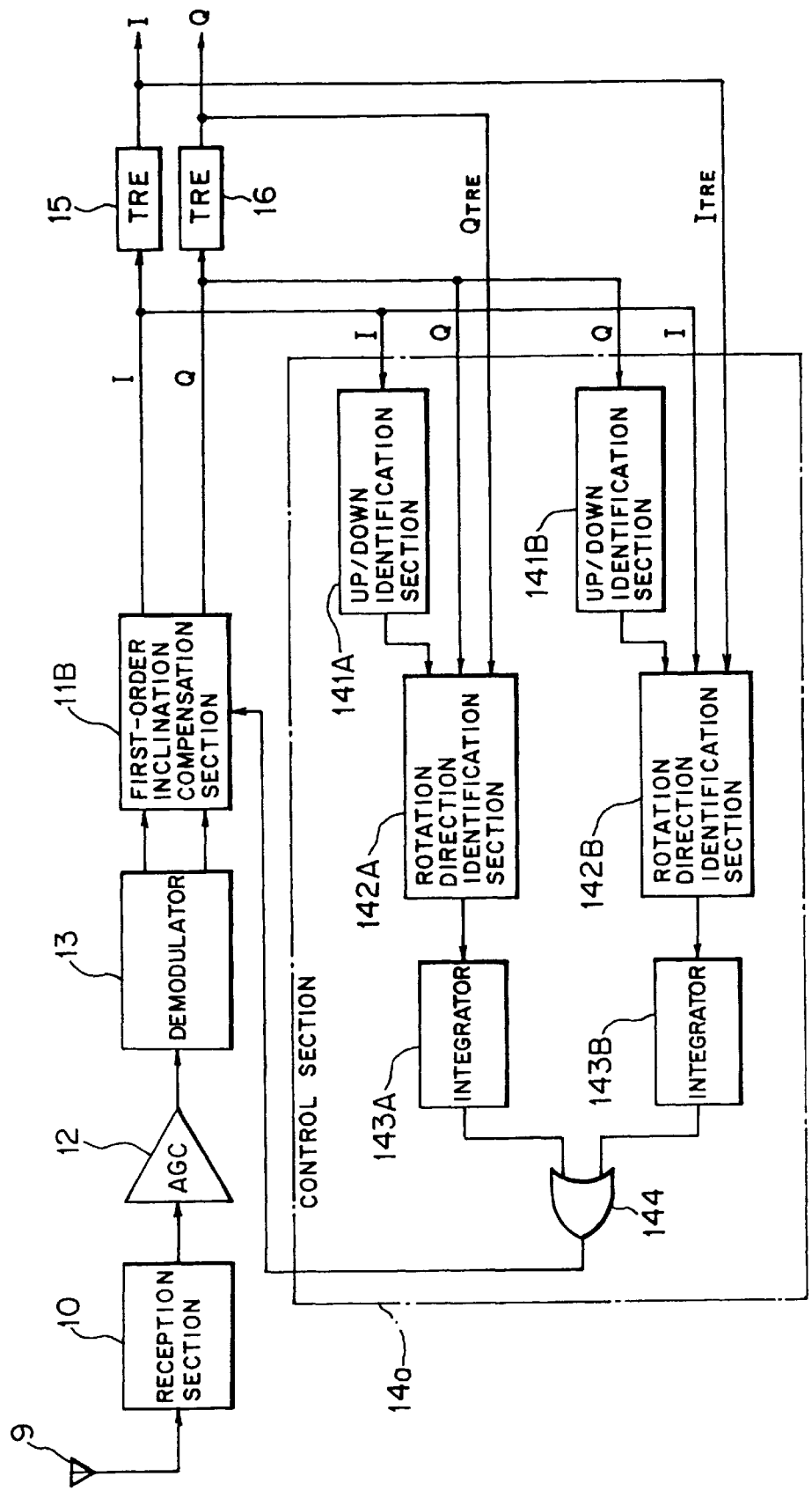
FIG. 31 is a block diagram of a yet further automatic amplitude equalizer showing a tenth preferred embodiment of the present invention.

FIG. 31 shows in block diagram a construction of an automatic amplitude equalizer according to a tenth preferred embodiment of the present invention. Referring to FIG. 31, the automatic amplitude equalizer of the present embodiment is a modification to the automatic amplitude equalizer of the sixth embodiment shown in FIG. 26 in that, in place of the first-order inclination compensation section 11A shown in FIG. 26, a first-order inclination compensation section 11B is provided at a following stage to the demodulator 13 so that first-order inclination distortions are detected from digital demodulated signals I and Q of a base band obtained from the demodulator 13 so as to be compensated for independently of each other in the time-domain for the individual digital demodulated signals I and Q.

Accordingly, also the first-order inclination compensation section 11B in the present embodiment includes, similarly to the first-order inclination compensation section 11B described hereinabove in connection with the ninth embodiment, four transversal equalizers 111B to 114B and a pair of addition sections 115B and 116B (refer to FIG. 30). Further, the internal construction of each of the transversal equalizers 111B to 114B is similar to that of the transversal equalizer shown in FIG. 21.

Also in the automatic amplitude equalizer of the present embodiment having the construction described above, a characteristic (a positive inclination, a negative inclination or a zero inclination) of a first-order inclination distortion of an input signal is detected from each of the digital demodulated signals I and Q by the control section 14a. Then, based on the thus detected characteristics, a control signal for the first-order inclination compensation section 11B is produced and outputted to the first-order inclination compensation section 11B.

More particularly, also in the instance, in the control section 14a, the digital demodulated signal I obtained by the demodulator 13 is sampled in a data clock period T and sample data obtained by such sampling are compared with each other by the up/down identification section 141A to discriminate the direction in which the signal I moves. Meanwhile, the digital demodulated signal Q is sampled in the data clock period T and sample data obtained by such sampling are compared with each other by the up/down identification section 141B to discriminate the direction in which the signal Q moves.

It is to be noted that, also in this instance, if the digital demodulated signals I and Q are sampled in a period T/N (N is an integral number equal to or greater than 2) equal to 1/N the data clock period, then even if the digital demodulated signals I and Q are demodulated, for example, by QPSK or the like, the directions in which the digital demodulated signals I and Q move can be discriminated in a similar manner.

Then, in the rotation direction identification section 142A, a difference between the digital demodulated signal Q and an equalized signal $Q_{TRE}$ obtained by equalization of the digital demodulated signal Q by means of the transversal equalizer 16 is calculated to detect error information E of the digital demodulated signal Q. Meanwhile, in the rotation direction identification section 142B, a difference between the digital demodulated signal I and an equalized signal $I_{TRE}$ obtained by equalization of the digital demodulated signal I by means of the transversal equalizer 15 is calculated to detect error information E of the signal I.

Further, in the rotation direction identification section 142A, a characteristic of the first-order inclination distortion of the input signal is detected based on the correlation between the direction of movement of the digital demodulated signal I and the error information E of the signal Q obtained in such a manner as described above, and a signal corresponding to the thus detected characteristic is outputted as a first correlation signal. Meanwhile, in the rotation direction identification section 142B, the first-order inclination distortion of the input signal is detected based on the correlation between the direction of movement of the digital demodulated signal Q and the error information E of the digital demodulated signal I similarly, and a signal corresponding to the thus detected characteristic is outputted as a second correlation signal.

Further, the correlation signals obtained in such a manner as described above are integrated by the integrators 143A and 143B, respectively, and then logically ORed by the OR gate 144. Consequently, if a correlation signal is obtained from at least one of the rotation direction identification sections 142A and 142B, that is, if it is detected from any one of the digital demodulated signals I and Q that a first-order inclination distortion is present in the input signal, then a signal corresponding to a characteristic (a positive inclination, a negative inclination or a zero inclination) of the thus detected first-order inclination distortion is outputted as a control signal for the first-order inclination compensation section 11B.

As a result, in the first-order inclination compensation section first-order inclination compensation section 11B, the tap coefficients of the transversal equalizers 111B to 114B (FIG. 30) are adjusted in response to the control signal so that the first-order inclination distortion of the input signal is equalized and compensated for in the time-domain at the following stage to the demodulator 13 as described hereinabove in connection with the ninth embodiment.

As described above, with the automatic amplitude equalizer of the tenth preferred embodiment of the present invention, since the first-order inclination compensation section 11B is provided at the following stage to the demodulator 13 in place of the first-order inclination compensation section 11A described hereinabove in connection with the sixth embodiment, the first-order inclination distortions of the digital demodulated signals I and Q of the base band are compensated for in the time-domain. Consequently, the application range of the automatic amplitude equalizer described hereinabove in connection with the sixth embodiment can be expanded remarkably.

l. Eleventh Embodiment

Figure 32:
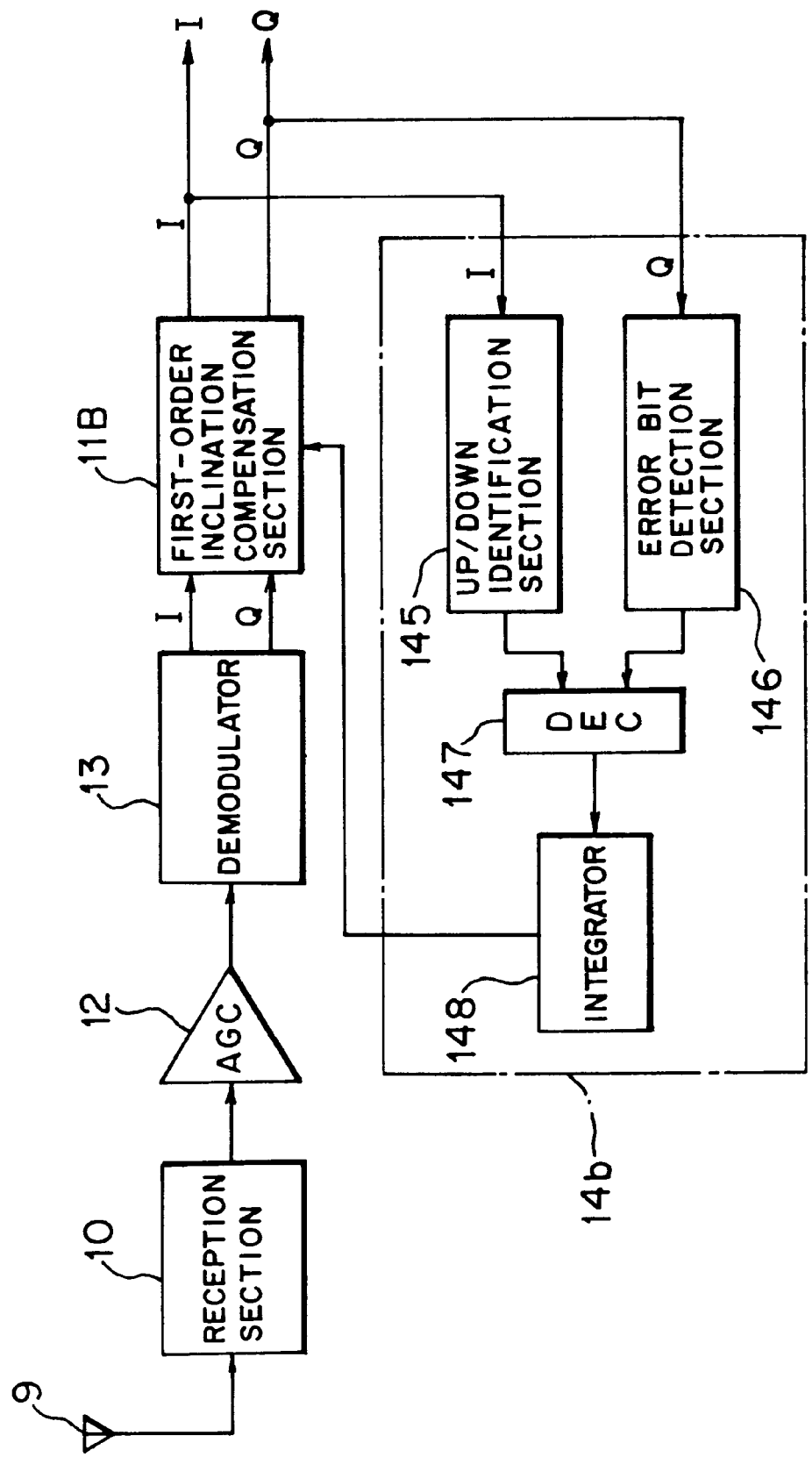
FIG. 32 is a block diagram of a yet further automatic amplitude equalizer showing an eleventh preferred embodiment of the present invention.

FIG. 32 shows in block diagram a construction of an automatic amplitude equalizer according to an eleventh preferred embodiment of the present invention. Referring to FIG. 32, the automatic amplitude equalizer of the present embodiment is a modification to the automatic amplitude equalizer of the seventh embodiment shown in FIG. 27 in that, in place of the first-order inclination compensation section 11A shown in FIG. 27, a first-order inclination compensation section 11B is provided at a following stage to the demodulator 13 so that first-order inclination distortions of digital demodulated signals I and Q of a base band obtained by the demodulator 13 are compensated for in the time-domain.

To this end, also the first-order inclination compensation section 11B in the present embodiment includes, similarly to the first-order inclination compensation section 11B of the automatic amplitude equalizer described hereinabove in connection with the ninth embodiment, four transversal equalizers 111B to 114B (FIG. 30). Also the transversal equalizers 111B to 114B are each constructed similarly to the transversal equalizer 112A (113A) shown in FIG. 25.

Also in the automatic amplitude equalizer of the present embodiment having the construction described above, similarly as described above in connection with the ninth embodiment, a characteristic (a positive inclination, a negative inclination or a zero inclination) of a first-order inclination distortion of an input signal is detected from each of the digital demodulated signals I and Q by the control section 14b.

More particularly, in the control section 14b, the digital demodulated signal I obtained by the demodulator 13 is sampled in a data clock period T and sample data obtained by such sampling are compared with each other by the up/down identification section 145 to discriminate the direction in which the signal I moves. Meanwhile, error information E of the digital demodulated signal Q is detected from only part (an error bit) of data of the digital demodulated signal Q by the error bit detection section 146.

It is to be noted that, also in this instance, if the digital demodulated signal I is sampled in a period T/N (N is an integral number equal to or greater than 2) equal to 1/N the data clock period, then even if the digital demodulated signal I is demodulated, for example, by QPSK or the like, the direction in which the digital demodulated signal I moves can be discriminated in a similar manner.

Then, a characteristic of a positive inclination, a negative inclination or a zero inclination of the first-order inclination distortion of the input signal is detected based on the correlation between the direction of movement of the signal I and the error information E of the signal Q, and a signal corresponding to the thus detected characteristic is outputted as a control signal for the first-order inclination compensation section 11B from the decoder (DEC) 147.

Consequently, in the first-order inclination compensation section 11B, the tap coefficients of the transversal equalizers 111B to 114B of the first-order inclination compensation section 11B are adjusted in response to the control signal so that the first-order inclination distortion of the input signal is equalized and compensated for in the time-domain at the following stage to the demodulator 13.

As described above, with the automatic amplitude equalizer of the eleventh preferred embodiment of the present invention, since the first-order inclination compensation section 11B is provided at the following stage to the demodulator 13 in place of the first-order inclination compensation section 11A described hereinabove in connection with the seventh embodiment similarly as in the ninth and tenth embodiments so that the first-order inclination distortions of the digital demodulated signals I and Q of the base band obtained by the demodulator 13 are compensated for in the time-domain, the application range of the automatic amplitude equalizer described hereinabove in connection with the seventh embodiment can be expanded remarkably.

It is to be noted that, while, in the present embodiment, the direction in which the signal I moves is discriminated from the digital demodulated signal I while the error information E of the signal Q is detected from part (an error bit) of data of the digital demodulated signal Q, alternatively the direction in which the signal Q moves may be discriminated from the digital demodulated signal Q while the error information E of the signal I is detected from part (an error bit) of data of the digital demodulated signal I conversely to that described above.

m. Twelfth Embodiment

Figure 33:
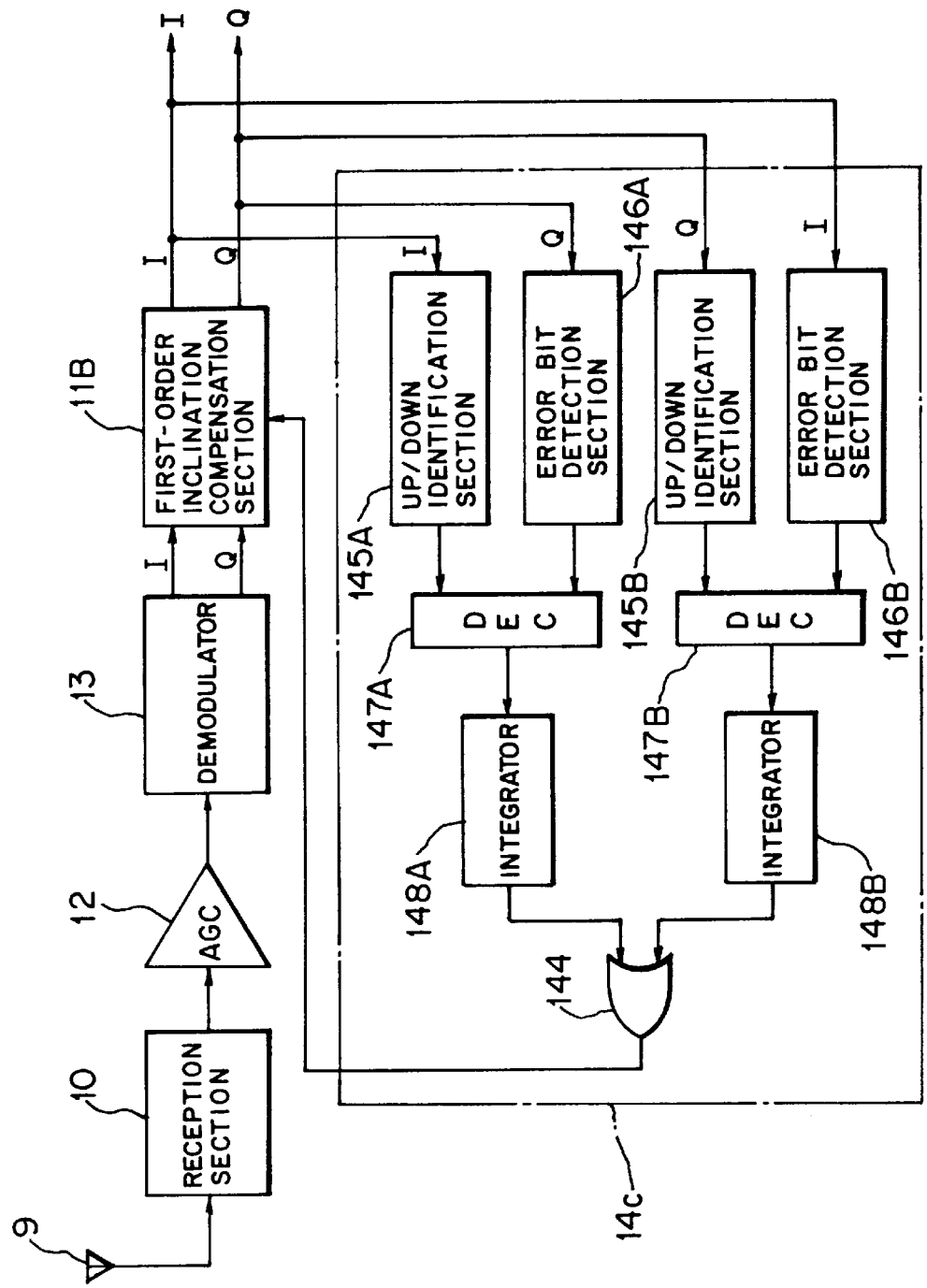
FIG. 33 is a block diagram of a yet further automatic amplitude equalizer showing a twelfth preferred embodiment of the present invention.

FIG. 33 shows in block diagram a construction of an automatic amplitude equalizer according to a twelfth preferred embodiment of the present invention. Referring to FIG. 33, the automatic amplitude equalizer of the present embodiment is a modification to the automatic amplitude equalizer of the eighth embodiment shown in FIG. 28 in that, in place of the first-order inclination compensation section 11A shown in FIG. 28, a first-order inclination compensation section 11B is provided at a following stage to the demodulator 13 so that first-order inclination distortions of digital demodulated signals I and Q of a base band obtained by the demodulator 13 are compensated for in the time-domain.

To this end, also the first-order inclination compensation section 11B in the present embodiment includes, similarly to the first-order inclination compensation section 11B of the automatic amplitude equalizer described hereinabove in connection with the ninth embodiment, four transversal equalizers 111B to 114B (FIG. 30). Also the internal construction of each of the transversal equalizers 111B to 114B is similar to that of the transversal equalizer 112A (113A) shown in FIG. 25.

Also in the automatic amplitude equalizer of the present embodiment having the construction described above, a characteristic (a positive inclination, a negative inclination or a zero inclination) of a first-order inclination distortion of an input signal is detected from each of the digital demodulated signals I and Q by the control section 14c, and a control signal for the first-order inclination compensation section 11B is produced in accordance with the thus detected characteristic and outputted to the first-order inclination compensation section 11B.

More particularly, in the control section 14c, the digital demodulated signal I obtained by the demodulator 13 is sampled in a data clock period T and sample data obtained by such sampling are compared with each other by the up/down identification section 145A to discriminate the direction in which the signal I moves. Meanwhile, error information E of the digital demodulated signal Q is detected from only part (an error bit) of data of the digital demodulated signal Q by the error bit detection section 146A.

Meanwhile, the digital demodulated signal Q is simultaneously sampled in the data clock period T and sample data obtained by such sampling are compared with each other by the up/down identification section 145B to discriminate the direction in which the signal Q moves. Meanwhile, error information E of the digital demodulated signal I is detected from only part (an error bit) of data of the digital demodulated signal I by the error bit detection section 146B.

It is to be noted that, also in this instance, if the digital demodulated signals I and Q are sampled in a period T/N (N is an integral number equal to or greater than 2) equal to 1/N the data clock period by the up/down identification sections 145A and 145B, respectively, then even if the digital demodulated signals I and Q are demodulated, for example, by QPSK or the like, the directions in which the digital demodulated signals I and Q move can be discriminated in a similar manner.

Then, a positive inclination, a negative inclination or a zero inclination of the first-order inclination distortion of the input signal is detected based on the correlation between the direction of movement of the signal I obtained by the up/down identification section 145A and the error information E of the signal Q obtained by the error bit detection section 146A, and a signal corresponding to the thus detected inclination is outputted as a first correlation signal from the decoder (DEC) 147A.

Simultaneously, a positive inclination, a negative inclination or a zero inclination of the first-order inclination distortion of the input signal is further detected based on the correlation between the direction of movement of the signal Q obtained by the up/down identification section 145B and the error information E of the signal I obtained by the error bit detection section 146B, and a signal corresponding to the thus detected inclination is outputted as a second correlation signal from the decoder (DEC) 147B.

Further, the correlation signals obtained in such a manner as described above are integrated by the integrators 148A and 148B, respectively, and then logically ORed by the OR gate 144. Consequently, if a correlation signal is obtained from at least one of the rotation direction identification sections 142A and 142B, that is, if it is detected from any one of the digital demodulated signals I and Q that a first-order inclination distortion is present in the input signal, then a signal corresponding to a characteristic (a positive inclination, a negative inclination or a zero inclination) of the thus detected first-order inclination distortion is outputted as a control signal for the first-order inclination compensation section 11B.

As a result, in the first-order inclination compensation section 11B, the tap coefficients of the transversal equalizers 111B to 114B (FIG. 30) are adjusted in response to the control signal so that the first-order inclination distortion of the input signal is equalized and compensated for in the time-domain at the following stage to the demodulator 13 as described hereinabove in connection with the ninth embodiment.

As described above, with the automatic amplitude equalizer of the twelfth preferred embodiment of the present invention, since the first-order inclination compensation section 11B is provided, similarly as in the ninth to eleventh embodiments, at the following stage to the demodulator 13 in place of the first-order inclination compensation section 11A described hereinabove in connection with the eighth embodiment so that the first-order inclination distortions of the digital demodulated signals I and Q of the base band obtained by the demodulator 13 can be compensated for in the time-domain, the application range of the automatic amplitude equalizer described hereinabove in connection with the eighth embodiment can be expanded remarkably.

n. Thirteenth Embodiment

Figure 34:
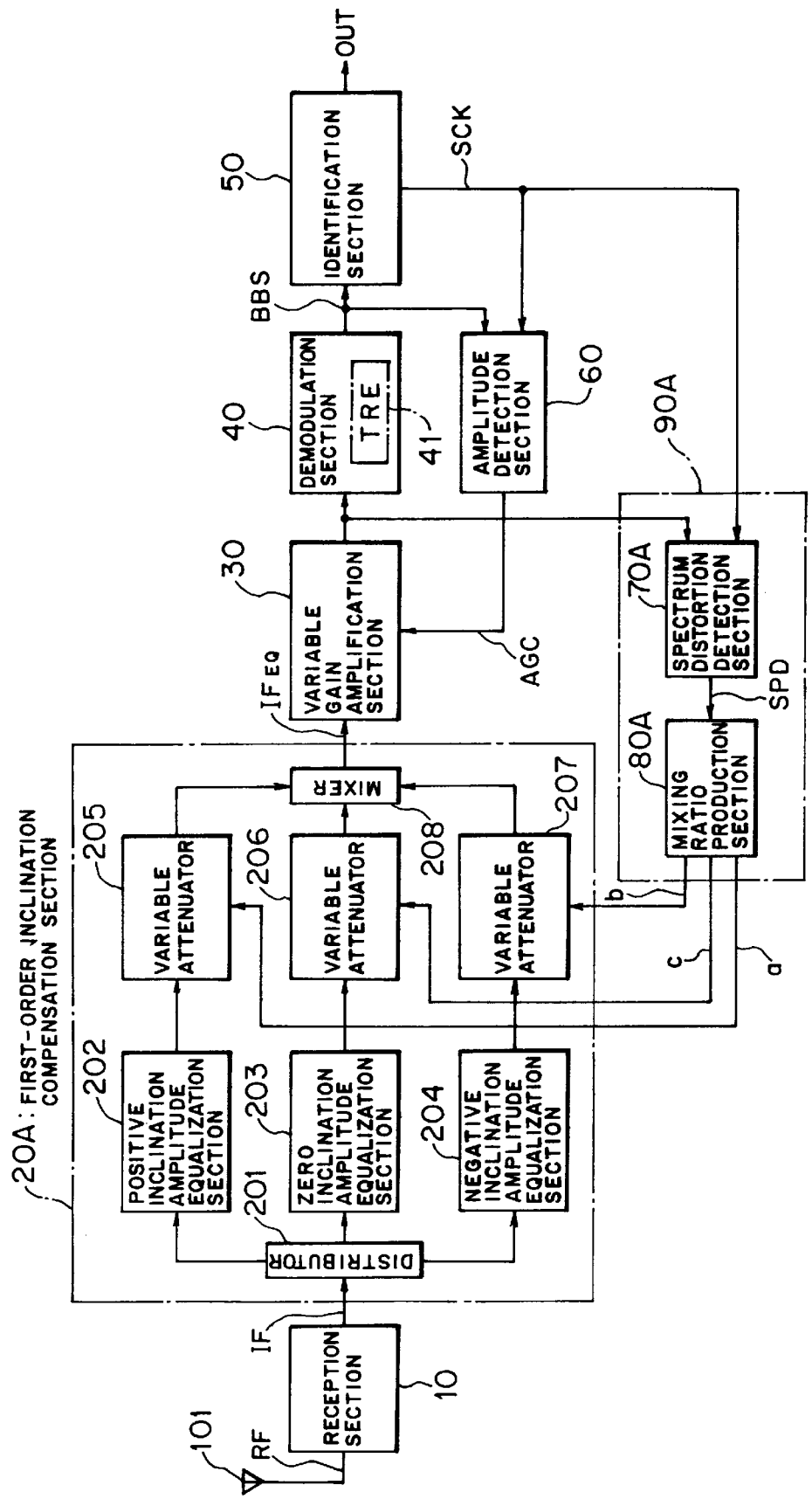
FIG. 34 is a block diagram of a yet further automatic amplitude equalizer showing a thirteenth preferred embodiment of the present invention.

FIG. 34 shows in block diagram a construction of an automatic amplitude equalizer according to a thirteenth preferred embodiment of the present invention. Referring to FIG. 34, the automatic amplitude equalizer shown includes a reception section 10, a first-order inclination compensation section 20A, a variable gain amplification section 30, a demodulation section 40, an identification section 50, an amplitude detection section 60, a control section 90A and an antenna 101.

The reception section 10 frequency converts (down converts) a RF (radio frequency) signal received by the antenna 101 into a required IF (intermediate frequency) signal. The first-order inclination compensation section (first-order inclination amplitude equalization section) 20A compensates for a first-order inclination distortion of the IF signal (input signal) obtained by the reception section 10 in accordance with, in the present embodiment, one of three first-order inclination amplitude characteristics of a positive inclination, a negative inclination and a zero inclination. To this end, the reception section 10 includes, as shown in FIG. 34, a distributor 201 for branching an input signal into three waves, a positive inclination amplitude equalization section 202, a zero inclination amplitude equalization section 203, a negative inclination amplitude equalization section 204, three variable attenuators 205 to 207, and a mixer 208.

The positive inclination amplitude equalization section 202 has a positive inclination amplitude equalization characteristic in the frequency-domain and is constructed making use of, for example, a portion of a positive inclination second-order characteristic of a notch filter. The zero inclination amplitude equalization section 203 has a zero inclination amplitude equalization characteristic in the frequency-domain and is formed from, in the present embodiment, a delay line having a flat passing characteristic so that it may have a same delay characteristic as the positive inclination amplitude equalization section 202 and the negative inclination amplitude equalization section 204. This can be constructed, for example, a coaxial cable of is a predetermined length, a microstrip line or the like.

The negative inclination amplitude equalization section 204 has a negative inclination amplitude equalization characteristic in the frequency-domain and is constructed making use of, for example, a portion of a negative inclination second-order characteristic of a notch filter similarly.

The variable attenuators 205 to 207 control the attenuation amounts of the outputs of the positive inclination amplitude equalization section 202, the zero inclination amplitude equalization section 203 and the negative inclination amplitude equalization section 204, respectively, in response to a mixing ratio control signal produced by the control section 90A, which will be hereinafter described. The mixer 208 composes and mixes the outputs of the variable attenuators 205 to 207. It is to be noted that the variable attenuators 205 to 207 can each be constructed using, for example, a PIN diode.

In short, the first-order inclination compensation section 20A is constructed such that the outputs of the positive inclination amplitude equalization section 202, the zero inclination amplitude equalization section 203 and the negative inclination amplitude equalization section 204 are mixed at a variable mixing ratio in response to a mixing ratio control signal from the control section 90A.

Meanwhile, the variable gain amplification section 30 controls the amplification degree of the output of the first-order inclination compensation section 20A in response to an AGC (Automatic Gain Control) signal from the amplitude detection section 60, which will be hereinafter described, so that the gain of the output to the demodulation section 40 may be fixed. The demodulation section 40 demodulates the output of the variable gain amplification section 30 by a required demodulation method such as orthogonal detection to obtain a demodulated base band signal (BBS). It is to be noted that the demodulation section 40 includes a transversal equalizer 41 of the 9-tap type as hereinafter described with reference to FIG. 37.

The identification section 50 identifies the demodulated base band signal obtained by the demodulation section 40 with a required identification level. The amplitude detection section 60 compares the BBS signal with a predetermined reference value (symbol level) in synchronism with a symbol timing clock signal (SCK) to produce an AGC signal for controlling the automatic gain of the variable gain amplification section 30.

The control section 90A detects a first-order inclination distortion of the IF signal from the demodulated base band signal (digital demodulated signal) of a digital value obtained by the demodulation section 40, produces, based on the thus detected first-order inclination distortion, a mixing ratio control signal for controlling the mixing ratio of the first-order inclination compensation section 20A described above and outputs the mixing ratio control signal to the first-order inclination compensation section 20A. The control section 90A includes a spectrum distortion detection section 70A and a mixing ratio production section 80A as shown in FIG. 34.

The spectrum distortion detection section (first-order inclination detection section) 70A detects a characteristic (a positive inclination, a negative inclination or a zero inclination) of a first-order inclination distortion of the IF signal from a digital demodulated signal of the IF signal and outputs a detection signal (detection result) SPD corresponding to the thus detected characteristic. The mixing ratio production section 80A produces and outputs a mixing ratio control signal for the first-order inclination compensation section 20 in response to the detection signal SPD from the spectrum distortion detection section 70A. It is to be noted that a detailed construction of the spectrum distortion detection section 70A and the mixing ratio production section 80A will be hereinafter described.

Operation of the automatic amplitude equalizer of the present embodiment having the construction described above will be described in detail below.

First, in the control section 90A, a characteristic of a positive inclination, a negative inclination or a zero inclination of a first-order inclination distortion of an IF signal is detected from a digital demodulated signal by the spectrum distortion detection section 70A, and a detection signal SPD corresponding to the thus detected characteristic is outputted to the mixing ratio production section 80A.

Then, in the mixing ratio production section 80A, the detection signal SPD is integrated to produce a distortion detection signal, which is outputted as a mixing ratio control signal for the first-order inclination compensation section 20. More particularly, the distortion detection signal is, for example, driven to the side of "0" when the spectrum of an IFEQ signal is flat or has a distortion in the proximity of a frequency f0, and when the IFEQ signal has a distortion of a positive inclination, the distortion detection signal is driven to the side of "−", but when the the IFEQ signal has a distortion of a negative inclination, the distortion detection signal is driven to the side of "+".

Figure 35A:
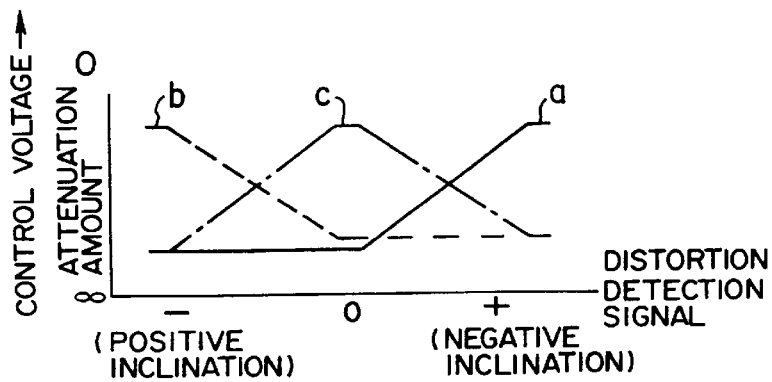
FIGS. 35(a) to 35(c) are diagrams illustrating operation of the automatic amplitude equalizer shown in FIG. 34.
Figure 35B:
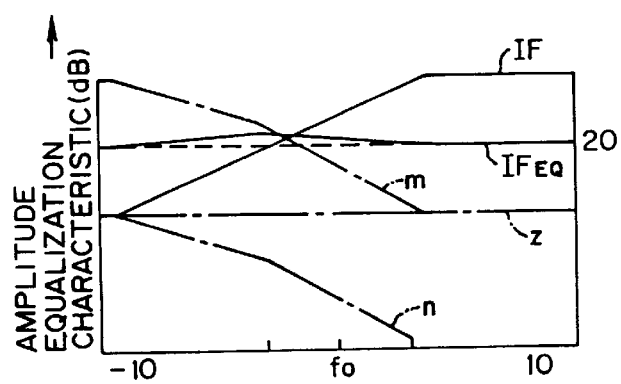
Figure 35C:
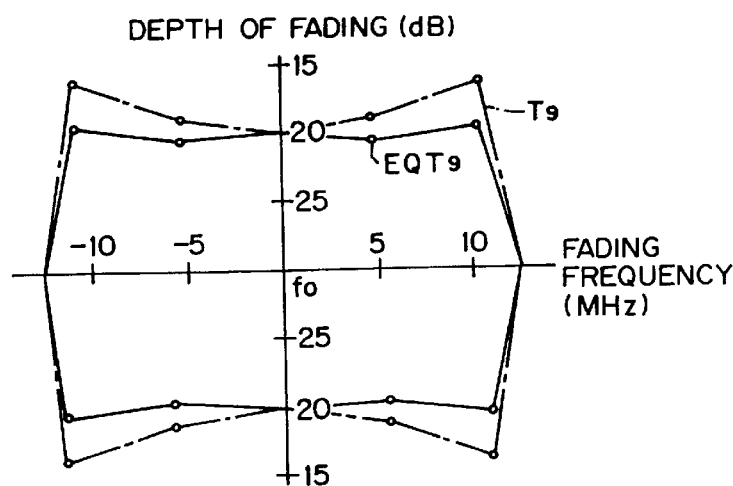

In short, control voltages a to c for adjusting the attenuation amounts of the variable attenuators 205 to 207 are individually controlled in such a manner as illustrated in FIG. 35($a$) in response to the mixing ratio control signal.

For example, when the distortion detection signal is "0" (has a zero distortion), the control voltage c exhibits a maximum value (attenuation amount of the variable attenuator 206=0), and the remaining control voltages a and b exhibit individual minimum values (attenuation amounts of the variable attenuators 205 and 207=∞). In this instance, the IF signal is outputted as it is through the zero inclination amplitude equalization section 203.

On the other hand, if the distortion detection signal varies to the "−" side (has a positive inclination), then the control voltage c decreases towards its minimum value while the control voltage b increases toward its maximum value. The control voltage a remains at the minimum value. Accordingly, in this region, the zero inclination amplitude equalization section 203 and the negative inclination amplitude equalization section 204 cooperate with each other to perform amplitude equalization of the IF signal.

In contrast, if the distortion detection signal varies to the "+" side (has a negative inclination), the control voltage c decreases toward its minimum value while the control voltage a increases toward its maximum value. The control voltage b remains at its minimum value. Accordingly, in this region, the zero inclination amplitude equalization section 203 and the positive inclination amplitude equalization section 202 cooperate with each other to perform amplitude equalization of the IF signal.

Subsequently, an example of an equalization action of an IF signal by the first-order inclination compensation section 20A will be described with reference to FIG. 35($b$). In FIG. 35($b$), the characteristic z indicates a zero inclination amplitude equalization characteristic of the zero inclination amplitude equalization section 203 while the characteristic n indicates a negative inclination amplitude equalization characteristic of the negative inclination amplitude equalization section 204, and the composite characteristic of them is indicated by the characteristic m. As seen from FIG. 35($b$), the characteristic m is opposite to the positive inclination distortion of the input IF signal.

Figure 68A:
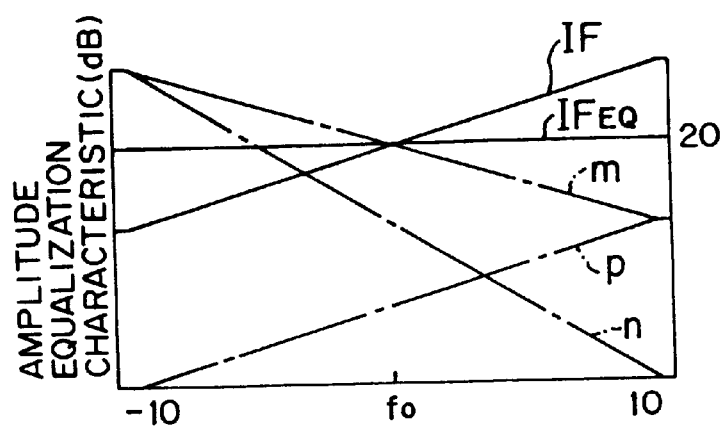
FIGS. 68(a) and 68(b) are diagrams illustrating operation of another ordinary automatic amplitude equalizer.

Accordingly, if the IF signal is amplitude equalized (compensated for) with the composite characteristic m, then a flat IFEQ signal is obtained at the output of the first-order inclination compensation section 20A. It is to be noted that, even where the IF signal suffers from a positive inclination first-order distortion as described hereinabove with reference to FIG. 68($b$), the output IFEQ signal exhibits remarkable improvement in characteristic comparing with the automatic amplitude equalizer shown in FIG. 66.

In this manner, with the automatic amplitude equalizer of the thirteenth preferred embodiment of the present invention, even when an IF signal (input signal) has a first-order inclination distortion such as a positive inclination or a negative inclination, an IFEQ signal having a flat fading characteristic can always be obtained at the output of the first-order inclination compensation section 20A by mixing the outputs of the positive inclination amplitude equalization section 202, the zero inclination amplitude equalization section 203 and the negative inclination amplitude equalization section 204 at a variable mixing ratio by means of the first-order inclination compensation section 20A.

Accordingly, the transversal equalizer 41 of the 9-tap type can equalize (compensate for) a fading distortion of the depth up to approximately 20 dB uniformly at the error rate of 10-3 over the entire IF band. As a result, the first-order inclination distortion of the IF signal can be compensated for very effectively as seen from the equalization characteristic EQTs of FIG. 35(c).

n'1. Modification to the Thirteenth Embodiment

Figure 36:
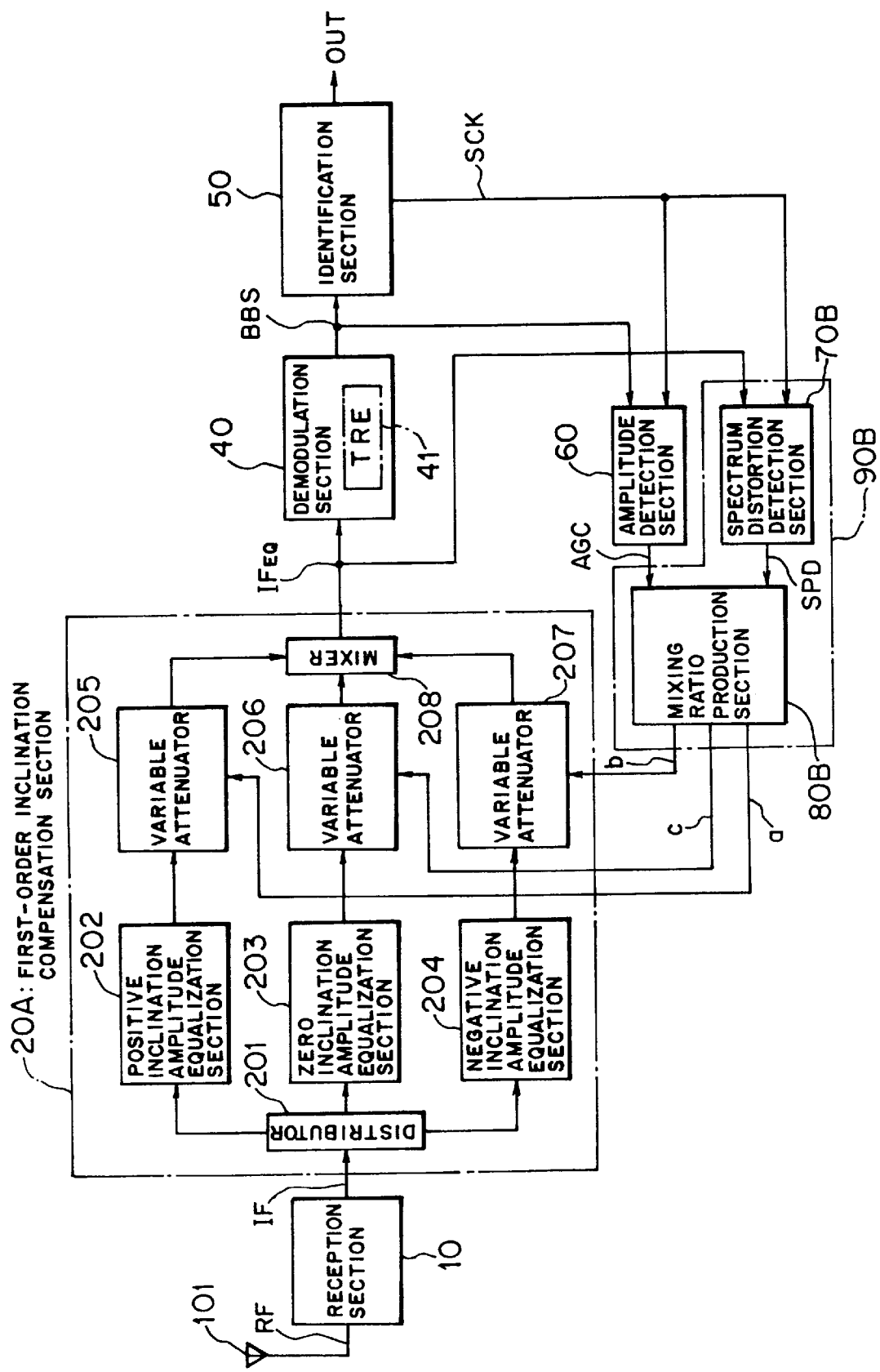
FIG. 36 is a block diagram showing a construction of a modification to the automatic amplitude equalizer shown in FIG. 34.

FIG. 36 shows in block diagram a construction of a modification to the automatic amplitude equalizer of the thirteenth preferred embodiment of the present invention. The modified automatic amplitude equalizer is different from the automatic amplitude equalizer shown in FIG. 34 in that it additionally includes a control section 90B and an amplitude detection section 60 but does not include the variable gain amplification section 30.

Also in the modified automatic amplitude equalizer, the control section 90B detects a first-order inclination distortion of a digital demodulated signal of an IF signal obtained by the demodulation section 40 and produces a mixing ratio control signal for controlling the mixing ratio of the outputs of the positive inclination amplitude equalization section 202, the zero inclination amplitude equalization section 203 and the negative inclination amplitude equalization section 204 of the first-order inclination compensation section 20A in response to a result of the detection. In the present modified automatic amplitude equalizer, the control section 90B includes a spectrum distortion detection section 70B and a mixing ratio production section 80B. An AGC signal from the amplitude detection section 60 is inputted to the mixing ratio production section 80B.

The amplitude detection section (signal level error detection section) 60 detects error information of a signal level from digital demodulated signals before and after identified by the identification section 50 and outputs the thus detected error information as an AGC signal.

In short, the mixing ratio production section 80B in the present modified automatic amplitude equalizer processes an AGC signal from the amplitude detection section 60 simultaneously with production of mixing ratio control signals a to c to vary the output levels of the mixing ratio control signals a to c to realize a unique AGC loop. By this construction, the circuit scale of the present equalizer is reduced remarkably due to the elimination of the variable gain amplification section 30 shown in FIG. 34.

The spectrum distortion detection section (first-order inclination detection section) 70B is similar to the spectrum distortion detection section 70A described hereinabove, and discriminates the movement (direction of a variation of the value) of one of digital demodulated signals I and Q obtained by the demodulation section 40, detects an error voltage (error information) E of the other signal which makes an orthogonal interference component with the above-mentioned one signal, and detects a characteristic of a positive inclination, a negative inclination or a zero inclination of a first-order inclination distortion based on the correlation between the movement of the one signal and the error voltage E of the other signal.

Figure 37:
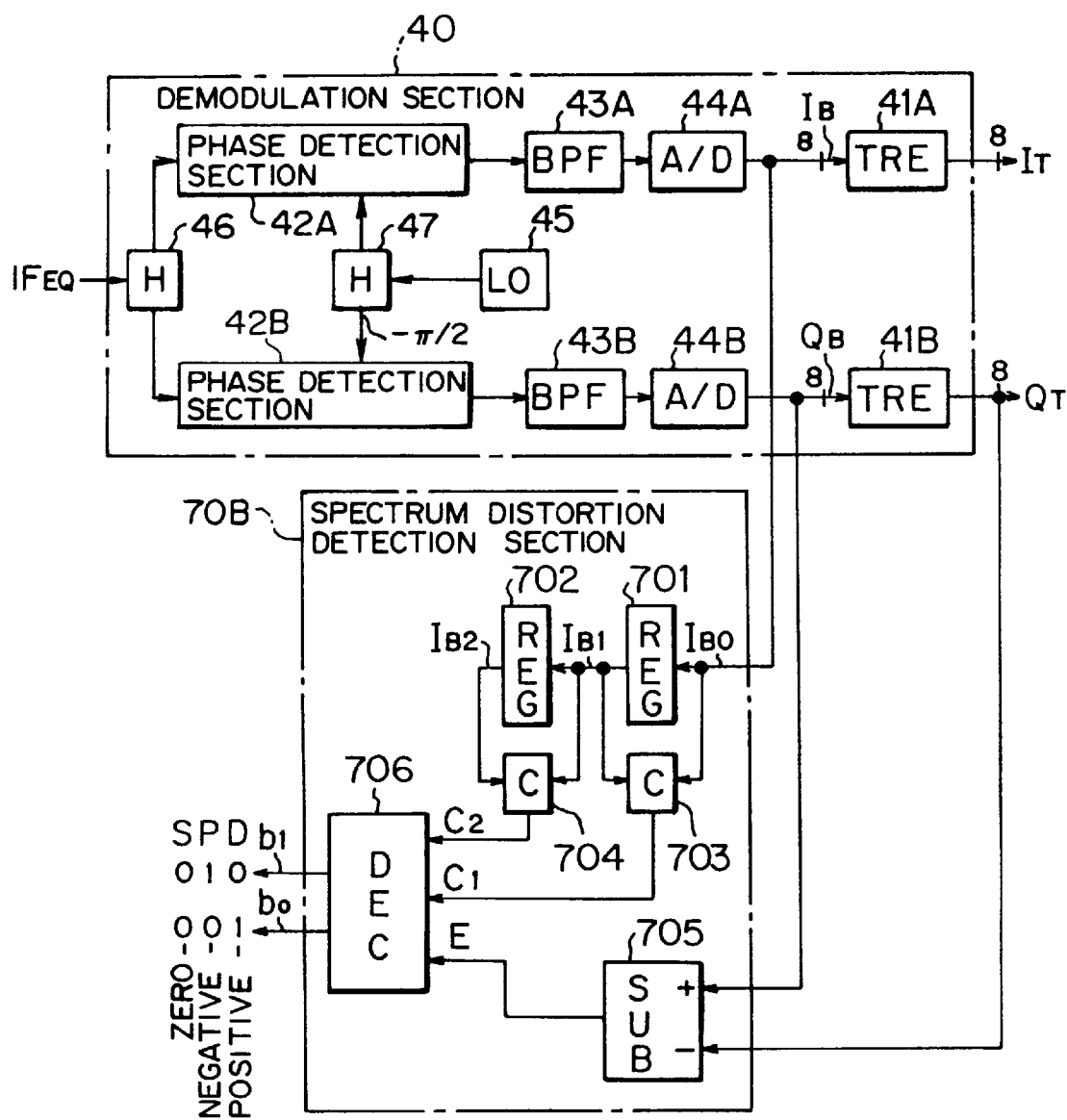
FIG. 37 is a block diagram showing a construction of a demodulation section and a spectrum distortion detection section of the modified automatic amplitude equalizer of FIG. 36.

FIG. 37 shows in block diagram a detailed construction of the demodulation section 40 and the spectrum distortion detection section 70B described above. Referring to FIG. 37, the demodulation section 40 includes a pair of transversal equalizers (TRE) 41A and 41B, a pair of phase detection sections 42A and 42B, a pair of band pass filters (BPF) 43A and 43B for the IF band, a pair of analog to digital converters (A/D) 44A and 44B, a local oscillator (LO) 45, and a pair of hybrid circuits 46 and 47.

Meanwhile, the spectrum distortion detection section 70B includes a pair of 8-bit registers (REG) 701 and 702 and a pair of comparators (C) 703 and 704, which construct a signal direction discrimination section which discriminates the direction in which one of a pair of digital demodulated signals originating from an input signal moves. The spectrum distortion detection section 70B further includes a subtractor (SUB) 705, and a decoder (DEC) 706.

In the demodulation section 40 having the construction described above, an IFEQ signal is branched by the hybrid circuit 46 into two waves, which are individually inputted to the phase detection sections 42A and 42B. Meanwhile, the local oscillator 45 produces a carrier reproduction signal synchronized in phase with a carrier. The carrier reproduction signal is branched into two waves having phases different by $\pi/2$ from each other by the hybrid circuit 47, and the two signals thus branched are individually inputted to the phase detection sections 42A and 42B.

The phase detection sections 42A and 42B perform phase detection of the input signals thereto in accordance with the carrier reproduction signals inputted thereto to obtain a pair of demodulated base band signals I and Q. The demodulated base band signals I and Q are converted from analog into digital signals by the analog to digital converters 44A and 44B so that data $I_B$ and $Q_B$ of the digital demodulated signals I and Q are obtained, respectively.

The data $I_B$ and $Q_B$ are amplitude equalized in the time-domain by the transversal equalizers 41A and 41B so that equalized data $I_T$ and $Q_T$ of the digital demodulated signals I and Q are obtained, respectively.

Meanwhile, in the spectrum distortion detection section 70B, data $I_B$ of the digital demodulated signal I at successive symbol timings are stored in time series into the registers 701 and 702. In this condition, the comparator 703 compares the data $I_{B0}$ of the signal I at the current operation point and the data $I_{B1}$ of the signal at the last operation point with each other and outputs a detection signal $C_1$ representing a result of such comparison. It is to be noted that the detection signal $C_1$ represents one of three cases of $I_{B0}>I_{B1}$, $I_{B0}=I_{B1}$ and $I_{B0}<I_{B1}$.

Further, in this instance, the comparator 704 compares the data $I_{B1}$ of the signal I at the last operation point and the data $I_{B2}$ of the signal I at the second last operation point with each other and outputs a detection signal $C_2$ representing a result of such comparison. It is to be noted that the detection signal $C_2$ represents one of three cases of $I_{B1}>I_{B2}$, $I_{B1}=I_{B2}$ and $I_{B1}<I_{B2}$.

Meanwhile, the subtractor (error information detection section) 705 subtracts the data $Q_T$ of the signal Q after equalization from the data $Q_B$ of the signal Q before equalization by the transversal equalizer 41B to detect detection data (error information) E of an error voltage ($\pm E$).

Then, the decoder (correlation calculation section) 706 produces a detection signal of 2 bits ($b_1$, $b_0$), that is, a detection signal (0, 1) of a positive inclination, a detection signal (1, 0) of a negative inclination or a detection signal (0, 0 or 1, 1) of a zero inclination, in accordance with such a correlation as described hereinabove with reference to FIG. 12 based on the detection signals $C_1$ and $C_2$ and the detection data E. The detection signal thus produced by the decoder 706 is outputted to the mixing ratio production section 80B.

More particularly, in the decoder 706, when, for example, both of the detection signal $C_1=I_{B0}>I_{B1}$ and the detection signal $C_2=I_{B1}>I_{B2}$ are satisfied, it is discriminated that the movement of the signal I is an upward movement, but when both of the detection signal $C_1=I_{B0}<I_{B1}$ and the detection signal $C_2=I_{B1}<I_{B2}$ are satisfied, it is discriminated that the movement of the signal I is a downward movement. On the other hand, as regards the detection data E of the error voltage $\pm E$, when the detection data E is within a small range of $\pm\Delta E$ with reference to "0", the detection data E is discriminated to be equal to "0". However, when $E>+\Delta E$, the detection data E is discriminated to be "+", but when E<−ΔE, the detection data E is discriminated to be "−".

It is to be noted that, also in this instance, the movement of the signal I in an upward or downward direction can be discriminated readily by comparing the demodulated signal I at different points of time in time series. Further, the movement of the demodulated signal I may be detected for each symbol point or in a period shorter than the symbol period.

Figure 38:
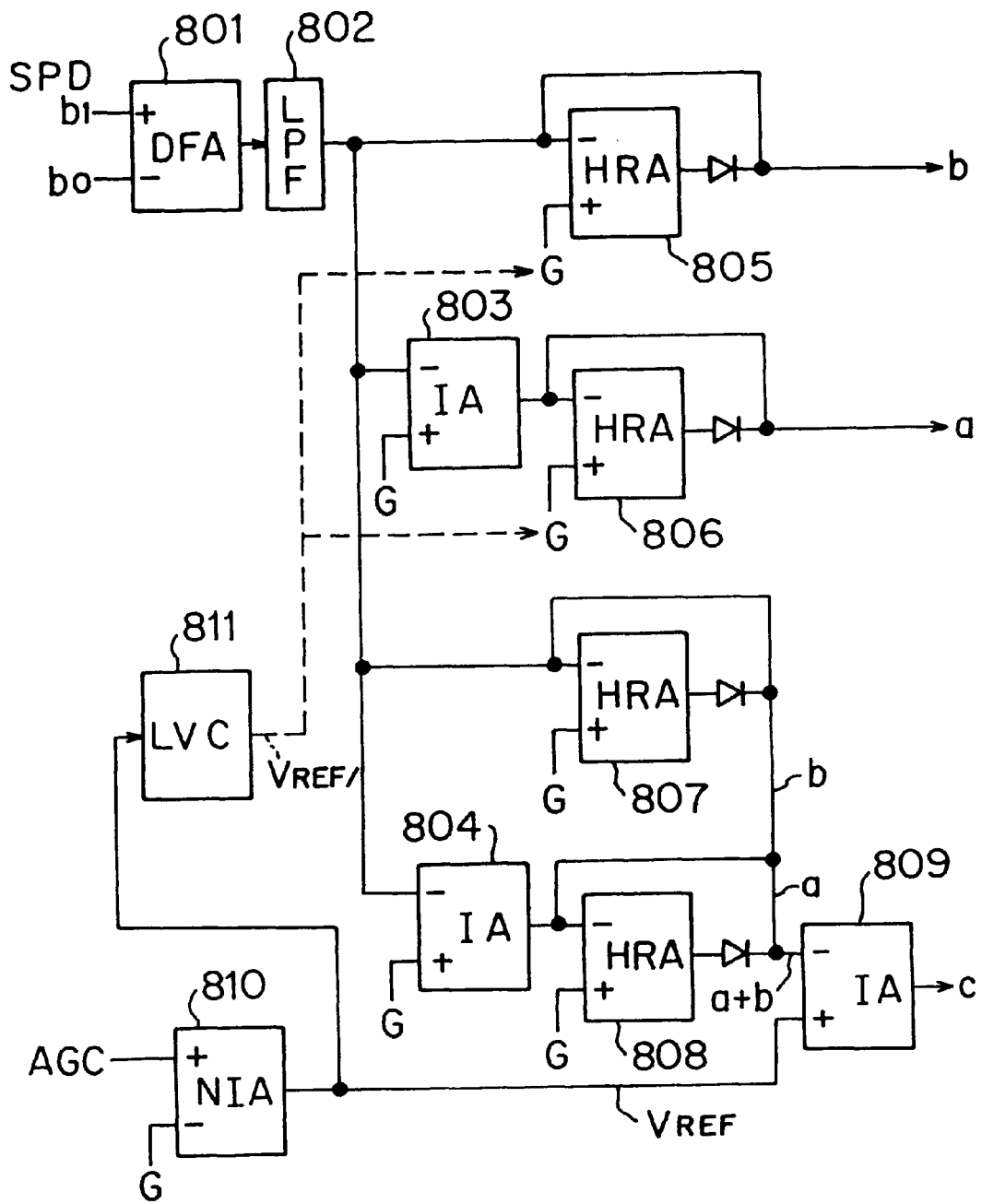
FIG. 38 is a block diagram showing a construction of a mixing ratio production section of the modified automatic amplitude equalizer of FIG. 36.

FIG. 38 shows in block diagram a detailed construction of the mixing ratio production section 80B. Referring to FIG. 38, the mixing ratio production section 80B includes a differential amplification circuit (DFA) 801, a low pass filter (LPF) 802, a pair of inversion amplification circuits (IA) 803 and 804, four half wave rectification circuits (HRA) 805 to 808, a further inversion amplification circuit (IA) 809, a non-inversion amplification circuit (NIA) 810 and a level converter (LVC) 811.

The differential amplification circuit 801 converts a difference between signal levels of the 2 bits ($b_1$, $b_0$) of a detection signal SPD of a first-order inclination distortion into a voltage signal. The low pass filter (integrator) 802 integrates the output (distortion detection signal) of the differential amplification circuit 801, that is, a result of detection of a first-order inclination distortion of an IF signal. The inversion amplification circuits 803 and 804 invert a distortion detection signal integrated by the low pass filter 802 with a gain equal to 1 and output resulted signals to the half wave rectification circuits 806 and 808, respectively.

The half wave rectification circuit 805 outputs, when the distortion detection signal from the low pass filter 802 is in the negative, a voltage signal of a positive level which increases in proportion to an input thereto, but outputs, when the distortion detection signal is equal to zero or in the positive, a voltage signal of zero, as a mixing ratio control voltage b. The half wave rectification circuit 806 outputs, when the distortion detection signal inverted by the inversion amplification circuit 803 is in the positive, a voltage signal of a positive level which increases in proportion to an input thereto, but outputs, when the inverted distortion detection signal is equal to zero or in the negative, a voltage signal of zero, as a mixing ratio control signal a.

Further, the half wave rectification circuit 807 produces a signal b similar to the mixing ratio control signal b, and the half wave rectification circuit 808 produces a signal a similar to the mixing ratio control signal a. The inversion amplification circuit 809 inverts a voltage signal (a+b) added at a negative (−) input terminal thereof in response to a positive reference voltage level $V_{REF}$ (where $V_{REF} \geq MAX(a+b)$) inputted to a positive (+) input terminal thereof, and outputs a signal of the thus inverted voltage signal as a mixing ratio control signal c.

The non-inversion amplification circuit 810 supplies a reference voltage corresponding to an AGC signal from the amplitude detection section 60 to the half wave rectification circuits 805 and 806 and the inversion amplification circuit 809. The level converter 811 receives the output of the non-inversion amplification circuit 810 and converts it into a voltage signal $V_{REF}$, level shifted in the opposite direction to the reference voltage level $V_{REF}$ with respect to the ground level G. The mixing ratio production section 80B may otherwise be constructed such that, as indicated by broken lines in FIG. 38, the voltage signal $V_{REF}$, is applied to the positive (+) input terminals of the half wave rectification circuits 805 and 806.

In the mixing ratio production section 80B constructed in such a manner as described above, a difference between signal levels of the 2 bits ($b_1$, $b_0$) of a detection signal SPD of a first-order inclination distortion of an input signal is converted into a voltage signal by the differential amplification circuit 801.

In particular, the detection signal (0, 1) of a positive inclination distortion is converted into a negative voltage signal in accordance with a result of the subtraction of the logic 0 level–the logic 1 level; the detection signal (1, 0) of a negative inclination distortion is converted into a positive voltage signal in accordance with a result of the subtraction of the logic 1 level–the logic 0 level; and the detection signal (0, 0 or 1, 1) of a zero inclination distortion is converted into a zero voltage signal. Then, any voltage signal obtained by the differential amplification circuit 801 is integrated by the low pass filter 802 (integrator).

The half wave rectification circuit 805 outputs, when the distortion detection signal from the low pass filter 802 is in the negative, a voltage signal of a positive level which increases in proportion to the input thereto, but outputs, when the distortion detection signal is equal to zero or in the positive, a zero voltage signal, as a mixing ratio control signal b which has such a voltage waveform as illustrated in FIG. 35(a).

Further, the inversion amplification circuit 803 outputs the distortion detection signal after inverted with the gain of 1 to the half wave rectification circuit 806. Consequently, the half wave rectification circuit 806 outputs, when the distortion detection signal is in the positive, a voltage signal of a positive level which increases in proportion to the input thereof, but outputs, when the distortion detection signal is equal to zero or in the negative, a zero voltage signal, as a mixing ratio control signal a having such a voltage waveform as shown in FIG. 35(a).

Similarly, a signal b equivalent to the mixing ratio control signal b is outputted from the half wave rectification circuit 807, and a signal a equivalent to the mixing ratio control signal a is outputted from the half wave rectification circuit 808. Then, the signals a and b are added to each other (a+b) at the negative (−) input terminal of the inversion amplification circuit 809 while the positive reference voltage level $V_{REF}$ is inputted to the positive (+) input terminal of the inversion amplification circuit 809.

As a result, a voltage signal having an inverted form of the voltage signal (a+b) (for example, when (a+b)=0, $V_{REF} \geq MAX(a+b)$) appears, at the output of the inversion amplification circuit 809, as a mixing ratio control signal c having such a voltage waveform as shown in FIG. 35(a).

In short, the mixing ratio production section 80B produces, as the mixing ratio control signals a to c, such signals which maximize the mixing rate of the output of the zero inclination amplitude equalization section 203 and minimize the mixing rates of the outputs of the positive inclination amplitude equalization section 202 and the negative inclination amplitude equalization section 204 when a result of integration of a characteristic of a first-order inclination distortion detected by the spectrum distortion detection section 70 exhibits a zero inclination distortion, but increase, when the result of integration exhibits a negative inclination distortion, the mixing rate of the output of the positive inclination amplitude equalization section 202 so as to cancel the negative inclination distortion, and decrease, when the result of integration exhibits a positive inclination distortion, the mixing rate of the output of the negative inclination amplitude equalization section 204 so as to cancel the positive inclination distortion.

It is to be noted that a modified form of the mixing ratio production section 80 in which the reference voltage level V$_{REF}$ is fixed in the inside thereof has such a construction as that of the mixing ratio production section 80A shown in FIG. 34.

The mixing ratio production section 80B shown in FIG. 38 further includes the non-inversion amplification circuit 810, and an AGC signal from the amplitude detection section 60 is inputted to the "+" input terminal of the non-inversion amplification circuit 810. The AGC signal exhibits a predetermined positive reference voltage level AGCREF when a demodulated base band signal BBS at each symbol timing is equal to a prescribed symbol level. The output level of the non-inversion amplification circuit 810 corresponding to the positive reference voltage level AGCREF is the reference voltage level VREF mentioned hereinabove.

Then, for example, if the digital demodulated signal (BBS) exceeds the prescribed symbol level by some reason and consequently the level of the AGC signal drops, then also the reference voltage level V$_{REF}$ drops and also the level of the mixing ratio control signal c drops. Consequently, the contribution of the zero inclination amplitude equalization section 203 decreases relatively, and the gain of the system decreases.

On the other hand, if the demodulated base band signal BBS drops lower than the prescribed symbol level and consequently the level of the AGC signal rises, then also the reference voltage level V$_{REF}$ rises and also the level of the mixing ratio control signal c rises. Consequently, the contribution of the zero inclination amplitude equalization section 203 increases relatively, and the gain of the system increases.

In short, since ACC control is performed only with the contribution of the zero inclination amplitude equalization section 203, this control can be performed very readily.

It is to be noted that the mixing ratio production section 80B may alternatively be constructed such that the output of the non-inversion amplification circuit 810 is inputted to the level converter 811, by which it is converted into a voltage signal V$_{REF}$ level shifted in the opposite direction to the reference voltage level V$_{REF}$ with respect to the ground level G, and the voltage signal V$_{REF}$, is inputted to the + input terminals of the half wave rectification circuits 805 and 806. With the alternative construction, not only the contribution of the zero inclination amplitude equalization section 203 but also the contributions of the positive inclination amplitude equalization section 202 and the negative inclination amplitude equalization section 204 are increased or decreased simultaneously, and the loop gain of AGC control is increased.

Or, the half wave rectification circuits 805 to 808 may be replaced by a function generation circuit. With the alternative arrangement just mentioned, not the mixing ratio control signals a to c which vary linearly as seen in FIG. 35(*a*) but mixing ratio control signals a to c which vary in arbitrary curves can be obtained, which allows the amplitude equalization characteristic or the AGC characteristic to vary dynamically in response to a distortion detection signal.

Figure 39:
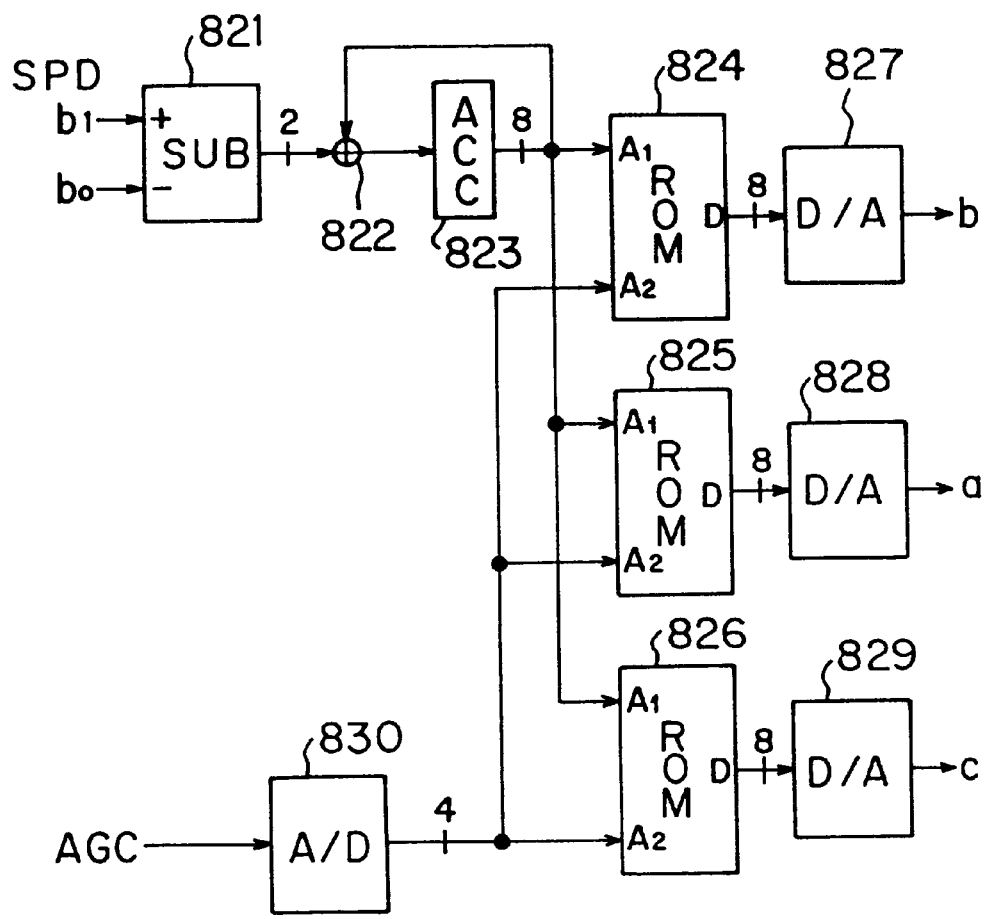
FIG. 39 is a block diagram showing another construction of the mixing ratio production section of the modified automatic amplitude equalizer of FIG. 36.

FIG. 39 shows in block diagram another construction of the mixing ratio production section 80B. Referring to FIG. 39, the mixing ratio production section 80B shown includes a subtractor (SUB) 821, an adder 822, an accumulator (ACC) 823, three ROMs 824 to 826, three digital to analog converters (D/A) 827 to 829, and an analog to digital converter (A/D) 830.

In the mixing ratio production section 80B shown in FIG. 39, the subtractor 821 calculates a difference of a 2-bit signal (b1, b0) of a detection signal SPD of a spectrum distortion and outputs a 2-bit signal including one bit for the sign of positive or negative and the other bit for a magnitude. In particular, the detection signal (0, 1) of a positive inclination distortion is converted into a 2-bit signal of "−1" by calculation of (0-1), but the detection signal (1, 0) of a negative inclination distortion is converted into another 2-bit signal of "+1" by calculation of (1-0). On the other hand, the distortion detection signal (0, 0 or 1, 1) of a zero inclination is converted into a 2-bit signal of "0" by calculation of (0-0) or (1-1).

The adder 822 cumulatively adds (integrates) the output signal of the subtractor 821 into the accumulator 823. Meanwhile, the analog to digital converter 830 converts an AGC signal from the amplitude detection section 60 into a digital signal (for example, of 4 bits).

The output of the accumulator 823 is inputted to address inputs A1 of the ROMs (conversion memories) 824 to 826, and the output of the analog to digital converter 830 is inputted to address inputs A2 of the ROMs 824 to 826. It is to be noted that whichever ones of the address inputs A1 and A2 may be upper or lower addresses.

The ROMs 824 to 826 store control signal data b, a and c of such characteristics as illustrated in FIG. 35(*a*) at an address thereof corresponding to the address input A1 (distortion detection signal). The values of the control signal data b, a and c are level shifted in a required direction or adjusted so as to vary the amplification degrees in response to the address inputs A2 (AGC signal).

The control signal data b, a and c (for example, of 8 bits) read out from the ROMs 824 to 826 are converted into mixing ratio control signals b, a and c of analog voltages by the digital to analog converters 827 to 829, respectively.

In this manner, in the mixing ratio production section shown in FIG. 39, since the ROMs 824 to 826 are employed as a function generation circuit, any mixing ratio control signals b, a and c can be generated very readily. For example, optimum control functions b, a and c determined based on external simulation can be incorporated into the ROMs 824 to 826 readily.

It is to be noted that the address bit number and the data bit number of the ROMs 824 to 826 may each be an arbitrary number. Further, in place of the ROMs 824 to 826, such control of a control voltage as described hereinabove with reference to FIG. 38 may be realized using logic circuits.

o. Fourteenth Embodiment

Figure 40:
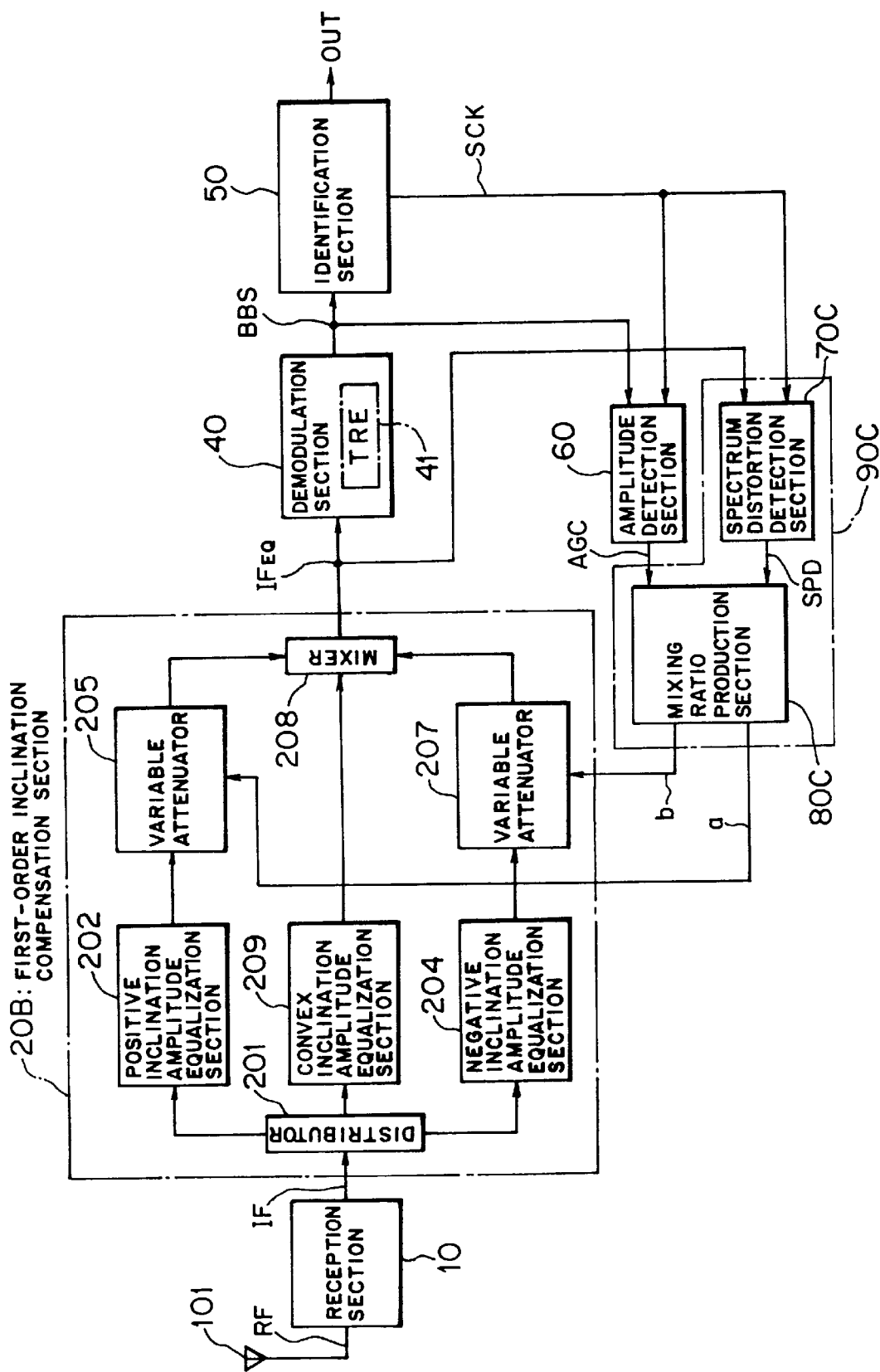
FIG. 40 is a block diagram of a yet further automatic amplitude equalizer showing a fourteenth preferred embodiment of the present invention.

FIG. 40 shows in block diagram a construction of an automatic amplitude equalizer according to a fourteenth preferred embodiment of the present invention. Referring to FIG. 40, the automatic amplitude equalizer of the present embodiment is a modification to and is different from the automatic amplitude equalizer of the thirteenth embodiment shown in FIG. 34 in that it includes, in place of the first-order inclination compensation section 20A in the thirteenth embodiment, a first-order inclination compensation section 20B constructed using a convex inclination amplitude equalization section 209 and includes, in place of the control section 90A, a control section 90C which includes a spectrum distortion detection section 70C and a mixing ratio production section 80*c*.

The convex inclination amplitude equalization section 209 is formed from an LC resonance circuit having a center frequency of f0, and an output thereof is inputted at a fixed mixing rate to the mixer 208 without passing a variable attenuator.

In particular, the first-order inclination compensation section 20B in the present embodiment includes a pair of variable attenuators 205 and 207 corresponding to the positive inclination amplitude equalization section 202 and the negative inclination amplitude equalization section 204, respectively. Then, the attenuation amounts of the variable attenuators 205 and 207 are individually controlled in response to mixing ratio control signals a and b produced by the control section 90C, which will be hereinafter described, so that the outputs of the positive inclination amplitude equalization section 202 and the negative inclination amplitude equalization section 204 are mixed at individually variable mixing rates while the output of the convex inclination amplitude equalization section 209 is mixed at a fixed mixing rate.

The control section 90C detects a first-order inclination distortion of a digital demodulated signal of an IF signal obtained by the demodulation section 40 and produces, in response to a result of such detection, mixing ratio control signals a and b for controlling mixing rates of the outputs of the positive inclination amplitude equalization section 202 and the negative inclination amplitude equalization section 204 of the first-order inclination compensation section 20B. It is to be noted that, also in the present embodiment, an AGC signal from the amplitude detection section 60 is inputted to the mixing ratio production section 80C to realize a unique AGC loop.

Figure 41:
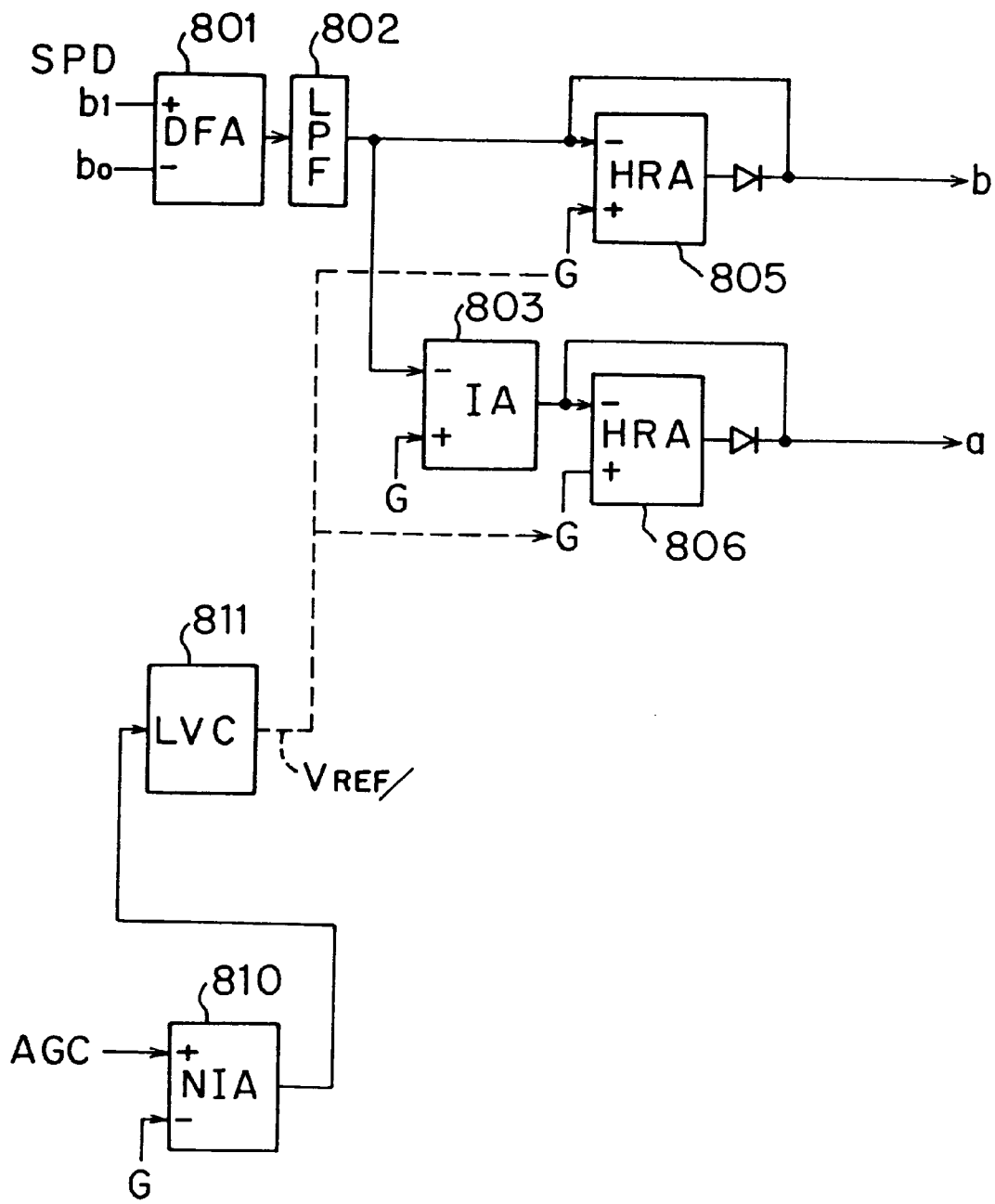
FIG. 41 is a block diagram showing a construction of a mixing ratio production section of the automatic amplitude equalizer of FIG. 40.

Then, the mixing ratio production section 80C in the present embodiment is constructed such that, in order for the output of the convex inclination amplitude equalization section 209 to be mixed at the fixed mixing rate, it eliminates, as seen in FIG. 41, the inversion amplification circuits 804 and 809 and the half wave rectification circuits 807 and 808 of the mixing ratio production section 80B shown in FIG. 38 so as to produce only mixing ratio control signals a and b for controlling the mixing rates of the outputs of the positive inclination amplitude equalization section 202 and the negative inclination amplitude equalization section 204, respectively. It is to be noted that, also in the present embodiment, the spectrum distortion detection section 70C is similar to the spectrum distortion detection section 70B described hereinabove in connection with the thirteenth embodiment.

Also in the automatic amplitude equalizer of the present embodiment having the construction described above, a characteristic (a positive inclination, a negative inclination or a zero inclination) of a first-order inclination distortion of an input signal is detected based on a digital demodulated signal (BBS) originating from the input signal by the spectrum distortion detection section (first-order inclination detection section) 70C. Then, in response to a result of the detection by the spectrum distortion detection section 70C, mixing ratio control signals a and b are produced by the mixing ratio production section 80C.

More particularly, also in this instance, in the spectrum distortion detection section 70C, the direction in which one of digital demodulated signals I and Q from the input signal, that is, the signal I, moves is discriminated by means of the registers 701 and 702 and the comparators 703 and 704 shown in FIG. 37, and error information E is detected from the other signal Q of the digital demodulated signals I and Q, which is orthogonal to the one signal I, is detected by the subtractor (error information detection section) 705 as described hereinabove with reference to FIG. 37.

Then, based on the correlation between the direction of movement of the signal I and the error information E of the signal Q, a characteristic of the first-order inclination distortion of the input signal is detected by calculation by the decoder (correlation calculation section) 706, and the characteristic thus detected is outputted as a distortion detection signal SPD of 2 bits (b1, b0) to the mixing ratio production section 80C.

Consequently, in the mixing ratio production section 80C, mixing ratio control signals a and b for variably controlling the mixing rates of the outputs of the positive inclination amplitude equalization section 202 and the negative inclination amplitude equalization section 204 of the first-order inclination compensation section 20B are produced as described hereinabove in connection with the modification to the automatic amplitude equalizer of the thirteenth embodiment and then outputted to the first-order inclination compensation section 20B.

More particularly, the mixing ratio production section 80C produces such mixing ratio control signals a and b as will make, when a result of integration of the distortion detection signal SPD conducted by the low pass filter (integrator) 802 exhibits a zero inclination distortion, that is, when the input signal has no first-order inclination distortion, the mixing rates of the outputs of the positive inclination amplitude equalization section 202 and the negative inclination amplitude equalization section 204 equal to each other, and will increase, when the result of integration exhibits a negative inclination distortion, the mixing rate of the output of the positive inclination amplitude equalization section 202 so as to cancel the negative inclination distortion, but will increase, when the result of integration exhibits a positive inclination distortion, the mixing rate of the output of the negative inclination amplitude equalization section 204 so as to cancel the positive inclination distortion.

Figure 42:
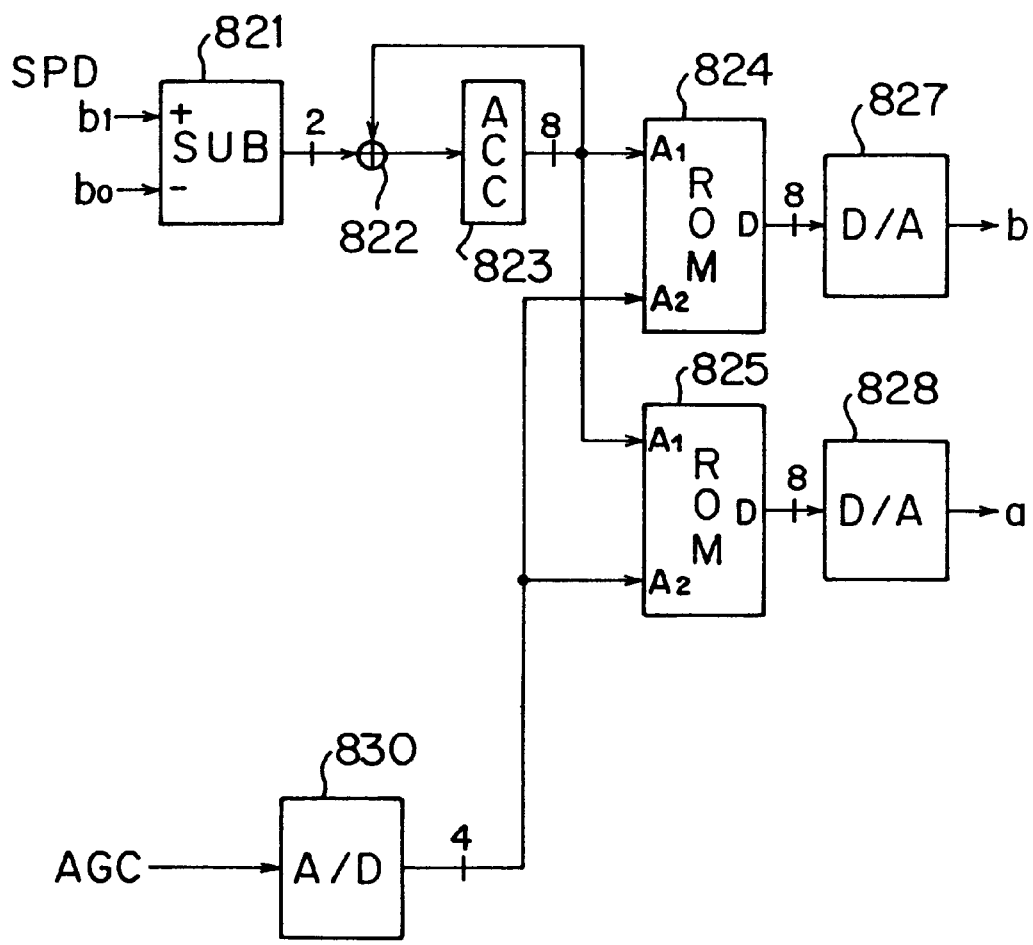
FIG. 42 is a block diagram showing another construction of the mixing ratio production section of the automatic amplitude equalizer of FIG. 40.

It is to be noted that, also in this instance, if the mixing ratio production section 80C is constructed, as shown in FIG. 42, including such subtractor (SUB) 821, adder 822, accumulator (ACC) 823, ROMs (conversion memories) 824 and 825, digital to analog converters (D/A) 827 and 828 and analog to digital converter (A/D) 830 as described hereinabove with reference to FIG. 39, the mixing ratio control signals a and b mentioned above can be obtained with a very simple construction.

Subsequently, an equalization operation of the first-order inclination distortion of the IF signal by the first-order inclination compensation section 20B in response to the mixing ratio control signals a and b obtained in such a manner as described above will be described in detail.

Figure 43A:
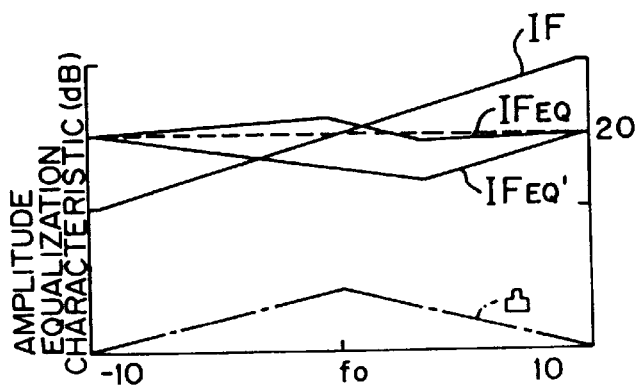
FIGS. 43(a) and 43(b) are diagrams illustrating operation of the automatic amplitude equalizer shown in FIG. 40.
Figure 43B:
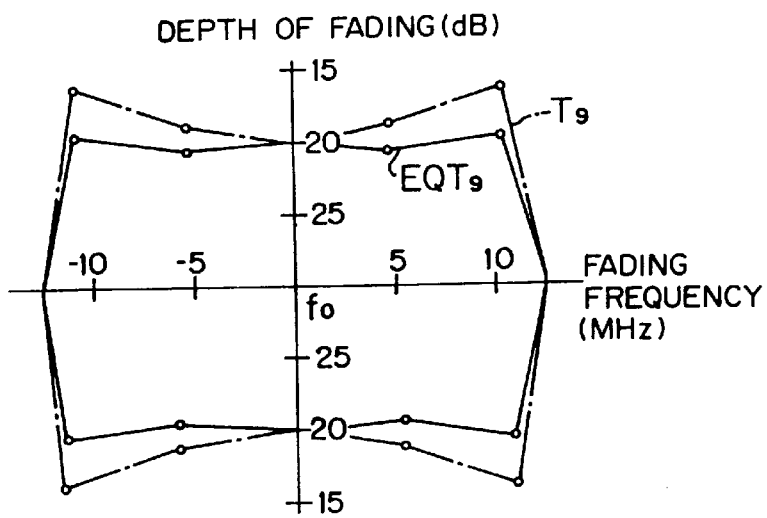
Figure 68B:
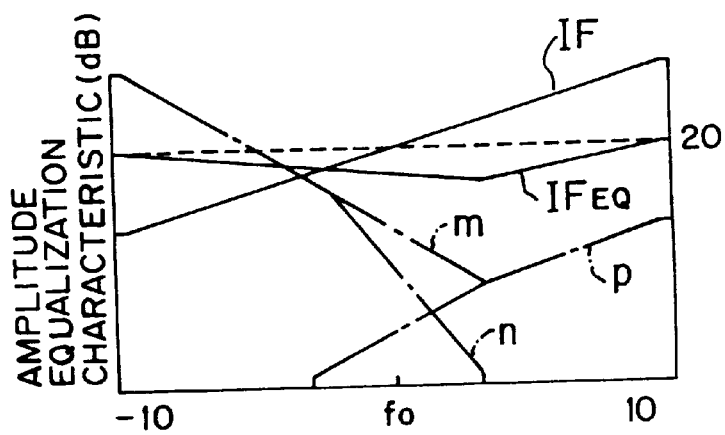

FIGS. 43(a) and 43(b) are diagrams illustrating operation of the equalizer of the present embodiment. Also in this instance, similar operation conditions to those described hereinabove with reference to FIG. 68(b) are presumed. However, equalization characteristics p and n and a composite characteristic m of them are omitted in FIGS. 43(a) and 43(b).

Figure 66:
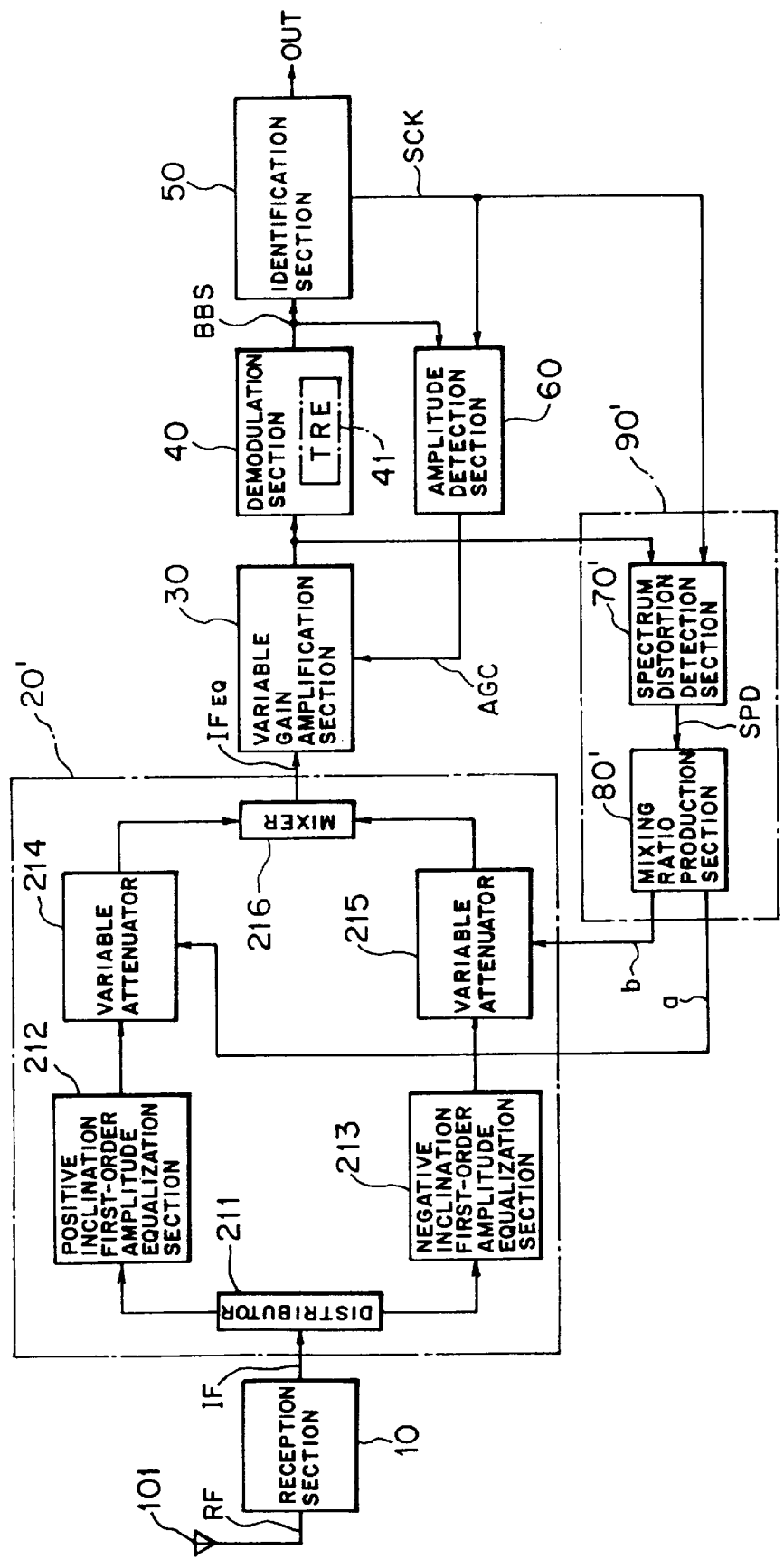
FIG. 66 is a block diagram showing a construction of another ordinary automatic amplitude equalizer.
Figure 67A:
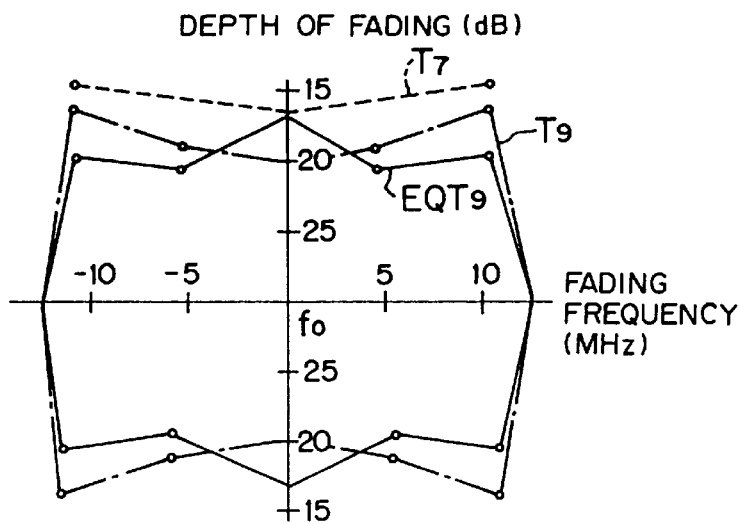
FIGS. 67(a) and 67(b) are diagrams illustrating operation of an ordinary automatic amplitude equalizer.
Figure 67B:
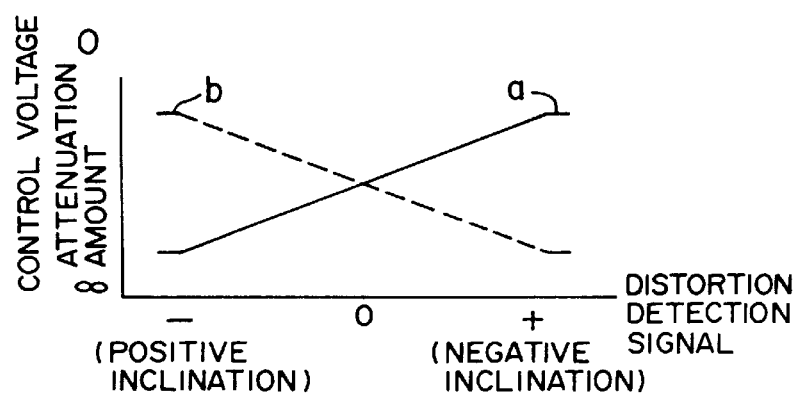

In FIG. 43(a), an IFEQ' signal corresponds to the output of the first-order inclination compensation section 20' described hereinabove with reference to FIG. 66. The IFEQ' signal has such a concave configuration that, as seen in FIG. 43(a), it exhibits deterioration of approximately 3 dB in the proximity of the frequency f0. This deterioration arises from the fact that both of the characteristics p and n have steep inclination (non-linear) characteristics. Consequently, the magnitude of the deterioration is normally fixed.

Therefore, the convex inclination characteristic of the convex inclination amplitude equalization section 209 is selected so as to have such a concave configuration that normally provides an improvement in characteristic of approximately 3 dB in the proximity of the frequency f0 as seen in FIG. 43(b). Here, such a concave configuration as just described can be obtained readily by suitably selecting the sharpness Q of a resonance characteristic of an LC resonance circuit. Accordingly, with the equalizer shown in FIG. 40, the IFEQ' signal is amplitude equalized always with the fixed convex inclination characteristic, and an IFEQ signal having a flat fading characteristic is always obtained at the output of the equalizer.

In this manner, with the automatic amplitude equalizer of the present embodiment, since the first-order inclination compensation section 20B includes, in addition to the positive inclination amplitude equalization section 202 and the negative inclination amplitude equalization section 204, the convex inclination amplitude equalization section 209 and mixes the outputs of the positive inclination amplitude equalization section 202 and the negative inclination amplitude equalization section 204 individually at variable mixing rates whereas it mixes the output of the convex inclination amplitude equalization section 209 at a fixed mixing rate, whether an IF signal (input signal) has a positive inclination distortion or a negative inclination distortion, the first-order inclination distortion of the IF signal can be compensated for with a very high degree of accuracy. As a result, an IFEQ signal having a flat fading characteristic is always obtained at the output of the first-order inclination compensation section 20B.

Accordingly, also where a transversal equalizer, for example, of a high performance having nine taps such as the transversal equalizer 41 is employed, the transversal equalizer (41) can equalize a fading distortion of the depth of up to approximately 20 dB uniformly within the range of the error rate of $10^{-3}$ over the entire IF band. As a result, such a flat equalization characteristic EQT9 as illustrated in FIG. 43(b) can be obtained.

It is to be noted that, while a first-order inclination distortion is automatically equalized by the automatic amplitude equalizer of each of the thirteenth and fourteenth embodiments, the present invention is not limited to this, and for example, where a transmission line distortion is fixed, similar effects can be achieved even if any of the equalization sections 202 to 204, 209 is employed solely for the first-order inclination compensation section 20A, 20B. Further, while the present invention is applied, in the thirteenth and fourteenth embodiments, to an IF signal of the first-order inclination compensation section 20A, 20B, the present invention is not limited to this and can be applied also to a base band signal.

p. Fifteenth Embodiment

Figure 44:
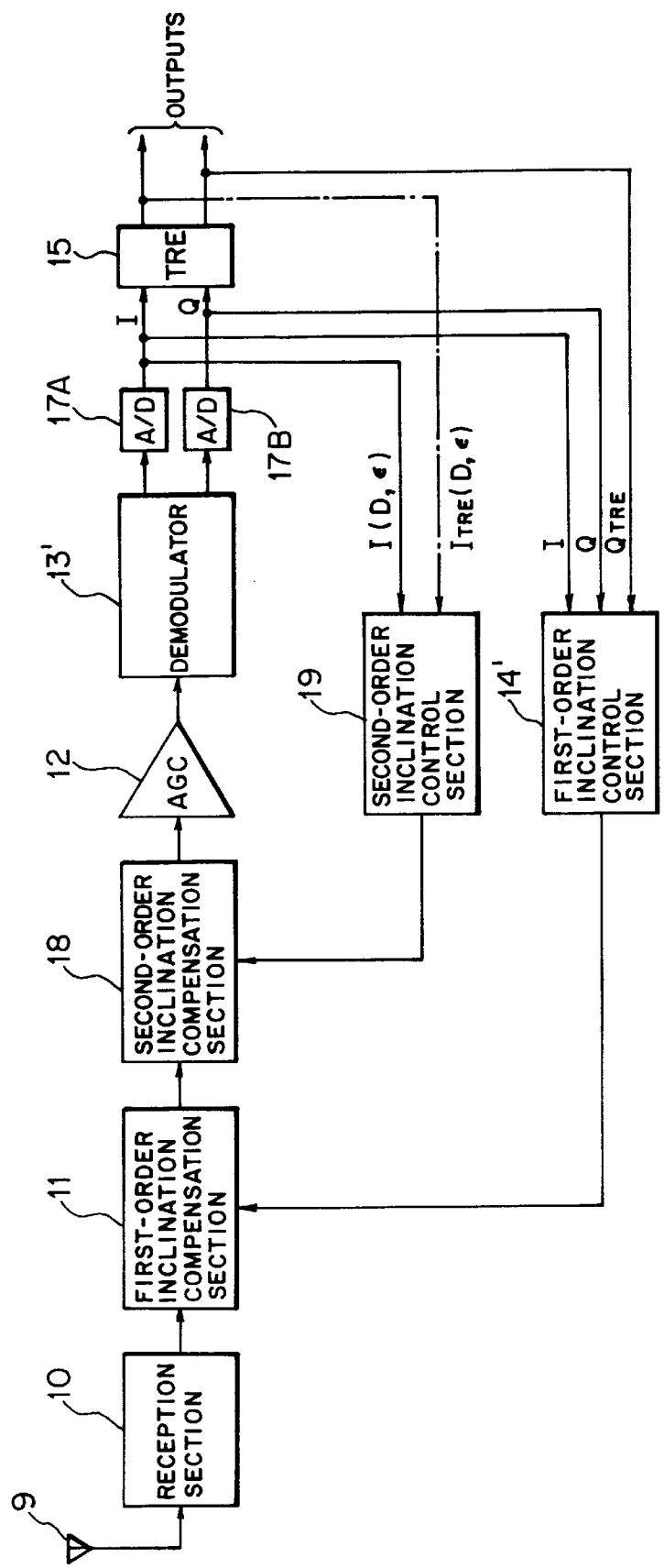
FIG. 44 is a block diagram of a yet further automatic amplitude equalizer showing a fifteenth preferred embodiment of the present invention.

FIG. 44 shows in block diagram a construction of an automatic amplitude equalizer according to a fifteenth preferred embodiment of the present invention. Referring to FIG. 44, the automatic amplitude equalizer shown includes an antenna 9, a reception section 10, a first-order inclination compensation section 11, an automatic gain control section (AGC) 12, a demodulator 13', a first-order inclination control section 14', a transversal equalizer (TRE) 15, a pair of analog to digital converters 17A and 17B, a second-order inclination compensation section 18, and a second-order inclination control section 19. It is to be noted that, in the present embodiment, the first-order inclination compensation section 11 and the second-order inclination compensation section 18 are provided at preceding stages to the demodulator 13'.

The reception section 10 frequency converts (down converts) a RF (radio frequency) signal received by the antenna 9 into an IF (intermediate frequency) signal and outputs the IF signal to the first-order inclination compensation section 11. The first-order inclination compensation section (first-order inclination amplitude equalization section) 11 compensates for the inclination distortion (amplitude characteristic) of the IF signal (input signal) from the reception section 10 in the frequency-domain in accordance with a first-order inclination amplitude characteristic thereof.

Figure 45:
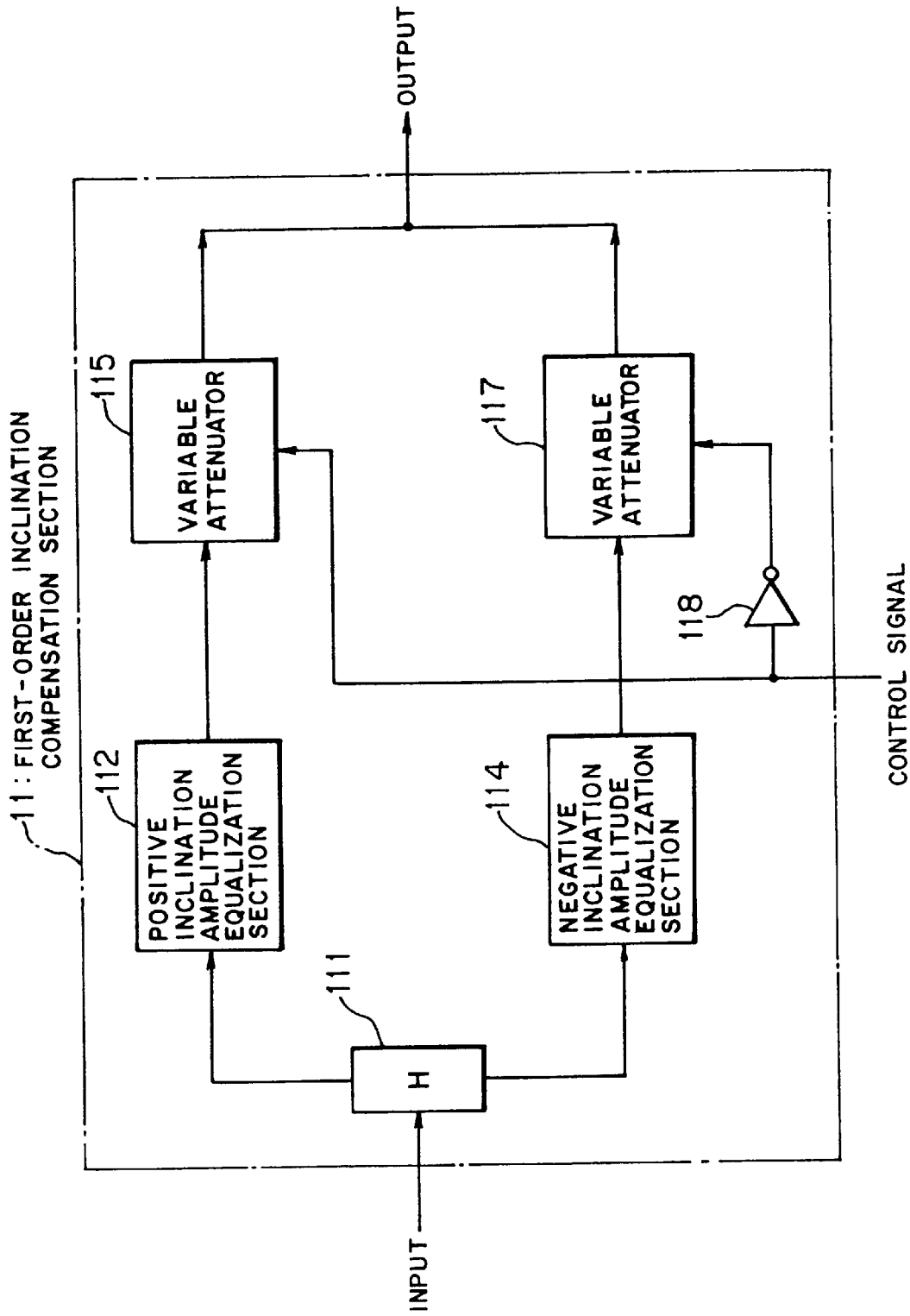
FIG. 45 is a block diagram showing a construction of a first-order inclination compensation section of the automatic amplitude equalizer of FIG. 44.

To this end, also the first-order inclination compensation section 11 in the present embodiment includes, as shown in FIG. 45, similarly as in the first embodiment, a hybrid circuit (H) 111, a positive inclination amplitude equalization section 112 having a first-order inclination amplitude characteristic of a positive inclination in the frequency-domain, a negative inclination amplitude equalization section 114 having a first-order inclination amplitude characteristic of a negative inclination in the frequency-domain, and a pair of variable attenuators 115 and 117.

The automatic gain control section 12 controls the gain of the output signal of the first-order inclination compensation section 11 fixed and outputs a resulted signal to the demodulator 13'. The demodulator 13' orthogonally detects the signal from the first-order inclination compensation section 11 outputted by way of the automatic gain control section 12 to obtain demodulated base band signals I and Q orthogonal to each other. The analog to digital converters 17A and 17B convert the demodulated base band signals I and Q from analog into digital signals to obtain digital demodulated signals I and Q, respectively.

The transversal equalizer 15 equalizes the digital demodulated signals I and Q in the time-domain and outputs resulted signals as equalized signals ITRE and QTRE, respectively.

The first-order inclination control section (first control section) 14' is similar to the control section 14 described hereinabove in connection with the first embodiment, and detects a first-order inclination distortion of the IF signal from the digital demodulated signals I and Q obtained by the demodulator 13' and the analog to digital converters 17A and 17B and outputs a result of the detection as a control signal for the first-order inclination compensation section 11, particularly as a control signal for adjusting the attenuation degrees of the variable attenuators 115 and 117.

Figure 46:
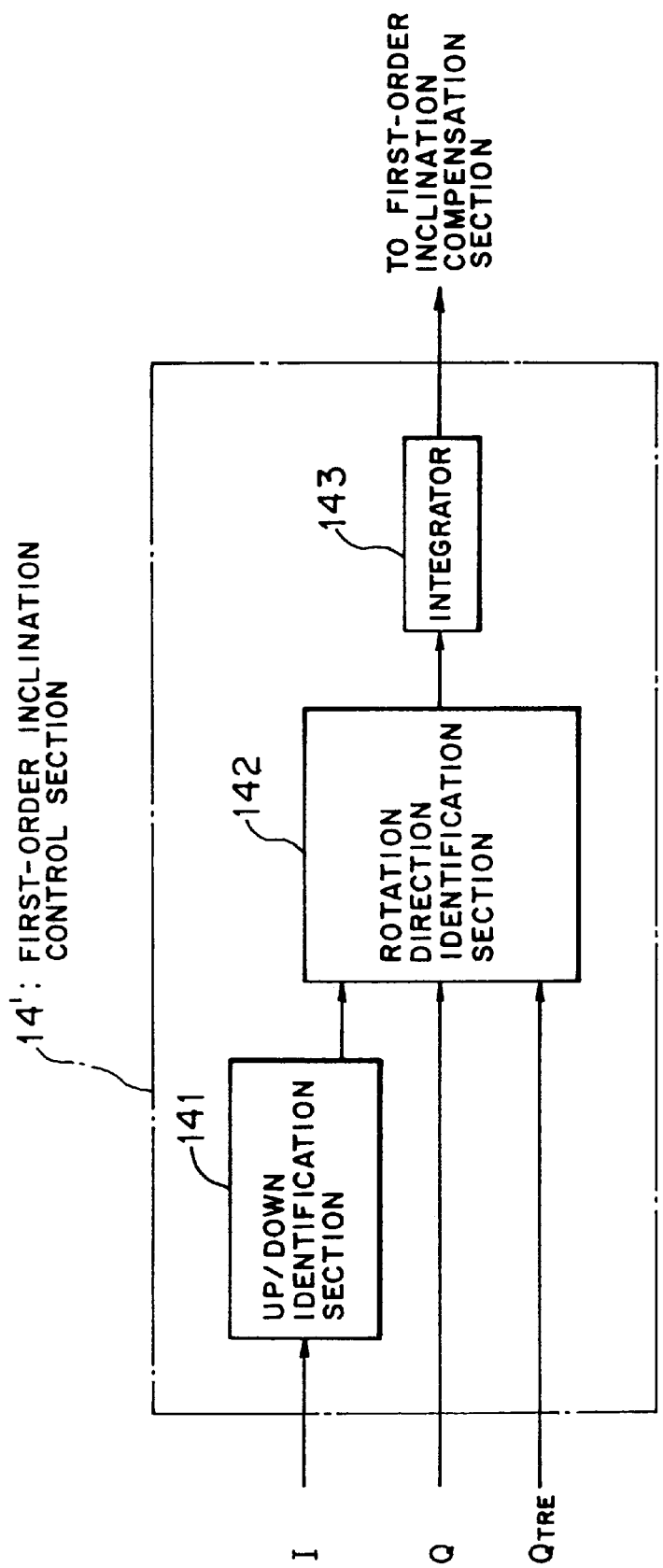
FIG. 46 is a block diagram showing a construction of a first-order inclination control section of the automatic amplitude equalizer of FIG. 44.

To this end, also in the present embodiment, the first-order inclination control section 14' includes, as shown in FIG. 46, an up/down identification section 141, a rotation direction identification section 142 and an integrator 143 which are all similar to those described hereinabove with reference to FIG. 14.

Accordingly, also in this instance, the up/down identification section (signal direction discrimination section) 141 samples one of a pair of digital demodulated signals I and Q, that is, the signal I, in a data clock period and compares different data obtained by such sampling with each other to discriminate the direction in which the signal I moves (the direction of variation of the value of the signal I). The rotation direction identification section (error information detection section, correlation calculation section) 142 detects an error voltage (error information) E=±E from the digital demodulated signal Q orthogonal to the signal I and produces and outputs such a control signal as described above based on the correlation (refer to FIG. 12) between the error information E of the signal Q and the direction of movement of the signal I obtained by the up/down identification section 141. The integrator 143 integrates the control signal obtained by the rotation direction identification section 142.

Figure 47:
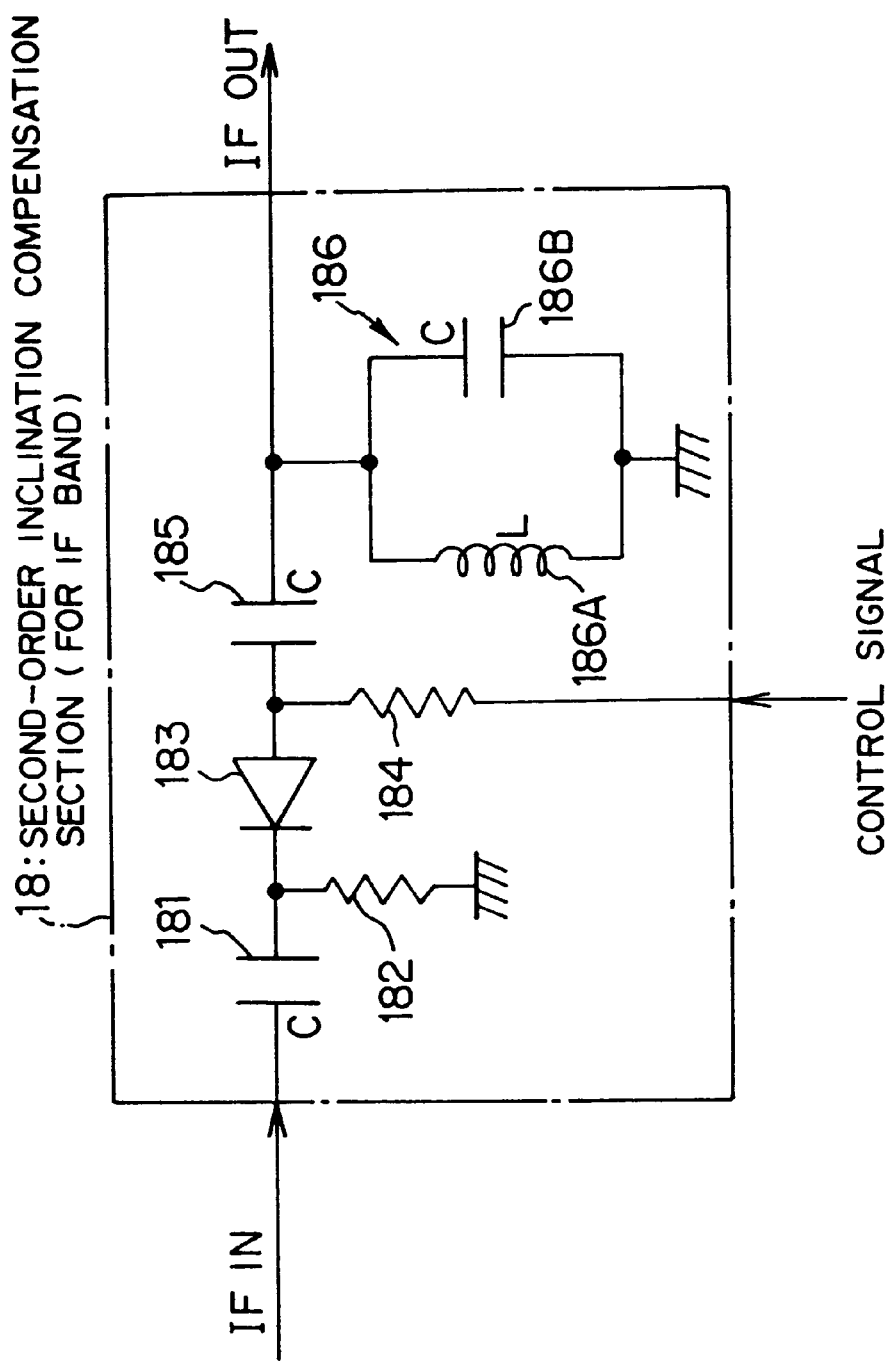
FIG. 47 is a block diagram showing a construction of a second-order inclination compensation section of the automatic amplitude equalizer of FIG. 44.

The second-order inclination compensation section (second-order inclination amplitude equalization section) 18 compensates for an inclination distortion (amplitude characteristic) of an IF signal in the frequency-domain in accordance with a second-order inclination amplitude characteristic thereof. The second-order inclination compensation section 18 includes, as shown in FIG. 47, a pair of capacitors 181 and 185, a pair of resistors 182 and 184, a PIN diode 183, and a resonance circuit 186 formed from a coil (L) 186A and a capacitor (C) 186B.

Figure 48:
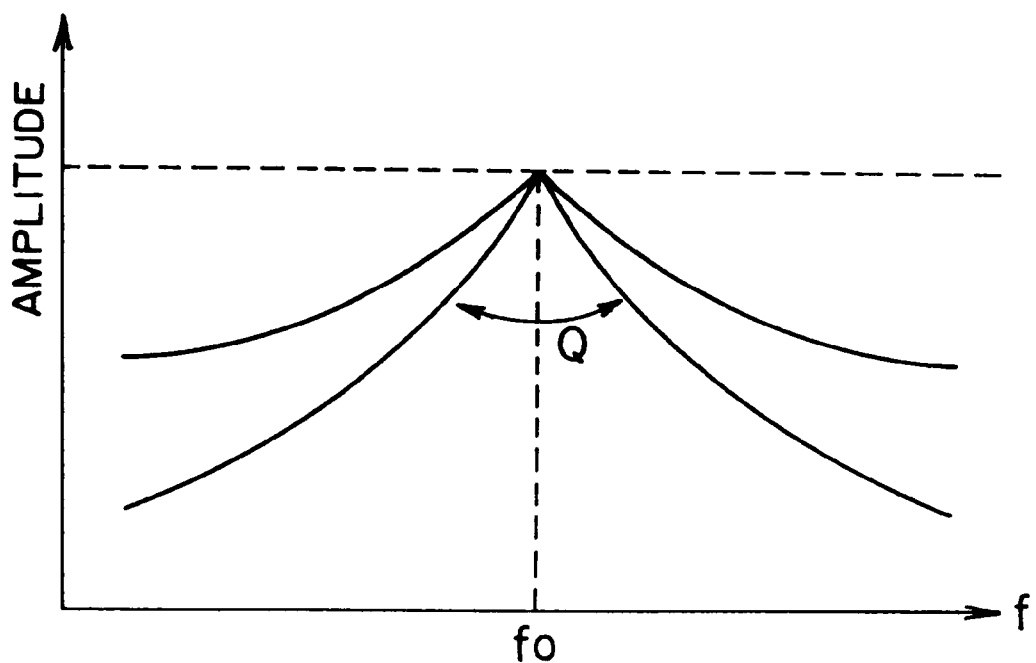
FIG. 48 is a diagram illustrating an example of a resonance characteristic of the second-order inclination compensation section of FIG. 47.

The resonance circuit 186 generates a resonance signal having such a resonance characteristic (second-order inclination amplitude characteristic) that, for example, where the center frequency of a received IF signal is f0, the resonance signal exhibits a maximum amplitude in the proximity of the frequency f0 as seen in FIG. 48. Here, the resistance value of the PIN diode 183 is controlled in response to a control signal from the second-order inclination control section 19, which will be hereinafter described, to control the sharpness "Q" of the resonance characteristic of the resonance circuit 186 so that the second-order inclination distortion of the IF signal is equalized (compensated for) in accordance with the second-order inclination amplitude characteristic.

The second-order inclination control section (second control section) 19 is an essential component in the present embodiment, and detects a second-order inclination distortion (second-order inclination amplitude characteristic) of an IF signal from a digital demodulated signal I (or Q), produces a control signal for the second-order inclination compensation section 18, that is, a control signal for controlling the sharpness "Q" of the resonance circuit 186 described above, based on a result of the detection and outputs the control signal to the second-order inclination compensation section 18.

Figure 49:
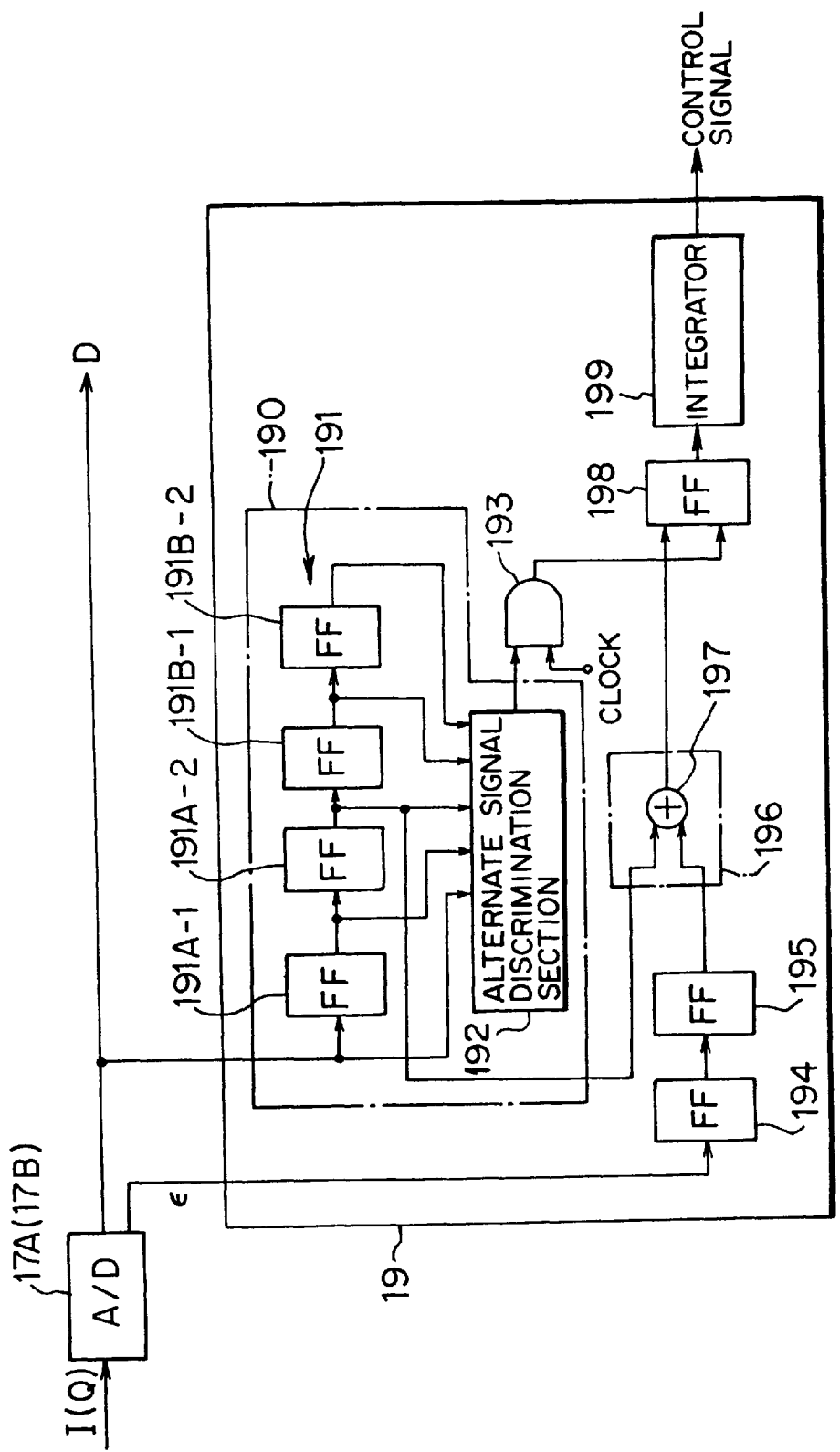
FIG. 49 is a block diagram showing a construction of a second-order inclination control section of the automatic amplitude equalizer of FIG. 44.

To this end, the second-order inclination control section 19 includes, as shown in FIG. 49, a signal condition supervision section 190, an AND gate 193, a pair of flip-flop circuits (FF) 194 and 195, a second-order inclination detection section 196, a further flip-flop circuit (FF) 198 and an integrator 199.

The signal condition supervision section 190 supervises the variation condition of signal data (values) D of a digital demodulated signal I (or Q) to detect whether or not, where a received eye pattern has, for example, two values as hereinafter described, the values "1" and "0" alternately appear repetitively. To this end, in the present embodiment, the signal condition supervision section 190 includes, as shown in FIG. 49, a delay section 191 formed from four flip-flop circuits (FF) 191A-1, 191A-2, 191B-1 and 191B-2, and an alternate signal discrimination section 192. It is to be noted that, while the following description proceeds based on the presumption that the received eye pattern has two values ("1", "0") for convenience of description, the description similarly applies to any other case wherein the received eye pattern has more than two values.

The flip-flop circuits (delay elements) 191A-1, 191A-2, 191B-1 and 191B-2 successively delay a digital demodulated signal I (Q) obtained by the analog to digital converter 17A (analog to digital converter 17B) each by a required time. In the present embodiment, defining signal data D to the second-order inclination detection section 196, which will be hereinafter described, as an origin, the signal data D is delayed by the two preceding stages (flip-flop circuits 191A-1 and 191A-2) and the two following stages (flip-flop circuits 191B-1 and 191B-2) so that signal data D at totaling five different points of time are obtained.

It is to be noted that the delay section 191 may generally be constructed from M preceding stages and N following stages including flip-flop circuits 191A-1 to 191A-M (M is a natural number) and flip-flop circuits 191B-1 to 191B-N (N is a natural number), respectively.

The alternate signal discrimination section (particular signal condition discrimination section) 192 discriminates whether or not the signal data D of the digital demodulated signal I from the flip-flop circuits 191A-1, 191A-2, 191B-1 and 191B-2 are in a condition (particular variation condition) in which the values "1" and "0" alternately appear repetitively. If it is discriminated that the signal data D are in the condition wherein the values "1" and "0" alternately appear repetitively, a "H" level signal is outputted from the alternate signal discrimination section 192.

The AND gate 193 logically ANDs two inputs thereto and thus outputs, when a result of discrimination by the alternate signal discrimination section 192 and a required timing clock pulse both exhibit a "H" level, a "H" level signal.

The second-order inclination detection section 196 detects a second-order inclination distortion of the IF signal based on the correlation between the signal data D of the digital demodulated signal I after delayed by the flip-flop circuits 191A-1 and 191A-2 and an error signal (error information) e produced based on an error between an identification level at the analog to digital converter 17A and a symbol level of the signal data D. In the present embodiment, the second-order inclination detection section 196 employs an EX-OR gate (exclusive OR operation element) 197 by which logical exclusive ORing of the data D of the digital demodulated signal I and the error information e is performed.

It is to be noted that, if the second-order inclination detection section 196 is constructed such that signal data D of an equalized signal I$_{TRE}$ (Q$_{TRE}$) obtained by processing of the digital demodulated signal I (or Q) further by means of the transversal equalizer 15 as indicated by an arrow mark of an alternate long and short dash line in FIG. 44 and the error signal ε are logically exclusively ORed by the EX-OR gate 197, then the second-order inclination distortion of the IF signal can be detected with a higher degree of accuracy based on the correlation between the signal data D and the error signal ε.

The flip-flop circuits 194 and 195 serve as delay elements provided corresponding to the flip-flop circuits 191A-1 and 191A-2 so that operation timings regarding data D of the digital demodulated signal I and the error information e at the second-order inclination detection section 196 may coincide with each other.

The flip-flop circuit 198 latches a result of such operation by the EX-OR gate 197 of the second-order inclination detection section 196, that is, a detected second-order inclination distortion of the IF signal and outputs the result of detection each time a "H" level signal is received from the AND gate 193. The integrator 199 integrates the result of detection from the flip-flop circuit 198 to average it and outputs a resulted signal as a control signal for the second-order inclination compensation section 18.

In short, the second-order inclination control section 19 shown in FIG. 49 outputs a control signal for the second-order inclination compensation section 18 based on a second-order inclination distortion of an IF signal detected by the second-order inclination detection section 196 when it is discriminated by the signal condition supervision section 190 that signal data D of a digital demodulated signal I are in a particular variation condition wherein, for example, the values "1" and "0" alternately appear repetitively.

In the automatic amplitude equalizer of the present embodiment constructed in such a manner as described above, a first-order inclination distortion of an IF signal is detected by the first-order inclination control section 14', and a control signal for the first-order inclination compensation section 11 is produced in accordance with a result of the detection and is outputted to the variable attenuators 115 and 117 of the first-order inclination compensation section 11.

More particularly, also in the present embodiment, in the first-order inclination control section 14', the direction in which one of a pair of digital demodulated signals I and Q obtained by way of the demodulator 13' and the analog to digital converters 17A and 17B, that is, the signal I, moves is discriminated by the up/down identification section 141, and a difference between the digital demodulated signal Q and an equalized signal Q$_{TRE}$ obtained by processing of the signal Q further by means of the transversal equalizer 15 is calculated by the rotation direction identification section 142 to detect error information E of the signal Q.

Then, the rotation direction identification section 142 detects a characteristic (a positive inclination, a negative inclination or a zero inclination) of the first-order inclination distortion of the IF signal based on the correlation (refer to FIG. 12) between the direction of movement of the signal I and the error information E of the signal Q, and outputs a result of the detection as a control signal for the first-order inclination compensation section 11.

Consequently, in the first-order inclination compensation section 11, the outputs of the positive inclination amplitude equalization section 112 and the negative inclination amplitude equalization section 114 are thus mixed at a variable mixing ratio after they are attenuated by the variable attenuators 115 and 117 the attenuation degrees of which are adjusted in response to the control signal from the first-order inclination control section 14'. As a result, the first-order inclination distortion of the IF signal is cancelled and compensated for with certainty in accordance with the first-order inclination amplitude characteristic of the first-order inclination compensation section 11 by the first-order inclination compensation section 11.

Further, in the present equalizer, a second-order inclination distortion of the IF signal is detected from the digital demodulated signal I (or Q) by the second-order inclination control section 19, and a control signal for the second-order inclination compensation section 18 is outputted in accordance with a result of the detection to the second-order inclination compensation section 18. Consequently, in addition to the first-order inclination distortion of the IF signal, also the second-order inclination distortion is compensated for.

In the following, a principle of detection of a second-order inclination distortion of an IF signal by the second-order inclination control section 19 will be described in detail.

Figures 50A, 50B, 50C:
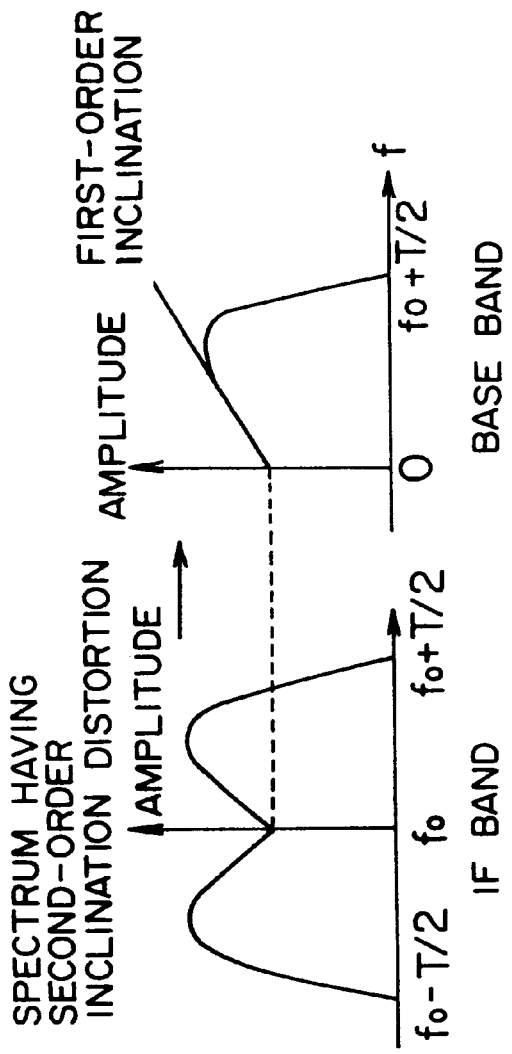

First, an IF signal obtained by down conversion by the reception section 10 has, when it does not suffer from a distortion of fading or the like in the space, such a normal spectrum as illustrated, for example, in FIG. 50(a), but has, when the IF signal suffers from a second-order inclination distortion, such a spectrum as illustrated in FIG. 50(b) wherein it exhibits a concave in the proximity of the center frequency f$_0$.

If the IF signal having such a second-order inclination distortion as described above is demodulated by the demodulator 13', then the spectrum of one channel of demodulated base band signals I and Q originating from the IF signal exhibits a first-order inclination distortion as shown in FIG. 50(c), in short, exhibits a difference in amplitude between a component having a low frequency and another component having a high frequency.

Accordingly, conversely if an amplitude difference (distortion amount) between a component having a high frequency and another component having a low frequency of the demodulated base band signal I can be detected, then a second-order inclination distortion of the IF signal before demodulated by the demodulator 13' can be detected readily.

Therefore, in the present embodiment, a signal of a component of a high frequency is detected by the signal condition supervision section 190, and a distortion amount of the signal is detected by the second-order inclination detection section 196 to detect a second-order inclination distortion of the IF signal.

Here, a signal of a component of a high frequency follows such a route as indicated by arrow marks on a reception eye pattern shown in FIG. 51(a). Then, if such a signal of a component of a high frequency as just mentioned is converted from an analog to a digital signal in accordance with an optimum analog to digital conversion timing which exhibits a "H" level at each point at which the eye (opening) of the reception eye pattern opens in the maximum as shown in FIG. 51(b), then resulted signal data D exhibit alternate repetitions of "0" and "1" (alternate data).

Accordingly, if the signal data D of the digital demodulated signal I are alternate data which alternately exhibit "0" and "1", then the signal can be discriminated to be a signal of a component of a high frequency.

Discrimination based on the theory described above is performed by the signal condition supervision section 190. In particular, data D of the digital demodulated signal I from the analog to digital converter 17A are individually delayed by predetermined delay times by the flip-flop circuits 191A-1, 191A-2, 191B-1 and 191B-2 and outputted to the alternate signal discrimination section 192, by which it is discriminated with certainty whether or not the signal data D are alternate data which alternately exhibit "0" and "1".

If it is determined that the signal data D are alternate data, then a "H" level signal is outputted from the alternate signal discrimination section 192.

Meanwhile, since a distortion amount of a signal of a component of a high frequency is a distortion amount of the digital demodulated signal I when it is determined by the signal condition supervision section 190 that the signal data D of the digital demodulated signal I are alternate data, an error signal ε of the digital demodulated signal I may be detected as the distortion amount of a signal of a component of a high frequency.

Here, it is known that the distortion amount of the digital demodulated signal I can be obtained by logical exclusive ORing of the signal data D and the error signal ε of the digital demodulated signal I. Thus, in the present embodiment, the second-order inclination detection section 196 detects a distortion amount of the digital demodulated signal I by logically exclusively ORing the signal data D and the error signal ε of the digital demodulated signal I by means of the EX-OR gate 197.

Figure 52A:
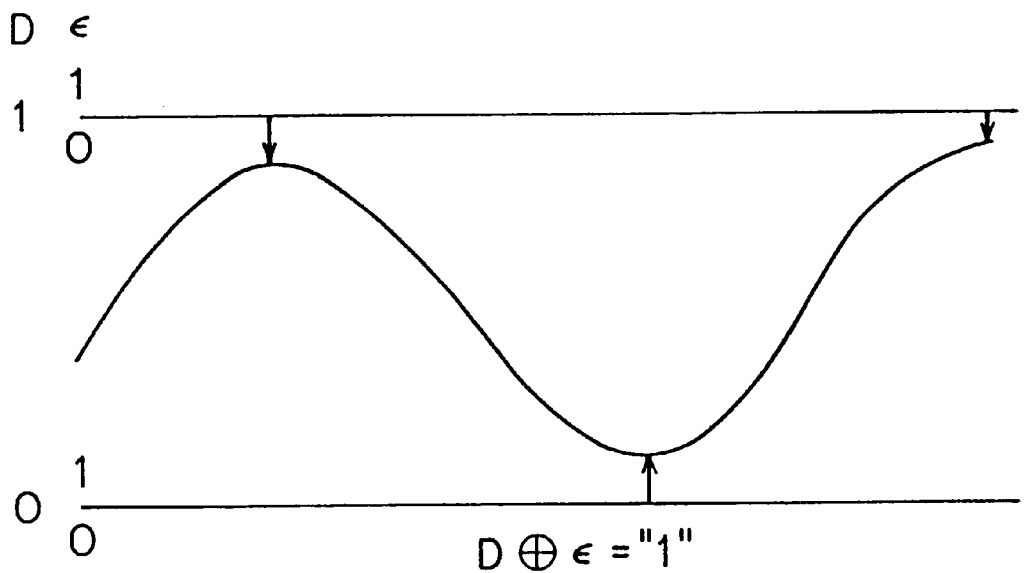
Figure 52B:
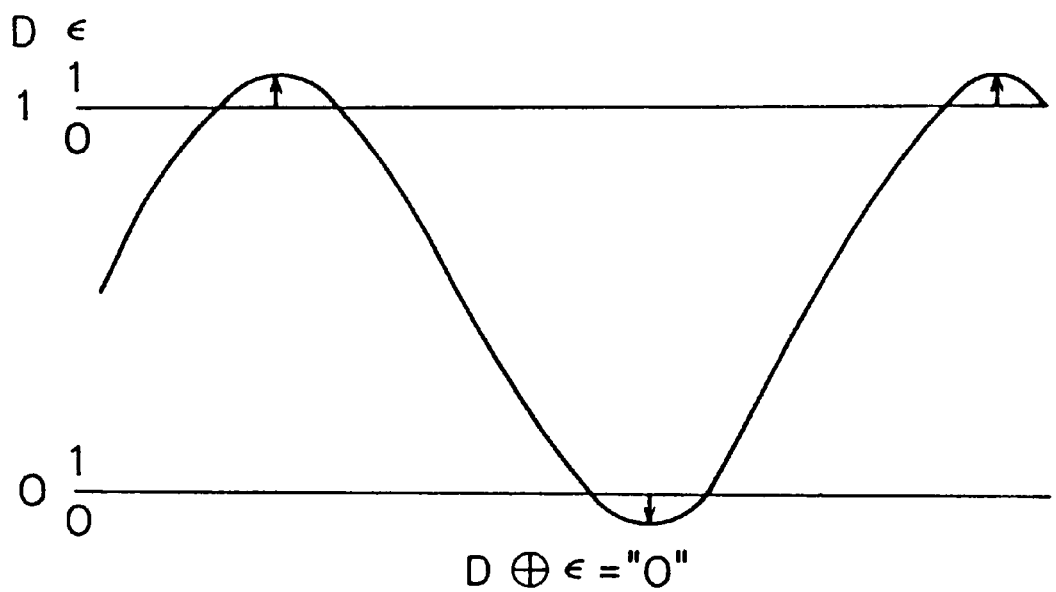

For example, when the amplitude of a signal of a component of a high frequency is smaller than a predetermined analog to digital conversion level as seen in FIG. 52(a), the combination of (signal data D, error signal ε) is (0, 1) or (1, 0), and consequently, the result of operation by logical exclusive ORing is "1". On the contrary when the amplitude of the signal of a component of a high frequency is greater than the predetermined analog to digital conversion level as seen in FIG. 52(b), the combination of (signal data D, error signal ε) is (0, 0) or (1, 1), and consequently, the result of operation by logical exclusive ORing is "0".

Then, any result of detection by the second-order inclination detection section 196 is latched once into the flip-flop circuit 198 and is then outputted as effective data only when a "H" level signal is received from the AND gate 193, that is, when it is discriminated that the signal data D of the digital demodulated signal I are alternate data which alternately exhibit "0" and "1". In short, a distortion amount of the signal of a component of a high frequency is outputted as data indicative of a characteristic of a second-order inclination distortion of the IF signal.

Thereafter, the data of the second-order inclination distortion of the IF signal obtained in such a manner as described above is averaged by the integrator 199 and outputted as a control signal for the second-order inclination compensation section 18. Consequently, in the second-order inclination compensation section 18 (refer to FIG. 47), the value of the electric current of the PIN diode 183 is adjusted in response to the control signal to control the sharpness "Q" of the resonance circuit 186 (refer to FIG. 48). As a result, the second-order inclination distortion of the IF signal which exhibits a concave as shown in FIG. 50(b) is cancelled and compensated for with certainty.

Figures 53A, 53B, 53C:
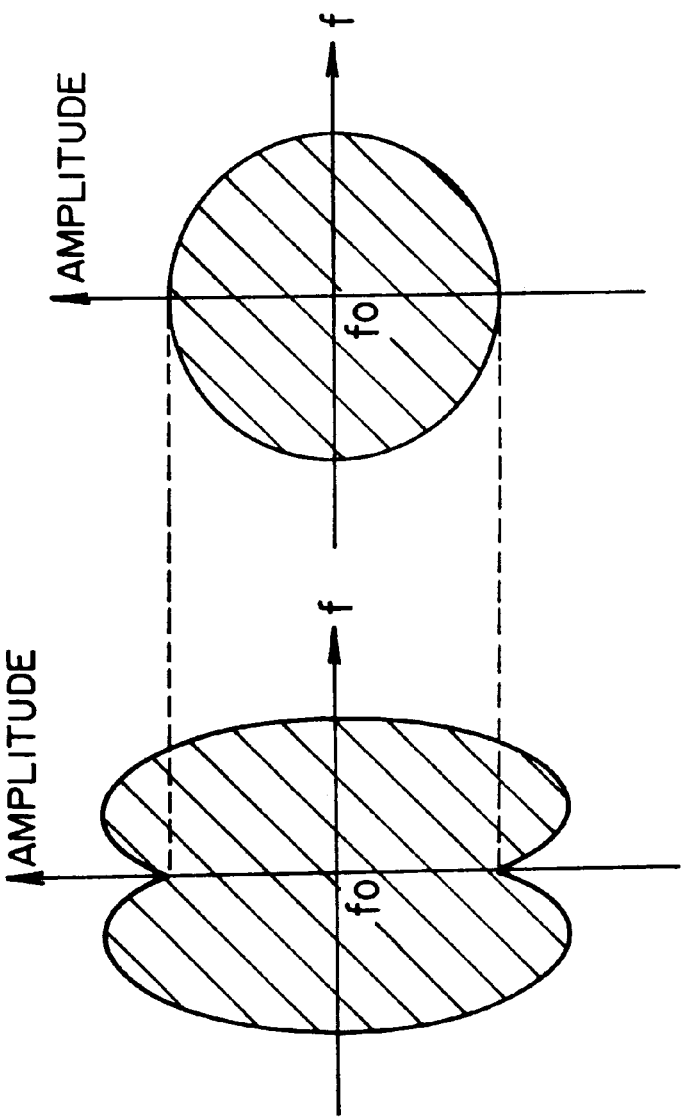
FIGS. 53(a) to 53(c) are diagrams illustrating an example of an equalization characteristic indicating an equalization capacity of the automatic amplitude equalizer of FIG. 44.

It is to be noted that FIGS. 53(a) to 53(c) illustrate different equalization characteristics (M curves) of an equalizer. In particular, FIG. 53(a) illustrates an equalization characteristic where only the transversal equalizer 15 is used; FIG. 53(b) illustrates another equalization characteristic where only the first-order inclination compensation section 11 is used together with the transversal equalizer 15; and FIG. 53(c) illustrates a further equalization characteristic where both of the first-order inclination compensation section 11 and the second-order inclination compensation section 18 are used together with the transversal equalizer 15.

As seen from FIG. 53(c), where the second-order inclination compensation section 18 is used in addition to the transversal equalizer 15 and the first-order inclination compensation section 11, the range of slanting lines which indicate that the bit error rate (BER) of the equalizer is deteriorated to cause instantaneous disconnection is reduced remarkably comparing with those shown in FIGS. 53(a) and 53(b). Accordingly, it can be recognized that the equalization characteristic of the equalizer is improved very much.

As described above, with the automatic amplitude equalizer of the fifteenth embodiment of the present invention, a first-order inclination distortion (first-order inclination amplitude characteristic) of an IF signal (input signal) is detected from digital demodulated signals I and Q obtained from the IF signal and the first-order inclination distortion is compensated for by the first-order inclination control section 14' and the first-order inclination compensation section 11, respectively, and a second-order inclination distortion (second-order inclination amplitude characteristic) of the IF signal is detected from the digital demodulated signal I (or Q) by the second-order inclination control section 19. Then, also the second-order inclination distortion of the IF signal can be compensated for based on the thus detected second-order inclination distortion of the IF signal. Consequently, the equalization capacity of the equalizer can be improved very much.

Further, with the automatic amplitude equalizer of the present embodiment, a first-order inclination distortion and a second-order inclination distortion of an IF signal can be compensated for effectively with a very simple construction that the first-order inclination compensation section 11 and the second-order inclination compensation section 18 are provided each by one at preceding stages to the demodulator 13'.

It is to be noted that, while the second-order inclination compensation section 18 is disposed, in the present embodiment, at a following stage to the first-order inclination compensation section 11, the arrangement relationship of them may otherwise be reversed.

Figure 54:
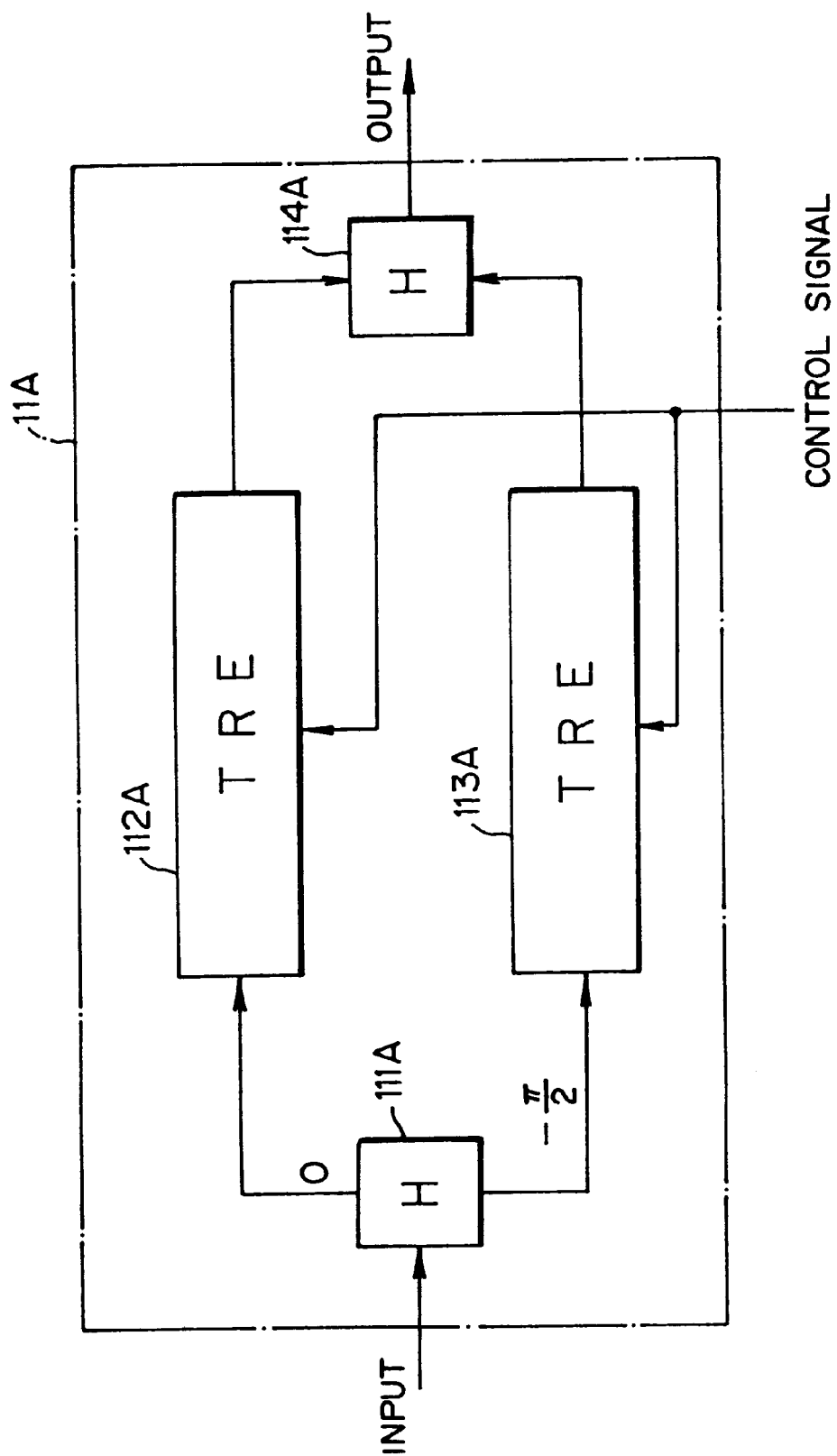
FIG. 54 is a block diagram showing another construction of the first-order inclination compensation section of the automatic amplitude equalizer of FIG. 44.

Further, the first-order inclination compensation section 11 may be replaced by such a first-order inclination compensation section 11A as shown in FIG. 54.

Referring to FIG. 54, the first-order inclination compensation section 11A shown is similar to that of the fifth embodiment shown in FIG. 24 and includes a pair of hybrid circuits (H) 111A and 114A, and a pair of transversal equalizers (TRE) 112A and 113A.

In short, in the first-order inclination compensation section 11A, the transversal equalizers (TRE) 112A and 113A having a first-order inclination amplitude equalization characteristic in the time-domain are employed so that only a first-order inclination distortion of an IF signal can be compensated for in the time-domain similarly as described hereinabove with reference to FIG. 24. It is to be noted that the construction of each of the transversal equalizers 112A and 113A is similar to that shown in FIG. 25.

Accordingly, in the first-order inclination compensation section 11A, tap coefficients of the transversal equalizers 112A and 113A are controlled in response to a control signal from the first-order inclination control section 14' to compensate for the first-order inclination distortion of an IF signal in the time-domain as described hereinabove in connection with the fifth embodiment, where the first-order inclination distortion of the IF signal is caused by an interference wave of a long delay time difference, the first-order inclination distortion of the IF signal can be compensated for very effectively.

Further, while the second-order inclination compensation section 18 in the present embodiment is constructed such that it has a second-order inclination amplitude characteristic in the frequency-domain using the resonance circuit 186, if also the second-order inclination compensation section 18 is constructed using the hybrid circuits 111A and 114A and the transversal equalizers 112A and 113A similarly to the first-order inclination compensation section 11A described above, then the tap coefficients of the transversal equalizers 112A and 113A are controlled in response to a control signal from the second-order inclination control section 19. Consequently, the second-order inclination distortion of the IF signal can be compensated for with certainty in the time-domain.

Accordingly, even if the second-order inclination distortion of the IF signal is caused by an interference wave of a long delay time difference, the second-order inclination distortion of the IF signal can be compensated for very effectively.

Further, while the first-order inclination control section 14' discriminates the direction in which the signal I from between the digital demodulated signals I and Q moves, detects error information E from the signal Q and detects a first-order inclination distortion of the IF signal based on the correlation between the direction of movement of the signal I and the error information E, also in the present embodiment, alternatively the direction in which the signal Q moves may be discriminated while error information E is detected from the signal I, and the first-order inclination distortion of the IF signal may be detected based on the correlation between the direction of movement of the signal Q and the error information E.

Figure 55:
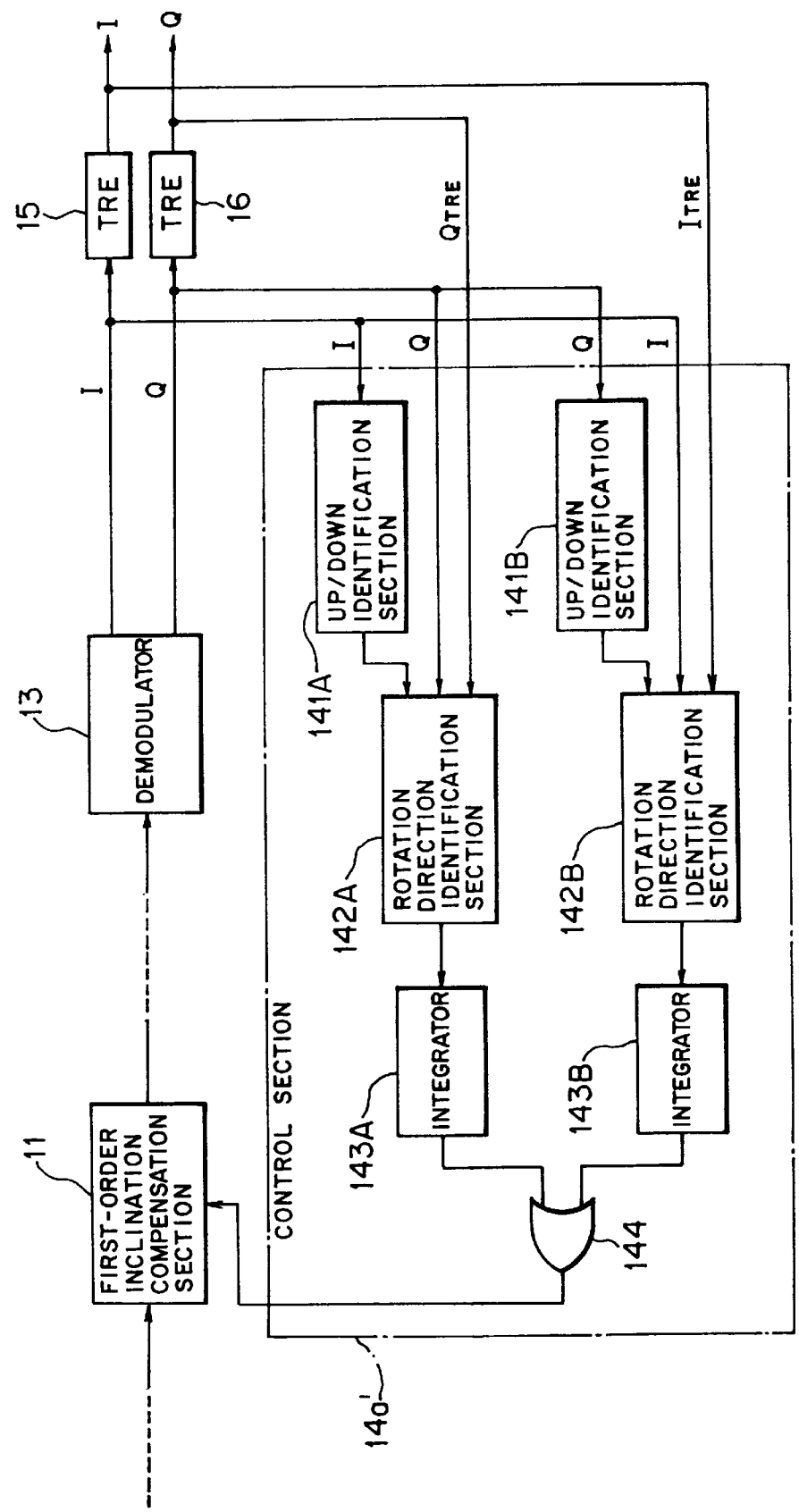
FIG. 55 is a block diagram showing another construction of the first-order inclination control section of the automatic amplitude equalizer of FIG. 44.

It is to be noted that, for the first-order inclination control section 14', such a first-order inclination control section 14a' as shown in FIG. 55 may be employed which includes a pair of up/down identification sections (first and second signal direction discrimination sections) 141A and 141B, a pair of rotation direction identification sections (first and second error information detection sections and first and second correlation calculation sections) 142A and 142B, a pair of integrators 143A and 143B, and an OR element 144 which are all similar to those of the control section 14a described hereinabove with reference to FIG. 20.

Thus, in the first-order inclination control section 14a', similarly as described hereinabove in connection with the second embodiment, the directions in which both of digital demodulated signals I and Q move are discriminated by the up/down identification sections 141A and 141B, respectively. Then, error information between the digital demodulated signals I and Q and equalized signals I$_{TRE}$ and Q$_{TRE}$ obtained by processing of the digital demodulated signals I and Q further by means of the transversal equalizer 15 is detected by the rotation direction identification sections 142A and 142B, respectively. Then, based on the correlation between the direction of movement of the signal I and the error information of the signal Q and the correlation between the direction of movement of the signal Q and the error information of the signal I, a control signal for the first-order inclination compensation section 11 can be obtained.

Accordingly, in this instance, a control signal for the first-order inclination compensation section 11 which has a higher degree of accuracy is obtained, and the first-order inclination distortion of the IF signal can be compensated for with a higher degree of accuracy.

Figure 56:
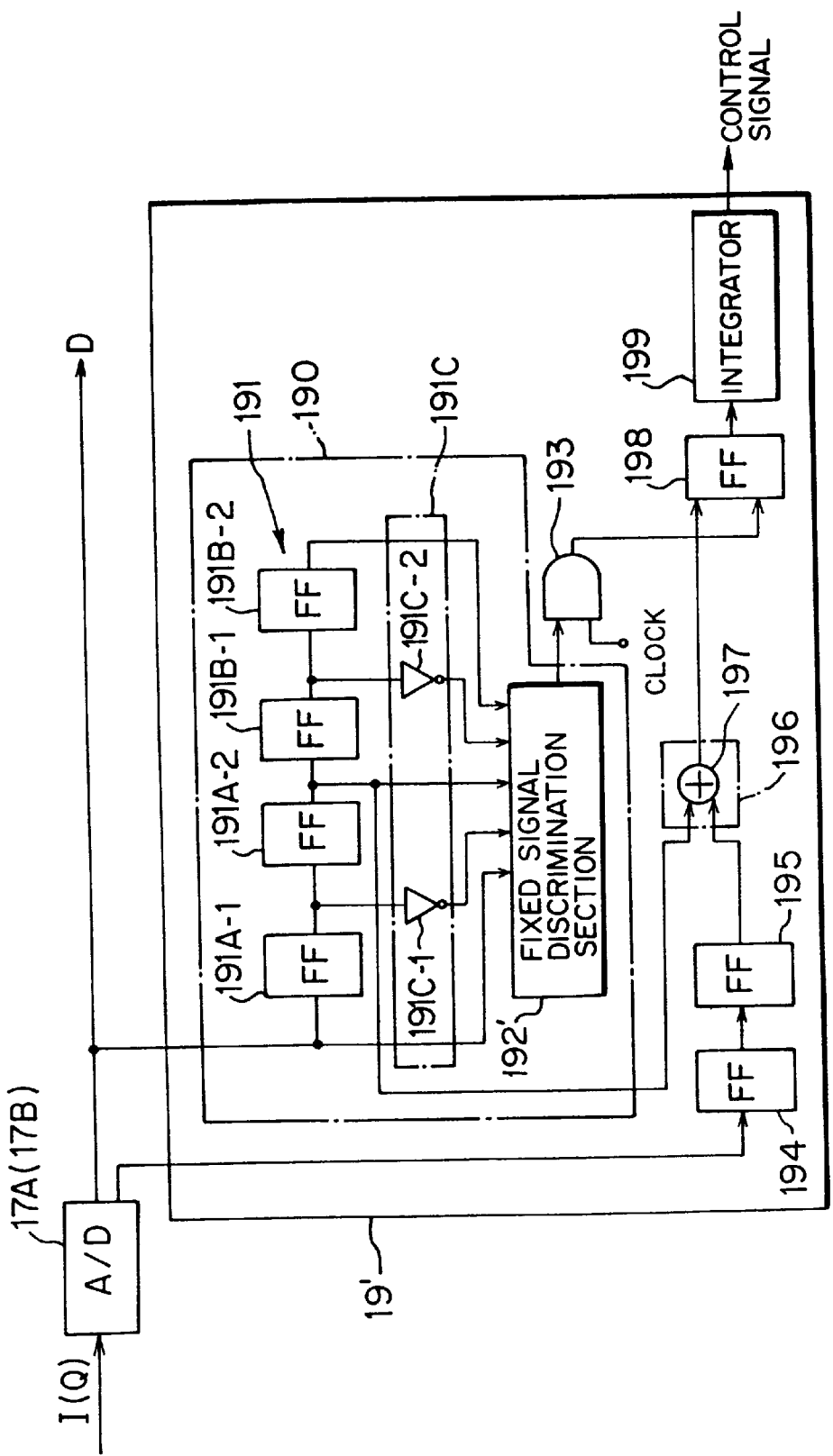
FIG. 56 is a block diagram showing another construction of the second-order inclination control section of the automatic amplitude equalizer of FIG. 44.

Further, while the second-order inclination control section 19 in the present embodiment is constructed such that the signal condition supervision section 190 discriminates whether or not data D of the digital demodulated signal I are alternate data which alternately exhibit "0" and "1" to detect a signal of a component of a high frequency, the second-order inclination control section 19 may be constructed otherwise, for example, like a second-order inclination control section 19' shown in FIG. 56 which includes an inversion/non-inversion section 191C and includes, in place of the alternate signal discrimination section 192, a fixed signal discrimination section 192'.

The inversion/non-inversion section 191C performs, when values of the digital demodulated signal I (or Q) from the flip-flop circuits (delay elements) 191A-1, 191A-2, 191B-1 and 191B-2 exhibit a condition wherein the values "0" and "1" appear alternately, inversion and non-inversion processing of the values of the digital demodulated signal I to vary the values of the digital demodulated signal I into a fixed value of "0" or "1", and outputs a resulted signal of the fixed value. In this instance, inversion processing is performed by a pair of inversion gates 191C-1 and 191C-2 of the inversion/non-inversion section 191C so that the values of the digital demodulated signal I are varied into the fixed value of "0" or "1" to be outputted.

Accordingly, in this instance, the fixed signal discrimination section (particular signal condition discrimination section) 192' can detect whether or not the digital demodulated signal I is a signal of a component of a high frequency readily only by receiving the output of the inversion/non-inversion section 191C and performing discrimination of whether or not the values of the digital demodulated signal I have a fixed value of "0" or "1".

It is to be noted that, also in this instance, the delay section 191 can be constructed, as described hereinabove in connection with FIG. 49, from preceding M stages of flip-flop circuits 191A-1 to 191A-M and following N stages of flip-flop circuits 191B-1 to 191B-N. In this instance, however, the inversion/non-inversion section 191C is constructed including a number of inversion gates 191C-1 to 191C-n (n is a natural number) equal to one half the total number of the flip-flop circuits 191A-1 to 191A-M and 191B-1 to 191B-M.

q. Sixteenth Embodiment

Figure 57:
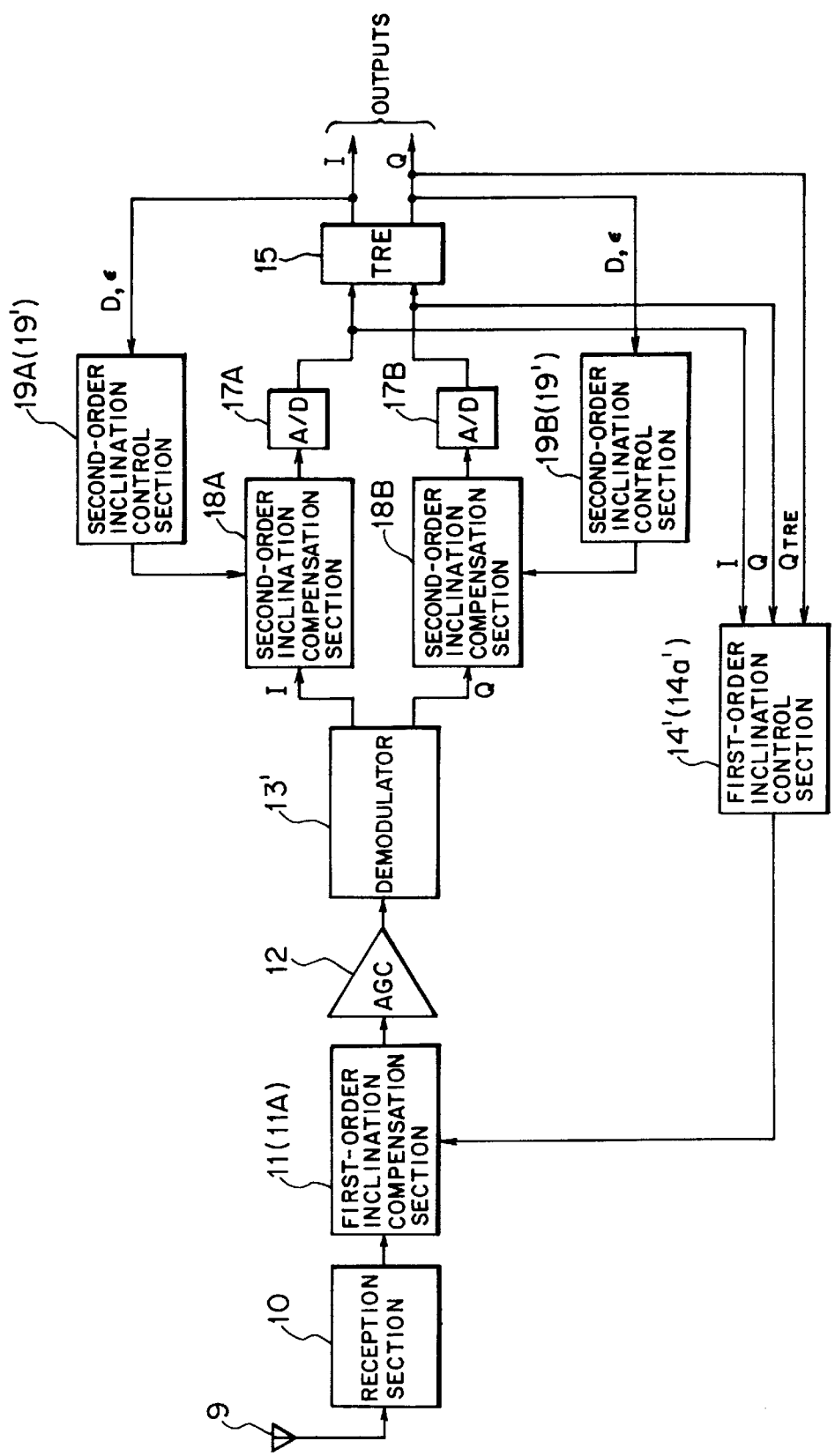
FIG. 57 is a block diagram of a yet further automatic amplitude equalizer showing a sixteenth preferred embodiment of the present invention.

FIG. 57 shows in block diagram a construction of an automatic amplitude equalizer according to a sixteenth preferred embodiment of the present invention. The automatic amplitude equalizer of the present embodiment is a modification to and different from the automatic amplitude equalizer of the fifteenth embodiment described hereinabove with reference to FIG. 42 in that, in place of the second-order inclination compensation section 18, a pair of second-order inclination compensation sections 18A and 18B are provided for signals I and Q at a stage following the demodulator 13' and, in place of the second-order inclination control section 19, a pair of second-order inclination control sections 19A and 19B, each of which is similar to the second-order inclination control section 19 shown in FIG. 44, are provided corresponding to the second-order inclination compensation sections 18A and 18B, respectively.

Figure 58:
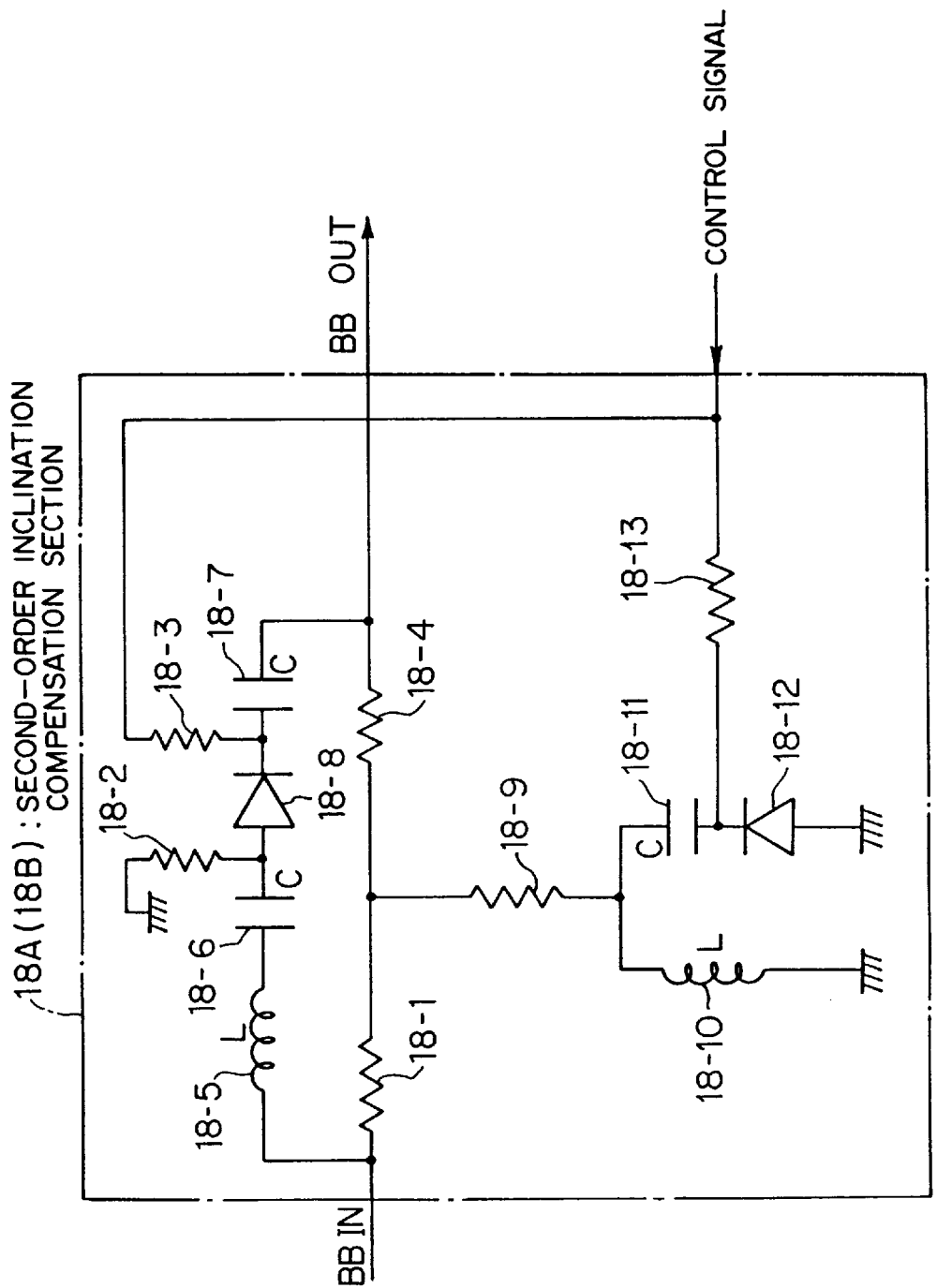
FIG. 58 is a block diagram showing a construction of a second-order inclination compensation section of the automatic amplitude equalizer of FIG. 57.
Figure 59:
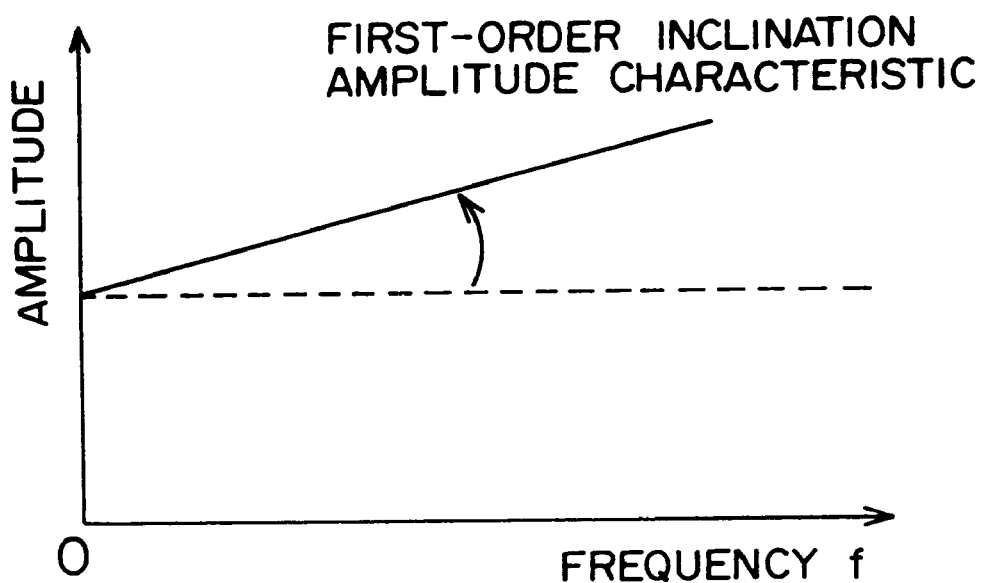
FIG. 59 is a diagram illustrating an amplitude characteristic of the second-order inclination compensation section of FIG. 58.

Each of the second-order inclination compensation sections (second-order inclination amplitude equalization sections) 18A and 18B includes, as shown in FIG. 58, six resistors 18-1 to 18-4, 18-9 and 18-13, three capacitors (C) 18-6, 18-7 and 18-11, and two coils (L) 18-5 and 18-10, and two PIN diodes 18-8 and 18-12, and is constructed so as to have such a first-order inclination amplitude characteristic as illustrated in FIG. 59 in the frequency-domain.

In each of the second-order inclination compensation sections 18A and 18B, the values of electric currents flowing through the PIN diodes 18-8 and 18-12 are controlled in accordance with a control signal from a corresponding one of the second-order inclination control sections 19A and 19B to control the first-order inclination amplitude characteristic of the second-order inclination compensation section 18A or 18B illustrated in FIG. 59. Thus, amplitude equalization processing of demodulated base band signals I and Q is performed in accordance with the thus controlled first-order inclination amplitude characteristics by the second-order inclination compensation sections 18A and 18B, respectively.

In short, each of the second-order inclination compensation sections 18A and 18B in the present embodiment is constructed such that, since an IF signal having a second-order inclination distortion is converted, when it is demodulated (orthogonally detected) by the demodulator 13', into demodulated base band signals I and Q having a first-order inclination distortion as described hereinabove in connection with the fifteenth embodiment, a second-order inclination distortion of an IF signal is compensated for at the following stage to the demodulator 13' in accordance with the first-order inclination amplitude characteristic illustrated in FIG. 59.

Due to the construction described above, also in the automatic amplitude equalizer of the present embodiment, by the first-order inclination control section 14', the direction in which one of digital demodulated signals I and Q obtained by way of the demodulator 13' and the analog to digital converters 17A and 17B, that is, the signal I, moves is discriminated and a difference between the digital demodulated signal Q and an equalized signal Q$_{TRE}$ obtained by processing of the signal Q further by means of the transversal equalizer 15 is calculated to detect error information E of the signal Q which is an orthogonal interference component with the signal I.

Then, based on the correlation between the direction of movement of the signal I and the error information E of the signal Q (refer to FIG. 12), a characteristic (a positive inclination, a negative inclination or a zero inclination) of the first-order inclination distortion of the IF signal is detected, and a signal corresponding to the thus detected characteristic is outputted as a control signal for the first-order inclination compensation section 11. The first-order inclination compensation section 11 thus compensates for the first-order inclination distortion of the IF signal in accordance with the control signal.

It is to be noted that, also in this instance, the first-order inclination control section 14' may be constructed otherwise such that the direction in which the signal Q from between the digital demodulated signals I and Q moves is discriminated and a difference between the digital demodulated signal I and an equalized signal I$_{TRE}$ obtained by processing of the signal I further by means of the transversal equalizer 15 is calculated to detect error information E of the signal I which is an orthogonal interference component with the signal Q, and the first-order inclination distortion of the IF signal is detected based on the correlation between the direction of movement of the signal Q and the error information E of the signal I.

In the meantime, in each of the second-order inclination control sections 19A and 19B, it is discriminated whether or not signal data D of the digital demodulated signal I or Q are alternate data which alternately exhibit the values of "0" and "1" as described hereinabove in connection with the fifteenth embodiment, and when the signal data are alternate data, a distortion amount of the digital demodulated signal I or Q obtained by logical exclusive ORing which is performed between the signal data D and the signal error $\epsilon$ is detected as a second-order inclination distortion of the IF signal. Then, based on results of the detection, control signals for the second-order inclination compensation sections 18A and 18B are outputted independently of each other from the second-order inclination control sections 19A and 19B, respectively. It is to be noted that, in the present embodiment, the second-order inclination distortion of the IF signal is detected from signal data D of equalized signals I$_{TRE}$ and Q$_{TRE}$ obtained by processing of the digital demodulated signals I and Q further by means of the transversal equalizer 15 and error signals $\epsilon$.

Consequently, in each of the second-order inclination compensation sections 18A and 18B, the values of electric currents to flow through the PIN diodes 18-8 and 18-12 are adjusted in accordance with the control signal from the second-order inclination control section 19A or 19B to control the sharpness "Q" of an LC resonance circuit formed from the coil 18-5 and the capacitors 18-6 and 18-7 and another LC resonance circuit formed from the coil 18-10 and the capacitor 18-11. As a result, amplitude equalization processing is performed individually for the demodulated base band signals I and Q, and consequently, the second-order inclination distortion of the IF signal is compensated for at the following stage to the demodulator 13'.

In this manner, with the automatic amplitude equalizer of the sixteenth embodiment of the present invention, since the first-order inclination compensation section 11 is provided at the preceding stage to the demodulator 13' while the second-order inclination compensation sections 18A and 18B are provided, at the following stage to the demodulator 13', for the digital demodulated signals I and Q and the second-order inclination control sections 19A and 19B are provided corresponding to the second-order inclination compensation sections 18A and 18B, respectively, a first-order inclination distortion of an IF signal can be compensated for at the preceding stage to the demodulator 13' by the first-order inclination compensation section 11. Further, a second-order inclination distortion of the IF signal can be detected from both of the digital demodulated signals I and Q by the second-order inclination control sections 19A and 19B and then the second-order inclination distortion of the IF signal can be compensated for at the following stage to the demodulator 13' by the second-order inclination compensation sections 18A and 18B independently of each other. Consequently, both of the first-order inclination distortion and the second-order inclination distortion of the IF signal can be compensated for with a higher degree of certainty.

It is to be noted that the automatic amplitude equalizer of the present embodiment may be modified such that the first-order inclination compensation section 11 which compensates for the first-order inclination distortion in the frequency-domain is replaced by the first-order inclination compensation section 11A which compensates for the first-order inclination distortion in the time-domain described hereinabove with reference to FIG. 54 or each of the second-order inclination compensation sections 18A and 18B employs such transversal equalizers 112A and 113A which perform amplitude equalization in the time domain as shown in FIG. 54 to compensate for the second-order inclination distortion of the IF signal in the time-domain.

Further, also in the present embodiment, the first-order inclination control section 14' may be replaced by the control section 14a' described hereinabove with reference to FIG. 55, and each of the second-order inclination control sections 19A and 19B may be replaced by the second-order inclination control section 19' described hereinabove with reference to FIG. 56.

r. Seventeenth Embodiment

Figure 60:
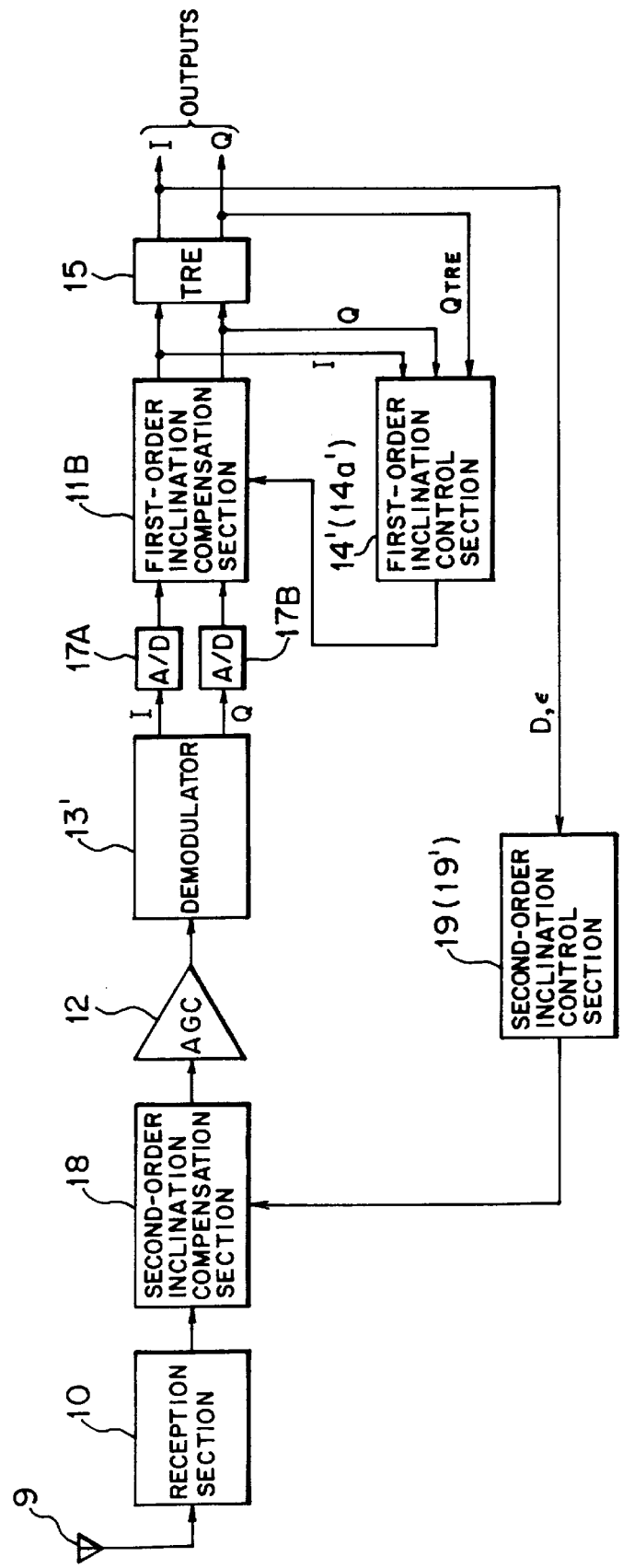
FIG. 60 is a block diagram of a yet further automatic amplitude equalizer showing a seventeenth preferred embodiment of the present invention.

FIG. 60 shows in block diagram a construction of an automatic amplitude equalizer according to a seventeenth preferred embodiment of the present invention. The automatic amplitude equalizer of the present embodiment is a modification to and is different from the automatic amplitude equalizer of the fifteenth embodiment described hereinabove with reference to FIG. 44 in that the second-order inclination compensation section 18 is provided at a preceding stage to the demodulator 13' and the first-order inclination compensation section 11B is provided at a following stage to the demodulator 13'.

Figure 61:
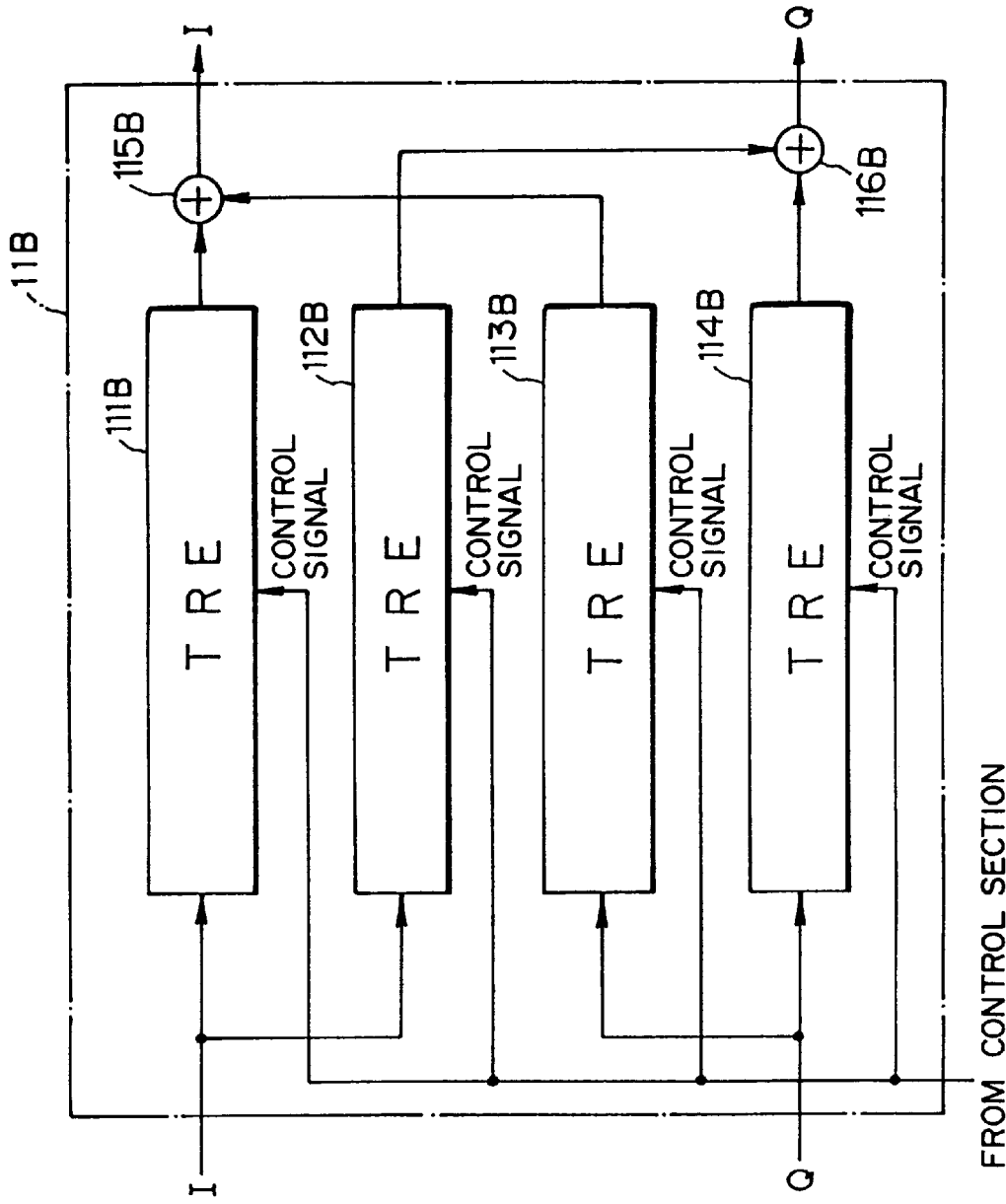
FIG. 61 is a block diagram showing a construction of a first-order inclination compensation section of the automatic amplitude equalizer of FIG. 60.

The first-order inclination compensation section 11B is similar to that described hereinabove in connection with the ninth embodiment and includes, as shown in FIG. 61, four base band transversal equalizers (TRE: hereinafter referred to merely as transversal equalizers) 111B to 114B and a pair of addition sections 115B and 116B.

Each of the transversal equalizers 111B to 114B is similar to the transversal equalize 112A (113A) described hereinabove in connection with the fifth embodiment shown in FIG. 24 and compensates, with tap coefficients thereof adjusted, for a first-order inclination distortion of a digital demodulated signal I or Q of a base band in accordance with a first-order inclination amplitude characteristic thereof in the time-domain. It is to be noted that each of the transversal equalizers 111B to 114B has an internal construction similar to that shown in FIG. 25.

The addition section 115B adds signals obtained by equalization processing by the transversal equalizers 111B and 113B and outputs a resulted signal as an equalized digital demodulated signal I. The addition section 116B adds signals obtained by equalization processing by the transversal equalizers 112B and 114B and outputs a resulted signal as an equalized digital demodulated signal Q.

In the automatic amplitude equalizer of the present embodiment having the construction described above, as described hereinabove in connection with the fifteenth embodiment, based on a digital demodulated signal I (or Q) of an IF signal (input signal) from the reception section 10, a second-order inclination distortion of the IF signal is detected by the second-order inclination control section 19, and a control signal for the second-order inclination compensation section 18 is outputted based on a result of such detection.

Consequently, in the second-order inclination compensation section 18, the sharpness "Q" of the resonance circuit 186 (refer to FIG. 47) is controlled in accordance with the control signal from the second-order inclination control section 19 so that the second-order inclination distortion of the IF signal is compensated for at the preceding stage to the demodulator 13' in the frequency-domain.

Meanwhile, in the first-order inclination control section 14', also in the present embodiment, the direction in which one of the digital demodulated signals I and Q, that is, the signal I, moves (the direction of variation of the value of the signal I) is discriminated, and error information E between the other signal Q and an equalized signal QTRE obtained by processing of the signal Q further by means of the transversal equalizer 15 is detected. Then, based on the correlation between the direction of movement of the signal I and the error information E of the signal Q, a first-order inclination distortion of the IF signal is detected, and a control signal for the first-order inclination compensation section 11B is produced and outputted in accordance with the thus detected first-order inclination distortion.

Consequently, in the first-order inclination compensation section 11B, the tap coefficients of the transversal equalizers 111B to 114B are controlled in accordance with the control signal from the first-order inclination control section 14', and amplitude equalization processing of the digital demodulated signals I and Q of the base band is performed in the time-domain. As a result, the first-order inclination distortion of the IF signal is compensated for subsequently to the second-order inclination distortion.

It is to be noted that, also in this instance, the first-order inclination control section 14' may be modified such that the direction in which the signal Q from between the digital demodulated signals I and Q moves is discriminated while a difference between the digital demodulated signal I and an equalized signal ITRE obtained by processing of the signal I further by means of the transversal equalizer 15 is calculated to detect error information E of the signal I which is an orthogonal interference component with the signal Q, and based on the correlation between the direction of movement of the signal Q and the error information E of the signal I, the first-order inclination distortion of the IF signal is detected.

In this manner, with the automatic amplitude equalizer of the seventeenth embodiment of the present invention, since a second-order inclination distortion of an IF signal (input signal) obtained by way of the reception section 10 is compensated for at the preceding stage to the demodulator 13' by the second-order inclination compensation section 18 and a first-order inclination distortion of the IF signal is compensated for at the following stage to the demodulator 13' by the first-order inclination compensation section 11B, both of the first-order inclination distortion and the second-order inclination distortion of the IF signal in this instance can be compensated for with certainty. Consequently, the equalization capacity of the equalizer can be improved remarkably.

Further, since the first-order inclination compensation section 11B in the present embodiment employs the transversal equalizers 111B to 114B which perform amplitude equalization in the time-domain, where the first-order inclination distortion is caused by, for example, an interference wave having a long delay time difference or in a like case, the first-order inclination distortion of the IF signal can be compensated for very effectively.

It is to be noted that, also in the present embodiment, the second-order inclination compensation section 18 may employ such transversal equalizers 112A and 113A as shown in FIG. 54 so that a second-order inclination distortion of an IF signal can be compensated for in the time-domain. In this instance, where the second-order inclination distortion is caused by, for example, an interference wave having a long delay time difference, the second-order inclination distortion of the IF signal can be compensated for very effectively in the time-domain.

Further, the first-order inclination control section 14' may be replaced by the control section 14a' described hereinabove with reference to FIG. 55, and the second-order inclination control section 19 may be replaced by the second-order inclination control section 19' described hereinabove with reference to FIG. 56.

s. Eighteenth Embodiment

Figure 62:
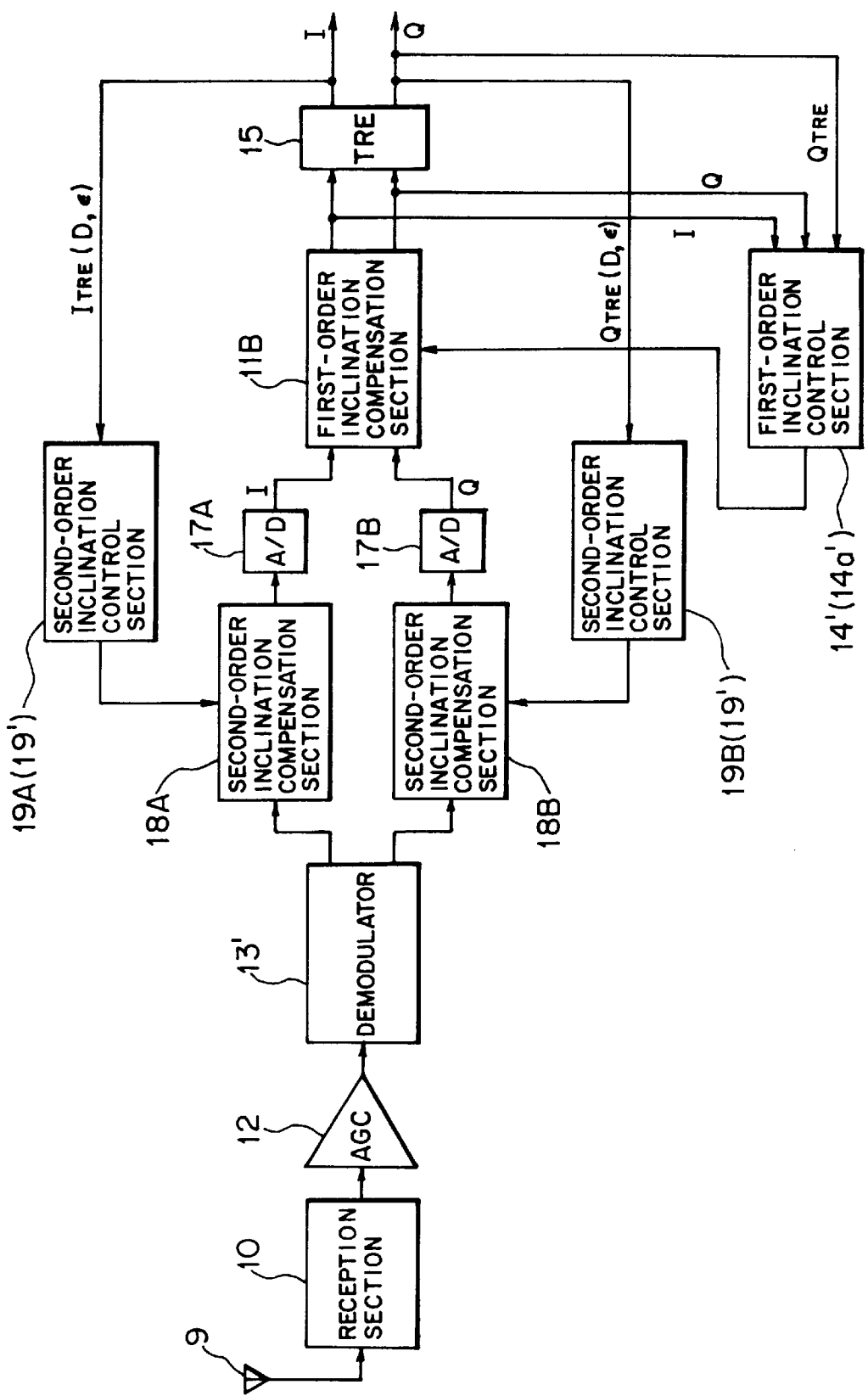
FIG. 62 is a block diagram of a yet further automatic amplitude equalizer showing an eighteenth preferred embodiment of the present invention.

FIG. 62 shows in block diagram a construction of an automatic amplitude equalizer according to an eighteenth preferred embodiment of the present invention. The automatic amplitude equalizer of the present embodiment is a modification to and is different from the automatic amplitude equalizer of the seventeenth embodiment shown in FIG. 60 in that, in place of the second-order inclination compensation section 18, a pair of second-order inclination compensation sections 18A and 18B are provided at a following stage to the demodulator 13' and also the first-order inclination compensation section 11B is provided at a following stage to the demodulator 13'. The second-order inclination compensation sections 18A and 18B are similar to those in the sixteenth embodiment described hereinabove in connection with FIG. 57.

Also in the automatic amplitude equalizer of the present embodiment having the construction described above, a second-order inclination distortion of an IF signal (input signal) obtained by way of the reception section 10 is detected from each of digital demodulated signals I and Q originating from the IF signal by a corresponding one of the second-order inclination control sections 19A and 19B, and based on results of such detection, control signals for the second-order inclination compensation sections 18A and 18B are outputted.

Consequently, such a first-order inclination amplitude characteristic as illustrated in FIG. 59 of each of the second-order inclination compensation sections 18A and 18B is controlled in accordance with the control signal from a corresponding one of the second-order inclination control sections 19A and 19B, and the second-order inclination distortion of the IF signal which makes a first-order inclination distortion in the base band is compensated for in the frequency-domain.

Meanwhile, in the first-order inclination control section 14', also in the present embodiment, the direction in which one of the digital demodulated signals I and Q, that is, the signal I, moves (the direction of variation of the value of the signal I) is discriminated, and error information E between the other signal Q and an equalized signal QTRE obtained by processing of the signal Q further by means of the transversal equalizer 15 is detected. Then, based on the correlation between the direction of movement of the signal I and the error information E of the signal Q, a control signal for the first-order inclination compensation section 11B is produced and outputted.

Consequently, in the first-order inclination compensation section 11B, the tap coefficients of the transversal equalizers 111B to 114B (refer to FIG. 61) are controlled in response to the control signal from the first-order inclination control section 14', and the digital demodulated signals I and Q are amplitude equalized in the time-domain. Accordingly, the first-order inclination distortion of the IF signal is compensated for subsequently to the second-order inclination distortion of the IF signal, It is to be noted that, also in this instance, the first-order inclination control section 14' may be modified such that the direction in which the signal Q from between the digital demodulated signals I and Q moves is discriminated while a difference between the digital demodulated signal I and an equalized signal I$_{TRE}$ obtained by processing of the signal I further by means of the transversal equalizer 15 is calculated to detect error information E of the signal I which is an orthogonal interference component with the signal Q, and the first-order inclination distortion of the IF signal is detected based on the correlation between the direction of movement of the signal Q and the error information E of the signal I.

In this manner, with the automatic amplitude equalizer of the eighteenth embodiment of the present invention, since a second-order inclination distortion of an IF signal (input signal) obtained by way of the reception section 10 is detected by each of the second-order inclination control sections 19A and 19B and the second-order inclination distortion is compensated for based on the thus detected second-order inclination distortion at the following stage to the demodulator 13' by the second-order inclination compensation sections 18A and 18B while a first-order inclination distortion of the IF signal is detected by the first-order inclination control section 14' and the first-order inclination distortion is compensated for based on the thus detected first-order inclination distortion at the following stage to the demodulator 13' by the first-order inclination compensation section 11B, also in this instance, both of the first-order inclination distortion and the second-order inclination distortion of the IF signal can be compensated for with certainty. Consequently, the equalization capacity of the equalizer is improved very much.

Further, also in the present embodiment, since the first-order inclination compensation section 11B employs the transversal equalizers 111B to 114B which perform amplitude equalization in the time-domain, where the first-order inclination distortion is caused by, for example, an interference wave having a long delay time difference, the first-order inclination distortion of the IF signal can be compensated for very effectively in the time-domain.

It is to be noted that, while the first-order inclination compensation section 11B in the present embodiment is disposed at the following stage to the second-order inclination compensation sections 18A and 18B, the arrangement relationship of them may be reversed.

Further, also in the present embodiment, each of the second-order inclination compensation sections 18A and 18B may employ such transversal equalizers 112A and 113A as shown in FIG. 54 to compensate for the second-order inclination distortion of the IF signal in the time-domain.

Further, the first-order inclination control section 14' may be replaced by the control section 14a' described hereinabove with reference to FIG. 55, and each of the second-order inclination control sections 19A and 19B may be replaced by the second-order inclination control section 19' described hereinabove with reference to FIG. 56.

t. Other Embodiments

Figure 63:
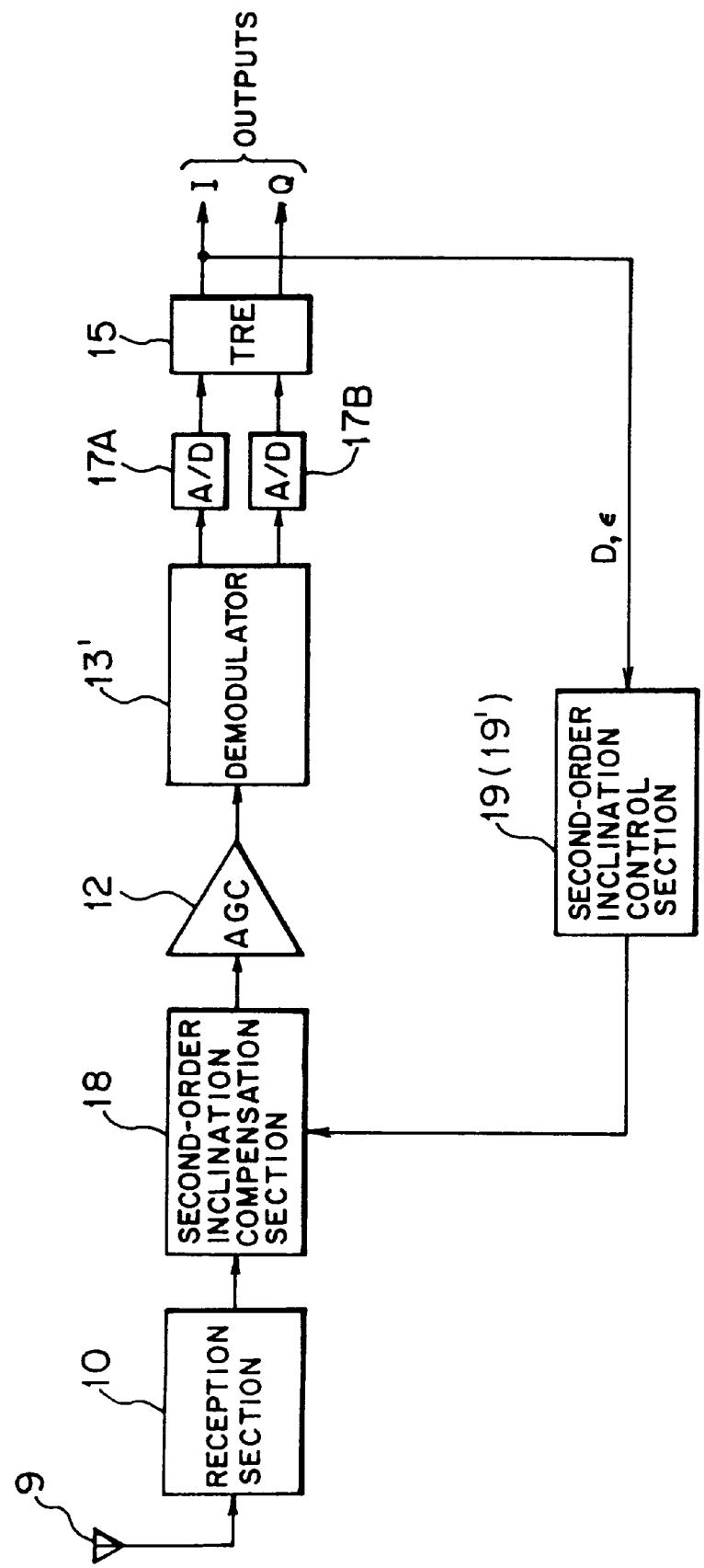
FIG. 63 is a block diagram of a yet further automatic amplitude equalizer showing a nineteenth preferred embodiment of the present invention.
Figure 64:
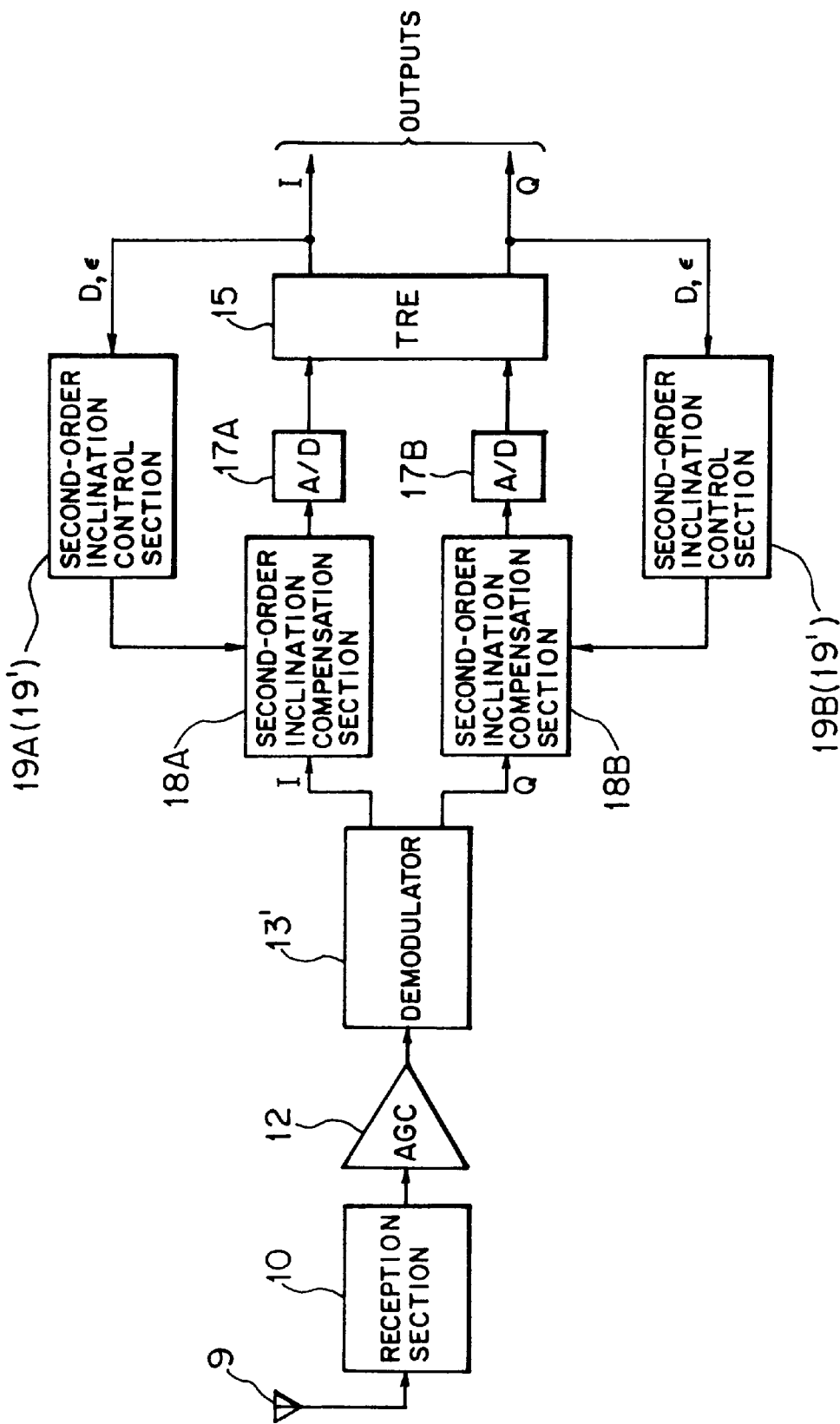
FIG. 64 is a block diagram of a yet further automatic amplitude equalizer showing a twentieth preferred embodiment of the present invention.
Figure 65:
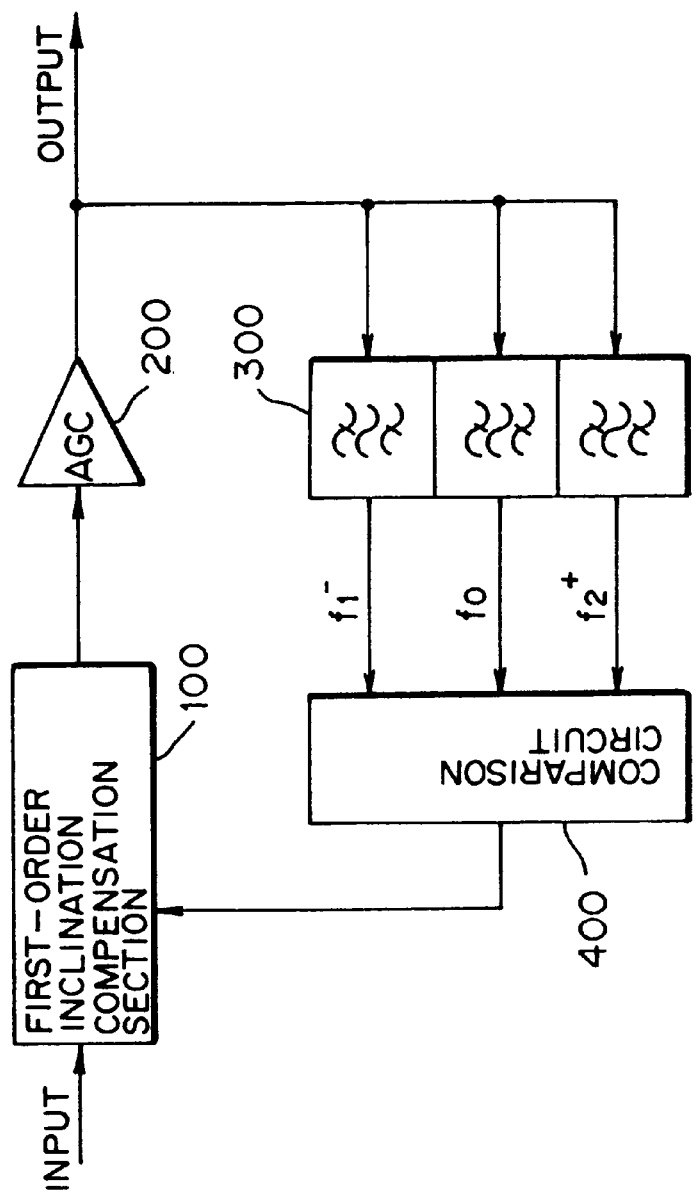
FIG. 65 is a block diagram showing a construction of an ordinary automatic amplitude equalizer.

While each of the automatic amplitude equalizers of the fifteenth to eighteenth embodiments described above is constructed from a combination of the first-order inclination compensation section(s) 11 (11A, 11B) and the first-order inclination control section 14' (14a') with the second-order inclination compensation section(s) 18 (18A, 18B) and the second-order inclination control section(s) 19 (19'; 19A, 19B) in order to compensate for both of a first-order inclination distortion and a second-order inclination distortion of an IF signal, an automatic amplitude equalizer may be constructed employing the second-order inclination compensation section(s) 18 (18A, 18B) and the second-order inclination control section(s) 19 (19A, 19B) solely as seen in FIG. 63 or 64 in order to compensate for only a second-order inclination distortion of an IF signal.

In the automatic amplitude equalizer shown in FIG. 63, a second-order inclination compensation section 18 similar to that described hereinabove with reference to FIG. 47 is provided at a preceding stage to the demodulator 13'.

Consequently, also in this instance, a second-order inclination distortion of an IF signal (input signal) obtained by way of the reception section 10 is detected from a digital demodulated signal I (or Q) of the IF signal by the second-order inclination control section 19 as described hereinabove in connection with the fifteenth embodiment, and a control signal for the second-order inclination compensation section 18 is outputted based on a result of such detection.

Then, in the second-order inclination compensation section 18, the sharpness "Q" of the resonance circuit 186 (refer to FIG. 47) is controlled in accordance with the control signal from the second-order inclination control section 19, and the first-order inclination distortion of the IF signal is compensated for with certainty at the preceding stage to the demodulator 13' in the frequency-domain.

It is to be noted that, also in this instance, the second-order inclination compensation section 18 may be constructed employing such transversal equalizers 112A and 113A which perform amplitude equalization of the second-order inclination distortion in the time-domain as shown in FIG. 54, and the second-order inclination control section 19 may be replaced by the second-order inclination control section 19' described hereinabove with reference to FIG. 56.

Meanwhile, in the automatic amplitude equalizer shown in FIG. 64, a pair of second-order inclination compensation sections 18A and 18B similar to that described hereinabove with reference to FIG. 58 are provided corresponding to digital demodulated signals I and Q at a following stage to the demodulator 13', and a pair of second-order inclination control sections 19A and 19B are provided corresponding to the second-order inclination compensation sections 18A and 18B, respectively.

Consequently, also in this instance, second-order inclination distortions of an IF signal (input signal) obtained by way of the reception section 10 are individually detected from the digital demodulated signals I and Q by the second-order inclination control sections 19A and 19B, respectively, and control signals for the second-order inclination compensation sections 18A and 18B are outputted based on results of such detection, respectively.

Then, in response to the control signals from the second-order inclination control sections 19A and 19B, such first-order inclination amplitude characteristics of the second-order inclination compensation sections 18A and 18B as seen in FIG. 59 are controlled, and amplitude equalization is performed for the demodulated base band signals I and Q from the demodulator 13' by the second-order inclination compensation sections 18A and 18B, respectively. Consequently, the second-order inclination distortions of the IF signal are compensated for with certainty at the following stage to the demodulator 13' in the frequency-domain.

It is to be noted that, also in this instance, the second-order inclination compensation section 18 may be constructed employing such transversal equalizers 112A and 113A which perform amplitude equalization of the second-order inclination distortion in the time-domain as shown in FIG. 54, and each of the second-order inclination control sections 19A and 19B may be replaced by the second-order inclination control section 19' described hereinabove with reference to FIG. 56.

The present invention is not limited to the specifically described embodiment, and variations and modifications may be made without departing from the scope of the present invention.

What is claimed is:

1. An automatic amplitude equalizer for compensating for an amplitude characteristic of an input signal, comprising:

a first-order inclination amplitude equalization section for compensating for the amplitude characteristic of the input signal in accordance with an amplitude characteristic having a first-order inclination amplitude characteristic in a frequency region: and a control section for discriminating a direction of variation of a value of a first one of a pair of digital demodulated signals originating from the input signal, detecting error information from the other, second one of the digital demodulated signals which is orthogonal to the first signal, and outputting a control signal for said first-order inclination amplitude equalization section to be used for amplitude equalization processing in the frequency region based on a correlation between the error information and the direction of variation of the value of the first signal.

2. An automatic amplitude equalizer as claimed in claim 1, wherein said first-order inclination amplitude equalization section has the first-order inclination amplitude characteristic in the frequency-domain and compensates for the amplitude characteristic of the input signal in accordance with the first-order inclination amplitude characteristic.

3. An automatic amplitude equalizer as claimed in claim 1, wherein said first-order inclination amplitude equalization section includes an equalizer which operates in the time-domain and compensates for the amplitude characteristic of the input signal in accordance with the first-order inclination amplitude characteristic.

4. An automatic amplitude equalizer as claimed in claim 1, wherein said control section includes a signal direction discrimination section for discriminating the direction of variation of the value of the first signal of the digital demodulated signals, an error information detection section for detecting error information from the second signal of the digital demodulated signals which is orthogonal to the first signal, and a correlation calculation section for outputting a control signal for said first-order inclination amplitude equalization section based on a correlation between the error information obtained by said error information detection section and the direction of variation of the value of the first signal obtained by said signal direction discrimination section.

5. An automatic amplitude equalizer as claimed in claim 4, wherein said signal direction discrimination section samples the first signal in a data clock period to discriminate the direction of variation of the value of the first signal.

6. An automatic amplitude equalizer as claimed in claim 4, wherein said signal direction discrimination section samples the first signal in a period equal to 1/N a data clock period to discriminate the direction of variation of the value of the first signal, N being an integral number equal to or greater than 2.

7. An automatic amplitude equalizer as claimed in claim 4, wherein said error information detection section detects error information from an error bit of the second signal.

8. An automatic amplitude equalizer as claimed in claim 4, wherein said error information detection section is constructed as a difference calculation section which calculates a difference between the second signal of the digital demodulated signals originating from the input signal and an equalized signal obtained by processing of the second signal further by means of a transversal equalizer.

9. An automatic amplitude equalizer as claimed in claim 1, further comprising a demodulator for producing the digital demodulated signals from the input signal, and wherein said first-order inclination amplitude equalization section is provided at a preceding stage to said demodulator.

10. An automatic amplitude equalizer as claimed in claim 1, further comprising a demodulator for producing the digital demodulated signals from the input signal, and wherein said first-order inclination amplitude equalization section is provided at a following stage to said demodulator.

11. An automatic amplitude equalizer for compensating for an amplitude characteristic of an input signal, comprising:

a first-order inclination amplitude equalization section for compensating for the amplitude characteristic of the input signal in accordance with an amplitude characteristic having a first-order inclination amplitude characteristic in a frequency region; and a control section for discriminating a direction of variation of a value of a first one of a pair of digital demodulated signals originating from the input signal, detecting error information from the other, second one of the digital demodulated signals which is orthogonal to the first signal, producing a first correlation signal based on a correlation between the error information and the direction of variation of the value of the first signal, discriminating a direction of variation of a value of the second signal, detecting error information from the first signal of the digital demodulated signals which is orthogonal to the second signal, producing a second correlation signal based on a correlation between the error information and the direction of variation of the value of the second signal, and producing and outputting a control signal for said first-order inclination amplitude equalization section to be used for amplitude equalization processing in the frequency region from the first correlation signal and the second correlation signal.

12. An automatic amplitude equalizer as claimed in claim 11, wherein said first-order inclination amplitude equalization section has the first-order inclination amplitude characteristic in the frequency-domain and compensates for the amplitude characteristic of the input signal in accordance with the first-order inclination amplitude characteristic.

13. An automatic amplitude equalizer as claimed in claim 11, wherein said first-order inclination amplitude equalization section includes an equalizer which operates in the time-domain and compensates for the amplitude characteristic of the input signal in accordance with the first-order inclination amplitude characteristic.

14. An automatic amplitude equalizer as claimed in claim 11, wherein said control section includes a first signal direction discrimination section for discriminating the direction of variation of the value of the first signal of the digital demodulated signals, a first error information detection section for detecting the error information from the second signal of the digital demodulated signals which is orthogonal to the first signal, a first correlation calculation section for outputting the first correlation signal based on the correlation between the error information obtained by said first error information detection section and the direction of variation of the value of the first signal obtained by said first signal direction discrimination section, a second signal direction discrimination section for discriminating the direction of variation of the value of the second signal, a second error information detection section for detecting the error information from the first signal, a second correlation calculation section for outputting the second correlation signal based on the correlation between the error information obtained by said second error information detection section and the direction of variation of the value of the second signal obtained by said second signal direction discrimination section, and a control signal production section for producing a control signal for said first-order inclination amplitude equalization section from the first correlation signal from said first correlation calculation section and the second correlation signal from said second correlation calculation section.

15. An automatic amplitude equalizer as claimed in claim 14, wherein said first signal direction discrimination section samples the first signal in a data clock period to discriminate the direction of variation of the value of the first signal, and said second signal direction discrimination section samples the second signal in the data clock period to discriminate the direction of variation of the value of the second signal.

16. An automatic amplitude equalizer as claimed in claim 14, wherein said first signal direction discrimination section samples the first signal in a period equal to 1/N a data clock period to discriminate the direction of variation of the value of the first signal, N being an integral number equal to or greater than 2, and said second signal direction discrimination section samples the second signal in the period equal to 1/N the data clock period to discriminate the direction of variation of the value of the second signal.

17. An automatic amplitude equalizer as claimed in claim 14, wherein said first error information detection section detects the error information from an error bit of the first signal, and said second error information detection section detects the error information from an error bit of the second signal.

18. An automatic amplitude equalizer as claimed in claim 14, wherein said first error information detection section is constructed as a first difference calculation section which calculates a difference between the second signal of the digital demodulated signals originating from the input signal and an equalized signal obtained by processing of the second signal further by means of a transversal equalizer, and said second error information detection section is constructed as a second difference calculation section which calculates a difference between the first signal and an equalized signal obtained by processing of the first signal further by means of another transversal equalizer.

19. An automatic amplitude equalizer as claimed in claim 11, further comprising a demodulator for producing the digital demodulated signals from the input signal, and wherein said first-order inclination amplitude equalization section is provided at a preceding stage to said demodulator.

20. An automatic amplitude equalizer as claimed in claim 11, further comprising a demodulator for producing the digital demodulated signals from the input signal, and wherein said first-order inclination amplitude equalization section is provided at a following stage to said demodulator.

21. An automatic amplitude equalizer for compensating for an amplitude characteristic of an input signal, comprising:

a second-order inclination amplitude equalization section for compensating for a second-order inclination amplitude characteristic of the input signal in accordance with a first-order inclination amplitude characteristic or a second-order inclination amplitude characteristic; and a control section for detecting the second-order inclination amplitude characteristic of the input signal from a pair of digital demodulated signals originating from the input signal and outputting a control signal for said second-order inclination amplitude equalization section based on a result of the detection.

22. An automatic amplitude equalizer as claimed in claim 21, wherein said second-order inclination amplitude equalization section has the first-order inclination amplitude characteristic or the second-order inclination amplitude characteristic in the frequency-domain and compensates for the second-order inclination amplitude characteristic of the input signal in accordance with the first-order inclination amplitude characteristic or the second-order inclination amplitude characteristic.

23. An automatic amplitude equalizer as claimed in claim 21, wherein said second-order inclination amplitude equalization section includes an equalizer which operates in the time-domain and compensates for the second-order inclination amplitude characteristic of the input signal in accordance with the first-order inclination amplitude characteristic or the second-order inclination amplitude characteristic.

24. An automatic amplitude equalizer as claimed in claim 21, wherein said control section includes a second-order inclination detection section for detecting the second-order inclination amplitude characteristic of the input signal based on a correlation between a value of one of the digital demodulated signals and error information of the one digital demodulated signal, and a signal condition supervision section for supervising a variation condition of the value of the one digital demodulated signal, and outputs, when it is discriminated by said signal condition supervision section that the variation condition of the value of the one digital demodulated signal is a particular condition, the control signal for said second-order inclination amplitude equalization section based on the second-order inclination amplitude characteristic detected by said second-order inclination detection section.

25. An automatic amplitude equalizer as claimed in claim 24, wherein said second-order inclination detection section detects the second-order inclination amplitude characteristic based on a correlation between a value of an equalized signal obtained by processing of the one digital demodulated signal further by means of a transversal equalizer and error information of the equalized signal.

26. An automatic amplitude equalizer as claimed in claim 24, wherein said second-order inclination detection section includes an exclusive OR element for logically exclusively ORing the one digital demodulated signal and the error information of the one digital demodulated signal.

27. An automatic amplitude equalizer as claimed in claim 24, wherein said signal condition supervision section includes a delay section for delaying the one digital demodulated signal by a predetermined time, and a particular signal condition discrimination section for discriminating whether or not a value of the delayed digital demodulated signal from said delay section is in a particular variation condition.

28. An automatic amplitude equalizer as claimed in claim 27, wherein said delay section includes a plurality of delay elements, and said particular signal condition discrimination section is constructed as means for discriminating whether or not values of the one digital demodulated signal from said delay elements exhibit a condition wherein two different values alternately appear repetitively.

29. An automatic amplitude equalizer as claimed in claim 27, wherein said delay section includes a plurality of delay elements, and an inversion/non-inversion section for performing, when values of the one digital demodulated signal from said delay elements exhibit a condition wherein two different values alternately appear repetitively, inversion and non-inversion processing for the values of the one digital demodulated signal from said delay elements to convert the values into a fixed value and outputting the fixed value, and said particular signal condition discrimination section is constructed as means for receiving outputs of said inversion/non-inversion section and discriminating whether or not the values of the one digital demodulated signal received from said inversion/non-inversion section are in a condition wherein the values have all equal to the fixed value.

30. An automatic amplitude equalizer as claimed in claim 21, further comprising a demodulator for producing one of both of the digital demodulated signals from the input signal, and wherein said second-order inclination amplitude equalization section is provided at a preceding stage to said demodulator.

31. An automatic amplitude equalizer as claimed in claim 21, further comprising a demodulator for producing one of both of the digital demodulated signals from the input signal, and wherein said second-order inclination amplitude equalization section is provided at a following stage to said demodulator.

32. An automatic amplitude equalizer as claimed in claim 21, further comprising a demodulator for producing one of both of the digital demodulated signals from the input signal, and wherein said second-order inclination amplitude equalization section is provided, at a following stage to said demodulator, by a plural number corresponding to a number of the digital demodulated signal or signals obtained by said demodulator and said control section is provided by a plural number corresponding to the second-order inclination amplitude equalization sections.

33. An automatic amplitude equalizer for compensating for an amplitude characteristic of an input signal, comprising:
a first-order inclination amplitude equalization section for compensating for a first-order inclination amplitude characteristic of the input signal in accordance with a first-order inclination amplitude characteristic;
a second-order inclination amplitude equalization section for compensating for a second-order inclination amplitude characteristic of the input signal in accordance with a first-order inclination amplitude characteristic or a second-order inclination amplitude characteristic;
a first control section for detecting the first-order inclination amplitude characteristic of the input signal from one of a pair of digital demodulated signals originating from the input signal and outputting a control signal for said first-order inclination amplitude equalization section based on a result of the detection; and
a second control section for detecting a second-order inclination amplitude characteristic of the input signal from the one digital demodulated signal originating from the input signal and outputting a control signal for said second-order inclination amplitude equalization section based on a result of the detection.

34. An automatic amplitude equalizer as claimed in claim 33, wherein said first-order inclination amplitude equalization section has the first-order inclination amplitude characteristic in the frequency-domain and compensates for the first-order inclination amplitude characteristic of the input signal in accordance with the first-order inclination amplitude characteristic thereof.

35. An automatic amplitude equalizer as claimed in claim 33, wherein said first-order inclination amplitude equalization section includes an equalizer which operates in the time-domain and compensates for the first-order inclination amplitude characteristic of the input signal in accordance with the first-order inclination amplitude characteristic thereof.

36. An automatic amplitude equalizer as claimed in claim 33, wherein said second-order inclination amplitude equalization section has the first-order inclination amplitude characteristic or the second-order inclination amplitude characteristic in the frequency-domain and compensates for the the second inclination amplitude characteristic of the input signal in accordance with the first-order inclination amplitude characteristic or the second-order inclination amplitude characteristic thereof.

37. An automatic amplitude equalizer as claimed in claim 33, wherein said second-order inclination amplitude equalization section includes an equalizer which operates in the time-domain and compensates for the second-order inclination amplitude characteristic of the input signal in accordance with the first-order inclination amplitude characteristic or the second-order inclination amplitude characteristic thereof.

38. An automatic amplitude equalizer as claimed in claim 33, wherein said first control section includes a signal direction discrimination section for discriminating a direction of variation of a value of a first one of the digital demodulated signals, an error information detection section for detecting error information from the other, second one of the digital demodulated signals which is orthogonal to the first signal, and a correlation calculation section for outputting a control signal for said first-order inclination amplitude equalization section based on a correlation between the error information obtained by said error information detection section and the direction of variation of the value of the first signal obtained by said signal direction discrimination section.

39. An automatic amplitude equalizer as claimed in claim 33, wherein said first control section includes a first signal direction discrimination section for discriminating a direction of variation of a value of a first one of the digital demodulated signals, a first error information detection section for detecting error information from the other, second one of the digital demodulated signals which is orthogonal to the first signal, a first correlation calculation section for outputting a first correlation signal based on a correlation between the error information obtained by said first error information detection section and the direction of variation of the value of the first signal obtained by said first signal direction discrimination section, a second signal direction discrimination section for discriminating a direction of variation of a value of the second signal, a second error information detection section for detecting error information from the first signal, a second correlation calculation section for outputting a second correlation signal based on a correlation between the error information obtained by said second error information detection section and the direction of variation of the value of the second signal obtained by said second signal direction determination section, and a control signal production section for producing a control signal for said first-order inclination amplitude equalization section from the first correlation signal from said first correlation calculation section and the second correlation signal from said second correlation calculation section.

40. An automatic amplitude equalizer as claimed in claim 33, wherein said second control section includes a second-order inclination detection section for detecting the second-order inclination amplitude characteristic of the input signal based on a correlation between a value and error information of the one digital demodulated signal, and a signal condition supervision section for supervising a variation condition of the value of the one digital demodulated signal, and outputs, when it is discriminated by said signal condition supervision section that the variation condition of the value of the one digital demodulated signal is in a particular condition, a control signal for said second-order inclination amplitude equalization section in accordance with the second-order inclination amplitude characteristic detected by said second-order inclination detection section.

41. An automatic amplitude equalizer as claimed in claim 33, further comprising a demodulator for producing the digital demodulated signals originating from the input signal, and wherein said first-order inclination amplitude equalization section and said second-order inclination amplitude equalization section are provided at preceding stages to said demodulator.

42. An automatic amplitude equalizer as claimed in claim 33, further comprising a demodulator for producing the digital demodulated signals originating from the input signal, and wherein said first-order inclination amplitude equalization section and said second-order inclination amplitude equalization section are provided at following stages to said demodulator.

43. An automatic amplitude equalizer as claimed in claim 33, further comprising a demodulator for producing the digital demodulated signals originating from the input signal, and wherein said first-order inclination amplitude equalization section is provided at a preceding stage to said demodulator while said second-order inclination amplitude equalization section is provided at a following stage to said demodulator.

44. An automatic amplitude equalizer as claimed in claim 33, further comprising a demodulator for producing the digital demodulated signals originating from the input signal, and wherein said second-order inclination amplitude equalization section is provided at a preceding stage to said demodulator while said first-order inclination amplitude equalization section is provided at a following stage to said demodulator.

45. An automatic amplitude equalizer as claimed in claim 33, further comprising a demodulator for producing the digital demodulated signals originating from the input signal, and wherein said second-order inclination amplitude equalization section is provided, at a following stage to said demodulator, by a plural number corresponding to the number of the digital demodulated demodulated signals obtained by said demodulator while said second control section is provided by a plural number corresponding to the second-order inclination amplitude equalization sections.

* * * * *